United States Patent
Saito et al.

(10) Patent No.: US 7,102,980 B2
(45) Date of Patent: Sep. 5, 2006

(54) OPTICAL PICKUP APPARATUS AND OBJECTIVE LENS

(75) Inventors: Shinichiro Saito, Hachioji (JP); Katsuya Sakamoto, Hachioji (JP)

(73) Assignee: Konica Corporation, Tokyo (JP)

( * ) Notice: Subject to any disclaimer, the term of this patent is extended or adjusted under 35 U.S.C. 154(b) by 663 days.

(21) Appl. No.: 09/983,682

(22) Filed: Oct. 25, 2001

(65) Prior Publication Data

US 2002/0159377 A1   Oct. 31, 2002

(30) Foreign Application Priority Data

| Oct. 26, 2000 | (JP) | ............................. 2000-326822 |
| Nov. 30, 2000 | (JP) | ............................. 2000-365554 |
| Mar. 26, 2001 | (JP) | ............................. 2001-086719 |

(51) Int. Cl.
   *G11B 7/135* (2006.01)

(52) U.S. Cl. ............................. 369/112.07; 369/112.12

(58) Field of Classification Search .......... 369/112.26, 369/112.08, 112.07
See application file for complete search history.

(56) References Cited

U.S. PATENT DOCUMENTS

| 5,475,537 | A |   | 12/1995 | Kobayashi et al. | |
| 5,757,758 | A | * | 5/1998 | Yagi et al. ............. | 369/112.25 |
| 5,870,369 | A | * | 2/1999 | Chung et al. ........... | 369/112.26 |
| 5,883,873 | A | * | 3/1999 | Morita ................... | 369/112.26 |
| 5,889,748 | A | * | 3/1999 | Shimano et al. ....... | 369/112.26 |
| 6,049,519 | A | * | 4/2000 | Arai et al. ............. | 369/112.24 |
| 6,084,843 | A | * | 7/2000 | Abe et al. ............... | 369/112.07 |
| 6,104,688 | A | * | 8/2000 | Kikuchi et al. ........ | 369/112.26 |
| 6,118,749 | A | * | 9/2000 | Arai et al. ............. | 369/112.26 |
| 6,124,988 | A | * | 9/2000 | Yanagisawa et al. ....... | 359/719 |
| 6,192,021 | B1 | * | 2/2001 | Saito et al. .................. | 369/53.2 |
| 6,259,668 | B1 | * | 7/2001 | Lee et al. ............. | 369/112.26 |
| 6,285,646 | B1 | * | 9/2001 | Yoo et al. ............. | 369/112.26 |
| 6,370,103 | B1 | * | 4/2002 | Yamazaki et al. ..... | 369/112.26 |
| 6,671,247 | B1 | * | 12/2003 | Arai et al. ............. | 369/112.01 |
| 6,870,805 | B1 | * | 3/2005 | Arai et al. ............. | 369/112.07 |

FOREIGN PATENT DOCUMENTS

| EP | 0 840 144 A1 | 5/1998 |
| EP | 1 022 731 A2 | 7/2000 |
| EP | 1 102 250 A2 | 5/2001 |

* cited by examiner

Primary Examiner—Brian E. Miller
Assistant Examiner—Michael V. Battaglia
(74) Attorney, Agent, or Firm—Finnegan, Henderson, Farabow, Garrett & Dunner, L.L.P.

(57) ABSTRACT

An objective lens of an optical pickup apparatus converges a divergent light flux onto an information recording surface. The following conditional formula is satisfied:

$$|\delta SA_1/\delta U|\cdot|\delta U|+|\delta SA_2/\delta T|\cdot|\delta T|\leq 0.07 \ \lambda rms$$

where $\lambda$ represents a wavelength of a light source, $\delta SA_1/\delta U$ represents a change of a spherical aberration for an object-to-image distance change $\delta U$ ($|\delta U|\leq 0.5$ mm) and $\delta SA_2/\delta T$ represents a change of spherical aberration for a temperature change $\delta T$ ($|\delta T|\leq 30°$ C.), the object-to-image distance is a distance between the light source (a light emitting point) and the information recording surface.

253 Claims, 46 Drawing Sheets

FIG. 3
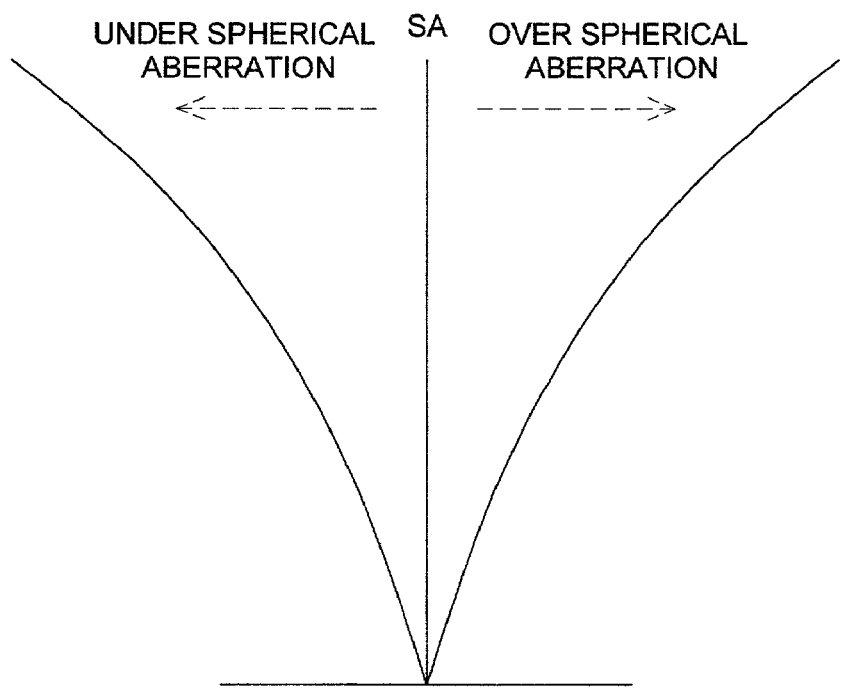
FIG. 4 (a)             FIG. 4 (b)
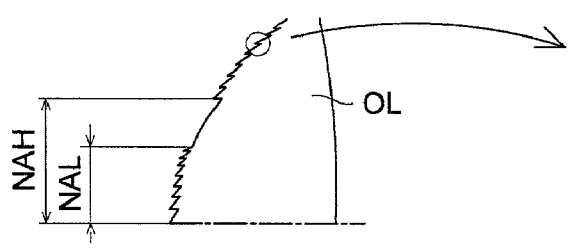    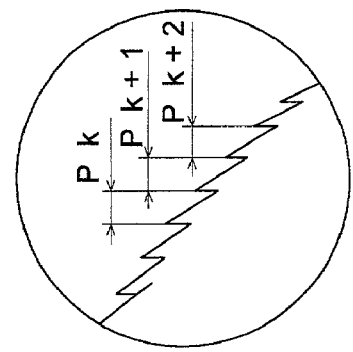
PITCH OF RING-SHAPED
DIFFRACTIVE ZONES

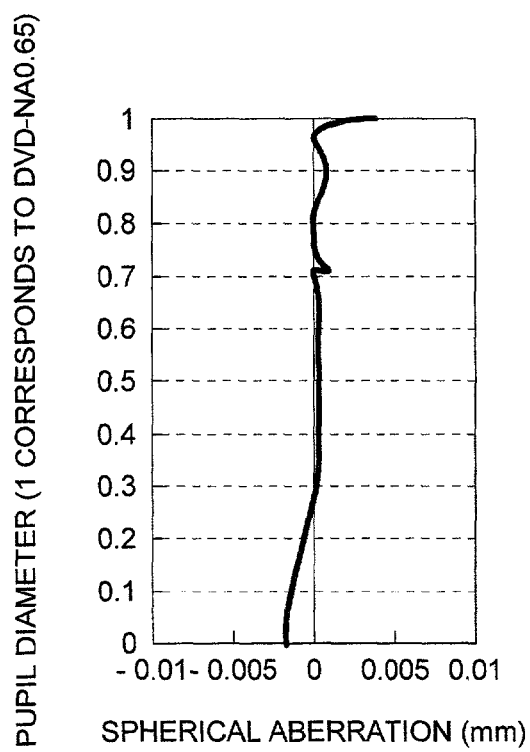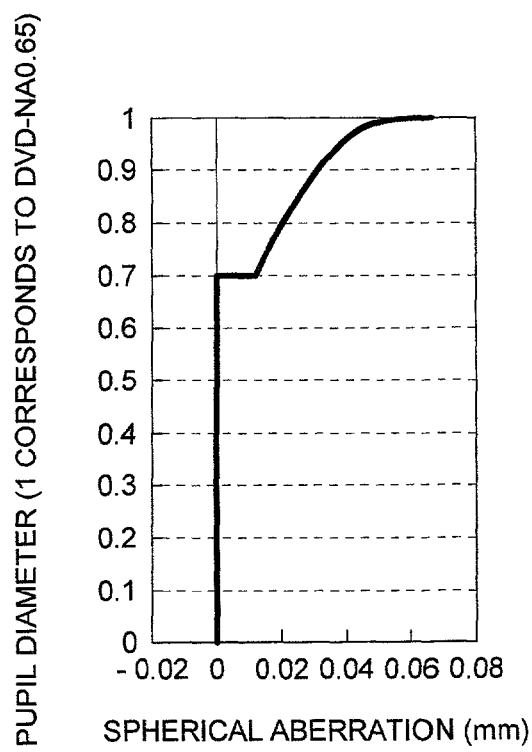

FIG. 50 ( a )
FIG. 50 ( b )
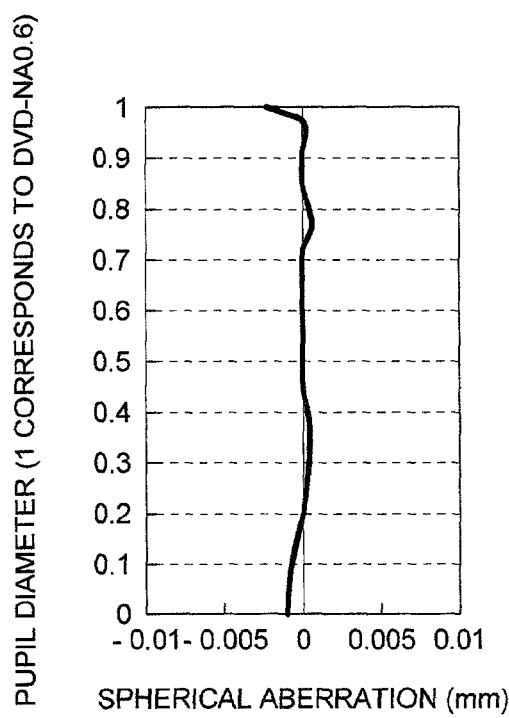
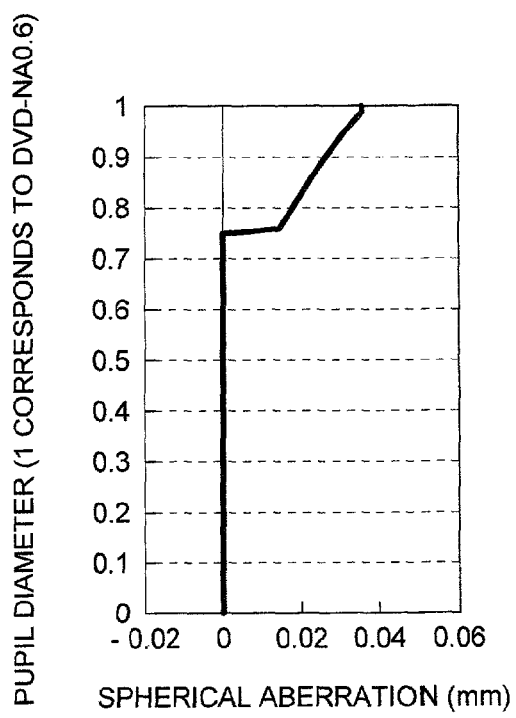

OPTICAL PICKUP APPARATUS AND OBJECTIVE LENS

BACKGROUND OF THE INVENTION

The present invention relates to an objective lens of an optical pickup device and to the optical pickup device, and in particular, to an objective lens wherein magnification is finite and yet the temperature characteristics are excellent for recording or reproduction for at least two optical information recording media each having a transparent base board with a different thickness and to an optical pickup device.

With regard to a recording/reproducing optical system for optical information recording media having a precision required for the conventional CD reproducing apparatus (incidentally, a recording/reproducing optical system or a recording/reproducing apparatus mentioned in the present specification includes a recording optical system, a reproducing optical system, a recording and reproducing optical system, and an apparatus employing the foregoing), an infinite conjugated optical system is disclosed in TOKKAI-SHO No. 57-76512, and a finite conjugated optical system is disclosed in TOKKAISHO No. 61-56314. Further, for reducing occurrence of aberration caused by a temperature change in the case of using an objective lens made of resins, those employing a coupling lens are disclosed in TOK-KAIHEI No. 6-258573. However, lenses made of resin (plastic) are used widely for a recording/reproducing optical system, especially for its objective lens, because of the recent demand for low cost.

However, an objective lens made of resin materials has a problem that aberration caused by a change in a refractive index that is derived from a temperature change is greater than that of a lens made of glass materials. In general, a change of a refractive index in resin materials is different from that of a refractive index in glass materials by ten times or more. In this case, when a difference between a temperature of the standard design and a temperature in the environment used actually is represented by $\Delta T$, aberration changed by this temperature difference $\Delta T$ is mainly tertiary spherical aberration. Let it be assumed that SA represents the tertiary spherical aberration components of wave front aberration expressed in an rms value, and a sign of SA is defined so that SA is greater than zero when the spherical aberration is positive (over), while, SA is smaller than zero when the spherical aberration is negative (under). Tertiary spherical aberration $\Delta SA$ ($\lambda$rms) caused by temperature change $\Delta T$ can be expressed in the following expression by using numerical aperture NA of the objective lens on the optical information recording medium side (on the image side), focal length f, image forming magnification m, proportion coefficient k and light wavelength $\lambda$.

$$\Delta SA/\Delta T = k \cdot f(1-m)^4 (NA)^4/\lambda \quad (1)$$

Incidentally, when a lens made of a resin material has a positive refracting power, if a temperature rises, its tertiary spherical aberration turns out to be over. Namely, the coefficient k in the aforesaid expression takes a positive value. Further, when a single lens made of a resin material is made to be an objective lens, the coefficient k takes a greater positive value.

In the case of an objective lens used for a compact disc that is widely used presently, it can be said that aberration caused by a temperature change in the environment used does not arrive at the problematic level, because NA is about 0.45. However, optical information recording media are now promoted to be of high density.

To be concrete, there has been developed DVD (storage capacity: 4.7 GB) which is in the size mostly the same as that of CD (storage capacity: 640 MB) and has raised recording density, and it is now popularized rapidly. For reproduction of DVD, it is normal to use a laser beam with a prescribed wavelength for which a wavelength of the light source is in a range of 635–660 nm. A divergent light flux emitted from a laser light source is made to be a collimated light flux by a collimator lens generally, and then, it enters an objective lens whose NA on the DVD side is 0.6 or more to be converged on an information recording surface through a transparent base board of DVD.

In consideration of the foregoing from the viewpoint of wave front aberration, when NA, for example, is increased from 0.45 to 0.6 in the expression (1) above, wave front aberration $\lambda$rms is increased to $(0.6/0.45)^4 = 3.16$ times.

Though it is considered to make focal length f to be small for the purpose of keeping the wave front aberration small based on the expression (1), in this case, it is difficult to make f to be smaller than the present value, because it is actually necessary to secure a distance of focusing operation.

With the background stated above, there have been proposed various types of objective lenses and optical pickup devices for conducting recording or reproduction, by using a single light-converging optical system, for a plurality of optical information recording media each having a transparent base board with a different thickness. It is known that the use of plastic lenses for the aforesaid objective lens and optical pickup device is advantageous for lightening a load for an actuator in the course of focusing and tracking, and for moving the objective lens rapidly, for making an optical pickup device to be light in weight, and for lowering the cost. For example, there are known an objective lens made of plastic and an optical pickup device employing the same wherein a divergent light is made to enter the objective lens for recording or reproducing of CD for restraining occurrence of spherical aberration caused by a thickness difference between transparent base boards, by utilizing that a diameter of a spot necessary for recording or reproducing for DVD (thickness of the transparent base board is 0.6 mm) and CD (thickness of the transparent base board is 1.2 mm) each having different recording density for information, is different each other and a necessary numerical aperture of the objective lens on the image side is different.

In the optical pickup device of this type, if an objective lens is made to be the finite conjugated type objective lens which is suitable for a divergent light flux from a light source to enter and an optical pickup device is made to be one employing that objective lens, for both recording or reproducing of DVD and recording or reproducing of CD, there are obtained merits that the optical pickup device can be made small and compact totally and a collimator lens to make a divergent light flux from a light source to be unnecessary. However, an objective lens which is made of plastic and satisfies various performances necessary for an optical pickup device, and an optical pickup device employing such objective lens made of plastic are not on practical use, and studies for them have not made yet.

On the other hand, in the case of a lens system using a conventional objective lens made of resin materials, there has been generated aberration that is proportional to the fourth power of numerical aperture NA of the objective lens on the image side, and is caused by refractive index change An of resin material derived from a temperature change, and this aberration has made it difficult to realize an objective lens and an optical pickup device both having sufficient optical performances.

With the aforesaid background, the inventors of the invention repeated trials and errors for realizing the objective lens and the optical pickup device stated above, and found out that an improvement of temperature characteristics of an objective lens is important for the realization. To be more concrete, they found out that the realization can be carried out by an objective lens and an optical pickup device, wherein there is provided a diffraction construction which makes spherical aberration for temperature changes to be satisfactory, on at least a peripheral area on at least one surface of the objective lens.

A first object of the invention is to provide a practical objective lens and an optical pickup device, wherein a divergent light emitted from a light source enters the objective lens, and sufficient properties for temperature changes in ambient conditions used are satisfied. Further, the first object of the invention is to provide a practical objective lens and an optical pickup device, wherein a divergent light emitted from a light source enters the objective lens, for a plurality of optical information recording media each having a transparent base board with a different thickness, and sufficient properties for temperature changes in ambient conditions used are satisfied, while making recording or reproducing for each information to be possible.

Further, the present invention relates to an objective lens and an optical pickup apparatus having a good temperature characteristics and a wide allowable range for a wavelength change of an light source.

An information recording surface of an optical information recording medium such as CD and DVD is usually protected by a transparent base board having a thickness stipulated by a standard. For conducting recording and reproducing for the optical information recording media, there is used an objective lens that is corrected in terms of spherical aberration for the transparent base board having that thickness. As an objective lens for recording and reproducing for these optical information recording media, various types of objective lenses are now studied, and TOKKAIHEI No. 6-258573, for example, discloses an objective lens of a refraction type wherein both sides thereof are aspheric surfaces. On this objective lens, there is introduced an aspheric surface to correct aberration of an optical system.

FIG. 52 is a diagram showing how residual aberration (spherical aberration) is generated when a thickness of the transparent base board is changed. When the spherical aberration is worsened, a diameter of a light spot formed on an information surface of an optical information recording medium is changed from the desired diameter. The desired spot diameter (range of $1/e^2$ of peak intensity), in this case, is approximated to Spot diameter $(\mu m)=0.831\times\lambda/NA$, when the numerical aperture of the objective lens is represented by NA and a wavelength of the light source is represented by $\lambda$ ($\mu m$). Therefore, further technologies are needed for securing interchangeability of optical information recording media each having a different thickness of the transparent base board.

TOKKAI No. 2000-81566 discloses technologies wherein spherical aberration for the specific transparent base board thickness is corrected in the wavelength used for CD or DVD, when a diffraction surface is united solidly with an aspheric surface of an objective lens. In this objective lens, over spherical aberration of base aspheric surface in a refraction system is corrected by under spherical aberration generated on the diffractive section. In this case, the diffractive section has a function to correct spherical aberration toward the under side in CD having a thick transparent base board, because the diffractive section has power that is proportional to the wavelength. Therefore, if power allocation for the refraction section and the diffractive section is properly selected, it is possible to correct spherical aberration in the transparent base board thickness of 0.6 mm for light source wavelength 650 nm in the case of using DVD and spherical aberration in the transparent base board thickness of 1.2 mm for light source wavelength 780 nm in the case of using CD. Further, TOKKAIHEI No. 11-274646 discloses an example wherein there is provided a diffraction surface which corrects fluctuations of a focus position caused by a refractive index change resulting from a temperature change of a plastic lens.

In these objective lenses, there is a tendency that a change of spherical aberration caused by temperature changes is increased as there are advanced a movement toward the finite of an optical pickup device, a movement toward a short wavelength and a movement toward high NA, for recording and reproducing for high density information. Amount of change $\delta SA_3$ of $3^{rd}$ order component of spherical aberration caused by temperature changes is expressed by the following expression, when NA represents a numerical aperture of an objective lens on the image side, f represents a focal length, m represents an image forming magnification and $\lambda$ represents a wavelength of a laser light source.

$$(\delta SA_3/\delta T) \propto f \cdot (1-m)^4 NA^4/\lambda \qquad (116)$$

Therefore, there is a tendency that temperature characteristics are deteriorated more as a movement toward an objective lens for high NA and a movement toward the finite of the objective lens are advanced, or as a movement toward a short wavelength of a laser light source is advanced. Error characteristics (conventional Example 1) in the case of designing on a conventional refracting interface are shown in "Table 14". Incidentally, from now on (including lens data of the table), the power multiplier of 10 (for example, $2.5\times10^{-3}$) is shown by the use of E (for example, $2.5\times E-3$).

TABLE 14

| | f(mm) DVD | m | λ(nm) | NA | Transparent base board thickness (mm) | dn/dT(/° C.) | $\delta SA_3$ (λ rms) at DVD in temperature change ($\delta T$ = +30° C., $\delta\lambda$ = +6 nm) |
|---|---|---|---|---|---|---|---|
| Conventional Example 1 | 3.0 | 0 | 785 | 0.50 | 1.2 | −1.20E−04 | +0.011(CD) |

TABLE 14-continued

| | | | | | | | |
|---|---|---|---|---|---|---|---|
| Conventional Example 2 | 3.0 | −1/7.0 | 650 | 0.60 | 0.6 | −1.20E-04 | +0.098 |
| Conventional Example 3 | 3.05 | −1/6 | 650 | 0.60 | 0.6 | −1.20E-04 | −0.002 |
| Example 1 | 3.0 | −1/7.0 | 650/780 | 0.60/0.45 | 0.6/1.2 | −5.80E-06 | +0.002 |
| Example 2 | 3.0 | −1/7.0 | 650/780 | 0.60/0.45 | 0.6/1.2 | −1.20E-04, +0.8E-06 | +0.027 |
| Example 3 | 3.0 | ∞ | 660/790 | 0.65/0.45 | 0.6/1.2 | −5.70E-06 | +0.009 |
| Example 4 | 3.0 | ∞ | 660/790 | 0.65/0.50 | 0.6/1.2 | −1.20E-04, +7.4E-06 | +0.019 |
| Example 5 | 3.0 | −1/7.0 | 650/780 | 0.60/0.45 | 0.6/1.2 | −1.20E-04, +0.8E-06 | −0.004 |
| Example 6 | 3.0 | −1/10.0 | 650/780 | 0.60/0.45 | 0.6/1.2 | −5.80E-06 | +0.002 |

| $\delta SA_3$ ($\lambda$ rms) at DVD in wavelength change ($\delta\lambda$ = +10 nm) | Type of objective lens | Minimum pitch of ring-shaped diffractive zone ($\mu$m) |
|---|---|---|
| +0.000 (CD) | Refractive surface only | — |
| +0.008 | Refractive surface only | — |
| +0.076 | Diffractive surface | 3 |

| $\delta SA_3$ ($\lambda$ rms) at DVD in wavelength change ($\delta\lambda$ = +10 nm) | Type of objective lens | Minimum pitch of ring-shaped diffractive zone ($\mu$m) | DVD spot diameter ($\mu$m) | CD spot diameter ($\mu$m) |
|---|---|---|---|---|
| +0.007 | Refractive surface only | — | 0.903 | 1.420 |
| +0.005 | Refractive surface only | — | 0.898 | 1.414 |
| +0.008 | Diffractive surface | 14 | 0.846 | 1.487 |
| +0.032 | Diffractive surface | 9 | 0.851 | 1.265 |
| −0.012 | Diffractive surface | 10 | 9.004 | 1.359 |
| −0.001 | Diffractive surface | 8 | 8.900 | 1.430 |

For the problems mentioned above, there is considered a method to improve temperature characteristics by employing diffraction, as shown in the prior art. However, when trying to improve temperature characteristics by employing diffraction, following two troubles are caused. First one of these troubles is that an objective lens turns out to be weak for wavelength characteristics. The direction in which spherical aberration is generated by temperature changes on a refraction section is originally different from that on a diffractive section, and when trying to improve temperature characteristics more, spherical aberration generated on the refraction section alone is canceled by strengthening effectiveness of the diffractive section relatively, but in the case of wavelength changes which are not followed by temperature changes, the aforesaid spherical aberration remains as residual aberration without being canceled, which is the reason why the objective lens turns out to be weak for wavelength characteristics.

The second trouble is that when trying to make the effectiveness of diffraction to be great, diffraction pitch becomes small and diffraction efficiency is lowered. There is a tendency, in particular, that a pitch becomes smaller as the position corresponding to the pitch moves in the direction toward the periphery of the objective lens. In the case of Conventional Example 2 in "Table 14" wherein temperature characteristics have been corrected thoroughly, a minimum pitch of the ring-shaped diffractive zone is 3 μm and diffraction efficiency is lowered to about 80% on the ring-shaped diffractive zone.

The invention is to solve the aforesaid problems, and the second object is to provide an objective lens which makes it possible to conduct recording and reproducing for optical information recording media each having a different transparent base board thickness such as DVD system (DVD-ROM and DVD+RAM) and CD system (CD-ROM and CD+RW) and an optical pickup device, while securing excellent temperature characteristics.

SUMMARY OF THE INVENTION

Firstly, the structure to achieve the first object is explained.

When a diffractive section is provided on an objective lens, it is possible to divide into a refracting power of diffraction basic aspheric surface and a diffracting power of the diffractive section, even in the case of a single lens, and a degree of freedom in design is increased, compared with an occasion to construct a lens only with refraction. If this power allocation between the refracting power and the diffracting power is carried out properly, temperature characteristics can be corrected. Now, the correction of temperature characteristics in the case of introducing a plastic objective lens in a finite optical system will be explained.

When $\partial SA/\partial T$ represents a change in an amount of tertiary spherical aberration for temperature changes of a spherical-aberration-corrected positive lens made of a resin such as a single objective lens with an aspheric surface having no diffraction pattern that is commonly used for recording and reproducing of optical information recording media, the change is expressed by the following expression.

$$\partial SA/\partial T = (\partial SA/\partial n)\cdot(\partial n/\partial T) + (\partial SA/\partial n)\cdot(\partial n/\partial\lambda)\cdot(\partial\lambda/\partial T) = (\partial SA/\partial n)\{(\partial n/\partial T) + (\partial n/\partial\lambda)\cdot(\partial\lambda/\partial T)\} \quad (4)$$

In this case, $(\partial n/\partial T)<0$ and $(\partial n/\partial X)<0$ hold for resin materials. $(\partial n/\partial T)=0$ and $(\partial n/\partial\lambda)<0$ hold for glass materials. $(\partial n/\partial T)>0$ holds for a semiconductor laser and $(\partial k/\partial T)=0$ holds for an SHG laser, a solid state laser and a gas laser.

Incidentally, though $(\partial n/\partial T)$ for glass materials and $(\partial k/\partial T)$ for an SHG laser, a solid state laser and a gas laser are made to be zero, these values are not zero to be exact. However, they are thought to be zero practically in the field of the invention, and thereby, the explanation can be simplified. Therefore, the explanation is forwarded under the assumption that these values are zero.

Now, when a light source is represented by an SHG laser, a solid state laser or a gas laser, and $(\partial\lambda/\partial T)=0$ holds, the following expression holds.

$$\partial SA/\partial T = (\partial SA/\partial n)\cdot(\partial n/\partial T) \quad (5)$$

If this lens is made of glass, $(\partial n/\partial T)=0$ holds, and therefore, $\partial SA/\partial T=0$ holds. On the other hand, if the lens is made of resin, $(\partial n/\partial T)<0$ holds, and $(\partial SA/\partial n)<0$ holds, because $\partial SA/\partial T>0$ holds for the lens of this kind. Further, $(\partial X/\partial T)>0$ holds when a light source is represented by a semiconductor laser.

In this case, even when the lens is made of glass, the following expression holds, $$\partial SA/\partial T = (\partial SA/\partial n)\cdot(\partial n/\partial\lambda)\cdot(\partial\lambda/\partial T) \quad (6)$$

and $\partial SA/\partial T>0$ holds because of $(\partial n/\partial\lambda)<0$ and $(\partial SA/\partial n)<0$.

When a wavelength of incident light turns out to be shorter irrespective of glass materials and resin materials, an absolute value of $(\partial n/\partial\lambda)$ turns out to be greater. When using a semiconductor laser with a short wavelength, therefore, it is necessary to pay attention to temperature changes for spherical aberration, even for glass materials.

On the other hand, when an amount of a change of tertiary spherical aberration for temperature changes is formulated in terms of $\partial SA/\partial T$, with respect to a resin aspherical single lens having a diffraction pattern, the following is obtained. In this case, it is necessary to take in both characteristics of the refracting power and characteristics of the diffracting power. When R is suffixed to amount of change $\partial SA$ of a spherical aberration amount to which a refracting lens section contributes, and D is suffixed to amount of change $\partial SA$ of a spherical aberration amount to which a diffracting power contributes for indicating, $\partial SA/\partial T$ can be expressed as follows.

$$\partial SA/\partial T = (\partial SA_R/\partial n)\cdot(\partial n/\partial T) + (\partial SA_R/\partial n)\cdot(\partial n/\partial\lambda)\cdot(\partial\lambda/\partial T) + (\partial SA_D/\partial\lambda)\cdot(\partial\lambda/\partial T) \quad (7)$$

In this case, when a light source is represented by an SHG laser, a solid state laser or a gas laser, and when $(\partial\lambda/\partial T)=0$ holds, the following expression holds.

$$\partial SA/\partial T = (\partial SA_R/\partial n)\cdot(\partial n/\partial T) \quad (8)$$

In the case of a glass lens, in this case, $(\partial n/\partial T)=0$ naturally holds, and $\partial SA/\partial T=0$ holds independently of a value of $(\partial SA_R/\partial n)$. In the case of a resin lens, on the other hand, $(\partial n/\partial T)<0$ holds, and if $(\partial SA_R/\partial n)=0$ holds, $\partial SA/\partial T=0$ can hold.

In the invention, therefore, a diffracting power is introduced to a resin aspherical single lens, so that $(\partial SA_R/\partial n)=0$ may hold with respect to a refracting power. However, in the case of a refracting power alone, spherical aberration remains, but the use of a diffracting power makes it possible to correct spherical aberration of an optical information recording medium on one side.

On the other hand, in the case of a light source represented by a semiconductor laser, $(\partial\lambda/\partial T)>0$ holds, and in the case of an objective lens having characteristics of the aforesaid $(\partial SA_R/\partial n)=0$, the following expression is obtained from the aforesaid expression (7).

$$\partial SA/\partial T = (\partial SA_D/\partial\lambda)\cdot(\partial\lambda/\partial T) \quad (9)$$

However, $(\partial SA_D/\partial\lambda)\neq 0$ usually holds, and it is understood that an amount of tertiary spherical aberration is changed by temperature.

Further, the expression (7) stated above can be deformed to the following expression.

$$\partial SA/\partial T = (\partial SA_R/\partial n)\cdot\{(\partial n/\partial T)\cdot(\partial n/\partial\lambda)\cdot(\partial\lambda/\partial T)\} + (\partial SA_D/\partial\lambda)\cdot(\partial\lambda/\partial T) \quad (10)$$

In the case of a resin lens, in this case, $(\partial SA/\partial T)<0$ holds, a light source is represented by a semiconductor laser, and $(\partial\lambda/\partial T)>0$ holds. Therefore, the following expression is obtained.

$$(\partial n/\partial T) + (\partial n/\partial\lambda)\cdot(\partial\lambda/\partial T)<0 \quad (11)$$

When $(\partial SA_R/\partial n)<0$ holds as an assumption, the first term of expression (10) turns out to be a positive value from expression (11). To make $\partial SA/\partial T=0$ to hold, the second term needs to take a negative value under the condition of $(\partial SA_D/\partial\lambda)<0$, because of $(\partial n/\partial T)>0$.

In the resin aspherical single lens having a diffracting power with the characteristics stated above, $\partial SA/\partial T>0$ holds because $(\partial SA_R/\partial n)<0$ and $(\partial n/\partial T)<0$ hold in the aforesaid expression (8), in the case of $(\partial\lambda/\partial T)=0$.

Spherical aberration $\partial SA/\partial\lambda$ in the case where a temperature is constant and a wavelength only changes can be expressed by the following expression.

$$\partial SA/\partial\lambda = (\partial SA_R/\partial n)\cdot(\partial n/\partial\lambda) + (\partial SA_D/\partial\lambda) \quad (12)$$

Though the first term is positive and the second term is negative, the diffracting power mainly contributes greatly to chromatic aberration of an aspherical single lens having a diffracting power as is known widely, thus, a sign of $\partial SA/\partial\lambda$ is determined by the second term of the above expression (12), and $\partial SA/\partial\lambda<0$ generally holds.

Namely, in the resin single lens into which a diffracting power is introduced, it is possible to make $\partial SA/\partial T$ to hold even in the case of a light source represented by a semiconductor laser, by making $\partial SA_R/\partial T>0$ and $\partial SA_D/\partial\lambda<0$ to hold.

When $(\partial SA_R/\partial n)>0$ holds, on the contrary, it is possible to make $\partial SA/\partial T$ to hold even in the case of a light source represented by a semiconductor laser, by making $\partial SA_R/\partial T<0$ and $\partial SA_D/\partial\lambda>0$ to hold, though calculation is omitted here.

Namely, it is needed that a sign of $\partial SA_R/\partial T$ is opposite to that of $\partial SA_D/\partial\lambda$. In this case, the relationship of $\partial SA_R/\partial T\cdot\partial SA_D/\partial\lambda$ holds. The invention makes it possible to provide an objective lens wherein sufficient functions can be secured even for changes of ambient temperatures used. In this case, when $(\partial SA/\partial T)$ is made to be greater than zero, the characteristic of the objective lens is closer to that of a resin aspherical single lens having no diffracting power, and thereby, a load of diffracting power is less, which is preferable. The invention makes it possible to provide an objective lens wherein sufficient functions can be secured even for changes of ambient temperatures used.

The objective lens having the structure stated above makes it possible to correct spherical aberration and temperature for an optical information recording medium on one side. Further, to conduct recording/reproducing of an optical information recording medium on the other side, optical surface areas which can divide a light flux entering the objective lens into some areas are formed on at least one side of the objective lens. Then, a certain light flux in an intermediate section of the divided light flux is made to be a spherical aberration design corresponding to a transparent base board thickness of the other disc. Satisfactory allocation of these divided light fluxes makes it possible to correct spherical aberration and temperature of an optical information recording medium on one side and to correct spherical aberration of an optical information recording medium on the other side.

(1) The optical pickup device described in (1) having therein a light source and a light-converging optical system including an objective lens for converging a light flux emitted from the light source on an information recording surface of an optical information recording medium, and is capable of conducting recording and/or reproducing of information for a first optical information recording medium in which a thickness of a transparent base board is $t_1$ and for a second optical information recording medium in which a thickness of a transparent base board is $t_2$ ($t_1 < t_2$), wherein the objective lens is a plastic lens, a divergent light flux emitted from the light source enters the objective lens when recording or reproducing information for the first optical information recording medium and when recording or reproducing information for the second optical information recording medium, and the following conditional expression is satisfied when $\lambda$ represents a wavelength of the light source, $\delta SA_1/\delta U$ represents a change of spherical aberration for object-image distance change $\delta U(|\delta U| \leq 0.5$ mm) and $\delta SA_2/\delta T$ represents a change of spherical aberration for temperature change $\delta T$ ($|\delta T| \leq 30°$ C.).

$$|\delta SA_1/\delta U|\cdot|\delta U|+|\delta SA_2/\delta T|\cdot|\delta T| \leq 0.07\ \lambda \text{rms} \quad (14)$$

In the optical pickup device described in (1), when the sum total of $|\delta SA_1/\delta U|\cdot|\delta U|$ and $|\delta SA_2/\delta T|\cdot|\delta T|$ is looked and it is made to be not more than 0.07 $\lambda$rms by providing the diffractive structure on the objective lens, for example, it is possible to conduct properly recording or reproducing of information for two optical information recording media even under the condition that a divergent light flux with a single light source wavelength enters the objective lens, and it is possible to omit a collimator lens for forming a collimated light flux that enters the objective lens, to attain cost reduction, and to make the structure of the optical pickup device to be compact.

Incidentally, the word "object-to-image distance" means a distance between a light source (a light emitting point) and an information recording surface of an optical information recording medium.

(2) In the optical pickup device described in (2), at least one surface of the objective lens is provided with a diffractive structure on at least a peripheral area in an effective diameter, and it is possible to conduct recording or reproducing of information for two optical information recording media properly even under the condition that a divergent light flux enters the objective lens, because the following conditional expression is satisfied when $\delta SA_1/\delta T$ represents a change of spherical aberration for temperature change $\delta T$ in a light flux which has passed the diffractive structure on the peripheral area among light fluxes emitted from the light source.

$$|\delta SA_1/\delta T| \leq 0.002\ \lambda \text{rms}/°\text{ C.} \quad (15)$$

(3) In the optical pickup device described in (3), it is possible to conduct recording or reproducing of information for two optical information recording media properly even under the condition that a divergent light flux enters the objective lens, because the following conditional expression is satisfied when $\delta SA_1/\delta T$ represents a change of spherical aberration for temperature change $\delta T$ in a light flux which has passed the diffractive structure on the peripheral area among light fluxes emitted from the light source.

$$|\delta SA_1/\delta T| \leq 0.0005\ \lambda \text{rms}/°\text{ C.} \quad (16)$$

(4) In the optical pickup device described in (4), the diffractive structure on the peripheral area of the objective lens is a ring-shaped diffractive zone, and with regard to a light flux passing through the diffractive structure of the peripheral area of the objective lens among light fluxes emitted from the light source, an average pitch P out of the ring-shaped diffractive zone satisfies the following expression.

$$2.00\times10^{-4} \leq P\text{ out}/(|n|\cdot f) \leq 3.00\times10^{-2} \quad (17)$$

(5) In the optical pickup device described in (5), an average pitch P out of the ring-shaped diffractive zone satisfies the following expression.

$$1.00\times10^{-3} \leq =P\text{ out}/(|n|\cdot f) \leq 3.00\times10^{-3} \quad (18)$$

(6) In the optical pickup device described in (6), an average pitch P out of the ring-shaped diffractive zone satisfies the following expression.

$$3.00\times10^{-3} \leq P\text{ out}/(|n|\cdot f) \leq 8.00\times10^{-3} \quad (19)$$

(7) In the optical pickup device described in (7), the optical surface of the objective lens is composed of three or more kinds of optical surface areas arranged in the direction perpendicular to an optical axis, and when the three or more kinds of optical surface areas are represented by an optical surface area closer to the optical axis, an intermediate optical surface area and an optical surface area closer to the outside, all arranged in this order from the optical axis side, the optical surface area closer to the outside is the area on the peripheral side stated above.

(8) In the optical pickup device described in (8), spherical aberration is discontinuous in at least one of a boundary between the optical surface area closer to the optical axis and the intermediate optical surface and a boundary between the intermediate optical surface area and the optical surface area closer to the outside.

(9) In the optical pickup device described in (9), a diffractive section where ring-shaped diffractive zones are formed is formed on the optical surface area closer to the optical axis, and average pitch P in of the ring-shaped diffractive zones satisfies the following expression, when n-th order light represents a diffracted light with a maximum amount of light generated by the diffractive structure from a light flux passing through the diffractive structure on the optical surface area closer to the light source among light fluxes emitted from the light source, and f represents a focal length of the objective lens.

$$3.00\times10^{-3}P\text{ in}/(|n|\cdot f) \leq 8.0\times10^{-2} \quad (20)$$

(10) In the optical pickup device described in (10), the optical surface area closer to the outside has a function to correct spherical aberration when recording or reproducing information for the first optical information recording medium stated above.

(11) In the optical pickup device described in (11), when recording or reproducing information for the first optical information recording medium, spherical aberration of the light flux passing through the intermediate optical surface area is made to be discontinuous and to be flare component, for spherical aberration of the light flux passing through the optical surface area closer to the outside, while when recording or reproducing information for the second optical information recording medium, the light flux passing through the intermediate optical surface area is used.

Incidentally, the flare component is one wherein an amount of spherical aberration is given to the light flux passing through the intermediate optical surface area, so that the light flux may be in the non-image-forming state at a focused position of a regular optical information recording medium, and the greater amount of spherical aberration is preferable. Further, the greater amount of a difference of steps at a position of a boundary between optical surfaces is preferable.

(12) In the optical pickup device described in (12), the intermediate optical surface area has a function to correct spherical aberration for thickness t ($t_1 < t < t_2$) of a transparent base board.

(13) In the optical pickup device described in (13), when recording or reproducing information for the first optical information recording medium, a light flux passing mainly through the optical surface area closer to the optical axis and the optical surface area closer to the outside is used, while when recording or reproducing information for the second optical information recording medium, a light flux passing mainly through the optical surface area closer to the optical axis and the intermediate optical surface area is used.

(14) In the optical pickup device described in (14), when recording or reproducing information for the second optical information recording medium, the following expressions are satisfied under the assumption that the intermediate optical surface area is formed within a range from the shortest distance from an optical axis NAH mm to NAL mm when a necessary numerical aperture is represented by $NA_2$ and a focal length of the objective lens is represented by $f_2$.

$$(NA_2-0.03)f_2 \leq NAH \leq (NA_2+0.03)f_2 \quad (21)$$

$$(NA_2-0.20)f_2 \leq NAL \leq (NA_2-0.04)f_2 \quad (22)$$

(15) In the optical pickup device described in (15), when recording or reproducing information for the first optical information recording medium, a light flux passing through the intermediate optical surface area is made to have under spherical aberration.

(16) In the optical pickup device described in (16), the optical surface area closer to the optical axis has a function to correct spherical aberration when recording or reproducing information for the first optical information recording medium.

(17) In the optical pickup device described in (17), the optical surface area closer to the optical axis has a function to correct temperature characteristics when recording or reproducing information for the first optical information recording medium.

(18) In the optical pickup device described in (18), the optical surface of the objective lens is composed of two or more kinds of optical surface areas arranged in the direction perpendicular to an optical axis, and when the two kinds of optical surface areas are represented by an optical surface area closer to the optical axis and an optical surface area closer to the outside, the optical surface area closer to the outside is the area on the peripheral side stated above.

(19) In the optical pickup device described in (19), a diffractive section where ring-shaped diffractive zones are formed is formed on the optical surface area closer to the optical axis, and average pitch P in of the ring-shaped diffractive zones satisfies the following expression, when $n^{th}$ order light represents a diffracted light with a maximum amount of light generated by the diffractive structure from a light flux passing through the diffractive structure on the optical surface area closer to the light source among light fluxes emitted from the light source, and f represents a focal length of the objective lens.

$$3.00 \times 10^{-3} \leq P \text{ in}/(|n| \cdot f) \leq 8.0 \times 10^{-2} \quad (23)$$

(20) In the optical pickup device described in (20), the optical surface area closer to the outside has a function to correct spherical aberration when recording or reproducing information for the first optical information recording medium.

(21) In the optical pickup device described in (21), the optical surface area closer to the optical axis has a function to correct spherical aberration for thickness t ($t_1 < t < t_2$) of a transparent base board. (22) In the optical pickup device described in (22), when recording or reproducing information for the first optical information recording medium, the optical surface area closer to the optical axis makes a light flux passing through the optical surface area closer to the optical axis to have under spherical aberration, and when recording or reproducing information for the second optical information recording medium, the optical surface area closer to the optical axis makes a light flux passing through the optical surface area closer to the optical axis to have over spherical aberration.

(23) In the optical pickup device described in (23), when recording or reproducing information for the second optical information recording medium, the following expression is satisfied under the assumption that the optical surface area closer to the optical axis is formed within a range of the shortest distance NAH mm from the optical axis, when a necessary numerical aperture is represented by $NA_2$ and a focal length of the objective lens is represented by $f_2$.

$$(NA_2-0.03)f_2 \leq NAH \leq (NA_2+0.03)f_2 \quad (24)$$

(24) In the optical pickup device described in (24), the following expression is satisfied by image forming magnification m1 of the objective lens in conducting recording or reproduction of information for the first optical information recording medium.

$$-1/2 \leq m1 \leq -1/7.5 \quad (25)$$

(25) In the optical pickup device described in (25), image forming magnification m2 of the objective lens in conducting recording or reproduction of information for the second optical information recording medium is nearly the same as m1.

(26) The optical pickup device described in (26) is represented by an optical pickup device having therein a first light source and a second light source each being different in terms of wavelength and a light-converging optical system including an objective lens for converging a light fluxes emitted from the first and the second light sources on an information recording surface of an optical information recording medium, and being capable of conducting recording and/or reproducing of information for a first optical information recording medium in which a thickness of a transparent base board is $t_1$ by using the first light source and the light-converging optical system and of conducting recording and/or reproducing of information for a second optical information recording medium in which a thickness of a transparent base board is $t_2$ ($t_1 < t_2$) by using the second light source and the light-converging optical system wherein the objective lens is a plastic lens, and when recording or reproducing information for the first optical information recording medium, a divergent light flux emitted from the first light source enters the objective lens, and the following conditional expression is satisfied when λ1 represents a wavelength of the first light source, $\delta SA_3/\delta U$ represents a change of spherical aberration for object-image distance change δU (|δU|≦0.5 mm) and $\delta SA_4/\delta T$ represents a change of spherical aberration for temperature change δT (|δT|≦30° C.)

$$|\delta SA_3/\delta U|\cdot|\delta U|+|\delta SA_4/\delta T|\cdot|\delta T|\leq 0.07\lambda \text{rms} \quad (26)$$

and when recording or reproducing information for the second optical information recording medium, a divergent light flux emitted from the second light source enters the objective lens, and the following conditional expression is satisfied when λ2 represents a wavelength of the second light source, $\delta SA_5/\delta U$ represents a change of spherical aberration for object-image distance change δU(|δU|≦0.5 mm) and $\delta SA_6/\delta T$ represents a change of spherical aberration for temperature change δT (|δT|≦30° C.).

$$|\delta SA_5/\delta U|\cdot|\delta U|+|\delta SA_6/\delta T|\cdot|\delta T|\leq 0.07\ \lambda 2\ \text{rms} \quad (27)$$

In the optical pickup device described in (26), when the sum total of $|\delta SA_3/\delta U|\cdot|U|$ and $|\delta SA_4/\delta T|\cdot|\delta T|$ and the sum total of $|\delta SA_5/\delta U|\cdot|U|$ and $|\delta SA_6/\delta T|\cdot|\delta T|$ are looked and each sum total is made to be not more than 0.07 λ1 rms and 0.07 λ2 rms respectively by providing the diffractive structure on the objective lens, for example, it is possible to conduct properly recording or reproducing of information for two optical information recording media even under the condition that divergent light fluxes emitted from light sources being different in terms of wavelength enter the objective lens, and it is possible to omit a collimator lens for forming a collimated light flux that enters the objective lens, to attain cost reduction, and to make the structure of the optical pickup device to be compact.

(27) The optical pickup device described in (27) wherein at least one surface of the objective lens is provided with a diffractive structure on at least a peripheral area in an effective diameter, and the following conditional expression is satisfied when δSA1/δT represents a change of spherical aberration for temperature change δT in a light flux which has passed the diffractive structure on the peripheral area among light fluxes emitted from the first light source.

$$|\delta SA1/\delta T|\leq 0.002\ \lambda 1\ \text{rms}/°\ \text{C}. \quad (28)$$

(28) The optical pickup device described in (28) wherein δSA1/δT representing a change of spherical aberration for temperature change δT in a light flux which has passed the diffractive structure on the peripheral area among light fluxes emitted from the first light source satisfies the following conditional expression.

$$|\delta SA1/\delta T|\leq 0.0005\ \lambda 1\ \text{rms}/°\ \text{C}. \quad (29)$$

(29) The optical pickup device described in (29) wherein the diffractive structure on the peripheral area of the objective lens is a ring-shaped diffractive zone, and an average pitch P out of the ring-shaped diffractive zone satisfies the following expression when $n^{th}$ order light represents a diffracted light with a maximum amount of light generated by the diffractive structure from a light flux passing through the diffractive structure on the peripheral area of the objective lens among light fluxes emitted from the first light source, and f represents a focal length of the objective lens.

$$2.00\times 10^{-4}\leq P\ \text{out}/(|n|\cdot f)\leq 3.00\times 10^{-2} \quad (30)$$

(30) The optical pickup device described in (30) wherein the average pitch P out of the ring-shaped diffractive zone satisfies the following expression.

$$1.00\times 10^{-3}\leq P\ \text{out}/(|n|\cdot f)\leq 3.00\times 10^{-3} \quad (31)$$

(31) The optical pickup device described in (31) wherein the average pitch P out of the ring-shaped diffractive zone satisfies the following expression.

$$3.00\times 10^{-3}\leq P\ \text{out}/(|n|\cdot f)\leq 8.00\times 10^{-3} \quad (32)$$

(32) The optical pickup device described in (32) wherein the optical surface of the objective lens is composed of three or more kinds of optical surface areas arranged in the direction perpendicular to an optical axis, and when the three or more kinds of optical surface areas are represented by an optical surface area closer to the optical axis, an intermediate optical surface area and an optical surface area closer to the outside, all arranged in this order from the optical axis side, the optical surface area closer to the outside is the area on the peripheral side stated above.

(33) The optical pickup device described in (32) wherein spherical aberration is discontinuous in at least one of a boundary between the optical surface area closer to the optical axis and the intermediate optical surface and a boundary between the intermediate optical surface area and the optical surface area closer to the outside.

(34) The optical pickup device described in (34), wherein a diffractive section where ring-shaped diffractive zones are formed is formed on the optical surface area closer to the optical axis, and average pitch P in of the ring-shaped diffractive zones satisfies the following expression, when $n^{th}$ order light represents a diffracted light with a maximum amount of light generated by the diffractive structure from a light flux passing through the diffractive structure on the optical surface area closer to the second light source among light fluxes emitted from the second light source, and f represents a focal length of the objective lens.

$$3.00\times 10^{-3}\leq P\ \text{in}/(|n|\cdot f)\leq 8.0\times 10^{-2} \quad (33)$$

(35) The optical pickup device described in (35), the optical surface area closer to the outside has a function to correct spherical aberration when recording or reproducing information for the first optical information recording medium stated above.

(36) The optical pickup device described in (36), wherein when recording or reproducing information for the first optical information recording medium, spherical aberration of the light flux passing through the intermediate optical surface area is made to be discontinuous and to be flare component, for spherical aberration of the light flux passing through the optical surface area closer to the outside, while when recording or reproducing information for the second optical information recording medium, the light flux passing through the intermediate optical surface area is used.

(37) The optical pickup device described in (37), wherein the intermediate optical surface area has a function to correct spherical aberration for thickness t ($t_1 < t < t_2$) of a transparent base board.

(38) The optical pickup device described in (38), wherein when recording or reproducing information for the first optical information recording medium, a light flux passing mainly through the optical surface area closer to the optical axis and the optical surface area closer to the outside is used, while when recording or reproducing information for the second optical information recording medium, a light flux passing mainly through the optical surface area closer to the optical axis and the intermediate optical surface area is used.

(39) In the optical pickup device described in (39), when recording or reproducing information for the second optical information recording medium, the following expressions are satisfied under the assumption that the intermediate optical surface area is formed within a range from the shortest distance from an optical axis NAH mm to NAL mm when a necessary numerical aperture is represented by $NA_2$ and a focal length of the objective lens is represented by $f_2$.

$$(NA_2-0.03)f_2 \leq NAH \leq (NA_2+0.03)f_2 \qquad (34)$$

$$(NA_2-0.20)f_2 \leq NAL \leq (NA_2-0.04)f_2 \qquad (35)$$

(40) The optical pickup device described in (40), wherein when recording or reproducing information for the first optical information recording medium, a light flux passing through the intermediate optical surface area is made to have over spherical aberration.

(41) The optical pickup device described in (41), wherein the optical surface area closer to the optical axis has a function to correct spherical aberration when recording or reproducing information for the first optical information recording medium.

(42) The optical pickup device described in (42), wherein the optical surface area closer to the optical axis has a function to correct temperature characteristics when recording or reproducing information for the first optical information recording medium.

(43) The optical pickup device described in (43), wherein the optical surface of the objective lens is composed of two or more kinds of optical surface areas arranged in the direction perpendicular to an optical axis, and when the two kinds of optical surface areas are represented by an optical surface area closer to the optical axis and an optical surface area closer to the outside, the optical surface area closer to the outside is the area on the peripheral side stated above.

(44) The optical pickup device described in (44), wherein a diffractive section where ring-shaped diffractive zones are formed is formed on the optical surface area closer to the optical axis, average pitch P in of the ring-shaped diffractive zones satisfies the following expression, when nth order light represents a diffracted light with a maximum amount of light generated by the diffractive structure from a light flux passing through the diffractive structure on the optical surface area closer to the second light source among light fluxes emitted from the second light source, and f represents a focal length of the objective lens.

$$3.00 \times 10^{-3} \leq P\ in/(|n| \cdot f) \leq 8.0 \times 10^{-2} \qquad (35)$$

(45) The optical pickup device described in (45), wherein the optical surface area closer to the outside has a function to correct spherical aberration when recording or reproducing information for the first optical information recording medium.

(46) The optical pickup device described in (46), wherein the optical surface area closer to the optical axis has a function to correct spherical aberration for thickness $t_1$ of a transparent base board.

(47) The optical pickup device described in (47), wherein the optical surface area closer to the optical axis has a function to correct spherical aberration for a light flux passing through that optical surface area when recording or reproducing information for the second optical information recording medium, while the optical surface area closer to the outside has a function to make the light flux passing through that optical surface area to be a flare component when recording or reproducing information for the second optical information recording medium.

(48) The optical pickup device described in (48), when recording or reproducing information for the second optical information recording medium, the following expression is satisfied under the assumption that the optical surface area closer to the optical axis is formed within a range of the shortest distance NAH mm from the optical axis, when a necessary numerical aperture is represented by $NA_2$ and a focal length of the objective lens is represented by $f_2$.

$$(NA_2-0.03)f_2 \leq NAH \leq (NA_2+0.03)f_2 \qquad (36)$$

(49) The optical pickup device described in (49), wherein the following expression is satisfied by image forming magnification m1 of the objective lens in conducting recording or reproduction of information for the first optical information recording medium.

$$-\tfrac{1}{2} \leq m1 \leq -\tfrac{1}{7.5} \qquad (37)$$

(50) The optical pickup device described in (50), wherein image forming magnification m2 of the objective lens in conducting recording or reproduction of information for the second optical information recording medium is nearly the same as m1.

(51) The optical pickup device described in (51), wherein there are provided a light source and a light-converging optical system including the objective lens for converging a divergent light flux that is emitted from the light source and enters objective lens on an information recording surface of an optical information recording medium, and the objective lens of the optical pickup device capable of recording and/or reproducing information for the first optical information recording medium having a t1-thick transparent base board and for the second optical information recording medium having a t2-thick transparent base board ($t_1 < t_2$) is a plastic lens and at least one side thereof is provided with a diffractive structure on at least a peripheral area within an effective diameter, and thus, the following expression is satisfied, when $\delta SA1/\delta T$ represents a change in spherical aberration for temperature change $\delta T$ in a light flux passing through the diffractive structure on the peripheral area among light fluxes emitted from the light source, and $\lambda$ represents a wavelength of the light source.

$$|\delta SA1/\delta T| \leq 0.002\ \lambda rms/^\circ C. \qquad (38)$$

In the objective lens described in (51), by providing the diffractive structure that satisfies the expression (38) on the aforesaid peripheral area, it is possible to conduct properly recording or reproducing of information for two optical information recording media, even under the condition that the objective lens is arranged on the optical pickup device and a divergent light flux emitted from the light source enters the objective lens, thus, it is possible to omit a collimator lens for forming a collimated light flux that enters the objective lens, to attain cost reduction, and to make the structure of the optical pickup device to be compact.

(52) The objective lens described in (52), wherein $\delta SA1/\delta T$ representing a change of spherical aberration for temperature change $\delta T$ in a light flux which has passed the diffractive structure on the peripheral area among light fluxes emitted from the light source satisfies the following conditional expression.

$$|\delta SA1/\delta T| \leq 0.0005\ \lambda rms/^\circ C. \qquad (39)$$

(53) The objective lens described in (53) wherein the diffractive structure on the peripheral area of the objective lens is a ring-shaped diffractive zone, and average pitch P out of the ring-shaped diffractive zone satisfies the following expression, when $n^{th}$ order light represents a diffracted light with the greatest amount of light generated by the diffractive structure and by a light flux passing through the diffractive structure on the peripheral area of the object lens among light fluxes emitted from the light source, and f represents a focal length of the objective lens.

$$2.00 \times 10^{-4} \leq P \text{ out}/(|n| \cdot f) \leq 3.00 \times 10^{-2} \qquad (40)$$

(54) The objective lens described in (54) wherein average pitch P out of the ring-shaped diffractive zone satisfies the following expression.

$$1.00 \times 10^{-3} \leq P \text{ out}/(|n| \cdot f) \leq 3.00 \times 10^{-3} \qquad (41)$$

(55) The objective lens described in (54) wherein average pitch P out of the ring-shaped diffractive zone satisfies the following expression.

$$3.00 \times 10^{-3} \leq P \text{ out}/(|n| \cdot f) \leq 8.00 \times 10^{-3} \qquad (42)$$

(56) The objective lens described in (56) wherein the optical surface of the objective lens is composed of three or more types of optical surface areas arranged in the direction perpendicular to the optical axis, and when the three types of optical surface areas are represented by an optical surface area closer to the optical axis, an intermediate optical surface area and an optical surface area closer to the outside, in this order from the optical axis side, the optical surface area closer to the outside is the aforesaid peripheral area.

(57) The objective lens described in (57) wherein spherical aberration is discontinuous in at least one of a boundary between the optical surface area closer to the optical axis and the intermediate optical surface and a boundary between the intermediate optical surface area and the optical surface area closer to the outside.

(58) The objective lens described in (58) wherein a diffractive section having thereon a ring-shaped diffractive zone is formed on the optical surface area closer to the optical axis, and average pitch P in of the ring-shaped diffractive zone satisfies the following expression, when nth order light represents a diffracted light with the greatest amount of light generated by the diffractive structure and by a light flux passing through the diffractive structure on the optical surface area closer to the light source among light fluxes emitted from the light source, and f represents a focal length of the objective lens.

$$3.00 \times 10^{-3} \leq P \text{ in}/(|n| \cdot f) \leq 8.00 \times 10^{-2} \qquad (43)$$

(59) The objective lens described in (59) wherein the optical surface area closer to the outside has a function to correct spherical aberration when recording or reproducing information for the first optical information recording medium stated above.

(60) The objective lens described in (60), wherein when recording or reproducing information for the first optical information recording medium, spherical aberration of the light flux passing through the intermediate optical surface area is made to be discontinuous and to be flare component, for spherical aberration of the light flux passing through the optical surface area closer to the outside, while when recording or reproducing information for the second optical information recording medium, the light flux passing through the intermediate optical surface area is used.

(61) The objective lens described in (61), wherein the intermediate optical surface area has a function to correct spherical aberration for thickness t ($t_1 < t < t_2$) of a transparent base board.

(62) The objective lens described in (62), wherein when recording or reproducing information for the first optical information recording medium, a light flux passing mainly through the optical surface area closer to the optical axis and the optical surface area closer to the outside is used, while when recording or reproducing information for the second optical information recording medium, a light flux passing mainly through the optical surface area closer to the optical axis and the intermediate optical surface area is used.

(63) The objective lens described in (63), wherein when recording or reproducing information for the second optical information recording medium, the following expressions are satisfied under the assumption that the intermediate optical surface area is formed within a range from the shortest distance from an optical axis NAH mm to NAL mm when a necessary numerical aperture is represented by $NA_2$ and a focal length of the objective lens is represented by $f_2$.

$$(NA_2 - 0.03)f_2 \leq NAH \leq (NA_2 + 0.03)f_2 \qquad (44)$$

$$(NA_2 - 0.20)f_2 \leq NAL \leq (NA_2 - 0.04)f_2 \qquad (45)$$

(64) The objective lens described in (64), wherein when recording or reproducing information for the first optical information recording medium, a light flux passing through the intermediate optical surface area is made to have under spherical aberration.

(65) The objective lens described in (65), wherein the optical surface area closer to the optical axis has a function to correct spherical aberration when recording or reproducing information for the first optical information recording medium.

(66) The objective lens described in (66), wherein the optical surface area closer to the optical axis has a function to correct temperature characteristics when recording or reproducing information for the first optical information recording medium.

(67) The objective lens described in (67), wherein the optical surface of the objective lens is composed of two or more kinds of optical surface areas arranged in the direction perpendicular to an optical axis, and when the two kinds of optical surface areas are represented by an optical surface area closer to the optical axis and an optical surface area closer to the outside, the optical surface area closer to the outside is the area on the peripheral side stated above.

(68) The objective lens described in (68), wherein a diffractive section where ring-shaped diffractive zones are formed is formed on the optical surface area closer to the optical axis, average pitch P in of the ring-shaped diffractive zones satisfies the following expression, when nth order light represents a diffracted light with a maximum amount of light generated by the diffractive structure from a light flux passing through the diffractive structure on the optical surface area closer to the light source among light fluxes emitted from the light source, and f represents a focal length of the objective lens.

$$3.00 \times 10^{-3} \leq P \text{ in}/(|n| \cdot f) \leq 8.0 \times 10^{-2} \qquad (46)$$

(69) The objective lens described in (69), wherein the optical surface area closer to the outside has a function to correct spherical aberration when recording or reproducing information for the first optical information recording medium.

(70) The objective lens described in (70), wherein the optical surface area closer to the optical axis has a function to correct spherical aberration for thickness t ($t_1 < t < t_2$) of a transparent base board.

(71) The objective lens described in (71), wherein when recording or reproducing information for the first optical information recording medium, the optical surface area closer to the optical axis makes a light flux passing through the optical surface area closer to the optical axis to have under spherical aberration, and when recording or reproducing information for the second optical information recording medium, the optical surface area closer to the optical axis makes a light flux passing through the optical surface area closer to the optical axis to have over spherical aberration.

(72) The objective lens described in (72), wherein when recording or reproducing information for the second optical information recording medium, the following expression is satisfied under the assumption that the optical surface area closer to the optical axis is formed within a range of the shortest distance NAH mm from the optical axis, when a necessary numerical aperture is represented by $NA_2$ and a focal length of the objective lens is represented by $f_2$.

$$(NA_2-0.03)f_2 \leq NAH \leq (NA_2+0.03)f_2 \quad (47)$$

(73) The objective lens described in (73), wherein the following expression is satisfied by image forming magnification m1 of the objective lens in conducting recording or reproduction of information for the first optical information recording medium.

$$-\tfrac{1}{2} \leq m1 \leq -\tfrac{1}{7.5} \quad (48)$$

(74) The objective lens described in (74), wherein image forming magnification m2 of the objective lens in conducting recording or reproduction of information for the second optical information recording medium is nearly the same as m1.

(75) The objective lens described in (75) is represented by an objective lens of an optical pickup device employing a first light source and a second light source each being different in terms of wavelength and a light-converging optical system including the objective lens for converging divergent light fluxes emitted from the first and the second light sources and enter the objective lens on an information recording surface of an optical information recording medium, and being capable of conducting recording and/or reproducing of information for a first optical information recording medium in which a thickness of a transparent base board is $t_1$, and of conducting recording and/or reproducing of information for a second optical information recording medium in which a thickness of a transparent base board is $t_2$ ($t_1 < t_2$), wherein the objective lens is a plastic lens, and at least one side of the objective lens is provided with a diffractive structure on at least a peripheral area within an effective diameter, and the following expression is satisfied, when $\delta SA1/\delta T$ represents a change in spherical aberration for temperature change $\delta T$ in a light flux passing through the diffractive structure on the peripheral area among light fluxes emitted from the first light source, and $\lambda 1$ represents a wavelength of the first light source.

$$|\delta SA1/\delta T| \leq 0.002 \; \lambda 1 \; \text{rms}/^\circ \text{C}. \quad (49)$$

In the objective lens described in (75), by providing the diffractive structure that satisfies the expression (49) on the aforesaid peripheral area, it is possible to conduct properly recording or reproducing of information for two optical information recording media, even under the condition that the objective lens is arranged on the optical pickup device and a divergent light flux emitted from the light source having a different wavelength enters the objective lens, thus, it is possible to omit a collimator lens for forming a collimated light flux that enters the objective lens, to attain cost reduction, and to make the structure of the optical pickup device to be compact.

(76) The objective lens described in (76), wherein $\delta SA1/\delta T$ representing a change of spherical aberration for temperature change $\delta T$ in a light flux which has passed the diffractive structure on the peripheral area among light fluxes emitted from the first light source satisfies the following conditional expression.

$$|\delta SA1/\delta T| \leq 0.0005 \; \lambda 1 \; \text{rms}/^\circ \text{C}. \quad (50)$$

(77) The objective lens described in (77) wherein the diffractive structure on the peripheral area of the objective lens is a ring-shaped diffractive zone, and average pitch P out of the ring-shaped diffractive zone satisfies the following expression, when n-th order light represents a diffracted light with the greatest amount of light generated by the diffractive structure and by a light flux passing through the diffractive structure on the peripheral area of the object lens among light fluxes emitted from the first light source, and f represents a focal length of the objective lens.

$$2.00\times 10^{-4} \leq P \text{ out}/(|n|\cdot f) \leq 3.00\times 10^{2} \quad (51)$$

(78) The objective lens described in (78) wherein average pitch P out of the ring-shaped diffractive zone satisfies the following expression.

$$1.00\times 10^{-3} \leq P \text{ out}/(|n|\cdot f) \leq 3.00\times 10^{-3} \quad (52)$$

(79) The objective lens described in (79) wherein average pitch P out of the ring-shaped diffractive zone satisfies the following expression.

$$3.00\times 10^{-3} \leq P \text{ out}/(|n|\cdot f) \leq 8.00\times 10^{-3} \quad (53)$$

(80) The objective lens described in (80) wherein the optical surface of the objective lens is composed of three or more types of optical surface areas arranged in the direction perpendicular to the optical axis, and when the three types of optical surface areas are represented by an optical surface area closer to the optical axis, an intermediate optical surface area and an optical surface area closer to the outside, in this order from the optical axis side, the optical surface area closer to the outside is the aforesaid peripheral area.

(81) The objective lens described in (81) wherein spherical aberration is discontinuous in at least one of a boundary between the optical surface area closer to the optical axis and the intermediate optical surface and a boundary between the intermediate optical surface area and the optical surface area closer to the outside.

(82) The objective lens described in (82) wherein a diffractive section having thereon a ring-shaped diffractive zone is formed on the optical surface area closer to the optical axis, and average pitch P in of the ring-shaped diffractive zone satisfies the following expression, when $n^{th}$ order light represents a diffracted light with the greatest amount of light generated by the diffractive structure and by a light flux passing through the diffractive structure on the optical surface area closer to the second light source among light fluxes emitted from the second light source, and f represents a focal length of the objective lens.

$$3.00\times 10^{-3} \leq P \text{ in}/(|n|\cdot f) \leq 8.00\times 10^{-2} \quad (54)$$

(83) The objective lens described in (83) wherein the optical surface area closer to the outside has a function to correct spherical aberration when recording or reproducing information for the first optical information recording medium stated above.

(84) The objective lens described in (84), wherein when recording or reproducing information for the first optical information recording medium, spherical aberration of the light flux passing through the intermediate optical surface area is made to be discontinuous and to be flare component, for spherical aberration of the light flux passing through the optical surface area closer to the outside, while when recording or reproducing information for the second optical information recording medium, the light flux passing through the intermediate optical surface area is used.

(85) The objective lens described in (85), wherein the intermediate optical surface area has a function to correct spherical aberration for thickness t ($t_1 < t < t_2$) of a transparent base board.

(86) The objective lens described in (86), wherein when recording or reproducing information for the first optical information recording medium, a light flux passing mainly through the optical surface area closer to the optical axis and the optical surface area closer to the outside is used, while when recording or reproducing information for the second optical information recording medium, a light flux passing mainly through the optical surface area closer to the optical axis and the intermediate optical surface area is used.

(87) The objective lens described in (87), wherein when recording or reproducing information for the second optical information recording medium, the following expressions are satisfied under the assumption that the intermediate optical surface area is formed within a range from the shortest distance from an optical axis NAH mm to NAL mm when a necessary numerical aperture is represented by $NA_2$ and a focal length of the objective lens is represented by $f_2$.

$$(NA_2-0.03)f_2 \leq NAH \leq (NA_2+0.03)f_2 \quad (55)$$

$$(NA_2-0.20)f_2 \leq NAL \leq (NA_2-0.04)f_2 \quad (56)$$

(88) The objective lens described in (88), wherein when recording or reproducing information for the first optical information recording medium, a light flux passing through the intermediate optical surface area is made to have over spherical aberration.

(89) The objective lens described in (89), wherein the optical surface area closer to the optical axis has a function to correct spherical aberration when recording or reproducing information for the first optical information recording medium.

(90) The objective lens described in (90), wherein the optical surface area closer to the optical axis has a function to correct temperature characteristics when recording or reproducing information for the first optical information recording medium.

(91) The objective lens described in (91), wherein the optical surface of the objective lens is composed of two or more kinds of optical surface areas arranged in the direction perpendicular to an optical axis, and when the two kinds of optical surface areas are represented by an optical surface area closer to the optical axis and an optical surface area closer to the outside, the optical surface area closer to the outside is the area on the peripheral side stated above.

(92) The objective lens described in (92), wherein a diffractive section where ring-shaped diffractive zones are formed is formed on the optical surface area closer to the optical axis, average pitch P in of the ring-shaped diffractive zones satisfies the following expression, when n-th order light represents a diffracted light with a maximum amount of light generated by the diffractive structure from a light flux passing through the diffractive structure on the optical surface area closer to the second light source among light fluxes emitted from the second light source, and f represents a focal length of the objective lens.

$$3.00 \times 10^{-3} \leq P \text{ in}/(|n| \cdot f) \leq 8.0 \times 10^{-2} \quad (57)$$

(93) The objective lens described in (93), wherein the optical surface area closer to the outside has a function to correct spherical aberration when recording or reproducing information for the first optical information recording medium.

(94) The objective lens described in (94), wherein the optical surface area closer to the optical axis has a function to correct spherical aberration for thickness $t_1$ of a transparent base board.

(95) The objective lens described in (95), wherein when recording or reproducing information for the second optical information recording medium, the optical surface area closer to the optical axis has a function to correct spherical aberration for the light flux passing through that optical surface area, while when recording or reproducing information for the second optical information recording medium, the optical surface area closer to the outside has a function to make the light flux passing through that optical surface to be flare components.

(96) The objective lens described in (96), wherein when recording or reproducing information for the second optical information recording medium, the following expression is satisfied under the assumption that the optical surface area closer to the optical axis is formed within a range of the shortest distance NAH mm from the optical axis, when a necessary numerical aperture is represented by $NA_2$ and a focal length of the objective lens is represented by $f_2$.

$$(NA_2-0.03)f_2 \leq NAH \leq (NA_2+0.03)f_2 \quad (58)$$

(97) The objective lens described in (97), wherein the following expression is satisfied by image forming magnification m1 of the objective lens in conducting recording or reproduction of information for the first optical information recording medium.

$$-\frac{1}{2} \leq m1 \leq -\frac{1}{7.5} \quad (59)$$

(98) The objective lens described in (98), wherein image forming magnification m2 of the objective lens in conducting recording or reproduction of information for the second optical information recording medium is nearly the same as m1.

(99) The objective lens described in (99) is represented by an objective lens of an optical pickup device having a light source and a light-converging optical system including the objective lens for converging a divergent light flux that is emitted from the light source and enters the objective lens on an information recording surface of an optical information recording medium, and being an objective lens of an optical pickup device capable of conducting recording and/or reproducing of information for a first optical information recording medium in which a thickness of a transparent base board is t1, and for a second optical information recording medium in which a thickness of a transparent base board is $t_2$ ($t_1 < t_2$), wherein the objective lens is a plastic lens, and at least one side of the objective lens is provided with at least two types of areas within an effective diameter in the direction from the optical axis of the objective lens toward the periphery, and the diffractive structure is provided on at least an area on the peripheral portion within the effective diameter, and the following expression is satisfied, when δSA1/δT represents a change in spherical aberration for temperature change δT in a light flux passing through the diffractive structure on the peripheral area among light fluxes emitted from the light source, and λ represents a wavelength of the light source, and an area inside the peripheral area is designed to correct spherical aberration for recording or reproducing information for the second optical information recording medium.

|δSA1/δT| ≦ 0.002 λrms/° C.

In the objective lens described in (99), change $\delta SA1/\delta T$ of spherical aberration for a temperature change is corrected by the diffractive structure on the aforesaid peripheral area in recording or reproducing of information for the first optical information recording medium, and spherical aberration is corrected by the area inside the peripheral area in recording or reproducing of information for the second optical information recording medium, and therefore, it is possible to conduct properly recording or reproducing of information for both optical information recording media, even under the condition that the objective lens is arranged on the optical pickup device and divergent light fluxes emitted from the light sources enter the objective lens, thus, it is possible to omit a collimator lens for forming a collimated light flux that enters the objective lens, to attain cost reduction, and to make the structure of the optical pickup device to be compact.

(100) The objective lens described in (100), wherein $\delta SA1/\delta T$ representing a change of spherical aberration for temperature change $\delta T$ in a light flux which has passed the diffractive structure on the peripheral area among light fluxes emitted from the light source satisfies the following conditional expression.

$$|\delta SA1/\delta T| \leq 0.0005 \; \lambda rms/^\circ C. \qquad (60)$$

(101) The objective lens described in (101) wherein the diffractive structure on the peripheral area of the objective lens is a ring-shaped diffractive zone, and average pitch P out of the ring-shaped diffractive zone satisfies the following expression, when n-th order light represents a diffracted light with the greatest amount of light generated by the diffractive structure and by a light flux passing through the diffractive structure on the peripheral area of the object lens among light fluxes emitted from the light source, and f represents a focal length of the objective lens.

$$2.00 \times 10^{-4} \leq P \; out/(|n| \cdot f) \leq 3.00 \times 10^{-2} \qquad (61)$$

(102) The objective lens described in (102) wherein average pitch P out of the ring-shaped diffractive zone satisfies the following expression.

$$1.00 \times 10^{-3} \leq P \; out/(|n| \cdot f) \leq 3.00 \times 10^{-3} \qquad (62)$$

(103) The objective lens described in (103) wherein average pitch P out of the ring-shaped diffractive zone satisfies the following expression.

$$3.00 \times 10^{-3} \leq P \; out/(|n| \cdot f) \leq 8.00 \times 10^{-3} \qquad (3)$$

(104) The objective lens described in (104) wherein the optical surface of the objective lens is composed of three or more kinds of optical surface areas arranged in the direction perpendicular to an optical axis, and when the three or more kinds of optical surface areas are represented by an optical surface area closer to the optical axis, an intermediate optical surface area and an optical surface area closer to the outside, all arranged in this order from the optical axis side, the optical surface area closer to the outside is the area on the peripheral side stated above.

(105) The objective lens described in (105) wherein spherical aberration is discontinuous in at least one of a boundary between the optical surface area closer to the optical axis and the intermediate optical surface and a boundary between the intermediate optical surface area and the optical surface area closer to the outside.

(106) The objective lens described in (106) wherein a diffractive section having thereon a ring-shaped diffractive zone is formed on the optical surface area closer to the optical axis, and average pitch P in of the ring-shaped diffractive zone satisfies the following expression, when $n^{th}$ order light represents a diffracted light with the greatest amount of light generated by the diffractive structure and by a light flux passing through the diffractive structure on the optical surface area closer to the light source among light fluxes emitted from the light source, and f represents a focal length of the objective lens.

$$3.00 \times 10^{-3} \leq P \; in/(|n| \cdot f) \leq 8.00 \times 10^{-2} \qquad (64)$$

(107) The objective lens described in (107) wherein the optical surface area closer to the outside has a function to correct spherical aberration when recording or reproducing information for the first optical information recording medium stated above.

(108) The objective lens described in (108), wherein when recording or reproducing information for the first optical information recording medium, spherical aberration of the light flux passing through the intermediate optical surface area is made to be discontinuous and to be flare component, for spherical aberration of the light flux passing through the optical surface area closer to the outside, while when recording or reproducing information for the second optical information recording medium, the light flux passing through the intermediate optical surface area is used.

(109) The objective lens described in (109), wherein the intermediate optical surface area has a function to correct spherical aberration for thickness $t$ ($t_1 < t < t_2$) of a transparent base board.

(110) The objective lens described in (110), wherein when recording or reproducing information for the first optical information recording medium, a light flux passing mainly through the optical surface area closer to the optical axis and the optical surface area closer to the outside is used, while when recording or reproducing information for the second optical information recording medium, a light flux passing mainly through the optical surface area closer to the optical axis and the intermediate optical surface area is used.

(111) The objective lens described in (111), wherein when recording or reproducing information for the second optical information recording medium, the following expressions are satisfied under the assumption that the intermediate optical surface area is formed within a range from the shortest distance from an optical axis NAH mm to NAL mm when a necessary numerical aperture is represented by $NA_2$ and a focal length of the objective lens is represented by $f_2$.

$$(NA_2 - 0.03)f_2 \leq NAH \leq (NA_2 + 0.03)f_2 \qquad (65)$$

$$(NA_2 - 0.20)f_2 \leq NAL \leq (NA_2 - 0.04)f_2 \qquad (66)$$

(112) The objective lens described in (112), wherein when recording or reproducing information for the first optical information recording medium, a light flux passing through the intermediate optical surface area is made to have under spherical aberration.

(113) The objective lens described in (113), wherein the optical surface area closer to the optical axis has a function to correct spherical aberration when recording or reproducing information for the first optical information recording medium.

(114) The objective lens described in (114), wherein the optical surface area closer to the optical axis has a function to correct temperature characteristics when recording or reproducing information for the first optical information recording medium.

(115) The objective lens described in (115), wherein the optical surface of the objective lens is composed of two or more kinds of optical surface areas arranged in the direction perpendicular to an optical axis, and when the two kinds of optical surface areas are represented by an optical surface area closer to the optical axis and an optical surface area closer to the outside, the optical surface area closer to the outside is the area on the peripheral side stated above.

(116) The objective lens described in (116), wherein a diffractive section where ring-shaped diffractive zones are formed is formed on the optical surface area closer to the optical axis, and average pitch P in of the ring-shaped diffractive zones satisfies the following expression, when nth order light represents a diffracted light with a maximum amount of light generated by the diffractive structure from a light flux passing through the diffractive structure on the optical surface area closer to the light source among light fluxes emitted from the light source, and f represents a focal length of the objective lens.

$$3.00\times10^{-3}\leq P\ in/(|n|\cdot f)\leq 8.0\times10^{-2} \qquad (67)$$

(117) The objective lens described in (117), wherein the optical surface area closer to the outside has a function to correct spherical aberration when recording or reproducing information for the first optical information recording medium.

(118) The objective lens described in (118), wherein the optical surface area closer to the optical axis has a function to correct spherical aberration for thickness t ($t_1 < t < t_2$) of a transparent base board.

(119) The objective lens described in (119), wherein when recording or reproducing information for the first optical information recording medium, the optical surface area closer to the optical axis makes a light flux passing through the optical surface area closer to the optical axis to have under spherical aberration, and when recording or reproducing information for the second optical information recording medium, the optical surface area closer to the optical axis makes a light flux passing through the optical surface area closer to the optical axis to have over spherical aberration.

(120) The objective lens described in (120), wherein when recording or reproducing information for the second optical information recording medium, the following expression is satisfied under the assumption that the optical surface area closer to the optical axis is formed within a range of the shortest distance NAH mm from the optical axis, when a necessary numerical aperture is represented by $NA_2$ and a focal length of the objective lens is represented by $f_2$.

$$(NA_2-0.03)f_2 \leq NAH \leq (NA_2+0.03)f_2 \qquad (68)$$

(121) The objective lens described in (121), wherein the following expression is satisfied by image forming magnification m1 of the objective lens in conducting recording or reproduction of information for the first optical information recording medium.

$$-\tfrac{1}{2}\leq m1 \leq -\tfrac{1}{7.5} \qquad (69)$$

(122) The objective lens described in (122), wherein image forming magnification m2 of the objective lens in conducting recording or reproduction of information for the second optical information recording medium is nearly the same as m1.

(123) The objective lens described in (123) is represented by an objective lens of an optical pickup device having a first light source and a second light source each being different each other in terms of wavelength and a light-converging optical system including the objective lens for converging divergent light fluxes emitted from the first and the second light sources and enter the objective lens on an information recording surface of an optical information recording medium, and being capable of conducting recording and/or reproducing of information for a first optical information recording medium in which a thickness of a transparent base board is $t_1$ by using the first light source and the light-converging optical system, and of conducting recording and/or reproducing of information for a second optical information recording medium in which a thickness of a transparent base board is $t_2$ ($t_1 < t_2$) by using the second light source and the light-converging optical system, wherein the objective lens is a plastic lens, and at least one side of the objective lens is provided with at least two types of areas within an effective diameter in the direction from the optical axis of the objective lens toward the periphery, and the diffractive structure is provided on at least an area on the peripheral portion within the effective diameter, and the following expression is satisfied, when δSA1/δT represents a change in spherical aberration for temperature change δT in a light flux passing through the diffractive structure on the peripheral area among light fluxes emitted from the first light source, and λ represents a wavelength of the light source, and an area inside the peripheral area is designed to correct spherical aberration for recording or reproducing information for the second optical information recording medium.

$$|\delta SA1/\delta T|\leq 0.002\ \lambda rms/^\circ\ C. \qquad (70)$$

In the objective lens described in (123), change δSA1/δT of spherical aberration for a temperature change is corrected by the diffractive structure on the aforesaid peripheral area in recording or reproducing of information for the first optical information recording medium, and spherical aberration is corrected by the area inside the peripheral area in recording or reproducing of information for the second optical information recording medium, and therefore, it is possible to conduct properly recording or reproducing of information for both optical information recording media, even under the condition that the objective lens is arranged on the optical pickup device and divergent light fluxes each having a different light source wavelength respectively enter the objective lens, thus, it is possible to omit a collimator lens for forming a collimated light flux that enters the objective lens, to attain cost reduction, and to make the structure of the optical pickup device to be compact.

(124) The objective lens described in (124), wherein δSA1/δT representing a change of spherical aberration for temperature change δT in a light flux which has passed the diffractive structure on the peripheral area among light fluxes emitted from the first light source satisfies the following conditional expression.

$$|\delta SA1/\delta T|\leq 0.0005\ \lambda rms/^\circ\ C. \qquad (71)$$

(125) The objective lens described in (125) wherein the diffractive structure on the peripheral area of the objective lens is a ring-shaped diffractive zone, and average pitch P out of the ring-shaped diffractive zone satisfies the following expression, when $n^{th}$ order light represents a diffracted light with the greatest amount of light generated by the diffractive structure and by a light flux passing through the diffractive structure on the peripheral area of the object lens among light fluxes emitted from the first light source, and f represents a focal length of the objective lens.

$$2.00\times10^{-4}\leq P\ out/(|n|\cdot f)\leq 3.00\times10^{-2} \qquad (72)$$

(126) The objective lens described in (126) wherein average pitch P out of the ring-shaped diffractive zone mentioned above satisfies the following expression.

$$1.00\times10^{-3}\leq P\ out/(|n|\cdot f)\leq 3.00\times10^{-3} \qquad (73)$$

(127) The objective lens described in (127) wherein average pitch P out of the ring-shaped diffractive zone satisfies the following expression.

$$3.00 \times 10^{-3} \leq P\ out/(|n|\cdot f) \leq 8.00 \times 10^{-3} \tag{74}$$

(128) The objective lens described in (128) wherein the optical surface of the objective lens is composed of three or more kinds of optical surface areas arranged in the direction perpendicular to an optical axis, and when the three or more kinds of optical surface areas are represented by an optical surface area closer to the optical axis, an intermediate optical surface area and an optical surface area closer to the outside, all arranged in this order from the optical axis side, the optical surface area closer to the outside is the area on the peripheral side stated above.

(129) The objective lens described in (129) wherein spherical aberration is discontinuous in at least one of a boundary between the optical surface area closer to the optical axis and the intermediate optical surface and a boundary between the intermediate optical surface area and the optical surface area closer to the outside.

(130) The objective lens described in (130) wherein a diffractive section having thereon a ring-shaped diffractive zone is formed on the optical surface area closer to the optical axis, and average pitch P in of the ring-shaped diffractive zone satisfies the following expression, when nth order light represents a diffracted light with the greatest amount of light generated by the diffractive structure and by a light flux passing through the diffractive structure on the optical surface area closer to the second light source among light fluxes emitted from the second light source, and f represents a focal length of the objective lens.

$$3.00 \times 10^{-3} \leq P\ in/(|n|\cdot f) \leq 8.00 \times 10^{-2} \tag{75}$$

(131) The objective lens described in (131) wherein the optical surface area closer to the outside has a function to correct spherical aberration when recording or reproducing information for the first optical information recording medium stated above.

(132) The objective lens described in (132), wherein when recording or reproducing information for the first optical information recording medium, spherical aberration of the light flux passing through the intermediate optical surface area is made to be discontinuous and to be flare component, for spherical aberration of the light flux passing through the optical surface area closer to the outside, while when recording or reproducing information for the second optical information recording medium, the light flux passing through the intermediate optical surface area is used.

(133) The objective lens described in (133), wherein the intermediate optical surface area has a function to correct spherical aberration for thickness t ($t_1 < t < t_2$) of a transparent base board.

(134) The objective lens described in (134), wherein when recording or reproducing information for the first optical information recording medium, a light flux passing mainly through the optical surface area closer to the optical axis and the optical surface area closer to the outside is used, while when recording or reproducing information for the second optical information recording medium, a light flux passing mainly through the optical surface area closer to the optical axis and the intermediate optical surface area is used.

(135) The objective lens described in (135), wherein when recording or reproducing information for the second optical information recording medium, the following expressions are satisfied under the assumption that the intermediate optical surface area is formed within a range from the shortest distance from an optical axis NAH mm to NAL mm when a necessary numerical aperture is represented by $NA_2$ and a focal length of the objective lens is represented by $f_2$.

$$(NA_2-0.03)f_2 \leq NAH \leq (NA_2+0.03)f_2 \tag{76}$$

$$(NA_2-0.20)f_2 \leq NAL \leq (NA_2-0.04)f_2 \tag{77}$$

(136) The objective lens described in (136), wherein when recording or reproducing information for the first optical information recording medium, a light flux passing through the intermediate optical surface area is made to have over spherical aberration.

(137) The objective lens described in (137), wherein the optical surface area closer to the optical axis has a function to correct spherical aberration when recording or reproducing information for the first optical information recording medium.

(138) The objective lens described in (138), wherein the optical surface area closer to the optical axis has a function to correct temperature characteristics when recording or reproducing information for the first optical information recording medium.

(139) The objective lens described in (139), wherein the optical surface of the objective lens is composed of two or more kinds of optical surface areas arranged in the direction perpendicular to an optical axis, and when the two kinds of optical surface areas are represented by an optical surface area closer to the optical axis and an optical surface area closer to the outside, the optical surface area closer to the outside is the area on the peripheral side stated above.

(140) The objective lens described in (140), wherein a diffractive section where ring-shaped diffractive zones are formed is formed on the optical surface area closer to the optical axis, and average pitch P in of the ring-shaped diffractive zones satisfies the following expression, when $n^{th}$ order light represents a diffracted light with a maximum amount of light generated by the diffractive structure from a light flux passing through the diffractive structure on the optical surface area closer to the second light source among light fluxes emitted from the second light source, and f represents a focal length of the objective lens.

$$3.00 \times 10^{-3} \leq P\ in/(|n|\cdot f) \leq 8.0 \times 10^{-2} \tag{78}$$

(141) The objective lens described in (141), wherein the optical surface area closer to the outside has a function to correct spherical aberration when recording or reproducing information for the first optical information recording medium.

(142) The objective lens described in (142), wherein the optical surface area closer to the optical axis has a function to correct spherical aberration for thickness $t_1$ of a transparent base board.

(143) The objective lens described in (143), wherein when recording or reproducing information for the second optical information recording medium, the optical surface area closer to the optical axis has a function to correct spherical aberration for the light flux passing through that optical surface area, while when recording or reproducing information for the second optical information recording medium, the optical surface area closer to the outside has a function to make the light flux passing through that optical surface area to be a flare component.

(144) The objective lens described in (144), wherein when recording or reproducing information for the second optical information recording medium, the following expression is satisfied under the assumption that the optical surface area closer to the optical axis is formed within a range of the shortest distance NAH mm from the optical axis, when a necessary numerical aperture is represented by $NA_2$ and a focal length of the objective lens is represented by $f_2$.

$$(NA_2-0.03)f_2 \leq NAH \leq (NA_2+0.03)f_2 \quad (80)$$

(145) The objective lens described in (145), wherein the following expression is satisfied by image forming magnification m1 of the objective lens in conducting recording or reproduction of information for the first optical information recording medium.

$$-\tfrac{1}{2} \leq m1 \leq -\tfrac{1}{7.5} \quad (81)$$

(146) The objective lens described in (146), wherein image forming magnification m2 of the objective lens in conducting recording or reproduction of information for the second optical information recording medium is nearly the same as m1.

(147) The objective lens described in (147) is represented by an objective lens of an optical pickup device having a light source and a light-converging optical system including the objective lens for converging a divergent light flux that is emitted from the light source and enters the objective lens on an information recording surface of an optical information recording medium, and being an objective lens of an optical pickup device capable of conducting recording and/or reproducing of information for a optical information recording medium in which a thickness of a transparent base board is $t_1$, wherein the objective lens is a plastic lens, and at least one side of the objective lens is provided with a diffractive structure on at least a peripheral area within an effective diameter, and the following expression is satisfied, when $\delta SA1/\delta T$ represents a change in spherical aberration for temperature change $\delta T$ in a light flux passing through the diffractive structure on the peripheral area among light fluxes emitted from the light source, and $\lambda$ represents a wavelength of the light source.

$$|\delta SA1/\delta T| \leq 0.002 \; \lambda\text{rms}/°\text{C}. \quad (82)$$

In the objective lens described in (147), change $\delta SA1/\delta T$ of spherical aberration for a temperature change is corrected properly by the diffractive structure on the aforesaid peripheral area in recording or reproducing of information for the first optical information recording medium, and therefore, it is possible to conduct properly recording or reproducing of information for both optical information recording media, even under the condition that the objective lens is arranged on the optical pickup device and divergent light fluxes emitted from the light sources enter the objective lens, thus, it is possible to omit a collimator lens for forming a collimated light flux that enters the objective lens, to attain cost reduction, and to make the structure of the optical pickup device to be compact.

(148) The objective lens described in (148), wherein $\delta SA1/\delta T$ representing a change of spherical aberration for temperature change $\delta T$ in a light flux which has passed the diffractive structure on the peripheral area among light fluxes emitted from the light source satisfies the following conditional expression.

$$|\delta SA1/\delta T| \leq 0.0005 \; \lambda\text{rms}/°\text{C}. \quad (83)$$

(149) The objective lens described in (149) wherein the diffractive structure on the peripheral area of the objective lens is a ring-shaped diffractive zone, and average pitch P out of the ring-shaped diffractive zone satisfies the following expression, when n-th order light represents a diffracted light with the greatest amount of light generated by the diffractive structure and by a light flux passing through the diffractive structure on the peripheral area of the object lens among light fluxes emitted from the light source, and f represents a focal length of the objective lens.

$$2.00 \times 10^{-4} \leq P\text{ out}/(|n| \cdot f) \leq 3.00 \times 10^{-2} \quad (84)$$

(150) The objective lens described in (150) wherein average pitch P out of the ring-shaped diffractive zone satisfies the following expression.

$$1.00 \times 10^{-3} \leq P\text{ out}/(|n| \cdot f) \leq 3.00 \times 10^{-3} \quad (85)$$

(151) The objective lens described in (151) wherein average pitch P out of the ring-shaped diffractive zone satisfies the following expression.

$$3.00 \times 10^{-3} \leq P\text{ out}/(|n| \cdot f) \leq 8.00 \times 10^{-3} \quad (86)$$

(152) The objective lens described in (152) wherein the optical surface of the objective lens is composed of three or more kinds of optical surface areas arranged in the direction perpendicular to an optical axis, and when the three or more kinds of optical surface areas are represented by an optical surface area closer to the optical axis, an intermediate optical surface area and an optical surface area closer to the outside, all arranged in this order from the optical axis side, the optical surface area closer to the outside is the area on the peripheral side stated above.

(153) The objective lens described in (153) wherein spherical aberration is discontinuous in at least one of a boundary between the optical surface area closer to the optical axis and the intermediate optical surface and a boundary between the intermediate optical surface area and the optical surface area closer to the outside.

(154) The objective lens described in (154) wherein a diffractive section having thereon a ring-shaped diffractive zone is formed on the optical surface area closer to the optical axis, and average pitch P in of the ring-shaped diffractive zone satisfies the following expression, when $n^{th}$ order light represents a diffracted light with the greatest amount of light generated by the diffractive structure and by a light flux passing through the diffractive structure on the optical surface area closer to the light source among light fluxes emitted from the light source, and f represents a focal length of the objective lens.

$$3.00 \times 10^{-3} \leq P\text{ in}/(|n| \cdot f) \leq 8.00 \times 10^{-2} \quad (87)$$

(155) The objective lens described in (155) wherein the optical surface area closer to the outside has a function to correct spherical aberration.

(156) The objective lens described in (156), wherein when recording or reproducing information for the optical information recording medium, the following expressions are satisfied under the assumption that the intermediate optical surface area is formed within a range from the shortest distance from an optical axis NAH mm to NAL mm when a necessary numerical aperture is represented by $NA_2$ and a focal length of the objective lens is represented by $f_2$.

$$(NA_2-0.03)f_2 \leq NAH \leq (NA_2+0.03)f_2 \quad (88)$$

$$(NA_2-0.20)f_2 \leq NAL \leq (NA_2-0.04)f_2 \quad (89)$$

(157) The objective lens described in (157), wherein the optical surface area closer to the optical axis has a function to correct spherical aberration.

(158) The objective lens described in (158), wherein the optical surface area closer to the optical axis has a function to correct temperature characteristics.

(159) The objective lens described in (159), wherein the optical surface of the objective lens is composed of two or more kinds of optical surface areas arranged in the direction perpendicular to an optical axis, and when the two kinds of optical surface areas are represented by an optical surface area closer to the optical axis and an optical surface area closer to the outside, the optical surface area closer to the outside is the area on the peripheral side stated above.

(160) The objective lens described in (160), wherein a diffractive section where ring-shaped diffractive zones are formed is formed on the optical surface area closer to the optical axis, and average pitch P in of the ring-shaped diffractive zones satisfies the following expression, when n-th order light represents a diffracted light with a maximum amount of light generated by the diffractive structure from a light flux passing through the diffractive structure on the optical surface area closer to the light source among light fluxes emitted from the light source, and f represents a focal length of the objective lens.

$$3.00\times10^{-3} \leq P\ \text{in}/(|n|\cdot f) \leq 8.0\times10^{-2} \tag{90}$$

(161) The objective lens described in (161), wherein the optical surface area closer to the outside has a function to correct spherical aberration.

(162) The objective lens described in (162), wherein when recording or reproducing information for the optical information recording medium, the following expression is satisfied under the assumption that the optical surface area closer to the optical axis is formed within a range of the shortest distance from an optical axis NAH mm from the optical axis when a necessary numerical aperture is represented by $NA_2$ and a focal length of the objective lens is represented by $f_2$ and a focal length of the objective lens is represented by $f_2$.

$$(NA_2-0.03)f_2 \leq NAH \leq (NA_2+0.03)f_2 \tag{91}$$

(163) The objective lens described in (163), wherein the following expression is satisfied by image forming magnification m1 of the objective lens in conducting recording or reproduction of information for the first optical information recording medium.

$$-\tfrac{1}{2} \leq m1 \leq -\tfrac{1}{7.5} \tag{92}$$

(164) The objective lens described in (164), wherein image forming magnification m2 of the objective lens in conducting recording or reproduction of information for the second optical information recording medium is nearly the same as m1.

(165) The optical pickup device described in (165), wherein the objective lens described in either one of (51)–(164) is employed.

(166) The objective lens described in (166) is represented by an objective lens for conducting recording and/or reproducing of information for the optical information recording medium by converging light emitted from a light source on an information recording surface of the optical information recording medium through a transparent base board thereof, wherein a surface on at least one side of the objective lens is constituted with at least two or more kinds of optical surface areas in the effective diameter of the objective lens, and a diffractive section to utilize $n^{th}$ order light on which a ring-shaped diffractive zone is formed is formed on an optical surface area that is outermost in the direction perpendicular to the optical axis, or on the surface on the other side through which a light flux passing through the outermost optical surface area passes, and average pitch P out of the ring-shaped diffractive zone satisfies the following expression when a focal length of the objective lens is represented by f.

$$2.00\times10^{-4} \leq =P\ \text{out}/(|n|\cdot f) \leq 3.50\times10^{-3} \tag{93}$$

In the foregoing, in the case of an objective lens where a divergent light flux enters, for example, m shown in expression (1) is not zero, and an amount of change of spherical aberration for temperature change is increased. Therefore, a ring-shaped diffractive zone is provided as in the objective lens described in (166), and its average pitch P out is made to satisfy expression (93), which makes it possible to control a change of spherical aberration for the temperature change and to obtain excellent characteristics even when the divergent light flux enters. Thus, a collimator can be omitted, and compactness and low cost can be attained accordingly.

(167) The objective lens described in (167) wherein average pitch P out of the ring-shaped diffractive zone satisfies the following expression.

$$1.00\times10^{-3} \leq P\ \text{out}/(|n|\cdot f) \leq 3.00\times10^{-3} \tag{94}$$

(168) The objective lens described in (168) wherein the optical surface on at least one side of the objective lens is constituted with three or more types of optical surface areas arranged in the direction perpendicular to the optical axis, and an intermediate optical surface area among the aforesaid optical surface areas is provided with a discontinuous section in terms of spherical aberration for at least one optical surface area among the outside and inside optical surface areas.

(169) The objective lens described in (169) wherein at least one of the refraction section and the diffractive section is formed on the intermediate optical surface area.

(170) The objective lens described in (170) wherein there is formed a diffractive section on which a ring-shaped diffractive zone is formed, on the optical surface area including an optical axis excluding the aforesaid intermediate optical surface area, and average pitch P in of that ring-shaped diffractive zone satisfies the following expression.

$$3.00\times10^{-3} \leq P\ \text{in}/(|n|\cdot f) \leq 6.00\times10^{-2} \tag{95}$$

(171) The objective lens described in (171) wherein the surface on at least one side of the objective lens is constituted with two types of optical surfaces and a diffractive section on which a ring-shaped diffractive zone is formed is formed on the optical surface area including an optical axis, and average pitch P in of that ring-shaped diffractive zone satisfies the following expression.

$$3.00\times10^{-3} \leq P\ \text{in}/(|n|\cdot f) \leq 6.00\times10^{-2} \tag{96}$$

(172) The objective lens described in (172) is characterized to be made of plastic materials.

(173) The objective lens described in (173) is represented by an objective lens of an optical pickup device having a light source emitting light fluxes for the first optical information recording medium having a $t_1$-thick transparent base board and for the second optical information recording medium having a $t_2$-thick transparent base board ($t_1<t_2$) and a light-converging optical system including an objective lens converging the light fluxes emitted from the light source on an information recording surface through the transparent base boards of the first and second optical information recording media, and conducting recording and/or reproducing of information for each of the optical information recording media, wherein a surface on at least one side of the objective lens is constituted with at least two or more kinds of optical surface areas in the effective diameter of the objective lens, and a diffractive section to utilize $n^{th}$ order light on which a ring-shaped diffractive zone is formed is formed on an optical surface area that is outermost in the direction perpendicular to the optical axis, or on the surface on the other side through which a light flux passing through the outermost optical surface area passes, and average pitch P out of the ring-shaped diffractive zone satisfies the following expression when a focal length of the objective lens is represented by f.

$$2.00\times10^{-4} \leq P\ \text{out}/(|m|\cdot f) \leq 3.50\times10^{-3} \quad (97)$$

In the case of an objective lens where a divergent light flux enters as stated above, m shown in expression (1) is not zero, and an amount of change of spherical aberration for temperature change is increased accordingly. Therefore, a ring-shaped diffractive zone is provided as in the objective lens described in (173), and its average pitch P out is made to satisfy expression (97), which makes it possible to control a change of spherical aberration for the temperature change and to obtain excellent characteristics even when the divergent light flux enters. Incidentally, the optical pickup device employing the objective lens described in (173) is capable of recording or reproducing information for optical information recording media in plural types, and therefore, it is possible to omit a collimator lens by using divergent light fluxes, and to attain compactness and low cost of the apparatus accordingly, which is preferable.

(174) The objective lens described in (174) wherein average pitch P out of the ring-shaped diffractive zone satisfies the following expression.

$$1.00\times10^{-3} \leq P\ \text{out}/(|m|\cdot f) \leq 3.00\times10^{-3} \quad (98)$$

(175) The objective lens described in (175) wherein a divergent light emitted from the light source enters the objective lens.

(176) The objective lens described in (176), wherein the following expression is satisfied by image forming magnification m1 of the objective lens in the course of conducting recording or reproduction of information for the first optical information recording medium.

$$-\tfrac{1}{2} \leq m1 \leq -\tfrac{1}{7.5} \quad (99)$$

(177) The objective lens described in (177), wherein image forming magnification m2 of the objective lens in conducting recording or reproduction of information for the second optical information recording medium is nearly the same as m1.

(178) The objective lens described in (178), wherein the outermost optical surface area has a function to correct spherical aberration when recording or reproducing information for the first optical information recording medium.

(179) The objective lens described in (179) wherein the optical surface area on at least one side of the objective lens is composed of three or more kinds of optical surface areas arranged in the direction perpendicular to an optical axis, and when recording or reproducing information for the first optical information recording medium, spherical aberration given to the light flux passing through the intermediate optical surface area is made to be discontinuous to be a flare component with respect to spherical aberration of the outermost optical surface area, and when recording or reproducing information for the second optical information recording medium, the light source passing through the intermediate optical surface area is used.

(180) The objective lens described in (180) wherein the intermediate optical surface area has a function to correct spherical aberration for thickness t ($t_1 < t < t_2$) of a transparent base board.

(181) The objective lens described in (181) wherein light fluxes passing respectively through the optical surface area mainly including an optical axis and the outermost optical surface area are used when recording or reproducing information for the first optical information recording medium, and light fluxes passing respectively through the optical surface area mainly including an optical axis and the intermediate optical surface area are used when recording or reproducing information for the second optical information recording medium.

(182) The objective lens described in (182) wherein when recording or reproducing information for the second optical information recording medium, the following expressions are satisfied under the assumption that the intermediate optical surface area is formed within a range from NAH mm to NAL mm in terms of the distance from an optical axis, when a necessary numerical aperture is represented by $NA_2$ and a focal length of the objective lens is represented by $f_2$.

$$(NA_2-0.03)f_2 \leq NAH \leq (NA_2+0.03)f_2 \quad (100)$$

$$(NA_2-0.20)f_2 \leq NAL \leq (NA_2-0.04)f_2 \quad (101)$$

(183) The objective lens described in (183) wherein when recording or reproducing information for the first and second optical information recording media, light fluxes relating to the same light source wavelength are used, while, when recording or reproducing information for the first optical information recording medium, the light flux passing through the intermediate optical surface area is made to have under spherical aberration.

(184) The objective lens described in (184) wherein when recording or reproducing information for the first and second optical information recording media, light fluxes relating to the light source wavelengths which are different each other are used, while, when recording or reproducing information for the first optical information recording medium, the light flux passing through the intermediate optical surface area is made to have over spherical aberration.

(185) The objective lens described in (185) wherein the optical surface area including the optical axis has a function to correct spherical aberration when conducting recording or reproducing of information for the first optical information recording medium.

(186) The objective lens described in (186) wherein the optical surface area including the optical axis has a function to correct temperature characteristics when conducting recording or reproducing of information for the first optical information recording medium.

(187) The objective lens described in (187) wherein when recording or reproducing information for the first and second optical information recording media, light fluxes relating to the same light source wavelength are used, and the surface on at least one side is composed of optical surfaces of two or more kinds, and the optical surface area including the optical axis has a function to correct spherical aberration for thickness t ($t_1 < t < t_2$) of a transparent base board.

(188) The objective lens described in (188) wherein, the optical surface area including the optical axis makes a light flux passing through it to have under spherical aberration, when recording or reproducing information for the first optical information recording medium, and to have over spherical aberration, when recording or reproducing information for the second optical information recording medium.

(189) The objective lens described in (189) wherein when recording or reproducing information for the second optical information recording medium, the following expression is satisfied under the assumption that the area where spherical aberration is corrected for thickness t of the transparent base board is formed within a range of distance NAH mm from the optical axis, when a necessary numerical aperture is represented by $NA_2$ and a focal length of the objective lens is represented by $f_2$.

$$(NA_2-0.03)f_2 \leq NAH \leq (NA_2+0.03)f_2 \quad (102)$$

(190) The objective lens described in (190) is related to an optical pickup device having a light source emitting light fluxes for the first optical information recording medium having a $t_1$-thick transparent base board and for the second optical information recording medium having a $t_2$-thick transparent base board ($t_1<t_2$) and a light-converging optical system including an objective lens converging the light fluxes emitted from the light source on an information recording surface through the transparent base boards of the first and second optical information recording media, and conducting recording and/or reproducing of information for each of the optical information recording media, wherein a surface on at least one side of the objective lens is constituted with at least two or more kinds of optical surface areas in the effective diameter of the objective lens, and a diffractive section to utilize $n^{th}$ order light on which a ring-shaped diffractive zone is formed is formed on an optical surface area that is outermost in the direction perpendicular to the optical axis, or on the surface on the other side through which a light flux passing through the outermost optical surface area passes, and average pitch P out of the ring-shaped diffractive zone satisfies the following expression when a focal length of the objective lens is represented by f.

$$2.00 \times 10^{-3} \leq P\,out/(|n|\cdot f) \leq 3.00 \times 10^{-3} \quad (103)$$

(191) The optical pickup device described in (191) wherein average pitch P out of the ring-shaped diffractive zone satisfies the following expression.

$$1.00 \times 10^{-3} \leq P\,out/(|n|\cdot f) \leq 3.00 \times 10^{-3} \quad (104)$$

(192) The optical pickup device described in (192) wherein a divergent light emitted from the light source enters the objective lens.

(193) The optical pickup device described in (193), wherein the following expression is satisfied by image forming magnification m1 of the objective lens in the course of conducting recording or reproduction of information for the first optical information recording medium.

$$-\tfrac{1}{2} \leq m1 \leq -\tfrac{1}{7.5} \quad (105)$$

(194) The optical pickup device described in (194), wherein there is provided a distance adjustment means that adjusts a distance between the light source and the objective lens or between the light source and an information recording surface of the optical information recording medium.

(195) The optical pickup device described in (195), wherein the distance adjustment means adjusts the distance in accordance with a wavelength of the light source in room temperature.

(196) The optical pickup device described in (196), wherein there is provided a temperature adjustment means that adjusts an ambient temperature.

(197) The optical pickup device described in (197), wherein the light source is a semiconductor laser, and the temperature adjustment means adjusts a temperature of the semiconductor laser.

(198) The optical pickup device described in (198), wherein the objective lens is driven in terms of focusing under the state in which the image forming magnification is constant substantially.

(199) The optical pickup device described in (199), wherein image forming magnification m2 of the objective lens in conducting recording or reproduction of information for the second optical information recording medium is nearly the same as m1.

(200) The optical pickup device described in (200), wherein the outermost optical surface area has a function to correct spherical aberration when recording or reproducing information for the first optical information recording medium.

(201) The optical pickup device described in (201), wherein the optical surface area on at least one side of the objective lens is composed of three or more kinds of optical surface areas arranged in the direction perpendicular to an optical axis, and when recording or reproducing information for the first optical information recording medium, spherical aberration given to the light flux passing through the intermediate optical surface area is made to be discontinuous to be a flare component with respect to spherical aberration of the outermost optical surface area, and when recording or reproducing information for the second optical information recording medium, the light source passing through the intermediate optical surface area is used.

(202) The optical pickup device described in (202), wherein the intermediate optical surface area has a function to correct spherical aberration for thickness t ($t_1<t<t_2$) of a transparent base board.

(203) The optical pickup device described in (203), wherein when recording or reproducing information for the first optical information recording medium, a light flux passing through the optical surface area including mainly the optical axis and the outermost optical surface area is used, and when recording or reproducing information for the second optical information recording medium, a light flux passing through the optical surface area including mainly the optical axis and the intermediate optical surface area is used.

(204) The optical pickup device described in (204), wherein when recording or reproducing information for the second optical information recording medium, the following expressions are satisfied under the assumption that the intermediate optical surface area is formed within a range from NAH mm to NAL mm in terms of the distance from an optical axis, when a necessary numerical aperture is represented by $NA_2$ and a focal length of the objective lens is represented by $f_2$.

$$(NA_2-0.03)f_2 \leq NAH \leq (NA_2+0.03)f_2 \quad (106)$$

$$(NA_2-0.20)f_2 \leq NAL \leq (NA_2-0.04)f_2 \quad (107)$$

(205) The optical pickup device described in (205), wherein when recording or reproducing information for the first and second optical information recording media, light fluxes relating to the same light source wavelength are used, while, when recording or reproducing information for the first optical information recording medium, the light flux passing through the intermediate optical surface area is made to have under spherical aberration.

(206) The optical pickup device described in (206), wherein when recording or reproducing information for the first and second optical information recording media, light fluxes relating to the light source wavelengths which are different each other are used, while, when recording or reproducing information for the first optical information recording medium, the light flux passing through the intermediate optical surface area is made to have over spherical aberration.

(207) The optical pickup device described in (207), wherein the optical surface area including the optical axis has a function to correct spherical aberration when conducting recording or reproducing of information for the first optical information recording medium.

(208) The optical pickup device described in (208), wherein the optical surface area including the optical axis has a function to correct temperature characteristics when conducting recording or reproducing of information for the first optical information recording medium.

(209) The optical pickup device described in (209), wherein when recording or reproducing information for the first and second optical information recording media, light fluxes relating to the same light source wavelength are used, and the surface on at least one side is composed of optical surfaces of two or more kinds, and the optical surface area including the optical axis has a function to correct spherical aberration for thickness t ($t_1 < t < t_2$) of a transparent base board.

(210) The optical pickup device described in (210), wherein when recording or reproducing information for the first optical information recording medium, the optical surface area including the optical axis makes a light flux passing through the optical surface area closer to the optical axis to have under spherical aberration, and when recording or reproducing information for the second optical information recording medium, the optical surface area closer to the optical axis makes a light flux passing through the optical surface area closer to the optical axis to have over spherical aberration.

(211) The optical pickup device described in (211), wherein when recording or reproducing information for the second optical information recording medium, the following expression is satisfied under the assumption that the intermediate optical surface area is formed within a range of distance NAH mm from an optical axis when a necessary numerical aperture is represented by $NA_2$ and a focal length of the objective lens is represented by $f_2$.

$$(NA_2-0.03)f_2 \leq NAH \leq (NA_2+0.03)f_2 \quad (107)$$

(212) The optical pickup device described in (212), wherein a change of spherical aberration for temperature change in a light flux which has passed the outermost optical surface area is in the following range, when $\lambda 1$ represents a wavelength of the light source.

$$|\delta SA1/\delta T| < 0.0005 \; \lambda 1 \; \text{rms}/°\text{C}. \quad (108)$$

(213) The objective lens described in (213) is represented by an objective lens of an optical pickup device having a light source emitting light fluxes for the first optical information recording medium having a $t_1$-thick transparent base board and for the second optical information recording medium having a $t_2$-thick transparent base board ($t_1<t_2$) and a light-converging optical system including an objective lens converging the light fluxes emitted from the light source on an information recording surface through the transparent base boards of the first and second optical information recording media, and conducting recording and/or reproducing of information for each of the optical information recording media, wherein a surface on at least one side of the objective lens is constituted with at least two or more kinds of optical surface areas in the effective diameter of the objective lens, and a ring-shaped diffractive zone is formed on an optical surface area that is outermost in the direction perpendicular to the optical axis, or on an area of the surface on the other side through which a light flux passing through the outermost optical surface area passes, thereby, when conducting recording or reproducing of information for the first optical information recording medium, correction of temperature characteristics for a light flux passing through the outermost optical surface area is conducted, and a design of spherical aberration for recording or reproducing of information for the second optical information recording medium is conducted, on the other hand, for a light flux passing through the area that is inside the outer optical surface area.

In the objective lens described in (213) employing the ring-shaped diffractive zone, temperature characteristics are corrected for the light flux passing the outermost optical surface area when recording or reproducing information for the first optical information recording medium, and there is conducted a design of spherical aberration for recording or reproducing of information of the second optical information recording medium for the light flux passing through the area inside the outer optical surface area. Therefore, it is possible to conduct correction of temperature characteristics and a design of spherical aberration, on a well-balanced basis.

(214) The objective lens described in (214) wherein the following expression is satisfied by image forming magnification m1 of the objective lens in the course of conducting recording or reproduction of information for the first optical information recording medium.

$$-\frac{1}{2} \leq m1 \leq -\frac{1}{7.5} \quad (109)$$

(215) The objective lens described in (215) wherein image forming magnification m2 of the objective lens in conducting recording or reproduction of information for the second optical information recording medium is nearly the same as m1.

(216) The objective lens described in (216) wherein the optical surface area on at least one side of the objective lens is composed of three or more kinds of optical surface areas arranged in the direction perpendicular to an optical axis, and the optical surface area to correct spherical aberration for a light flux for recording or reproducing information for the first optical information recording medium is arranged inside the optical surface area for recording or reproducing information for the second optical information recording medium.

(217) The objective lens described in (217) wherein the optical surface area on at least one side of the objective lens is composed of three or more kinds of optical surface areas arranged in the direction perpendicular to an optical axis, and the optical surface area to correct temperature characteristics for a light flux for recording or reproducing information for the first optical information recording medium is arranged inside the optical surface area for recording or reproducing information for the second optical information recording medium.

(218) The objective lens described in (218) is represented by an objective lens of an optical pickup device having therein a first light source with wavelength $\lambda_1$ that emits a light flux to the first optical information recording medium having a $t_1$-thick transparent base board, a second light source with wavelength $\lambda_2$ ($\lambda_1<\lambda_2$) that emits a light flux to the second optical information recording medium having a $t_2$-thick ($t_1<t_2$) transparent base board, and a light-converging optical system including an objective lens that converges light fluxes emitted respectively from the first and second light sources on the information recording surface respectively through transparent base boards of the first and second optical information recording media, and conducts recording and/or reproducing of information for each optical information recording medium, wherein a surface on at least one side of the objective lens is constituted with at least two or more kinds of optical surface areas in the effective diameter of the objective lens, and a ring-shaped diffractive zone is formed on an optical surface area that is outermost in the direction perpendicular to the optical axis, or on an area of the surface on the other side through which a light flux passing through the outermost optical surface area passes, thereby, when conducting recording or reproducing of information for the first optical information recording medium, correction of temperature characteristics for a light flux passing through the outermost optical surface area is conducted, and a design of spherical aberration for recording or reproducing of information for the second optical information recording medium is conducted, on the other hand, for a light flux passing through the area that is inside the outer optical surface area.

(219) The objective lens described in (219) wherein the following expression is satisfied by image forming magnification m1 of the objective lens in the course of conducting recording or reproduction of information for the first optical information recording medium.

$$-\tfrac{1}{2} \leq m1 \leq -\tfrac{1}{7.5} \qquad (110)$$

(220) The objective lens described in (220) wherein image forming magnification m2 of the objective lens in conducting recording or reproduction of information for the second optical information recording medium is nearly the same as m1.

(221) The objective lens described in (221) wherein the optical surface area on at least one side of the objective lens is composed of three or more kinds of optical surface areas arranged in the direction perpendicular to an optical axis, an optical surface area used only when the second light source with wavelength $\lambda_2$ is used in the intermediate optical surface area is formed, and the optical surface area to conduct correction of spherical aberration for the light flux from the first light source with wavelength $\lambda_1$ is arranged inside the intermediate optical surface area.

(222) The objective lens described in (222) wherein the optical surface area on at least one side of the objective lens is composed of three or more kinds of optical surface areas arranged in the direction perpendicular to an optical axis, an optical surface area used only when the second light source with wavelength $\lambda_2$ is used in the intermediate optical surface area is formed, and the optical surface area to conduct correction of temperature characteristics for the light flux from the first light source with wavelength $\lambda_1$ is arranged inside the intermediate optical surface area.

(223) The objective lens described in (223) wherein an optical surface area for the exclusive use of the light flux from the second light source and the outermost optical surface area are adjacent to each other.

(224) The objective lens described in (224) wherein average pitch P out of the ring-shaped diffractive zone utilizing n-th order light satisfies the following expression, when a focal length of the objective lens is represented by f.

$$2.00 \times 10^{-4} \leq P\ \text{out}/(|n| \cdot f) \leq 3.5 \times 10^{-3} \qquad (111)$$

(225) The objective lens described in (225) wherein spherical aberration in light fluxes passing respectively through the outermost optical surface area and the intermediate optical surface area adjacent to the outermost optical surface area is discontinuous.

(226) The objective lens described in (226) wherein at least one of a diffractive section and a refraction section is arranged on the intermediate optical surface area.

(227) The objective lens described in (227) which is made of plastic materials.

(228) The optical pickup device described in (228) is represented by an optical pickup having a light source emitting light fluxes for the first optical information recording medium having a $t_1$-thick transparent base board and for the second optical information recording medium having a $t_2$-thick transparent base board ($t_1 < t_2$) and a light-converging optical system including an objective lens converging the light fluxes emitted from the light source on an information recording surface through the transparent base boards of the first and second optical information recording media, and conducting recording and/or reproducing of information for each of the optical information recording media, wherein a surface on at least one side of the objective lens is constituted with at least two or more kinds of optical surface areas in the effective diameter of the objective lens, and a ring-shaped diffractive zone is formed on an optical surface area that is outermost in the direction perpendicular to the optical axis, or on an area of the surface on the other side through which a light flux passing through the outermost optical surface area passes, thereby, when conducting recording or reproducing of information for the first optical information recording medium, correction of temperature characteristics for a light flux passing through the outermost optical surface area is conducted, and a design of spherical aberration for recording or reproducing of information for the second optical information recording medium is conducted, on the other hand, for a light flux passing through the area that is inside the outer optical surface area.

(229) The optical pickup device described in (229) wherein the following expression is satisfied by image forming magnification m1 of the objective lens in the course of conducting recording or reproduction of information for the first optical information recording medium.

$$-\tfrac{1}{2} \leq m1 \leq -\tfrac{1}{7.5} \qquad (112)$$

(230) The optical pickup device described in (230) wherein image forming magnification m2 of the objective lens in conducting recording or reproduction of information for the second optical information recording medium is nearly the same as m1.

(231) The optical pickup device described in (231) wherein the optical surface area on at least one side of the objective lens is composed of three or more kinds of optical surface areas arranged in the direction perpendicular to an optical axis, and the optical surface area to correct spherical aberration for a light flux for recording or reproducing information for the first optical information recording medium is arranged inside the optical surface area for recording or reproducing information for the second optical information recording medium.

(232) The optical pickup device described in (232) wherein the optical surface area on at least one side of the objective lens is composed of three or more kinds of optical surface areas arranged in the direction perpendicular to an optical axis, and the optical surface area to correct temperature characteristics for a light flux for recording or reproducing information for the first optical information recording medium is arranged inside the optical surface area for recording or reproducing information for the second optical information recording medium.

(233) The optical pickup device described in (233) is represented by an optical pickup device having therein a first light source with wavelength $\lambda_1$ that emits a light flux to the first optical information recording medium having a $t_1$-thick transparent base board, a second light source with wavelength $\lambda_2$ ($\lambda_1 < \lambda_2$) that emits a light flux to the second optical information recording medium having a $t_2$-thick ($t_1 < t_2$) transparent base board, and a light-converging optical system including an objective lens that converges light fluxes emitted respectively from the first and second light sources on the information recording surface respectively through transparent base boards of the first and second optical information recording media, and conducts recording and/or reproducing of information for each optical information recording medium, wherein a surface on at least one side of the objective lens is constituted with at least two or more kinds of optical surface areas in the effective diameter of the objective lens, and a ring-shaped diffractive zone is formed on an optical surface area that is outermost in the direction perpendicular to the optical axis of the objective lens, or on an area of the surface on the other side through which a light flux passing through the outermost optical surface area passes, thereby, when conducting recording or reproducing of information for the first optical information recording medium, correction of temperature characteristics for a light flux passing through the outermost optical surface area is conducted, and a design of spherical aberration for recording or reproducing of information for the second optical information recording medium is conducted, on the other hand, for a light flux passing through the area that is inside the outer optical surface area.

(234) The optical pickup device described in (234) wherein the following expression is satisfied by image forming magnification m1 of the objective lens in the course of conducting recording or reproduction of information for the first optical information recording medium.

$$-\tfrac{1}{2} \leq m1 \leq -\tfrac{1}{7.5} \tag{113}$$

(235) The optical pickup device described in (235) wherein image forming magnification m2 of the objective lens in conducting recording or reproduction of information for the second optical information recording medium is nearly the same as m1.

(236) The optical pickup device described in (236) wherein the optical surface area on at least one side of the objective lens is composed of three or more kinds of optical surface areas arranged in the direction perpendicular to an optical axis, and an optical surface area to correct spherical aberration for the light flux from the first light source with wavelength $\lambda 1$ is arranged inside the optical surface area for the light flux from the second light source with wavelength $\lambda_2$.

(237) The optical pickup device described in (237) wherein the optical surface area on at least one side of the objective lens is composed of three or more kinds of optical surface areas arranged in the direction perpendicular to an optical axis, and an optical surface area to correct temperature characteristics for the light flux from the first light source with wavelength $\lambda 1$ is arranged inside the optical surface area for the light flux from the second light source with wavelength $\lambda_2$.

(238) The optical pickup device described in (238) wherein an optical surface area for the light flux from the second light source and the outermost optical surface area are adjacent to each other.

(239) The optical pickup device described in (239) wherein average pitch P out of the ring-shaped diffractive zone utilizing nth order light satisfies the following expression, when a focal length of the objective lens is represented by f.

$$2.00 \times 10^{-4} \leq P\,\text{out}/(|n|\cdot f) \leq 3.5 \times 10^{-3} \tag{114}$$

(240) The optical pickup device described in (240) wherein spherical aberration in the outermost optical surface area and in the optical surface area for the light flux from the second light source is discontinuous.

(241) The optical pickup device described in (241) wherein at least one of a diffractive section and a refraction section is arranged on the optical surface area for the exclusive use of the light flux from the second light source.

(242) The optical pickup device described in (242), wherein a change of spherical aberration for temperature change in a light flux which has passed the outermost optical surface area is in the following range, when $\lambda 1$ represents a wavelength of the light source at the room temperature.

$$|\delta SA1/\delta T| \leq 0.0005\ \lambda 1\ \text{rms}/^\circ\ \text{C.} \tag{115}$$

(243) The optical pickup device described in (243) wherein the objective lens is made of plastic materials.

(244) The objective lens described in (244) wherein the expression of $|n|=1$ holds for the diffraction number of order represented by n.

(245) The optical pickup device described in (245) wherein the expression of $|n|=1$ holds for the diffraction number of order represented by n.

The structure to attain the second object is explained hereinafter.

(2-1) The objective lens for an optical pickup device described in (2-1) is represented by an objective lens for an optical pickup device having therein a first light source with wavelength $\lambda 1$ for conducting recording or reproducing for information by radiating a light flux to the first optical information recording medium having transparent base board thickness $t_1$, a second light source with wavelength $\lambda 2$ ($\lambda 1 < \lambda 2$) for conducting recording or reproducing for information by radiating a light flux to the second optical information recording medium having transparent base board thickness $t_2$ ($t_1 < t_2$), and a light-converging optical system including the objective lens that converges light fluxes emitted from the first and the second light sources on the information recording surface through transparent base boards of the first and the second optical information recording media, wherein the objective lens is made of a uniform optical material, a value of refractive index change (hereinafter referred to as refractive index temperature dependency) dn/dT for the temperature change of the optical materials is expressed by the following expression under the conditions of the aforesaid light source wavelength and the room temperature environment, $$|dn/dT| \leq 10.0 \times 10^{-6} (/^\circ\ \text{C.}) \tag{117}$$

the objective lens is formed in a way that each of at least two optically functional surfaces arranged in the direction intersecting an optical axis has a different optical function, and a light flux passing through at least the outermost optically functional surface is used only for recording or reproducing of information for the first optical information recording medium.

By using a material having small temperature dependency for the objective lens, it is possible to make a change in spherical aberration caused by temperature changes to be small. Therefore, when the objective lens is composed of a refracting interface, it is easy to make temperature characteristics to be compatible with wavelength characteristics, because wavelength dependency is originally small. Further, even in the case of constituting the objective lens with a diffraction surface, a pitch of the ring-shaped diffractive zone is not required to be small, because temperature characteristics are improved even when the effectiveness of diffraction is not enhanced, which is different from a conventional objective lens. In addition, when an objective lens is provided with a plurality of optically functional surfaces each being designed properly, it is possible to attain a spot diameter which is needed for optical information recording media each having a different transparent base board thickness, and thereby to conduct recording or reproducing for each optical information recording medium. In this case, the optically functional surface that makes the optical function to be different includes optical surfaces each being completely different from others such as a refracting interface and a surface of a diffractive structure, and optical surfaces in the same type, for example, aspheric surfaces each having a different function which are formed by different aspherical coefficients, and optical surfaces each having a diffractive structure based on a different design.

(2-2) In the objective lens for an optical pickup device described in (2-2), when each optically functional surface is formed to have a step at a boundary section, it is easy to manipulate an amount of discontinuousness of spherical aberration, and for example, a main spot light can be separated greatly from a flare light on a recording surface of an optical information recording medium.

(2-3) In the objective lens for an optical pickup device described in (2-3) represents an example to constitute an objective lens only with a refracting interface. When a necessary numerical aperture of the first optical information recording medium is greater than that of the second optical information recording medium, it is possible to form a sport diameter required for the second optical information recording medium, by utilizing the first optical information recording medium and the second optical information recording medium in common at an area near the optical axis and by designing so that an intermediate optically functional surface is used for the second optical information recording medium. When the first optical information recording medium is used, a light flux passing through the intermediate optically functional surface turns out to be a flare light, but if the spherical aberration correction for the first optical information recording medium is made on the outermost optically functional surface, the required spot diameter can be formed on the first optical information recording medium.

(2-4) In the objective lens for an optical pickup device described in (2-4), it is preferable for correction of spherical aberration on the second optical information recording medium that the step on the boundary section farther from the optical axis is greater than that on the boundary section closer to the optical axis on the intermediate optically functional surface.

(2-5) As in the objective lens for an optical pickup device described in (2-5), if spherical aberration for recording or reproducing of information for the first optical information recording medium is corrected to 0.04 $\lambda_1$ rms or less for the innermost optically functional surface and the outermost optically functional surface, and if spherical aberration is corrected to be smallest for the optical information recording medium with transparent base board thickness $t_c$ ($t_1 < t_c < t_2$), an amount of spot light for each spot light can be enhanced, which is more preferable from the viewpoint of the utility factor of using light.

(2-6) In the objective lens for an optical pickup device described in (2-6), the objective lens has at least two optically functional surfaces and at least one optically functional surface has a diffractive structure, the optically functional surface closest to the optical axis is designed so that spherical aberration in the course of conducting recording or reproducing of information for the first and second optical information recording media may be corrected by the use of a light flux passing through the optically functional surface closest to the optical axis, and on the outermost optically functional surface, spherical aberration in the first optical information recording medium is corrected, and over spherical aberration is generated on the second optical information recording medium, therefore, each optically functional surface is made to correspond to a plurality of optical information recording media each having a different transparent base board thickness, thus recording or reproducing of information can be conducted properly for these optical information recording media.

(2-7) In the objective lens for an optical pickup device described in (2-7), a light flux passing through each optically functional surface passes through the diffractive structure with either surface of the objective lens (namely, the surface closer to the light source or the surface closer to the optical information recording medium), while, a diffraction pitch of the diffractive structure of the outermost optically functional surface is in a range from 5 µm to 40 µm, thereby it is possible to control a decline of diffraction efficiency while keeping the productivity for the objective lens.

(2-8) In the objective lens for an optical pickup device described in (2-8), over spherical aberration generated in the course of conducting recording or reproducing of information for the second optical information recording medium is increased toward the periphery from the optical axis, and therefore, recording or reproducing of information can be conducted properly for a plurality of optical information recording media each having a different transparent base board thickness.

(2-9) In the objective lens for an optical pickup device described in (2-9), spherical aberration generated in the course of conducting recording or reproducing of information for the second optical information recording medium is discontinuous on the boundary section of the optically functional surface, and an amount of discontinuousness of spherical aberration is in a range from 10 µm to 30 µm, thus, if the amount of discontinuousness of spherical aberration is not less than 10 µm, it is possible to control that a flare approaches the main spot, while if the amount of discontinuousness of spherical aberration is not more than 30 µm, it is possible to improve temperature characteristics satisfactorily.

(2-10) In the objective lens for an optical pickup device described in (2-10), it is possible to keep the diffraction efficiency to be high because recording or reproducing of information is conducted by the use of the diffracted light in the same order on the innermost optically functional surface for both the first optical information recording medium and the second optical information recording medium.

(2-11) In the objective lens for an optical pickup device described in (2-11), it is possible to lower a light amount for flare light by lowering efficiency of diffracted light generated by the diffractive structure of the outside optically functional surface, for example, and thereby to conduct recording or reproducing of information properly for a plurality of optical information recording media each having a different transparent base board thickness, because diffraction order $n_{ot}$ of the diffracted light having the highest intensity generated at the diffractive structure on the outside optically functional surface and diffraction order $n_{in}$ of the diffracted light having the highest intensity generated at the diffractive structure on the inside optically functional surface satisfy the following expression when conducting recording or reproducing of information for the first optical information recording medium.

$$|n_{ot}| \geq |n_{in}| \qquad (3)$$

(2-12) In the objective lens for an optical pickup device described in (2-12), with regard to the diffractive structure, a serrated ring-shaped diffractive zone is formed, and a design basis wavelength of the ring-shaped diffractive zone formed on the outside optically functional surface is different from that of the ring-shaped diffractive zone formed on the inside optically functional surface, and therefore, it is preferable, from the viewpoint of balance of an amount of light, to employ the design basis wavelength that is between $\lambda_1$ and $\lambda_2$ on the inside optically functional surface used for both the first and second optical information recording media from a viewpoint of diffraction efficiency, and it is advantageous in terms of an amount of light to make the design basis wavelength to be close to $\lambda_1$, because the outside optically functional surface is utilized only for the first optical information recording medium.

(2-13) In the objective lens for an optical pickup device described in (2-13), the objective lens has at least three optically functional surfaces wherein the innermost optically functional surface is composed only of a refracting interface and the intermediate optically functional surface has a diffractive structure, and when a light flux used for recording or reproducing of information for the first and second optical information recording media passes through the intermediate optically functional surface, it is possible to conduct recording or reproducing of information properly for a plurality of optical information recording media each having a different transparent base board thickness.

(2-14) In the objective lens for an optical pickup device described in (2-14), recording or reproducing of information for the first optical information recording medium can be conducted properly, because a serrated ring-shaped diffractive zone is formed on the outermost optically functional surface and a design basis wavelength $\lambda_0$ satisfies the following expression.

$$0.9\lambda_1 \leq \lambda_0 \leq 1.1\lambda_1$$

(2-15) In the objective lens for an optical pickup device described in (2-15), the outermost optically functional surface can also be composed only of a refracting interface.

(2-16) In the objective lens for an optical pickup device described in (2-16), image forming magnification m1 of the objective lens for recording or reproducing of information for the first optical information recording medium can satisfy the following expression.

$$-\tfrac{1}{4} \leq m1 \leq -\tfrac{1}{8} \qquad (119)$$

In this case, if image forming magnification m1 is not less than the lower limit, image height characteristics are excellent, while if it is not more than the upper limit, a working distance of the objective lens can be secured, which is preferable.

(2-17) In the objective lens for an optical pickup device described in (2-17), image forming magnification m2 of the objective lens for recording or reproducing of information for the second optical information recording medium can satisfy the following expression.

$$0.98\, m1 \leq m2 \leq 1.02\, m1 \qquad (120)$$

When m1 is different from m2 in this case, and when an image forming position on the first optical information recording medium and that on the second optical information recording medium are made to be almost common for the objective lens, a light emission point is shifted, and there is the possibility of complicated optical system including preparation of two sensors for signal detection. Namely, if the expression (120) is satisfied, signal detection in the course of recording and reproducing for each of the first optical information recording medium and the second optical information recording medium can be conducted by a single sensor.

(2-18) In the objective lens for an optical pickup device described in (2-18), if an aperture-stop in the case of conducting recording or reproducing of information for the first optical information recording medium is the same as that in the case of conducting recording or reproducing of information for the second optical information recording medium, it is possible to simplify the construction of the optical pickup device.

(2-19) In the objective lens for an optical pickup device described in (2-19), if necessary numerical aperture NA1 in the case of conducting recording or reproducing of information for the first optical information recording medium satisfies the following expression, it is possible to conduct high density information recording or high density information reproducing.

$$NA1 \geq 0.60 \qquad (121)$$

(2-20) In the objective lens for an optical pickup device described in (2-20), if wavelength $\lambda1$ of the first light source is not more than 670 nm, a high density optical information recording medium such as DVD representing the first optical information recording medium can be used.

(2-21) In the objective lens for an optical pickup device described in (2-21), when the optical material is represented by optical glass and dispersion value vd is greater than 50, a change of refractive index caused by temperature changes is less and axial chromatic aberration can be made excellent, which is preferable. Incidentally, the objective lens described in either one of the aforesaid structures 1–21 has the same action and effect as those stated above, even in the invention including the optical pickup device employing that objective lens, the objective lens wherein a plurality of optical elements are cemented, and the optical pickup device employing the aforesaid objective lens all will be explained later.

(2-22) The optical pickup device described in (2-22) is represented by an optical pickup device having therein a first light source with wavelength $\lambda_1$ arranged to conduct recording or reproducing of information by radiating a light flux to the first optical information recording medium having transparent base board thickness $t_1$, a second light source with wavelength $\lambda_2$ ($\lambda_1 < \lambda_2$) arranged to conduct recording or reproducing of information by radiating a light flux to the second optical information recording medium having transparent base board thickness $t_2$ ($t_1 < t_2$), and a light-converging optical system including an objective lens that converges light fluxes radiated respectively from the first and second light sources on information recording surfaces through transparent base boards respectively of the first and second optical information recording media, wherein the objective lens is made of uniform optical material, refractive index change dn/dT of the optical material for temperature changes satisfies the following expression under the conditions of the wavelength of the light source and the temperature environment for room temperature, $$|dn/dT| \leq 10.0 \times 10^{-6}(/° \text{ C.}) \qquad (127)$$

the objective lens is formed to make an optical action to be different on each of at least two optically functional surfaces arranged in the direction intersecting an optical axis, and a light flux passing through at least the outermost optically functional surface is used only for recording or reproducing of information for the first optical information recording medium. Action and effect of the invention stated above are the same as those of the invention described in (2-1).

(2-23) In the optical pickup device described in (2-23), each optically functional surface mentioned above is formed to have a step at the boundary section. Action and effect of the invention stated above are the same as those of the invention described in (2-2).

(2-24) In the optical pickup device described in (2-24), the objective lens is composed only of a refracting interface, at least three optically functional surfaces are formed, a light flux passing through the innermost optically functional surface is used for conducting recording or reproducing of information for the first and second optical information recording media, a light flux passing through the intermediate optically functional surface is used for conducting recording or reproducing of information for the second optical information recording medium, and a light flux passing through the outermost optically functional surface is used for conducting recording or reproducing of information for the first optical information recording medium. Action and effect of the invention stated above are the same as those of the invention described in (2-3).

(2-25) In the optical pickup device described in (2-25), a height of the step on the boundary section that is farther from an optical axis is greater than that on the boundary section that is closer to the optical axis, on the intermediate optically functional surface. Action and effect of the invention stated above are the same as those of the invention described in (2-4).

(2-26) In the optical pickup device described in (2-26), with respect to the innermost optically functional surface and the outermost optically functional surface, spherical aberration in the course of conducting recording or reproducing of information for the first optical information recording medium is corrected to 0.04 $\lambda_1$ rms or less, and the intermediate optically functional surface is corrected so that its spherical aberration for the optical information recording medium having transparent base board thickness $t_c$ ($t_1 < t_c < t_2$) may be the minimum. Action and effect of the invention stated above are the same as those of the invention described in (2-5).

(2-27) In the optical pickup device described in (2-27), the objective lens has at least two optically functional surfaces, and at least one of them has a diffractive structure, and the optically functional surface closest to the optical axis is designed to correct its spherical aberration in the course of conducting recording or reproducing of information for the first and second optical information recording media by using the light flux passing through the optically functional surface closest to the optical axis, and on the outermost optically functional surface, spherical aberration for the first optical information recording medium is corrected, while over spherical aberration is generated for the second optical information recording medium. Action and effect of the invention stated above are the same as those of the invention described in (2-6).

(2-28) In the optical pickup device described in (2-28), a light flux passing through each optically functional surface mentioned above passes through the aforesaid diffractive structure on either surface of the objective lens, and a diffraction pitch of the diffractive structure on the outermost optically functional surface is in a range from 5 µm to 40 µm. Action and effect of the invention stated above are the same as those of the invention described in (2-7).

(2-29) In the optical pickup device described in (2-29), the over spherical aberration generated in the course of conducting recording or reproducing of information for the second optical information recording medium is made to be increased gradually in the direction from the optical axis side toward the periphery. Action and effect of the invention stated above are the same as those of the invention described in (2-8).

(2-30) In the optical pickup device described in (2-30), the spherical aberration generated in the course of conducting recording or reproducing of information for the second optical information recording medium is discontinuous at the boundary section of the optically functional surface, and an amount of discontinuousness of the spherical aberration is in a range from 10 µm to 30 µm. Action and effect of the invention stated above are the same as those of the invention described in (2-9).

(2-31) In the optical pickup device described in (2-31), recording or reproducing of information is conducted by the use of the diffracted light in the same order on the innermost optically functional surface, for the first and second optical information recording media. Action and effect of the invention stated above are the same as those of the invention described in (2-10).

(2-32) In the optical pickup device described in (2-32), when conducting recording or reproducing of information for the first optical information recording medium, diffraction order $n_{ot}$ of the diffracted light having the highest intensity generated at the diffractive structure on the outside optically functional surface and diffraction order $n_{in}$ of the diffracted light having the highest intensity generated at the diffractive structure on the inside optically functional surface satisfy the following expression.

$$|n_{ot}| \geq |n_{in}| \qquad (128)$$

Action and effect of the invention stated above are the same as those of the invention described in (2-11).

(2-33) In the optical pickup device described in (2-33), in the diffractive structure stated above, a serrated ring-shaped diffractive zone is formed, and a design basis wavelength of the ring-shaped diffractive zone formed on the outside optically functional surface is different from that of the ring-shaped diffractive zone formed on the inside optically functional surface. Action and effect of the invention stated above are the same as those of the invention described in (2-12).

(2-34) In the optical pickup device described in (2-34), the objective lens has at least three optically functional surfaces wherein the innermost optically functional surface is composed only of a refracting interface and the intermediate optically functional surface has a diffractive structure, and a light flux used for recording or reproducing of information for the first and second optical information recording media passes through the intermediate optically functional surface.

Action and effect of the invention stated above are the same as those of the invention described in (2-13).

(2-35) In the optical pickup device described in (2-35), a serrated ring-shaped diffractive zone is formed on the outermost optically functional surface, and design basis wavelength $\lambda_0$ of the outermost optically functional surface satisfies $9\lambda_1 \leq \lambda_0 \leq 1.1\lambda_1$. Action and effect of the invention stated above are the same as those of the invention described in (2-14).

(2-36) In the optical pickup device described in (2-36), the outermost optically functional surface is composed only of a refracting interface. Action and effect of the invention stated above are the same as those of the invention described in (2-15).

(2-37) In the optical pickup device described in (2-37), image forming magnification m1 of the objective lens for conducting recording or reproducing of information for the first optical information recording medium satisfies the following expression.

$$-\tfrac{1}{4} \leq m1 \leq -\tfrac{1}{8} \tag{129}$$

Action and effect of the invention stated above are the same as those of the invention described in (2-16).

(2-38) In the optical pickup device described in (2-38), image forming magnification m2 of the objective lens for conducting recording or reproducing of information for the second optical information recording medium satisfies the following expression.

$$0.98\,m1 \leq m2 \leq 1.02m1 \tag{130}$$

Action and effect of the invention stated above are the same as those of the invention described in (2-17).

(2-39) In the optical pickup device described in (2-39), an aperture-stop in the case of conducting recording or reproducing of information for the first optical information recording medium is the same as that in the case of conducting recording or reproducing of information for the second optical information recording medium. Action and effect of the invention stated above are the same as those of the invention described in (2-18).

(2-40) In the optical pickup device described in (2-40), necessary numerical aperture NA1 in the case of conducting recording or reproducing of information for the first optical information recording medium satisfies the following expression.

$$\text{NA1} \geq 0.60 \tag{131}$$

Action and effect of the invention stated above are the same as those of the invention described in (2-19).

(2-41) In the optical pickup device described in (2-41), wavelength $\lambda 1$ of the first light source is not more than 670 nm. Action and effect of the invention stated above are the same as those of the invention described in (2-20).

(2-42) In the optical pickup device described in (2-42), the optical material is represented by optical glass and dispersion value vd is greater than 50. Action and effect of the invention stated above are the same as those of the invention described in (2-21).

(2-43) The objective lens of an optical pickup device described in (2-43) is represented by an objective lens of an optical pickup device having therein a first light source with wavelength $\lambda_1$ arranged to conduct recording or reproducing of information by radiating a light flux to the first optical information recording medium having transparent base board thickness $t_1$, a second light source with wavelength 2 ($\lambda 1 < \lambda_2$) arranged to conduct recording or reproducing of information by radiating a light flux to the second optical information recording medium having transparent base board thickness $t_2$ ($t_1 < t_2$), and a light-converging optical system including an objective lens that converges light fluxes radiated respectively from the first and second light sources on information recording surfaces through transparent base boards respectively of the first and second optical information recording media, wherein the objective lens is a cemented lens formed by cementing plural optical elements made of at least two kinds of optical materials, a value of refractive index change dn/dT of the optical material used for the optical element having stronger power component among the plural optical elements for temperature changes satisfies the following expression, $$|dn/dT| \leq 10.0 \times 10^{-6}(/^\circ \text{C.}) \tag{127}$$

and the objective lens is formed to make an optical action to be different on each of at least two optically functional surfaces arranged in the direction intersecting an optical axis, and a light flux passing through at least the outermost optically functional surface is used only for recording or reproducing of information for the first optical information recording medium, and therefore, it is possible to conduct recording or reproducing of information properly for plural optical information recording media each having a different transparent base board thickness by forming the objective lens by combining a material whose refractive index change for temperature changes is small and another material that is different from the previous material. When forming the objective lens by cementing optical elements, if temperature dependency of the material for the lens having stronger power is made to be lower, it is possible to make the total temperature dependency of the cemented objective lens to be low.

(2-44) In the objective lens of an optical pickup device described in (2-44), at least one of optical elements other than those having stronger power components among the aforesaid plural optical elements is made of plastic material, and therefore, a different optically functional surface can easily be constituted because of characteristics that forming is easy, which is an advantage.

(2-45) In the objective lens of an optical pickup device described in (2-45), a plurality of optically functional surfaces are formed on an optical surface of the optical element that is made of plastic material, thus, an objective lens which can be easily manufactured is provided.

(2-46) In the objective lens of an optical pickup device described in (2-46), each optically functional surface mentioned above is formed to have a step at the boundary section. Action and effect of the invention stated above are the same as those of the invention described in (2-2).

(2-47) In the objective lens of an optical pickup device described in (2-47), the objective lens is composed only of a refracting interface, at least three optically functional surfaces are formed, a light flux passing through the innermost optically functional surface is used for conducting recording or reproducing of information for the first and second optical information recording media, a light flux passing through the intermediate optically functional surface is used for conducting recording or reproducing of information for the second optical information recording medium, and a light flux passing through the outermost optically functional surface is used for conducting recording or reproducing of information for the first optical information recording medium. Action and effect of the invention stated above are the same as those of the invention described in (2-3).

(2-48) In the objective lens of an optical pickup device described in (2-48), a height of the step on the boundary section that is farther from an optical axis is greater than that on the boundary section that is closer to the optical axis, on the intermediate optically functional surface. Action and effect of the invention stated above are the same as those of the invention described in (2-4).

(2-49) In the objective lens of an optical pickup device described in (2-49), with respect to the innermost optically functional surface and the outermost optically functional surface, spherical aberration in the course of conducting recording or reproducing of information for the first optical information recording medium is corrected to 0.04 λ1 rms or less, and the intermediate optically functional surface is corrected so that its spherical aberration for the optical information recording medium having transparent base board thickness $t_c$ ($t_1 < t_c < t_2$) may be the minimum. Action and effect of the invention stated above are the same as those of the invention described in (2-5).

(2-50) In the objective lens of an optical pickup device described in (2-50), the objective lens has at least two optically functional surfaces, and at least one of them has a diffractive structure, and the optically functional surface closest to the optical axis is designed to correct its spherical aberration in the course of conducting recording or reproducing of information for the first and second optical information recording media by using the light flux passing through the optically functional surface closest to the optical axis, and on the outermost optically functional surface, spherical aberration for the first optical information recording medium is corrected, while over spherical aberration is generated for the second optical information recording medium. Action and effect of the invention stated above are the same as those of the invention described in (2-6).

(2-51) In the objective lens of an optical pickup device described in (2-51), a light flux passing through each optically functional surface mentioned above passes through the aforesaid diffractive structure on either surface of the objective lens, and a diffraction pitch of the diffractive structure on the outermost optically functional surface is in a range from 5 μm to 40 μm. Action and effect of the invention stated above are the same as those of the invention described in (2-7).

(2-52) In the objective lens of an optical pickup device described in (2-52), the over spherical aberration generated in the course of conducting recording or reproducing of information for the second optical information recording medium is made to be increased gradually in the direction from the optical axis side toward the periphery. Action and effect of the invention stated above are the same as those of the invention described in (2-8).

(2-53) In the objective lens of an optical pickup device described in (2-53), the spherical aberration generated in the course of conducting recording or reproducing of information for the second optical information recording medium is discontinuous at the boundary section of the optically functional surface, and an amount of discontinuousness of the spherical aberration is in a range from 10 μm to 30 μm. Action and effect of the invention stated above are the same as those of the invention described in (2-9).

(2-54) In the objective lens of an optical pickup device described in (2-54), recording or reproducing of information is conducted by the use of the diffracted light in the same order on the innermost optically functional surface, for the first and second optical information recording media. Action and effect of the invention stated above are the same as those of the invention described in (2-10).

(2-55) In the objective lens of an optical pickup device described in (2-55), when conducting recording or reproducing of information for the first optical information recording medium, diffraction order not of the diffracted light having the highest intensity generated at the diffractive structure on the outside optically functional surface and diffraction order $n_{in}$ of the diffracted light having the highest intensity generated at the diffractive structure on the inside optically functional surface satisfy the following expression.

$$|n_{ot}| \geq |n_{in}| \quad (128)$$

Action and effect of the invention stated above are the same as those of the invention described in (2-11).

(2-56) In the objective lens of an optical pickup device described in (2-56), in the diffractive structure stated above, a serrated ring-shaped diffractive zone is formed, and a design basis wavelength of the ring-shaped diffractive zone formed on the outside optically functional surface is different from that of the ring-shaped diffractive zone formed on the inside optically functional surface. Action and effect of the invention stated above are the same as those of the invention described in (2-12).

(2-57) In the objective lens for an optical pickup device described in (2-57), the objective lens has at least three optically functional surfaces wherein the innermost optically functional surface is composed only of a refracting interface and the intermediate optically functional surface has a diffractive structure, and a light flux used for recording or reproducing of information for the first and second optical information recording media passes through the intermediate optically functional surface. Action and effect of the invention stated above are the same as those of the invention described in (2-13).

(2-58) In the objective lens of an optical pickup device described in (2-58), a serrated ring-shaped diffractive zone is formed on the outermost optically functional surface, and design basis wavelength $\lambda_0$ of the outermost optically functional surface satisfies $9\lambda_1 \leq \lambda_0 \leq 1.1\lambda_1$. Action and effect of the invention stated above are the same as those of the invention described in (2-14).

(2-59) In the objective lens of an optical pickup device described in (2-59), the outermost optically functional surface is composed only of a refracting interface. Action and effect of the invention stated above are the same as those of the invention described in (2-15).

(2-60) In the objective lens of an optical pickup device described in (2-60), image forming magnification m1 of the objective lens for conducting recording or reproducing of information for the first optical information recording medium satisfies the following expression.

$$\frac{1}{4} \leq m1 \leq \frac{1}{8} \quad (129)$$

Action and effect of the invention stated above are the same as those of the invention described in (2-16). (2-61) In the objective lens of an optical pickup device described in (2-61), image forming magnification m2 of the objective lens for conducting recording or reproducing of information for the second optical information recording medium satisfies the following expression.

$$0.98m1 \leq m2 \leq 1.02m1 \quad (130)$$

Action and effect of the invention stated above are the same as those of the invention described in (2-17).

(2-62) In the objective lens of an optical pickup device described in (2-62), an aperture-stop in the case of conducting recording or reproducing of information for the first optical information recording medium is the same as that in the case of conducting recording or reproducing of information for the second optical information recording medium. Action and effect of the invention stated above are the same as those of the invention described in (2-18)

(2-63) In the objective lens of an optical pickup device described in (2-63), necessary numerical aperture NA1 in the case of conducting recording or reproducing of information for the first optical information recording medium satisfies the following expression.

$$NA1 \geq 0.60 \tag{131}$$

Action and effect of the invention stated above are the same as those of the invention described in (2-19).

(2-64) In the objective lens of an optical pickup device described in (2-64), wavelength λ1 of the first light source is not more than 670 nm. Action and effect of the invention stated above are the same as those of the invention described in (2-20).

(2-65) In the objective lens of an optical pickup device described in (2-65), the optical material is represented by optical glass and dispersion value vd is greater than 50. Action and effect of the invention stated above are the same as those of the invention described in (2-21).

(2-66) The optical pickup device described in (2-66) is represented by an optical pickup device having therein a first light source with wavelength $\lambda_1$ arranged to conduct recording or reproducing of information by radiating a light flux to the first optical information recording medium having transparent base board thickness $t_1$, a second light source with wavelength $\lambda_2$ ($\lambda_1 < \lambda_2$) arranged to conduct recording or reproducing of information by radiating a light flux to the second optical information recording medium having transparent base board thickness $t_2$ ($t_1 < t_2$), and a light-converging optical system including an objective lens that converges light fluxes radiated respectively from the first and second light sources on information recording surfaces through transparent base boards respectively of the first and second optical information recording media, wherein the objective lens is made of uniform optical material, refractive index change dn/dT of the optical material for temperature changes satisfies the following expression under the conditions of the wavelength of the light source and the temperature environment for room temperature, $$|dn/dT| \leq 10.0 \times 10^{-6} (/^\circ C.) \tag{127}$$

the objective lens is formed to make an optical action to be different on each of at least two optically functional surfaces arranged in the direction intersecting an optical axis, and a light flux passing through at least the outermost optically functional surface is used only for recording or reproducing of information for the first optical information recording medium. Action and effect of the invention stated above are the same as those of the invention described in (2-43).

(2-67) In the optical pickup device described in (2-67), at least one of optical elements other than the optical element having stronger power component among the aforesaid plural optical elements is made of a plastic material. Action and effect of the invention stated above are the same as those of the invention described in (2-44).

(2-68) In the optical pickup device described in (2-68), a plurality of optically functional surfaces are formed on an optical surface of the optical element that is made of plastic material. Action and effect of the invention stated above are the same as those of the invention described in (2-45).

(2-69) In the optical pickup device described in (2-69), each optically functional surface mentioned above is formed to have a step at the boundary section. Action and effect of the invention stated above are the same as those of the invention described in (2-2).

(2-70) In the optical pickup device described in (2-70), the objective lens is composed only of a refracting interface, at least three optically functional surfaces are formed, a light flux passing through the innermost optically functional surface is used for conducting recording or reproducing of information for the first and second optical information recording media, a light flux passing through the intermediate optically functional surface is used for conducting recording or reproducing of information for the second optical information recording medium, and a light flux passing through the outermost optically functional surface is used for conducting recording or reproducing of information for the first optical information recording medium. Action and effect of the invention stated above are the same as those of the invention described in (2-3).

(2-71) In the optical pickup device described in (2-71), a height of the step on the boundary section that is farther from an optical axis is greater than that on the boundary section that is closer to the optical axis, on the intermediate optically functional surface. Action and effect of the invention stated above are the same as those of the invention described in (2-4).

(2-72) In the optical pickup device described in (2-72), with respect to the innermost optically functional surface and the outermost optically functional surface, spherical aberration in the course of conducting recording or reproducing of information for the first optical information recording medium is corrected to 0.04 $\lambda_1$ rms or less, and the intermediate optically functional surface is corrected so that its spherical aberration for the optical information recording medium having transparent base board thickness $t_c$ ($t_1 < t_c < t_2$) may be the minimum. Action and effect of the invention stated above are the same as those of the invention described in (2-5).

(2-73) In the optical pickup device described in (2-73), the objective lens has at least two optically functional surfaces, and at least one of them has a diffractive structure, and the optically functional surface closest to the optical axis is designed to correct its spherical aberration in the course of conducting recording or reproducing of information for the first and second optical information recording media by using the light flux passing through the optically functional surface closest to the optical axis, and on the outermost optically functional surface, spherical aberration for the first optical information recording medium is corrected, while over spherical aberration is generated for the second optical information recording medium. Action and effect of the invention stated above are the same as those of the invention described in (2-6).

(2-74) In the optical pickup device described in (2-74), a light flux passing through each optically functional surface mentioned above passes through the aforesaid diffractive structure on either surface of the objective lens, and a diffraction pitch of the diffractive structure on the outermost optically functional surface is in a range from 5 µm to 40 µm. Action and effect of the invention stated above are the same as those of the invention described in (2-7).

(2-75) In the optical pickup device described in (2-75), the over spherical aberration generated in the course of conducting recording or reproducing of information for the second optical information recording medium is made to be increased gradually in the direction from the optical axis side toward the periphery. Action and effect of the invention stated above are the same as those of the invention described in (2-8).

(2-76) In the optical pickup device described in (2-76), the spherical aberration generated in the course of conducting recording or reproducing of information for the second optical information recording medium is discontinuous at the boundary section of the optically functional surface, and an amount of discontinuousness of the spherical aberration is in a range from 10 µm to 30 µm. Action and effect of the invention stated above are the same as those of the invention described in (2-9).

(2-77) In the optical pickup device described in (2-77), recording or reproducing of information is conducted by the use of the diffracted light in the same order on the innermost optically functional surface, for the first and second optical information recording media. Action and effect of the invention stated above are the same as those of the invention described in (2-10).

(2-78) In the optical pickup device described in (2-78), when conducting recording or reproducing of information for the first optical information recording medium, diffraction order not of the diffracted light having the highest intensity generated at the diffractive structure on the outside optically functional surface and diffraction order $n_{in}$ of the diffracted light having the highest intensity generated at the diffractive structure on the inside optically functional surface satisfy the following expression.

$$|n_{ot}| \geq |n_{in}| \tag{128}$$

Action and effect of the invention stated above are the same as those of the invention described in (2-11). (2-79) In the optical pickup device described in (2-79), in the diffractive structure stated above, a serrated ring-shaped diffractive zone is formed, and a design basis wavelength of the ring-shaped diffractive zone formed on the outside optically functional surface is different from that of the ring-shaped diffractive zone formed on the inside optically functional surface. Action and effect of the invention stated above are the same as those of the invention described in (2-12).

(2-80) In the optical pickup device described in (2-80), the objective lens has at least three optically functional surfaces wherein the innermost optically functional surface is composed only of a refracting interface and the intermediate optically functional surface has a diffractive structure, and a light flux used for recording or reproducing of information for the first and second optical information recording media passes through the intermediate optically functional surface. Action and effect of the invention stated above are the same as those of the invention described in (2-13).

(2-81) In the optical pickup device described in (2-81), a serrated ring-shaped diffractive zone is formed on the outermost optically functional surface, and design basis wavelength $\lambda_0$ of the outermost optically functional surface satisfies $9\lambda_1 \leq \lambda_0 \leq 1.1\lambda_1$. Action and effect of the invention stated above are the same as those of the invention described in (2-14).

(2-82) In the optical pickup device described in (2-82), the outermost optically functional surface is composed only of a refracting interface. Action and effect of the invention stated above are the same as those of the invention described in (2-15).

(2-83) In the optical pickup device described in (2-83), image forming magnification m1 of the objective lens for conducting recording or reproducing of information for the first optical information recording medium satisfies the following expression.

$$-\tfrac{1}{4} \leq m1 \leq \tfrac{1}{8} \tag{129}$$

Action and effect of the invention stated above are the same as those of the invention described in (2-16).

(2-84) In the optical pickup device described in (2-84), image forming magnification m2 of the objective lens for conducting recording or reproducing of information for the second optical information recording medium satisfies the following expression.

$$0.98m1 \leq m2 \leq 1.02m1 \tag{130}$$

Action and effect of the invention stated above are the same as those of the invention described in (2-17).

(2-85) In the optical pickup device described in (2-85), an aperture-stop in the case of conducting recording or reproducing of information for the first optical information recording medium is the same as that in the case of conducting recording or reproducing of information for the second optical information recording medium. Action and effect of the invention stated above are the same as those of the invention described in (2-18).

(2-86) In the optical pickup device described in (2-86), necessary numerical aperture NA1 in the case of conducting recording or reproducing of information for the first optical information recording medium satisfies the following expression.

$$NA1 \leq 0.60 \tag{131}$$

Action and effect of the invention stated above are the same as those of the invention described in (2-19). (2-87) In the optical pickup device described in (2-87), wavelength λ1 of the first light source is not more than 670 nm. Action and effect of the invention stated above are the same as those of the invention described in (2-20).

(2-88) In the optical pickup device described in (2-88), the optical material is represented by optical glass and dispersion value νd is greater than 50. Action and effect of the invention stated above are the same as those of the invention described in (2-21).

(2-89) In the optical pickup device described in (2-89), with respect to an objective lens of the optical pickup device having therein a first light source with wavelength $\lambda_1$ arranged to conduct recording or reproducing of information by radiating a light flux to the first optical information recording medium having transparent base board thickness $t_1$, a second light source with wavelength $\lambda_2$ ($\lambda_1 < \lambda_2$) arranged to conduct recording or reproducing of information by radiating a light flux to the second optical information recording medium having transparent base board thickness $t_2$ ($t_1 < t_2$), and a light-converging optical system including an objective lens that converges light fluxes radiated respectively from the first and second light sources on information recording surfaces through transparent base boards respectively of the first and second optical information recording media, the objective lens is made of uniform optical material or is composed of cemented lenses, and refractive index change dn/dT for temperature changes of the optical material having the strongest power among those used for constituting the objective lens satisfies the following expression, $$|dn/dT| \leq 10.0 \times 10^{-6} (/^\circ\text{C.}) \tag{127}$$

and there is provided a restricting member which lowers transmission factor of ray of light or intercepts the ray of light in the course of conducting recording or reproducing of information for the second optical information recording medium on at least the peripheral portion of the objective lens, and ray of light passing through at least the vicinity of an optical axis has been corrected in terms of spherical aberration in the course of conducting recording or reproducing of information for the first and second optical information recording media, thus, it is possible to conduct recording or reproducing properly for a plurality of optical information recording media each having a different transparent base board thickness, by using a material having less change in refractive index for temperature changes for the objective lens and by restricting an amount of irradiation for the second optical information recording medium by the intercepting member.

(2-90) In the optical pickup device described in (2-90), if there is provided a wavelength-selecting diaphragm that transmits ray of light having wavelength $\lambda_1$ emitted from the first light source and intercepts ray of light emitted from the second light source, the structure can be simplified, which is preferable.

(2-91) In the optical pickup device described in (2-91), at least one side of the objective lens is entirely covered by diffractive structure or is provided with two or more optically functional surfaces, and therefore, it is possible to conduct recording or reproducing of information properly for a plurality of optical information recording media each having a different transparent base board thickness.

(2-92) In the optical pickup device described in (2-92), image forming magnification m1 of the objective lens in the case of conducting recording or reproducing of information for the first optical information recording medium and image forming magnification m2 of the objective lens in the case of conducting recording or reproducing of information for the second optical information recording medium satisfy the following expression.

$$0.98m1 \leq m2 \leq 1.02m1 \qquad (130)$$

In the present specification, when "an optical surface area" is expressed with spherical aberration, if the spherical aberration comes under either one of the following cases, it is assumed that there exist optical surface areas which are different from each other at a boundary represented by h.

(a) Spherical aberration is discontinuous at h representing a boundary (FIG. 1(*a*)).

(b) Though spherical aberration is continuous at h, the first order differentiation is discontinuous (FIG. 1(*b*)).

(c) Spherical aberration is discontinuous at h for a certain wavelength (FIG. 1(*a*)).

The area which is divided under the conditions stated above and through which each light flux passes is respectively regarded as "an optical surface area". Therefore, when one surface of a lens is looked, if a refraction section and a diffractive section exist on the surface, these sections are regarded as separate "optical surface areas" which are different from each other at a boundary portion between the refraction section and the diffractive section (see FIGS. 2(*a*) and 2(*c*)). Further, even when the diffractive section is formed on the entire surface, when diffractive sections each designed for a different object are mixed together, they are regarded as separate optical surface areas based on the condition of the Item (c) above (see FIG. 2(*b*)). Furthermore, even when aspheric surfaces expressed with the same aspheric surface coefficient are formed on the surface on one side of a lens, for example, when discontinuous portions are formed on the surface on the other side, they are assumed to be the separate optical surface areas.

In the present specification, "an area on the peripheral side" is one optical surface area of the aforesaid "optical surface area", and it means the optical surface area closer to the peripheral side than the optical surface area including an optical axis among a plurality of optical surface areas. Further, "an area on the peripheral side" is an area existing on a part of either one of the following areas (a)–(f). It is preferable that 80% or more of either one of the following areas (a)–(f) is represented by "the area on the peripheral side", and it is preferable that 100% of either one of the following areas (a)–(f) is represented by "the area on the peripheral side". Next, areas (a)–(f) will be explained.

With regard optical disks popularized presently, there has generally been published a specification handbook in which wavelengths to be used and numerical apertures of light fluxes entering the optical disks are stipulated. Evaluation of optical disks is made by an optical disk evaluating instrument on which an optical pickup device having therein a light source with a wavelength and a light-converging optical system having a numerical aperture both based on the specification handbook is mounted. However, a wavelength of a light source on the optical pickup device provided on an actual optical disk apparatus does not always follow the specification handbook.

With regard to stipulations of the optical pickup device for measurement of CD, as an example, a wavelength is 780±10 nm and a numerical aperture is 0.45±0.01.

However, in the case of the optical pickup device provided on an actual CD player, a semiconductor laser whose oscillation wavelength at an ordinary temperature is longer than 790 nm is used as a light source from the viewpoint of a laser life and cost, in an example of a wavelength. With respect to the numerical aperture, on the other hand, there is also an occasion to use NA 0.43 for avoiding an influence of an error or to use NA 0.47 for improving basic performances.

On an optical pickup device provided on a DVD player having both functions for reproduction of DVD and that of CD, a light source with a wavelength of 650 nm is used for reproduction of DVD, and the same light source is used also for reproduction of CD. In this case, a diameter of an image forming spot of the light-converging optical system having no aberration is proportional to a wavelength, and is inversely proportional to a numerical aperture of a light flux entering the optical disk. Therefore, NA to obtain, under 650 nm, the image forming spot with the same diameter as that for NA 0.45 under 780 nm is 0.375, and the numerical aperture of about 0.38 is used. The basis why the optical pickup device that does not comply with the specifications of the optical disk has been put to practical use is considered to be the case that needs in the market have been changed from those in the initial stage of development and peripheral technologies have made progress.

An apparatus to use both DVD and CD on an interchangeable basis includes those in the following six types presently.

(1) An optical disk apparatus which employs an optical pickup device having only a light source with a wavelength of about 655 nm to conduct reproducing of DVD and reproducing of either one of CD and CD-ROM.

(2) An optical disk apparatus which employs an optical pickup device having a first light source with a wavelength of about 655 nm and a second light source with a wavelength of about 785 nm to conduct reproducing of DVD, reproducing of either one of CD-R and CD-RW.

(3) An optical disk apparatus which employs an optical pickup device having a first light source with a wavelength of about 655 nm and a second light source with a wavelength of about 785 nm to conduct reproducing of DVD, reproducing of either one of CD and CD-ROM and recording/reproducing of either one of CD-R and CD-RW.

(4) An optical disk apparatus which employs an optical pickup device having only a light source with a wavelength of about 655 nm to conduct reproducing of DVD, recording/reproducing of either one of DVD-RAM, DVD-RW, DVD+RW, DVD-R and MMVF and reproducing of either one of CD and CD-ROM.

(5) An optical disk apparatus which employs an optical pickup device having a first light source with a wavelength of about 655 nm and a second light source with a wavelength of about 785 nm to conduct reproducing of DVD, recording/reproducing of either one of DVD-RAM, DVD-RW, DVD+RW, DVD-R and MMVF and reproducing of either one of CD and CD-ROM and of either one of CD-R and CD-RW.

(6) An optical disk apparatus which employs an optical pickup device having a first light source with a wavelength of about 655 nm and a second light source with a wavelength of about 785 nm to conduct reproducing of DVD, recording/reproducing of either one of DVD-RAM, DVD-RW, DVD+RW, DVD-R and MMVF, reproducing of either one of CD and CD-ROM and recording/reproducing of either one of CD-R and CD-RW.

Since the numerical aperture necessary for recording and reproducing for each type of disk is different from others in each optical disk apparatus, the area on the peripheral side mentioned in the invention varies. Therefore, the area on the peripheral side is determined as follows, in accordance with a type of the optical disk apparatus.

(a) The area on the peripheral side of the objective lens in the apparatus of the aforesaid Item (1) is an area where the numerical aperture is 0.38 based on the maximum numerical aperture (usually, 0.6–0.63) for the light flux emitted from the first light source to enter the optical disk.

(b) The area on the peripheral side of the objective lens in the apparatus of the aforesaid Item (2) is an area where the numerical aperture for the light flux emitted from the second light source to enter the optical disk is 0.45 based on the numerical aperture (usually, 0.6–0.63) for the light flux emitted from the first light source to enter the optical disk.

(c) The area on the peripheral side of the objective lens in the apparatus of the aforesaid Item (3) is an area where the numerical aperture for the light flux emitted from the second light source to enter the optical disk is 0.50 based on the maximum numerical aperture (usually, 0.6–0.63) for the light flux emitted from the first light source to enter the optical disk.

(d) The area on the peripheral side of the objective lens in the apparatus of the aforesaid Item (4) is an area where the numerical aperture is 0.38 based on the maximum numerical aperture (usually, 0.6–0.65) for the light flux emitted from the first light source to enter the optical disk.

(e) The area on the peripheral side of the objective lens in the apparatus of the aforesaid Item (5) is an area where the numerical aperture for the light flux emitted from the second light source to enter the optical disk is 0.45 based on the maximum numerical aperture (usually, 0.6–0.65) for the light flux emitted from the first light source to enter the optical disk.

(f) The area on the peripheral side of the objective lens in the apparatus of the aforesaid Item (6) is an area where the numerical aperture for the light flux emitted from the second light source to enter the optical disk is 0.50 based on the maximum numerical aperture (usually, 0.6–0.65) for the light flux emitted from the first light source to enter the optical disk.

A diffractive structure (diffractive section) provided on "the area on the peripheral side" may be provided either on the side of an objective lens closer to a light source or on the side of an objective lens closer to an optical information recording medium, or it may further be provided on both sides thereof, and the diffractive structure is provided with at least a function to correct temperature characteristics for the prescribed light flux passing through the area on the peripheral side.

Incidentally, "the outermost optical surface area" or "the outermost circumferential optical surface area" means an optical surface area on the outermost side in the effective diameter, and it is most preferable that a diffractive structure is provided on that optical surface area. However, it does not affect the invention to provide, without departing from the technical spirit and the effect of the invention, a refraction section having no diffractive structure on a part of the outermost optical surface area in an effective diameter within a range that a spot diameter and light intensity both suitable for an optical information recording medium (for example, DVD compared with CD) whose necessary numerical aperture is relatively great are obtained. On the other hand, providing an optical surface area having no influence on recording or reproducing for the optical information recording medium substantially on the outermost optical surface area in an effective diameter has no influence on the invention. Even when the optical surface area of this kind exists in the effective diameter, it should be ignored.

Further, "correcting temperature characteristics" means that the following expression is satisfied by change (SA1/δT) of spherical aberration for temperature changes, even when a wavelength of a light source is changed and a refractive index of the objective lens is changed both by temperature changes (λ represents a wavelength of a light source).

$$|\delta SA1/\delta T| \leq 0.002 \ \lambda\text{rms}/^\circ \text{C}.$$

In addition, "an average pitch" is assumed to be (a width of an area of ring-shaped diffractive zone in the direction perpendicular to an optical axis viewed in a section including the optical axis)÷(number of rings in a ring-shaped diffractive zone). Further, "correcting spherical aberration" is to correct to the level of not more than the diffraction limit power, and it means that 0.07 λrms and downward (hereat, λ represents a wavelength of a light source) is satisfied when wave front aberration is obtained. Further, "m2≈m1" means relationship of magnification on the level wherein recording and reproducing for each optical information recording medium can be conducted with the same sensor size for both the first optical information recording medium and the second optical information recording medium. The relationship of magnification on the level wherein both recording and reproducing can be conducted with one sensor is more preferable.

With regard to "under spherical aberration or over spherical aberration", it is assumed that "under" means an occasion where an image intersects an optical axis at this side of a paraxial image point, and "over" means an occasion where an image intersects an optical axis at the far side of a paraxial image point, both in spherical aberration where a position of a paraxial image point is the origin, as shown in FIG. 3.

"Diffractive surface", "diffractive section", "diffractive structure" or "ring-shaped diffractive zone" used in the present specification means a section where a relief is provided on the surface of an objective lens to provide a function to converge or diverge a light flux through diffraction. With regard to a form of the relief, there is known a form wherein a ring-shaped diffractive zone that is almost in the form of concentric circle whose center is an optical axis is formed on the surface of objective lens OL as shown in FIG. 4(b), and a section of the ring-shaped diffractive zone on a plane including the optical axis looks like a serration. The form of the relief includes a form of this kind which is especially called "a ring-shaped diffractive zone".

An objective lens in a narrow sense in the present specification is a lens having a light-converging function arranged at the position closest to an optical information recording medium to face it under the condition that the optical information recording medium is loaded in an optical pickup device, while an objective lens in a wide sense is a lens group capable of being operated by an actuator at least in the direction of its optical axis together with that lens. This lens group in this case means at least one or more lenses (for example, two lenses). Therefore, numerical aperture NA of the objective lens on the optical information recording medium side (image side) in the present specification means numerical aperture NA of the lens surface positioned to be closest to the optical information recording medium side on the objective lens. Further, necessary numerical aperture NA in the present specification is a numerical aperture stipulated by specifications of each optical information recording medium, or it is a numerical aperture of the objective lens having the diffraction limit power capable of obtaining a spot diameter necessary for recording or reproducing of information in accordance with a wavelength of a light source used for each optical information recording medium.

In this specification, the second optical information recording medium means CD type optical disks in various types such as, for example, CD=R, CD-RW, CD-Video and CD-ROM, and the first optical information recording medium means DVD type optical disks in various types such as DVD-ROM, DVD-RAM, DVD-R, DVD-RW, CD=RW and DVD-Video. Further, thickness t of a transparent base board mentioned in the specification includes t=0. In addition, "when using DVD (CD)" means "when conducting recording or reproducing of information for DVD (CD)".

BRIEF DESCRIPTION OF THE DRAWINGS

FIG. 3 is a diagram showing whether aberration is under or over.

FIGS. 4(a) and 4(b) are diagrams showing a ring-shaped diffractive zone of a diffractive section. FIG. 4(b) shows a pitch of ring-shaped diffractive zones.

FIG. 8(a) shows a condition that how a light flux is used for the first optical information recording medium (DVD) and FIG. 8(b) shows a condition that how a light flux is used for the second optical information recording medium (CD).

FIG. 24(a) shows a condition that how a light flux is used for the first optical information recording medium (DVD) and FIG. 24(b) shows a condition that how a light flux is used for the second optical information recording medium (CD).

FIG. 25(a) shows a condition that how a light flux is used for the first optical information recording medium (DVD) and FIG. 25(b) shows a condition that how a light flux is used for the second optical information recording medium (CD).

FIG. 26(a) shows a condition that how a light flux is used for the first optical information recording medium (DVD) and FIG. 26(b) shows a condition that how a light flux is used for the second optical information recording medium (CD).

FIG. 33(a) show a spherical aberration diagram for DVD and FIG. 33(b) show a spherical aberration diagram for CD.

FIG. 37(a) show a spherical aberration diagram for DVD and FIG. 37(b) show a spherical aberration diagram for CD.

FIG. 39(a) show a spherical aberration diagram for DVD and FIG. 3(b) show a spherical aberration diagram for CD.

FIG. 40(a) show a spherical aberration diagram for DVD and FIG. 40(b) show a spherical aberration diagram for CD.

FIG. 41(a) is a diagram for CD and FIG. 41(b) is a diagram for DVD.

FIG. 42(a) show a spherical aberration diagram for DVD and FIG. 42(b) show a spherical aberration diagram for CD.

FIG. 43(a) is a diagram for CD and FIG. 43(b) is a diagram for DVD.

FIGS. 44(a) and 44(b) each is a spherical aberration diagram of an objective lens in Example 9. FIG. 44(a) show a spherical aberration diagram for DVD and FIG. 44(b) show a spherical aberration diagram for CD.

FIG. 45(a) is a diagram for CD and FIG. 45(b) is a diagram for DVD.

FIG. 46(a) show a spherical aberration diagram for DVD and FIG. 46(b) show a spherical aberration diagram for CD.

FIG. 47(a) is a diagram for CD and FIG. 47(b) is a diagram for DVD.

FIG. 48(a) show a spherical aberration diagram for DVD and FIG. 48(b) show a spherical aberration diagram for CD.

FIG. 49(a) is a diagram for CD and FIG. 49(b) is a diagram for DVD.

FIGS. 50(a) and 50(b) each is a spherical aberration diagram of an objective lens in Example 12. FIG. 50(a) show a spherical aberration diagram for DVD and FIG. 50(b) show a spherical aberration diagram for CD.

FIG. 51(a) is a diagram for CD and FIG. 51(b) is a diagram for DVD.

DETAILED DESCRIPTION OF THE PREFERRED EMBODIMENT

Figure 1:
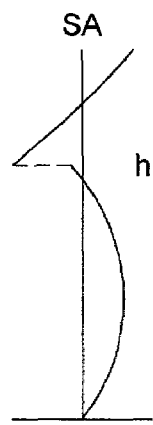
FIGS. 1(a) to 1(c) are diagrams showing a condition that spherical aberration is discontinuous.
Figure 1:
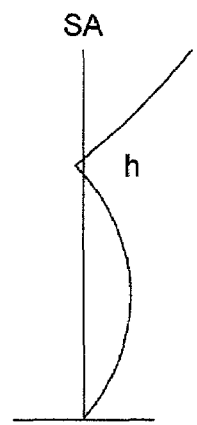
Figure 1:
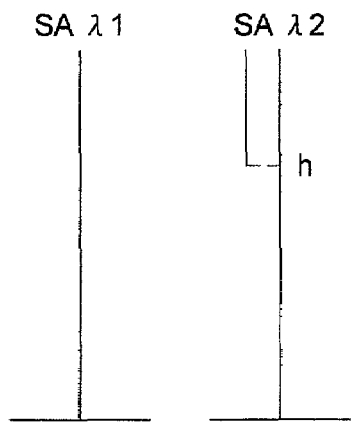
Figure 2:
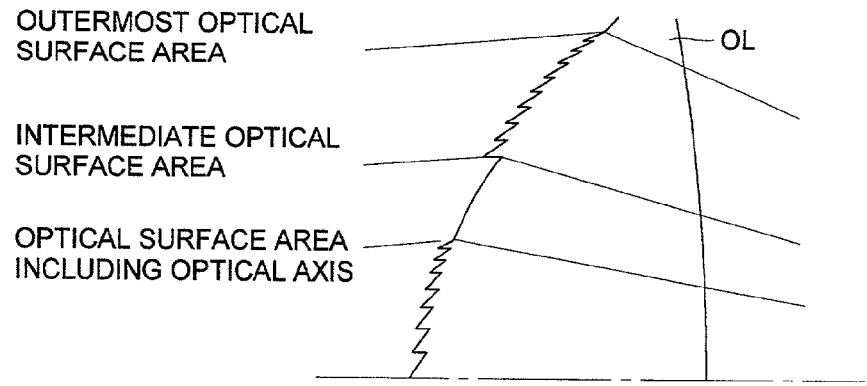
FIGS. 2(a) to 2(b) are sectional views of an objective lens for illustrating an optical surface area.
Figure 2:
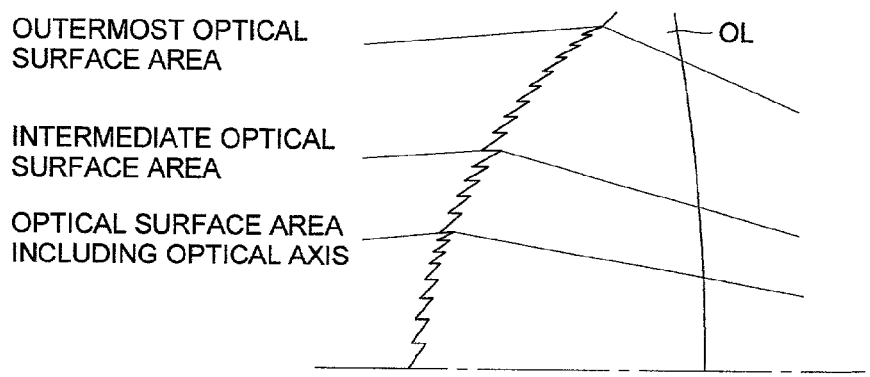
Figure 2:
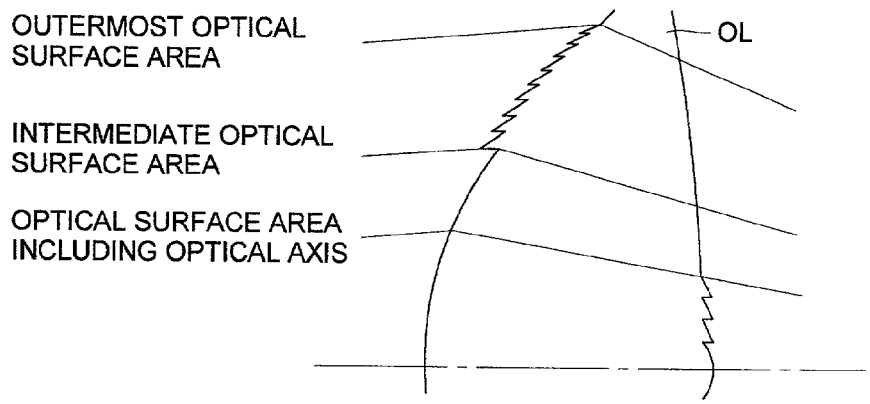

Referring to the drawings, the invention will further be explained in detail.

(First Embodiment)

Figure 5:
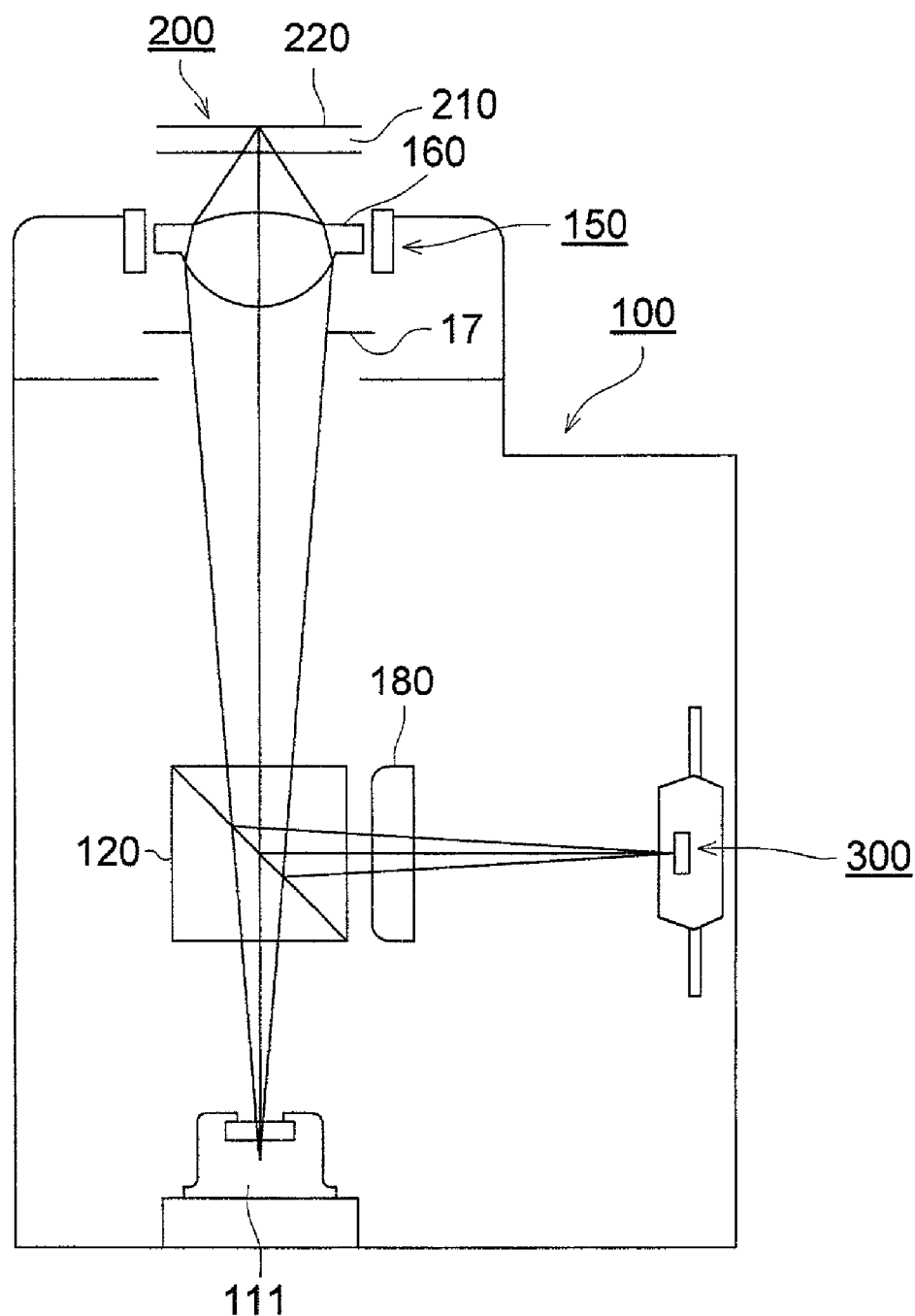
FIG. 5 is a schematic structure diagram of an optical pickup device.

First embodiment will be explained as follows. FIG. 5 is a schematic structure diagram of an optical pickup device. In optical pickup device 100 shown in FIG. 5, a light flux emitted from semiconductor laser 111 representing a light source passes through beam splitter 120 representing a light merging means, then, stopped down by diaphragm 17 to the prescribed numerical aperture, and forms a spot on information recording surface 220 through diffraction-integrated objective lens 160 and through transparent base board 210 of high density recording optical disk 200 representing an optical information recording medium. A wavelength (standard wavelength) of the semiconductor laser light is 650 nm.

A reflected light flux modulated by information bit on information recording surface 220 passes through the diffraction-integrated objective lens 160 again to be changed into a converged light, then, further passes through diaphragm 17 to be reflected on beam splitter 120 and passes through cylindrical lens 180 to be subjected to astigmatism and magnification change, and is converged on a light-receiving surface of optical detector 300. Incidentally, the numeral 150 in the drawing represents an actuator serving as a distance adjusting means for focus control and tracking control. Including an embodiment which will be explained later, it is preferable that the actuator 150 drives objective lens 160 in terms of focusing under the state wherein an image forming magnification is substantially constant.

Incidentally, including an embodiment which will be explained later, when objective lens 160 is driven in terms of tracking in the direction perpendicular to its optical axis by actuator 150, the relative position of the objective lens 160 to semiconductor laser 111 representing a light source is changed, and in this case, the position where an astigmatism component of wave front aberration of the light flux emerging out of the objective lens 160 is minimum is a position where the optical axis of the objective lens 160 is deviated from the center of a light flux emitted from the semiconductor laser 111, and therefore, it is possible to expand a range where an astigmatism is smaller than the prescribed value. When the distance between the semiconductor laser and an information recording surface of the optical image recording medium is made to be greater than 10 mm and to be smaller than 40 mm, optical pickup device 100 can be made compact, which is preferable.

Further, the diaphragm 17 was also established properly to comply with specifications of the objective lens in the example so that a numerical aperture on the disk 16 side may be a prescribed value. In the present embodiment, it is also possible to provide a liquid crystal shutter just ahead of the diaphragm 17. Incidentally, in the present embodiment and in another embodiment described later, it is conceivable that a temperature sensor that detects a temperature of a semiconductor laser representing a light source is provided, and a temperature of the semiconductor laser (or an ambient temperature) is adjusted by a temperature adjusting means including a Peltier element by the use of signals outputted from the temperature sensor.

Figure 6:
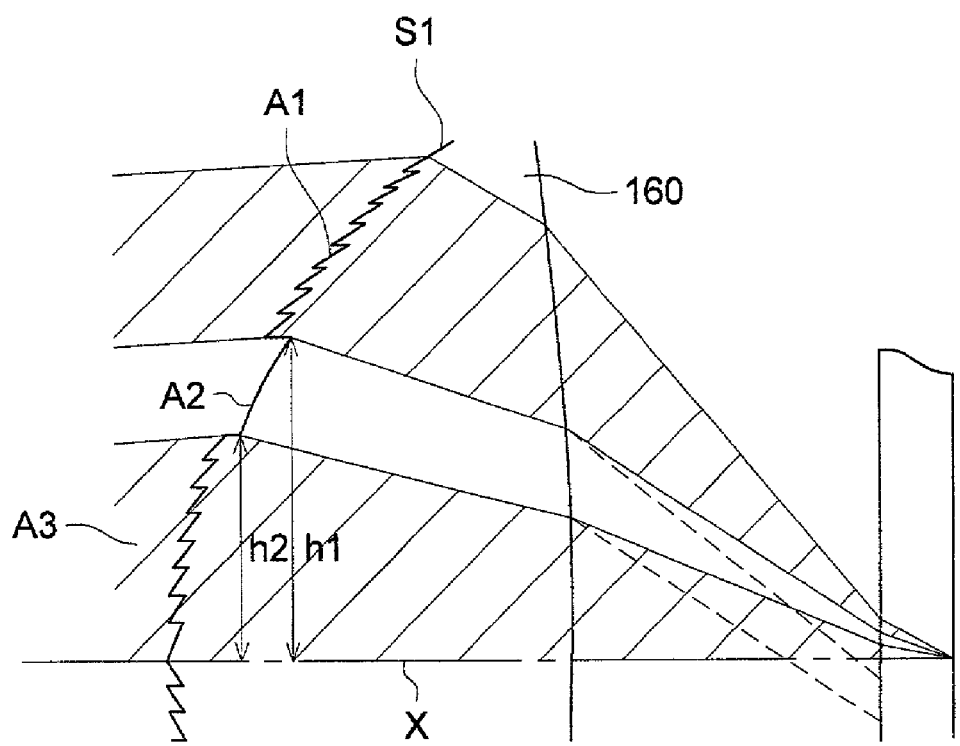
FIG. 6 is a sectional view showing a schematic structure of an objective lens of the first embodiment.

FIG. 6 is a sectional schematic view of objective lens 160. On surface S1 of the objective lens 160 closer to a light source, there are formed three optical surface areas A1, A2 and A3. The optical surface area A2 between h1 and h2 each representing a height from an optical axis is formed by a refraction section composed of an aspheric surface and each of the optical surface areas A1 and A3 which are adjacent to the optical surface area A2 is formed by a diffractive section.

The optical surface areas A1 that is outside the height h1 determines power allocation for refraction power and diffraction power of the outermost diffractive section so that correction of spherical aberration and correction of temperature characteristics in the course of using DVD may be the prime object.

Now, when CD is used, over spherical aberration is caused in the design wherein spherical aberration is corrected with a transparent base board thickness ($t_1=0.6$ mm) of DVD, because the transparent base board thickness is greater than the thickness of DVD. As it stands, therefore, recording and reproducing are usually impossible. To realize interchangeability, therefore, design of recording and reproducing for CD is conducted for intermediate optical surface area A2. To be concrete, the design is conducted to correct spherical aberration for the assumed base board (example, t=0.9 mm) whose thickness is in a range from $t_1$ to $t_2$, without making the spherical aberration to be zero thoroughly in CD ($t_2=1.2$ mm).

On the paraxial optical surface area A3, there is formed a diffractive section in the same way as in the outermost area A1, and power allocation for refraction power and diffraction power of the diffractive section is determined so that correction of spherical aberration and correction of temperature characteristics in the course of using DVD may be the prime object. In this case, generation of spherical aberration caused by a difference in transparent base board thickness is proportional to the fourth power of NA, and on the contrary, in the low NA area, the rate of generation of spherical aberration is less, even when deviated from the designed thickness of the base board. Therefore, by designing properly the paraxial area A3 in which a transparent base board thickness for DVD is designed to be $t_1$ and intermediate optical surface area A2, it is possible, even CD is used, to make a light spot formed by optical surface area A3 including an optical axis and by intermediate optical surface area A2 to be not more than the diffraction limit (0.07 λrms or less: λ represents a wavelength of a light source here), at a certain position on the over side from the paraxial image point.

In the case of using CD, a light flux passing through the outermost area A1 only turns out to be a flare component, and only a light flux passing through the intermediate optical surface area A2 and paraxial optical surface area A3 contributes to a CD spot. Though these are not always free from aberration completely, it is possible to realize an amount of spherical aberration (about 0.04 λrms) which is especially preferable for practical use. In the case of using DVD, a light flux passing through the intermediate optical surface area A2 only turns out to be a flare component, and a light flux passing through the outermost area A1 and paraxial optical surface area A3 is used for forming a spot. Therefore, correction of spherical aberration and correction of temperature characteristics in the course of using DVD are kept.

Incidentally, the invention is not limited to the aforesaid embodiment. Though the intermediate optical surface area A2 is composed of the refraction section, the same effect is obtained even when the intermediate optical surface area A2 is composed of the diffractive section having the same spherical aberration. Further, it is naturally possible to realize even when the refraction section and the diffractive section exist mixedly on the intermediate optical surface area A2. Further, diffractive sections may be formed on both sides in the direction of the optical axis. In addition, the paraxial optical surface area A3 does not need to be established to be thoroughly free from aberration in using DVD, and residual aberration of CD may be made less as shown in the second embodiment described later. In this case, spherical aberration may be caused on the portion close to the optical axis.

An optical surface of the objective lens does not need to be composed strictly of three optical surface areas, and it may be composed of more optical surface areas. In that case, it is also possible to arrange so that at least one optical surface area for correcting a base board thickness and temperature characteristics in using DVD exists on the optical surface area outside necessary numerical aperture NA of CD, at least one optical surface area for forming CD spot exists on at least one area inside necessary numerical aperture NA of CD, and at least one optical surface area for correcting a base board thickness and temperature characteristics in using DVD exists on the area near an optical axis.

(Second Embodiment)

Figure 7:
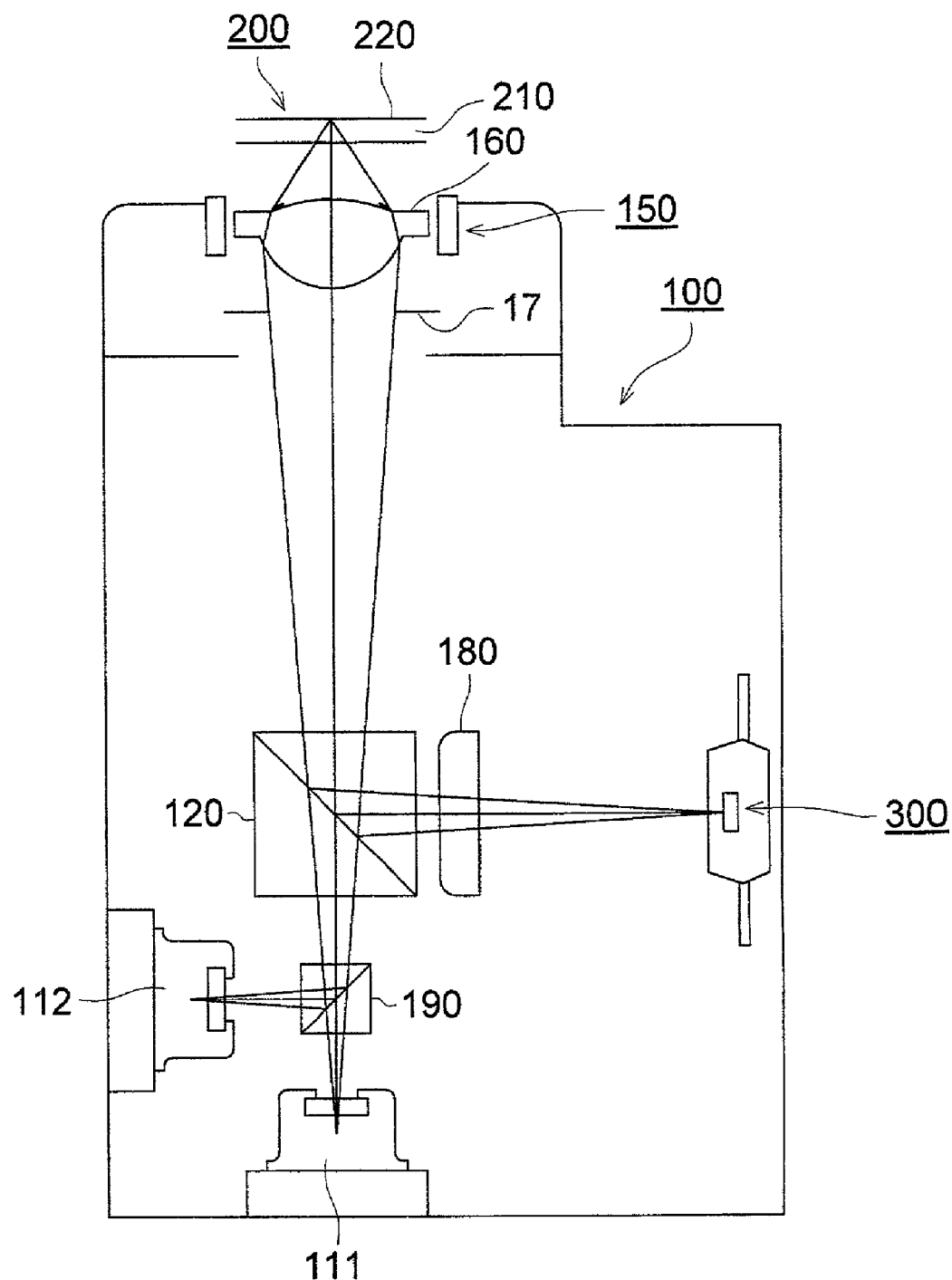
FIG. 7 is a schematic structure diagram of an optical pickup device.

Next, the second embodiment will be explained. This embodiment is one wherein a wavelength of a light source under which DVD is used is different from that under which CD is used, and explanation of portions in this embodiment which are the same as those in the first embodiment will be omitted. In the optical pickup device (that is of a type of two light sources and one detector) related to the present embodiment shown in FIG. 7, there are provided semiconductor laser 111 (designed wavelength $\lambda 1=650$ nm) representing the first light source for reproducing the first optical disk (DVD) and semiconductor laser 112 (designed wavelength $\lambda 1=780$ nm) representing the second light source for reproducing the second optical disk (CD).

First, when reproducing the first optical disk, a beam is emitted from the first semiconductor laser 111, and the light flux thus emitted passes through beam splitter 190 which is a light merging means for light emitted from the semiconductor laser 111 and for that emitted from the semiconductor laser 112, then, passes through beam splitter 120, and is stopped down by diaphragm 17 to be converged by objective lens 160 on information recording surface 220 through transparent base board 210 of first optical disk 200.

Then, the light flux modulated by information bit and reflected on the information recording surface 220 passes through the objective lens 160 as well as diaphragm 17 again, then, enters the beam splitter 120 to be reflected therein, and is given astigmatism by cylindrical lens 180 to enter optical detector 300, where signals are obtained through reading of information recorded on the first optical disk 200 by the use of signals outputted from the optical detector 300.

Further, detection of focusing and detection of tracking are conducted by detecting a change in an amount of light caused by changes in form and position of a spot on the optical detector 300. Based on this detection, two-dimension actuator 150 representing a distance adjusting means moves objective lens 160 so that a light flux emitted from the first semiconductor laser 111 may form images on recording surface 220 of the first optical disk 200, and moves objective lens 160 so that a light flux emitted from the first semiconductor laser 111 may form images on the prescribed track.

When reproducing the second optical disk, a beam is emitted from the second semiconductor laser 112, and the light flux thus emitted is reflected on beam splitter 190 which is a light merging means, and is converged on information recording surface 220 through beam splitter 120, diaphragm 17 and objective lens 160 in the same way as in the light flux emitted from the first semiconductor 111, and through transparent base board 210 of the second optical disk 200.

Then, the light flux modulated by information bit and reflected on information recording surface 220 enters the optical detector 300 through the objective lens 160, diaphragm 17, beam splitter 120 and cylindrical lens 180 again, and signals are obtained through reading of information recorded on the second optical disk 200 by the use of signals outputted from the optical detector 300.

In the same way as in the first optical disk, detection of focusing and detection of tracking are conducted by detecting a change in an amount of light caused by changes in a form and a position of the spot on the optical detector 300, and two-dimension actuator 150 moves objective lens 160 for focusing and tracking.

Figure 8:
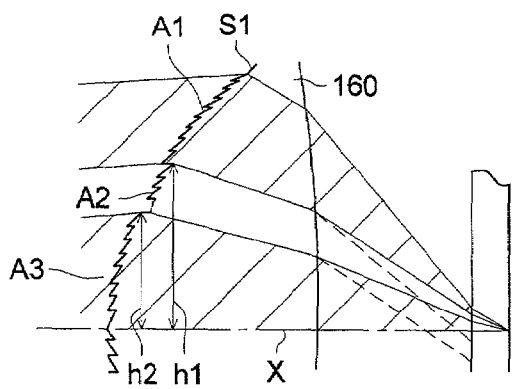
FIGS. 8(a) and 8(b) are sectional views showing a schematic structure of an objective lens of the second embodiment.
Figure 8:
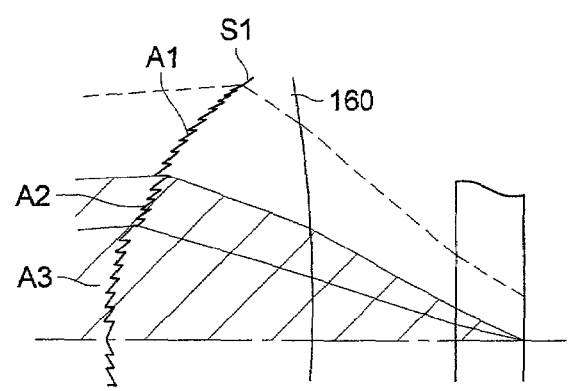

FIG. 8 shows a schematic sectional view of an objective lens. On surface S1 of the objective lens 160 closer to a light source, there are formed three optical surface areas A1, A2 and A3. Each optical surface area is composed of a diffractive section, and outermost optical surface area A1 and optical surface area A3 near an optical axis are diffraction surfaces under the same design concept, while, intermediate optical surface area A2 between h1 and h2 each representing a height from an optical axis is a diffractive section designed from a viewpoint that is different from that for diffractive sections on both sides of the intermediate optical surface area A2.

The outermost optical surface area A1 and optical surface area A3 near an optical axis conduct correction of a base board thickness and correction of temperature characteristics in the course of using DVD. When using CD, in this case, under spherical aberration is generated on the light flux passing through the aforesaid diffractive section as spherical aberration for the color corresponding to the wavelength of the light source that is longer compared with that for DVD. In this case, to make it possible to conduct reproducing and recording for CD, the optical design of intermediate optical surface area A2 is made so that spherical aberration which is different from that for the diffractive sections on both sides may be given to the intermediate optical surface area A2. Even in the present embodiment, spherical aberration is not made to be zero perfectly in CD ($t_2$=1.2 mm), but a base board (for example, t=0.9 mm) having a certain thickness between $t_1$ and $t_2$ is assumed, and spherical aberration is corrected for that base board, in the design. Though the corresponding portion has under spherical aberration when using DVD, it turns out to be flare light which is far from the main spot.

On the other hand, when using CD, a light flux passing through the outermost optical surface area A1 only turns out to be flare component, and those contributing to CD spot are only intermediate optical surface area A2 and optical surface area A3 near an optical axis (see FIG. 8 (b)). Though these are not free from aberration completely, an amount of spherical aberration capable of being used practically (about 0.04 λrms) can be realized. When using DVD, a light flux passing through intermediate optical surface area A2 is a flare component (see FIG. 8(a)), and outermost optical surface area A1 and optical surface area A3 near an optical axis are used for forming the spot. Therefore, interchangeability with CD can be realized under the condition where correction of spherical aberration and correction of temperature characteristics are kept in the course of using DVD.

Incidentally, the invention is not limited to the aforesaid embodiment. Though the intermediate optical surface area A2 is composed of the refraction section, the same effect is obtained even when the intermediate optical surface area A2 is composed of the diffractive section having the same spherical aberration. Further, it is naturally possible to realize even when the refraction section and the diffractive section exist mixedly on the intermediate optical surface area A2. Further, diffractive sections may be formed on both sides in the direction of the optical axis. In addition, the paraxial optical surface area A3 does not need to be established to be thoroughly free from aberration in using DVD, and residual aberration of CD may be made less. In this case, spherical aberration may be caused on the portion close to the optical axis.

An optical surface of the objective lens does not need to be composed strictly of three optical surface areas, and it may be composed of more optical surface areas. In that case, it is also possible to arrange so that at least one optical surface area for correcting a base board thickness and temperature characteristics in using DVD exists on the optical surface area outside necessary numerical aperture NA of CD, at least one optical surface area for forming CD spot exists on at least one area inside necessary numerical aperture NA of CD, and at least one optical surface area for correcting a base board thickness and temperature characteristics in using DVD exists on the area near an optical axis.

(Third Embodiment)

Figure 9:
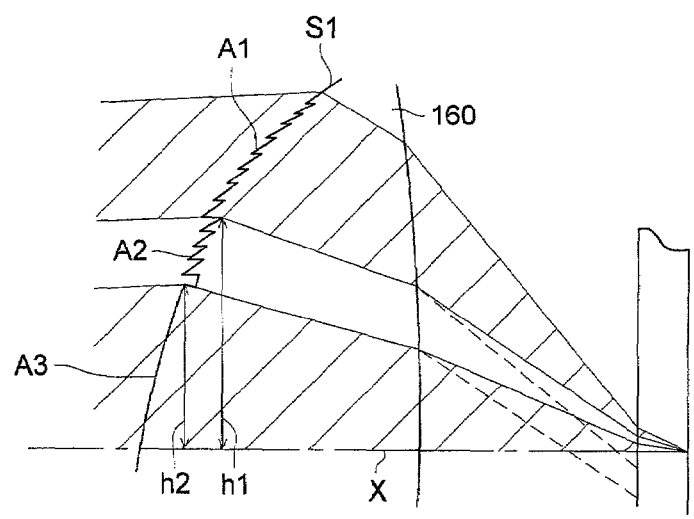
FIG. 9 is a sectional view showing a schematic structure of an objective lens of the third and fourth embodiments.

Next, the third embodiment will be explained. This embodiment is one wherein a wavelength of a light source under which DVD is used is the same as that under which CD is used, and explanation of portions in this embodiment which are the same as those in the aforesaid embodiment will be omitted. An optical pickup device is the same as one shown in FIG. 5 in terms of structure. A schematic structure diagram of an objective lens is shown in FIG. 9.

On surface S1 of objective lens 160 closer to a light source, there are formed three optical surface areas A1, A2 and A3 each being designed optically based on a different concept. However, from the viewpoint of using a light flux, a light flux passing through the outermost optical surface area A1 and the innermost optical surface area A3 is used to form an optical spot on a recording surface in the case of using DVD, and a light flux passing through the intermediate optical surface area A2 and the innermost optical surface area A3 is used to form an optical spot in the case of using CD, in the same way as in the embodiment explained already.

A diffraction surface of optical surface area A1 outside h1 representing a height from optical axis X is designed for correction of a base board thickness and temperature characteristics in the case of using DVD, in the same way as in the first embodiment, and when using CD, over flare light is generated. Intermediate optical surface area A2 is designed to correct spherical aberration for the assumed base board having a certain thickness between $t_1$ and $t_2$ (for example, t=0.9 mm) for a purpose of interchangeability with CD, and it is used for forming a spot in the case of using CD, and an under flare light is generated when DVD is used. On the innermost optical surface area A3, the refraction surface is designed for correcting a base board thickness of DVD basically, and a form of spherical aberration on the portion near an optical axis is devised for lessening residual aberration in the case of using CD. This area is also used for forming main spot light for DVD and CD, which has been described already.

Incidentally, the invention is not limited to the aforesaid embodiment. Though the intermediate optical surface area A2 is composed of the refraction section, the same effect is obtained even when the intermediate optical surface area A2 is composed of the diffractive section having the same spherical aberration. Further, it is naturally possible to realize even when the refraction section and the diffractive section exist mixedly on the intermediate optical surface area A2. Further, diffractive sections may be formed on both sides in the direction of the optical axis. In addition, the paraxial optical surface area A3 does not need to be established to be thoroughly free from aberration in using DVD, and residual aberration of CD may be made less. In this case, spherical aberration may be caused on the portion close to the optical axis.

An optical surface of the objective lens does not need to be composed strictly of three optical surface areas, and it may be composed of more optical surface areas. In that case, it is also possible to arrange so that at least one optical surface area for correcting a base board thickness and temperature characteristics in using DVD exists on the optical surface area outside necessary numerical aperture NA of CD, at least one optical surface area for forming CD spot exists on at least one area inside necessary numerical aperture NA of CD, and at least one optical surface area for correcting a base board thickness and temperature characteristics in using DVD exists on the area near an optical axis.

(Fourth Embodiment)

Next, the fourth embodiment will be explained. This embodiment is one wherein a wavelength of a light source under which DVD is used is different from that under which CD is used, and an optical pickup device is the same as one shown in FIG. 7 in terms of structure. A schematic sectional view of an objective lens is the same as one shown in FIG. 9.

On a surface of an objective lens closer to a light source, there are formed three optical surface areas A1, A2 and A3 each being designed optically based on a different concept. However, from the viewpoint of using a light flux, a light flux passing through the out side and the inside is used to form an spot light on a recording surface in the case of using DVD, and a light flux passing through the intermediate portion and the inside is used to form a spot light in the case of using CD, in the same way as in the embodiment explained already.

A diffraction surface of optical surface area A1 outside h1 representing a height from optical axis X is designed for correction of a base board thickness and temperature characteristics in the case of using DVD, in the same way as in the first embodiment, and when using CD, under flare light is generated. Intermediate optical surface area A2 is designed to correct spherical aberration for the assumed base board having a certain thickness between $t_1$ and $t_2$ (for example, t=0.9 mm) for a purpose of interchangeability with CD, and it is used for forming a spot in the case of using CD, and an over flare light is generated when DVD is used. On the innermost optical surface area A3, the refraction surface is designed for correcting a base board thickness of DVD basically, and a form of spherical aberration on the portion near an optical axis is devised for lessening residual aberration in the case of using CD. Spherical aberration of this area generated when CD is used is under one which is opposite to that in the third embodiment. This area is also used for forming main spot light for DVD and CD, which has been described already.

Incidentally, the invention is not limited to the aforesaid embodiment. Though the intermediate optical surface area A2 is composed of the refraction section, the same effect is obtained even when the intermediate optical surface area A2 is composed of the diffractive section having the same spherical aberration. Further, it is naturally possible to realize even when the refraction section and the diffractive section exist mixedly on the intermediate optical surface area A2. Further, diffractive sections may be formed on both sides in the direction of the optical axis. In addition, the paraxial optical surface area A3 does not need to be established to be thoroughly free from aberration in using DVD, and residual aberration of CD may be made less. In this case, spherical aberration may be caused on the portion close to the optical axis.

An optical surface of the objective lens does not need to be composed strictly of three optical surface areas, and it may be composed of more optical surface areas. In that case, it is also possible to arrange so that at least one optical surface area for correcting a base board thickness and temperature characteristics in using DVD exists on the optical surface area outside necessary numerical aperture NA of CD, at least one optical surface area for forming CD spot exists on at least one area inside necessary numerical aperture NA of CD, and at least one optical surface area for correcting a base board thickness and temperature characteristics in using DVD exists on the area near an optical axis.

(Fifth Embodiment)

Figure 10:
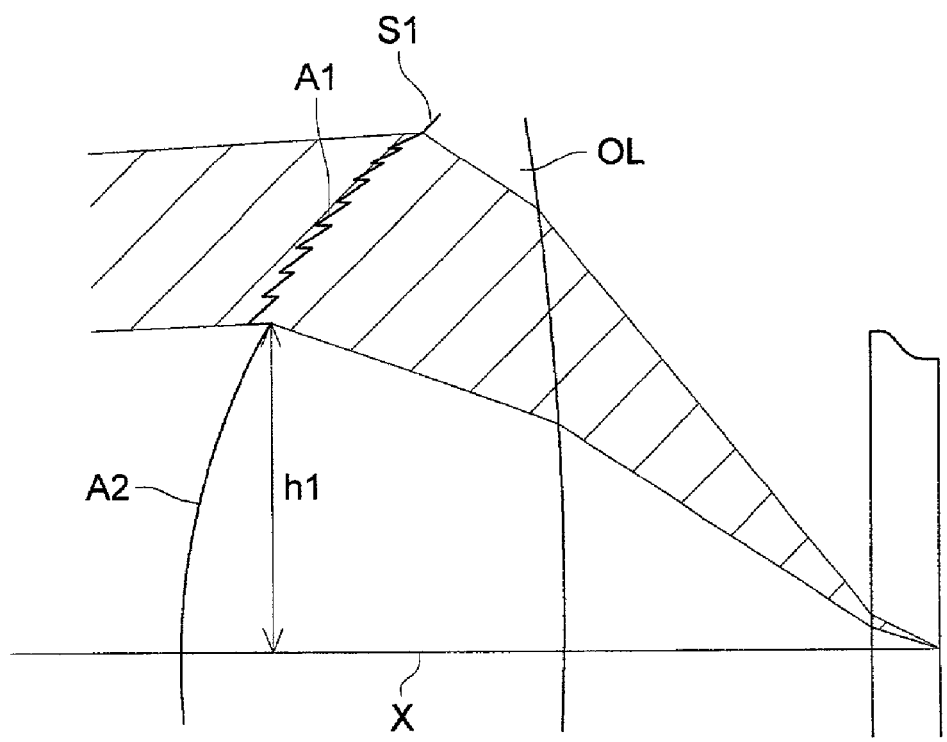
FIG. 10 is a sectional view showing a schematic structure of an objective lens of the fifth embodiment.

Next, the fifth embodiment will be explained. This embodiment is one wherein a wavelength of a light source under which DVD is used is the same as that under which CD is used, and an optical pickup device is the same as one shown in FIG. 5 in terms of structure. A schematic structure diagram of an objective lens is shown in FIG. 10.

On surface S1 of objective lens 160 closer to a light source, there are formed two optical surface areas A1 and A2 each being designed optically based on a different concept. From the viewpoint of using a light flux, a light flux passing through the outside and the inside is used to form a spot light on a recording surface in the case of using DVD, and a light flux passing through the inside is used to form a spot light on a recording surface in the case of using CD.

A diffraction surface of optical surface area A1 outside h1 representing a height from optical axis X is designed for correction of a base board thickness and temperature characteristics in the case of using DVD, in the same way as in the first embodiment, and when using CD, over flare light is generated. Inside optical surface area A2 is designed to correct spherical aberration for the assumed base board having a certain thickness between $t_1$ and $t_2$ (for example, t=0.9 mm) for a purpose of interchangeability with CD, and it is used for forming a spot in the case of using CD, and it is used to contribute to forming a spot light when DVD is used. Further, a form of spherical aberration on the portion near an optical axis is devised for lessening residual aberration in the case of using CD. Spherical aberration generated on this area when CD is used is under spherical aberration which is opposite to that in the third embodiment. This area is also used for forming main spot light for DVD and CD, which has been described already. Incidentally, the invention is not limited to the aforesaid embodiment. Though the inside optical surface area A2 is composed of the refraction section, the same effect is obtained even when the inside optical surface area A2 is composed of the diffractive section having the same spherical aberration. Further, it is naturally possible to realize even when the diffractive section and the refraction section exist mixedly on the intermediate optical surface area A2. Further, diffractive sections may be formed on both sides in the direction of the optical axis.

(Sixth Embodiment)

Figure 15:
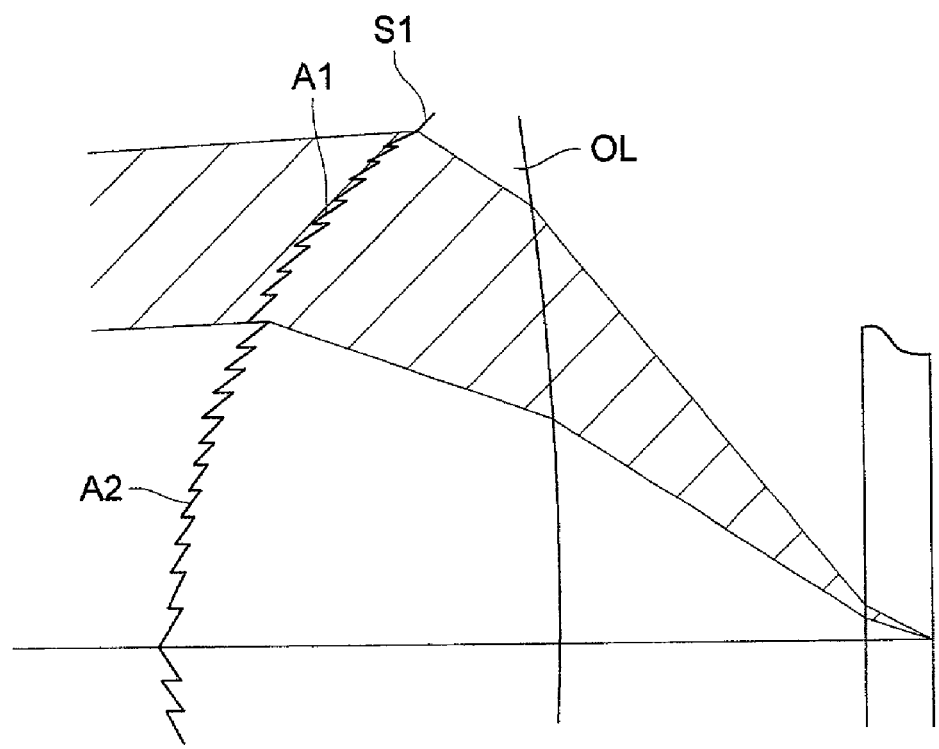
FIG. 15 is a sectional view showing a schematic structure of an objective lens related to a variation example.

Next, the sixth embodiment will be explained. This embodiment is one wherein a wavelength of a light source under which DVD is used is different from that under which CD is used, and an optical pickup device is the same as one shown in FIG. 7 in terms of structure. A schematic sectional view of an objective lens is shown in FIG. 15.

On surface S1 of objective lens 160 closer to a light source, there are formed two optical surface areas A1 and A2 each being designed optically based on a different concept. From the viewpoint of using a light flux, a light flux passing through the outside and the inside is used to form a spot light on a recording surface in the case of using DVD, and a light flux passing through the inside is used to form a spot light on a recording surface in the case of using CD.

A diffraction surface of optical surface area A1 outside h1 representing a height from optical axis X is designed for correction of a base board thickness and temperature characteristics in the case of using DVD, in the same way as in the first embodiment, and when using CD, over flare light is generated. Intermediate optical surface area A2 is designed to correct spherical aberration for the assumed base board having a certain thickness between $t_1$ and $t_2$ (for example, t=0.9 mm) while utilizing spherical aberration for the color corresponding to the longer length in terms of a length of a light source compared with DVD, for a purpose of interchangeability with CD, and it is used for forming a spot in the case of using CD, and it is used to contribute to forming a spot light when DVD is used. Therefore, when using CD, a light flux passing through the outside optical surface area A1 only turns out to be flare component, and what is contributing to forming of a spot light for CD is a light flux passing through the inside optical surface area A2, and when using DVD, a light flux passing through the outside optical surface area A1 and a light flux passing through the inside optical surface area A2 are used for forming a spot light. Therefore, interchangeability with CD can be realized under the condition where correction of spherical aberration and correction of temperature characteristics are kept in the course of using DVD.

Further, in many actual optical pickup devices, a distance between an emission point and each disk surface is constant, and there is a high possibility that an actual image forming magnification for DVD is different from that for CD. However, the distance between an emission point and a lens surface is made to be the same for DVD and CD in the following examples, because that strictness does not matter in substance of the invention.

Incidentally, the invention is not limited to the present embodiment. Though a diffractive section is used to constitute the inside optical surface area A2, the effect is the same even when a refraction section having the same spherical aberration is used. Further, even when the diffractive section and the refraction section exit mixedly on the inside optical surface area A2, it is naturally possible to realize. In addition, the diffractive section may further be formed on both sides in the direction of an optical axis.

Examples of the objective lens which is favorably used in the optical pickup device in the embodiment described above will be explained as follows.

In general, a pitch of a ring-shaped diffractive zone on the diffraction surface is defined by using a phase difference function or an optical path difference function. To be concrete, phase difference function Φb is expressed by the following "Numeral 1" in a unit of radian, and optical path difference function ΦB is expressed by the following "Numeral 2" in a unit of mm.

$$\Phi_b = \sum_{i=1}^{\infty} b_{2i} h^{2i} \quad \text{(Numeral 1)}$$

$$\Phi_B = \sum_{i=1}^{\infty} B_{2i} h^{2i} \quad \text{(Numeral 2)}$$

These two expression methods are different each other in terms of a unit, but they are the same in terms of expressing a pitch of a ring-shaped diffractive zone. Namely, if phase difference function coefficient b is multiplied by $\lambda/2\pi$ for main wavelength λ (unit mm), it is possible to convert into optical path difference function coefficient B, while, if optical path difference function coefficient B is divided by $\lambda/2\pi$ on the contrary, it is possible to convert into phase difference function coefficient b.

Based on the definition stated above, it is possible to make a lens to have power, by making the secondary coefficient of the phase difference function or of the optical path difference function to be the value other than zero. Further, it is possible to control spherical aberration by making the coefficient of the phase difference function or of the optical path difference function other than the secondary coefficient, for example, quaternary coefficient, 6-th order coefficient, 8-th order coefficient and 10-th order coefficient. Controlling in this case means that spherical aberration is corrected on the whole by giving opposite spherical aberration to the diffractive section for spherical aberration of the refraction section or that the total spherical aberration is made to be a desired flare amount by manipulating spherical aberration of the diffractive section.

In addition, the diffraction surface mentioned above is formed on the surface on at least one side, and that surface has thereon an aspherical form expressed by the following expression "Numeral 3".

$$Z = \frac{h^2/R_0}{1 + \sqrt{1 - (1+\kappa)(h/R_0)^2}} + \sum_{i=1}^{\infty} A_i h^{P_i} \quad \text{(Numeral 3)}$$

In the expression, Z represents an axis in the direction of an optical axis, h represents an axis in the direction perpendicular to an optical axis (height from an optical axis: advancing direction of light is positive), R0 represents a paraxial radius of curvature, κ represents the constant of the cone, A represents the aspherical coefficient and P represents the number of power of the aspheric surface.

Incidentally, from now on (including lens data of the table), the power multiplier of 10 (for example, $2.5 \times 10^{-3}$) is shown by the use of E (for Example, 2.5×E−3).

EXAMPLE 1

Figure 11:
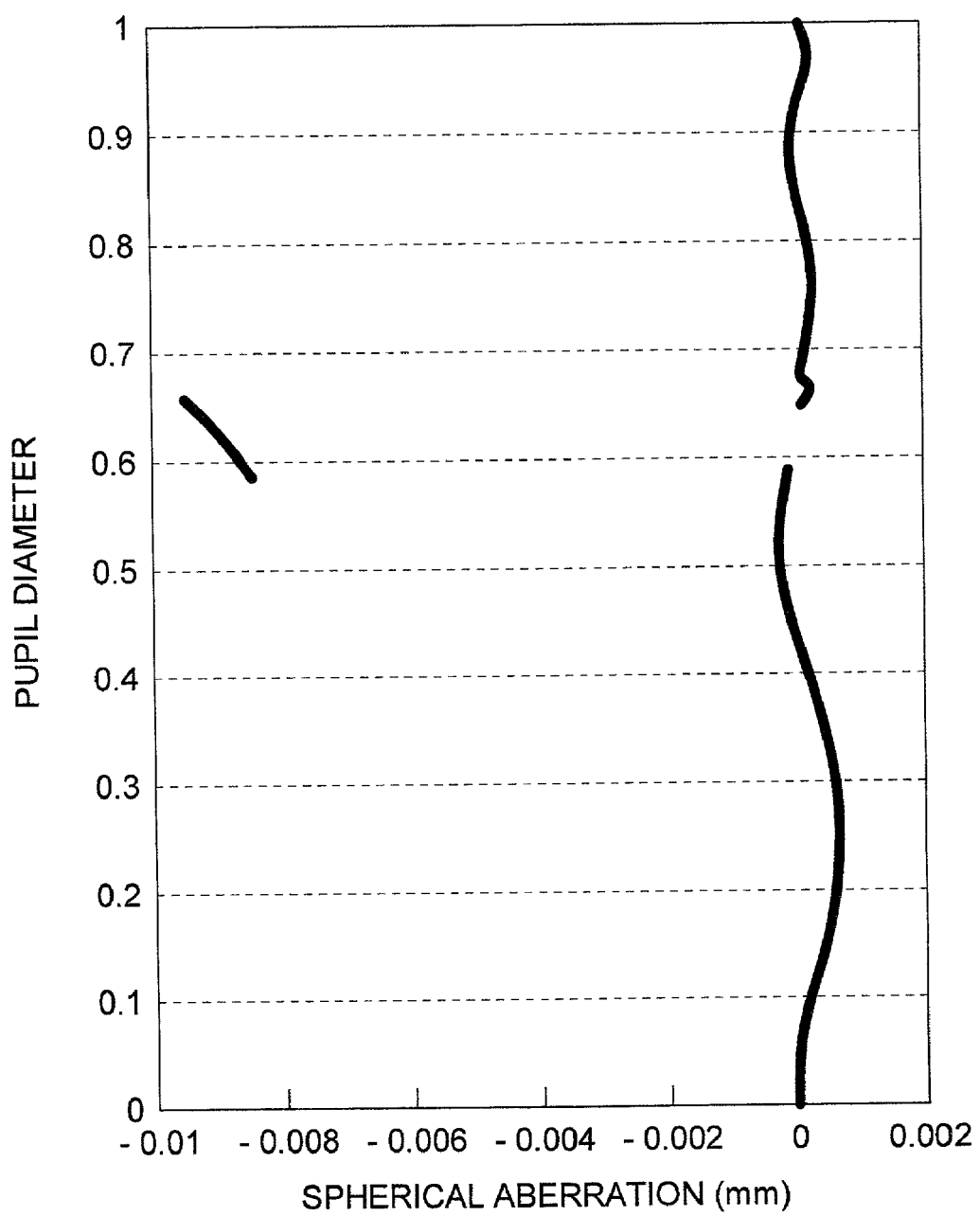
FIG. 11 is a spherical aberration diagram for an objective lens in Example 1 where DVD is used.
Figure 12:
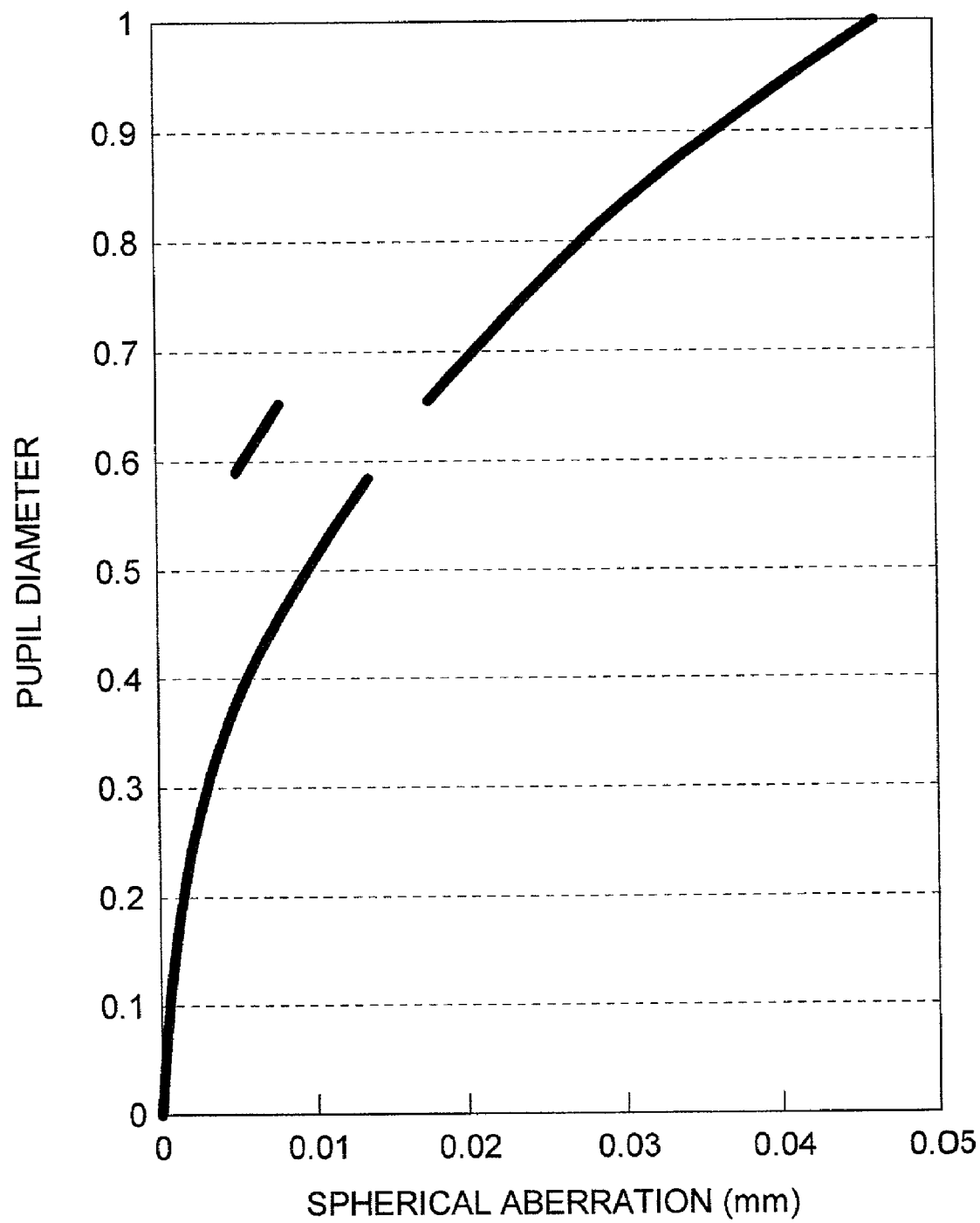
FIG. 12 is a spherical aberration diagram for an objective lens in Example 1 where CD is used.

With regard to the example of the objective lens which can be used for the Embodiment 1 mentioned above, data of the objective lens are shown in Table 1. FIG. 11 is a spherical aberration diagram for DVD and FIG. 12 is that for CD. Necessary numerical aperture NA of DVD is 0.60 and that of CD is 0.45.

TABLE 1

Example 1
$f_1$ = 3.05 mm, f2 = 3.05 mm, m1 = −1/6.01, m2 = −1/6.01
NAH = 1.373 mm, NAL = 1.22 mm
Pout = 0.00367 mm, Pin = 0.04368 mm
n = 1  δSA1/δT = 0.0001λrms/° C.
δSA/δU = 0.063λrms/mm

| | | DVD | | CD | |
|---|---|---|---|---|---|
| ith sur-face | ri | di (650 nm) | ni (650 nm) | di (650 nm) | ni (650 nm) | |
| 0 | | 20.006 | 1.0 | 20.006 | 1.0 | Emission point |
| 1 | ∞ | 0.0 | 1.0 | 0.0 | 1.0 | Aperture φ4.452 nm |
| 2 | 2.11184 | 1.72 | 1.54094 | 1.72 | 1.54094 | |
| 2' | 2.11184 | 1.72 | 1.54094 | 1.72 | 1.54094 | |
| 2" | 2.11184 | 1.72 | 1.54094 | 1.72 | 1.54094 | |
| 3 | −5.3457 | 2.20 | 1.0 | 1.83 | 1.0 | |
| 4 | ∞ | 0.6 | 1.577866 | 1.2 | 1.577866 | |
| 5 | ∞ | | | | | |

Aspherical data
2nd surface
(0 < h < 1.22 mm: Optical surface area including optical axis)
Aspherical coefficient κ −1.6695 × E−0
A1 +1.0619 × E−2      P1 4.0
A2 −1.6783 × E−3      P2 6.0
A3 +1.2711 × E−4      P3 8.0
A4 +1.9174 × E−8      P4 10.0
Optical path difference function
(Coefficient of optical path difference function: Standard wavelength 650 nm)

B2 −3.8401 × E−3
B4 −1.2957 × E−4
B6 −2.8158 × E−5
B8 +9.8536 × E−6
B10 −1.9454 × E−7
2'nd surface
(1.22 mm < h < 1.373 mm: Intermediate optical surface area)
Aspherical coefficient

κ −1.6536 × E−0
A1 +1.0637 × E−2      P1 4.0
A2 −1.6905 × E−3      P2 6.0

TABLE 1-continued

Example 1
$f_1$ = 3.05 mm, f2 = 3.05 mm, m1 = −1/6.01, m2 = −1/6.01
NAH = 1.373 mm, NAL = 1.22 mm
Pout = 0.00367 mm, Pin = 0.04368 mm
n = 1  δSA1/δT = 0.0001λrms/° C.
δSA/δU = 0.063λrms/mm A3 +1.2505 × E−4      P3 8.0
A4 −1.7615 × E−7      P4 10.0
Optical path difference function
(Coefficient of optical path difference function: Standard wavelength 650 nm)

B2 −3.8920 × E−3
B4 −1.3036 × E−4
B6 −2.4328 × E−5
B8 +1.1263 × E−5
B10 −1.3503 × E−6
2"nd surface (1.373 mm < h: Outside optical surface area)
Aspherical coefficient κ −1.6695 × E−0
A1 −1.0619 × E−2      P1 4.0
A2 −1.6783 × E−3      P2 6.0
A3 +1.2711 × E−4      P3 8.0
A4 +1.9174 × E−8      P4 10.0
Optical path difference function
(Coefficient of optical path difference function: Standard wavelength 650 nm)

B2 −3.8401 × E−3
B4 −1.2957 × E−4
B6 −2.8158 × E−5
B8 +9.8536 × E−6
B10 −1.9454 × E−7
3rd surface Aspherical coefficient κ −3.1740 × E+1
A1 +4.1021 × E−3      P1 4.0
A2 −6.9699 × E−4      P2 6.0
A3 +6.7716 × E−5      P3 8.0
A4 −6.4184 × E−6      P4 10.0
A5 +1.8509 × E−7      P5 12.0

EXAMPLE 2

Figure 13:
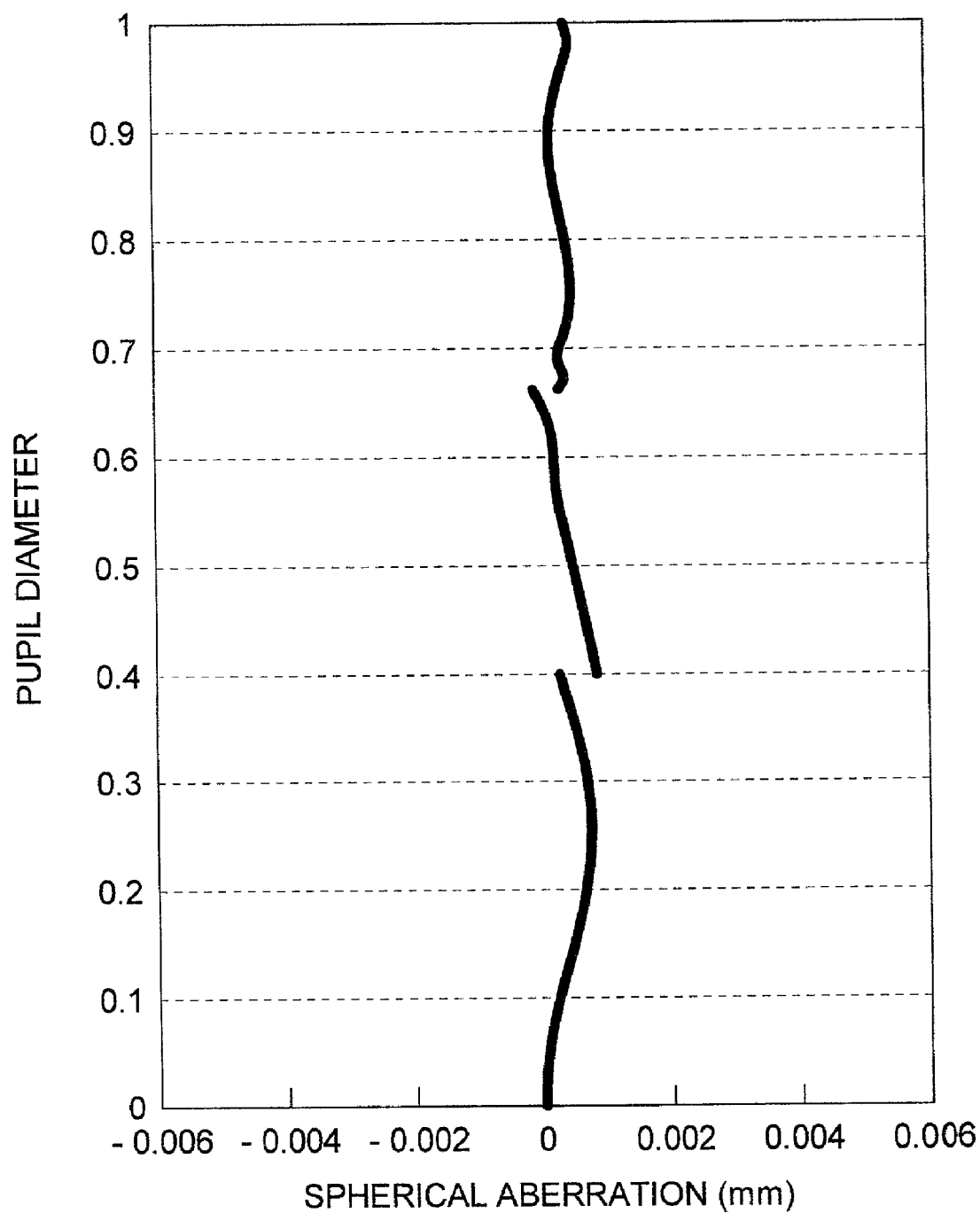
FIG. 13 is a spherical aberration diagram for an objective lens in Example 2 where DVD is used.
Figure 14:
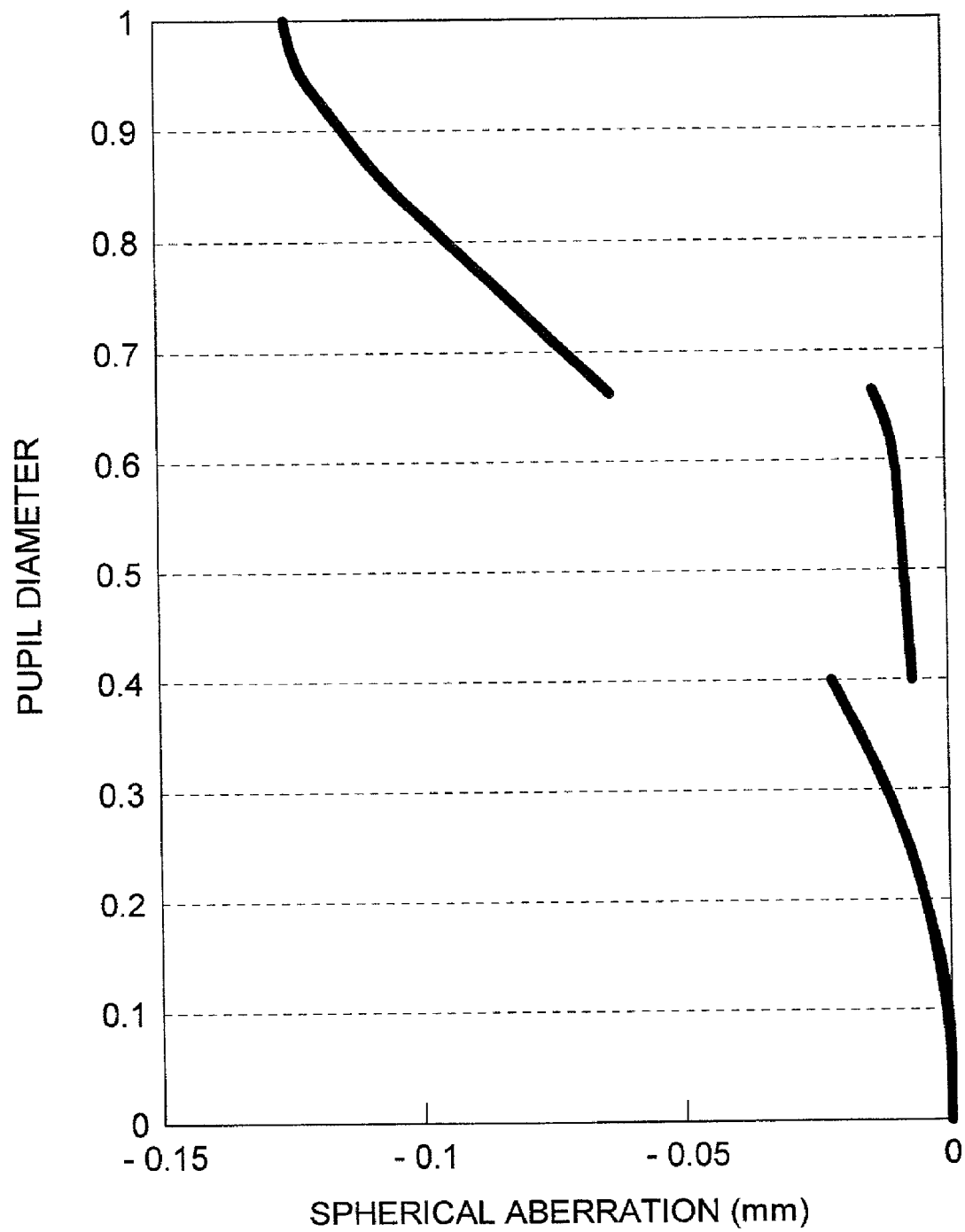
FIG. 14 is a spherical aberration diagram for an objective lens in Example 2 where CD is used.

With regard to the example of the objective lens which can be used for the Embodiment 2 mentioned above, data of the objective lens are shown in Table 2. FIG. 13 is a spherical aberration diagram for DVD and FIG. 14 is that for CD. Necessary numerical aperture NA of DVD is 0.60 and that of CD is 0.45.

TABLE 2

Example 2
$f_1$ = 3.05 mm, f2 = 3.06 mm, m1 = −1/6.01, m2 = −1/5.97
NAH = 1.370 mm, NAL = 0.81 mm
Pout = 0.00369 mm, Pin = 0.1600 mm
n = 1  δSA1/δT = 0.0001λrms/° C.
δSA/δU = 0.0632λrms/mm

| | | DVD | | CD | | |
|---|---|---|---|---|---|---|
| ith sur-face | ri | di (650 nm) | ni (650 nm) | di (780 nm) | ni (780 nm) | |
| 0 | | 20.006 | 1.0 | 20.006 | 1.0 | Emission point |
| 1 | ∞ | 0.0 | 1.0 | 0.0 | 1.0 | Aperture φ4.452 mm |

TABLE 2-continued

Example 2
$f_1$ = 3.05 mm, f2 = 3.06 mm,m1 = −1/6.01,m2 = −1/5.97
NAH = 1.370 mm, NAL = 0.81 mm
Pout = 0.00369 mm, Pin = 0.1600 mm
n = 1 δSA1/δT = 0.0001λrms/° C.
δSA/δU = 0.0632λ,rms/mm

| 2 | 2.11184 | 1.72 | 1.54094 | 1.72 | 1.53729 |
| 2' | 2.11184 | 1.72 | 1.54094 | 1.72 | 1.53729 |
| 2" | 2.11184 | 1.72 | 1.54094 | 1.72 | 1.53729 |
| 3 | −5.3457 | 2.20 | 1.0 | 1.83 | 1.0 |
| 4 | ∞ | 0.6 | 1.577866 | 1.2 | 1.570839 |
| 5 | ∞ | | | | |

Aspherical data
2nd surface
(0 < h < 0.81 mm: Optical surface area including optical axis)
Aspherical coefficient κ −1.6695 × E−0
A1 +1.0619 × E−2    P1 4.0
A2 −1.6783 × E−3    P2 6.0
A3 +1.2711 × E−4    P3 8.0
A4 +1.9174 × E−8    P4 10.0

Optical path difference function (Coefficient of optical path difference function: Standard wavelength 650 nm)

B2 −3.8401 × E−3
B4 −1.2957 × E−4
B6 −2.8158 × E−5
B8 +9.8536 × E−6
B10 −1.9454 × E−7

2'nd surface
(0.81 mm < h < 1.370 mm: Intermediate optical surface area)
Aspherical coefficient κ −1.5361 × E−0
A1 +1.2030 × E−2    P1 4.0
A2 −7.7324 × E−4    P2 6.0
A3 +4.5188 × E−4    P3 8.0
A4 −1.3696 × E−4    P4 10.0

Optical path difference function (Coefficient of optical path difference function: Standard wavelength 780 nm)

B2 −2.5830 × E−3
B4 +3.8438 × E−4
B6 +2.0764 × E−5
B8 −1.9229 × E−5
B10 −8.1530 × E−6

2"nd surface (1.370 mm < h: Outside optical surface area)
Aspherical coefficient κ −1.6695 × E−0
A1 +1.0619 × E−2    P1 4.0
A2 −1.6783 × E−3    P2 6.0
A3 +1.2711 × E−4    P3 8.0
A4 +1.9174 × E−8    P4 10.0

Optical path difference function (Coefficient of optical path difference function: Standard wavelength 650 nm)

B2 −3.8401 × E−3
B4 −1.2957 × E−4
B6 −2.8158 × E−5
B8 +9.8536 × E−6
B10 −1.9454 × E−7

3rd surface Aspherical coefficient

κ −3.1740 × E+1
A1 +4.1021 × E−3    P1 4.0
A2 −6.9699 × E−4    P2 6.0
A3 +6.7716 × E−5    P3 8.0
A4 −6.4184 × E−6    P4 10.0
A5 +1.8509 × E−7    P5 12.0

EXAMPLE 3

Figure 16:
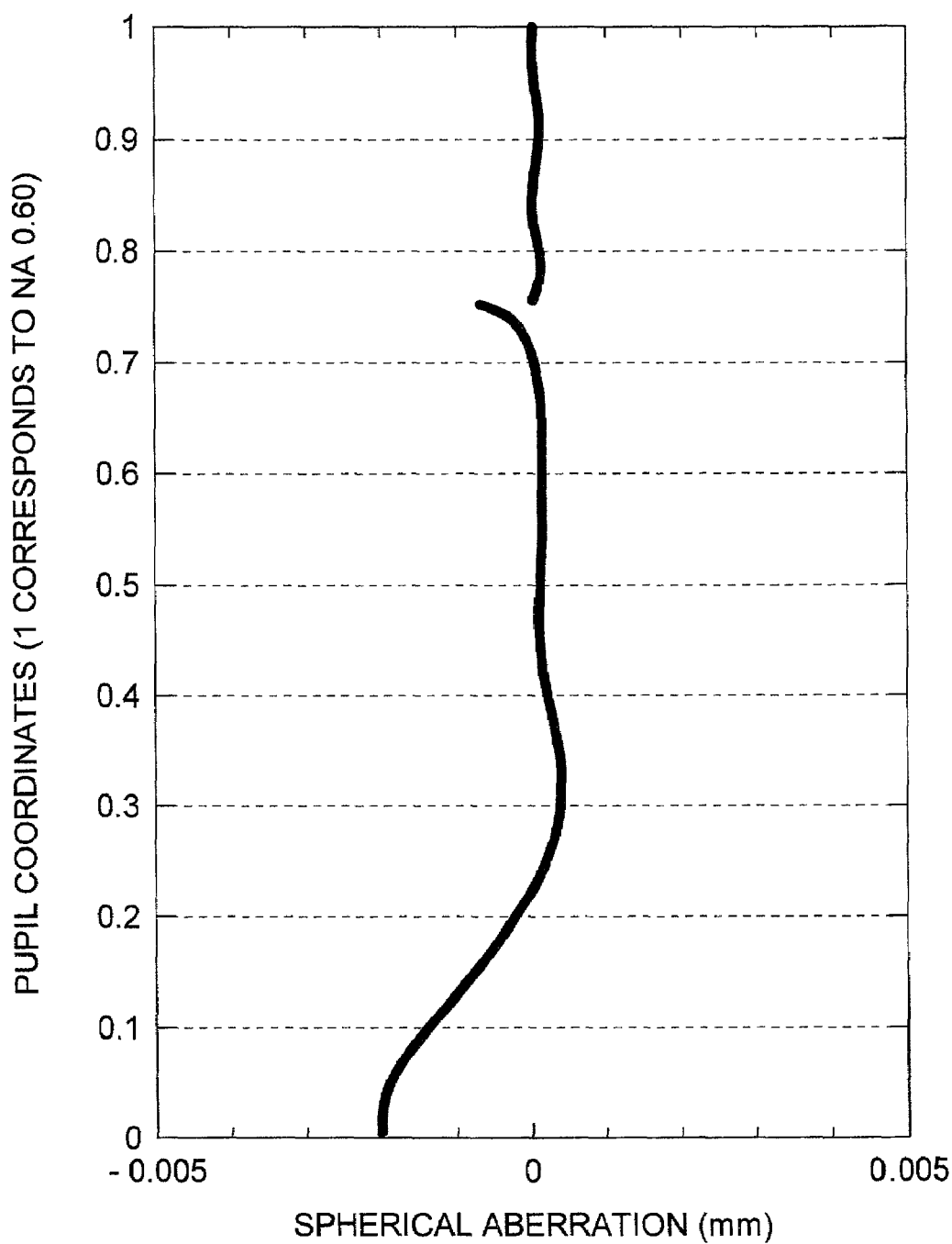
FIG. 16 is a spherical aberration diagram for an objective lens in Example 3 where DVD is used.
Figure 17:
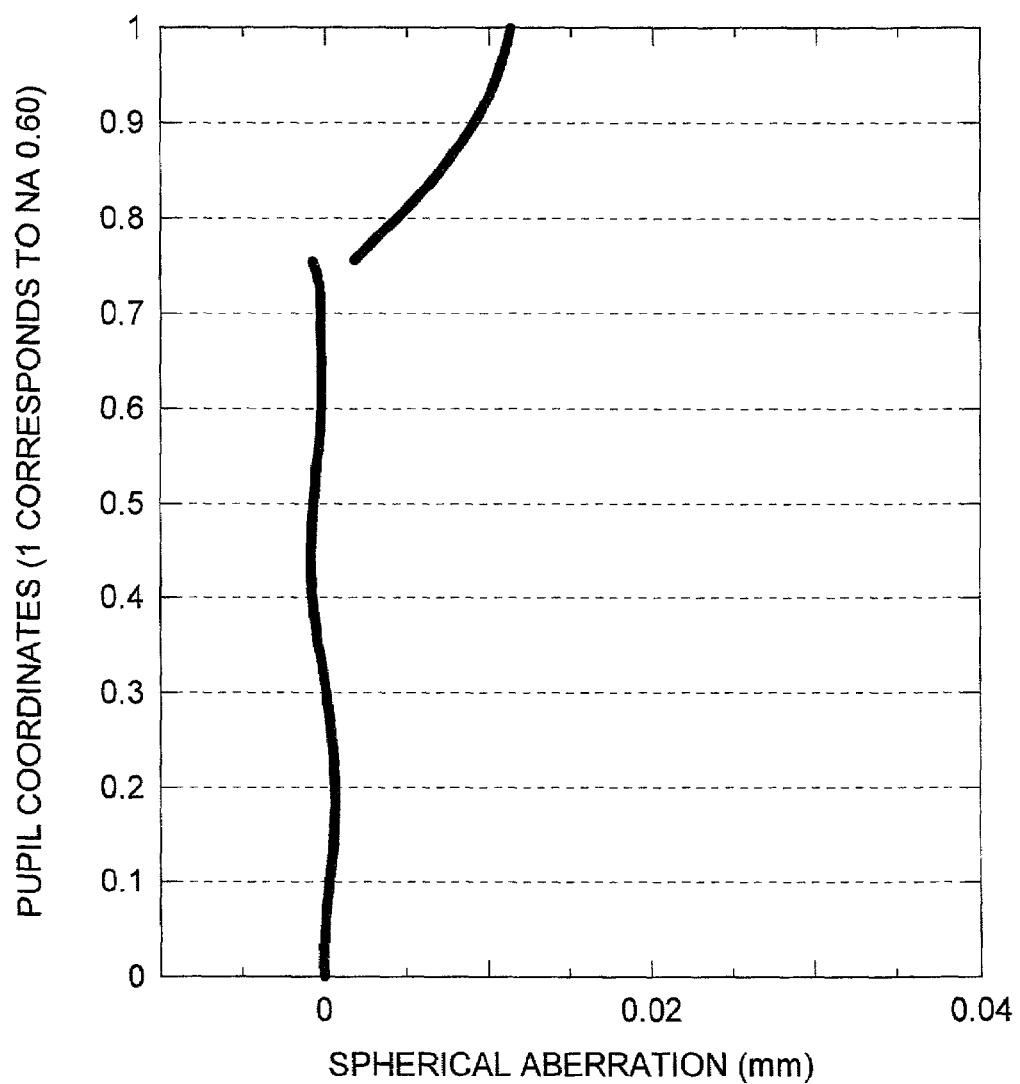
FIG. 17 is a spherical aberration diagram for an objective lens in Example 3 where CD is used.

With regard to the example of the objective lens which can be used for the Embodiment 6 mentioned above, data of the objective lens are shown in Table 2. FIG. 16 is a spherical aberration diagram for DVD and FIG. 17 is that for CD. necessary numerical aperture NA of DVD is 0.60 and that of CD is 0.45.

TABLE 3

$f_1$ = 3.20 mm, f2 = 3.21 mm,m1 = −1/6.8, m2 = −1/6.8
NAH = 1.66681 mm
Pout = 0.0217 mm, Pin = 0.111 mm
n = 1 δSA2/δT = 0.00077λrms/° C.
δSA1/δU = 0.066λrms/mm

| ith surface | ri | di (655 nm) | ni (655 nm) | di (785 nm) | ni (785 nm) | |
|---|---|---|---|---|---|---|
| 0 | | 2.43289 | | 24.699 | | |
| 1 | ∞ | 0.0 | 1.0 | 0.0 | 1.0 | Aperture φ4.3108 mm |
| 2 | 2.219924 | 2.6 | 1.54094 | 2.6 | 1.53716 | |
| 2' | 2.321811 | 2.5938 | 1.54094 | 2.5938 | 1.53716 | |
| 3 | −4.6282 | 1.97666 | 1.0 | 1.60656 | 1.0 | |
| 4 | ∞ | 0.6 | 1.57752 | 1.2 | 1.57063 | |
| 5 | ∞ | | | | | |

Aspherical data
2nd surface
(0 < h < 1.66681 mm: Optical surface area including optical axis)
Aspherical coefficient κ −2.0664 × E−0
A1 +1.4172 × E−2    P1 4.0
A2 +1.8597 × E−4    P2 6.0
A3 −7.6246 × E−4    P3 8.0
A4 +2.9680 × E−4    P4 10.0
A5 −5.9552 × E−5    P5 12.0
A6 +5.2766 × E−6    P6 14.0

Optical path difference function (Coefficient of optical path difference function: Standard wavelength 720 nm)

B4 −1.9684 × E−3
B6 +5.8778 × E−4
B8 −1.7198 × E−4
B10 +1.8183 × E−5

2'nd surface (1.66681 mm < h: Outside optical surface area)
Aspherical coefficient κ −5.2521 × E−1
A1 +7.2310 × E−3    P1 4.0
A2 −5.3542 × E−3    P2 6.0
A3 +1.6587 × E−3    P3 8.0
A4 −2.9617 × E−4    P4 10.0
A5 +3.0030 × E−5    P5 12.0
A6 −1.6742 × E−6    P6 14.0

Optical path difference function (Coefficient of optical path difference function: Standard wavelength 655 nm)

B2 +2.7391 × E−3
B4 −4.3035 × E−3
B6 +1.1732 × E−3
B8 −1.6358 × E−4
B10 +7.6874 × E−6

3rd surface Aspherical coefficient

κ −2.14215 × E−0
A1 +3.14404 × E−2    P1 4.0
A2 −1.58639 × E−2    P2 6.0
A3 +6.63865 × E−3    P3 8.0
A4 −1.73208 × E−3    P4 10.0
A5 +2.34860 × E−4    P5 12.0
A6 −1.30087 × E−5    P6 14.0

EXAMPLE 4

Figure 18:
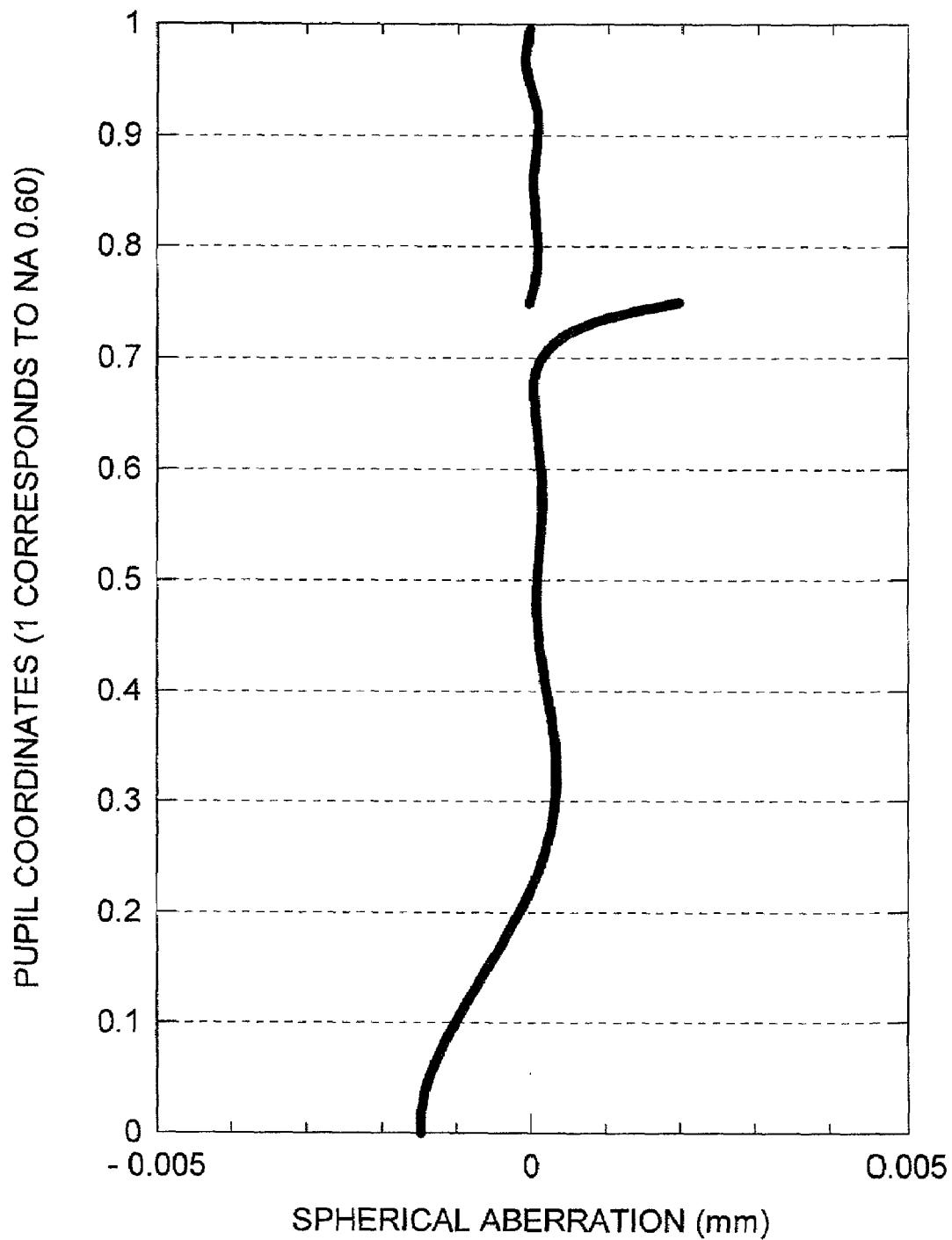
FIG. 18 is a spherical is an aberration diagram for an objective lens in Example 4 where DVD is used.
Figure 19:
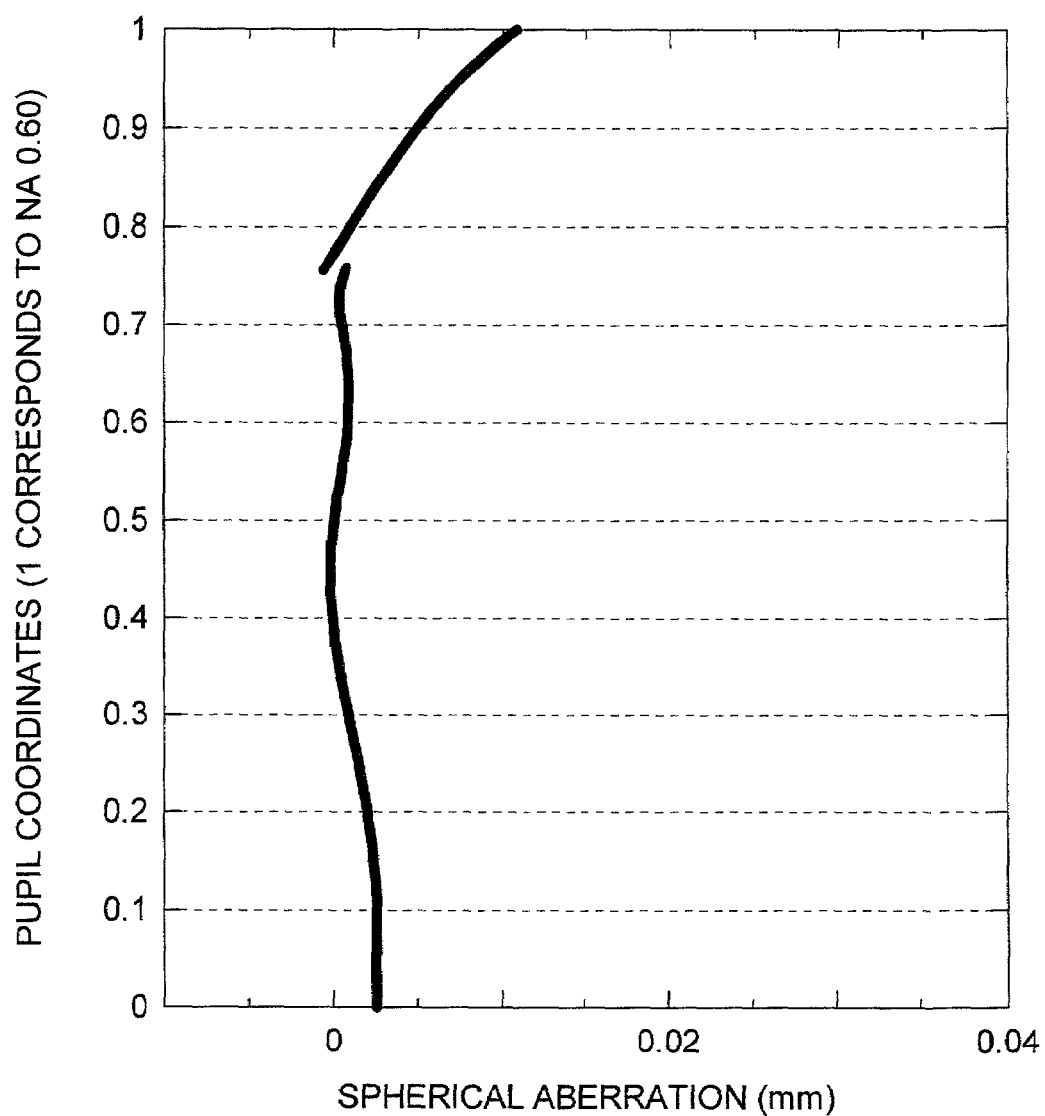
FIG. 19 is a spherical aberration diagram for an objective lens in Example 4 where CD is used.

With regard to another example of the objective lens which can be used for the Embodiment 6 mentioned above, data of the objective lens are shown in Table 2. FIG. 18 is a spherical aberration diagram for DVD and FIG. 19 is that for CD. Necessary numerical aperture NA of DVD is 0.60 and that of CD is 0.45.

TABLE 4

$f_1 = 3.20$ mm, $f_2 = 3.21$ mm, $m_1 = -1/6.8$, $m_2 = -1/6.8$
NAH = 1.66681 mm
Pout = 0.0190 mm, Pin = 0.111 mm
n= 1 $\delta SA2/\delta T = 0.00070 \lambda rms/°$ C.
$\delta SA1/\delta U = 0.054 \lambda rms/mm$

| ith surface | ri | di (655 nm) | ni (655 nm) | di (785 nm) | ni (785 nm) | |
|---|---|---|---|---|---|---|
| 0 | | 24.3312 | | 24.7024 | | |
| 1 | ∞ | 0.0 | 1.0 | 0.0 | 1.0 | Aperture φ4.3108 mm |
| 2 | 2.21708 | 2.6 | 1.54094 | 2.6 | 1.53716 | |
| 2' | 2.315273 | 2.5938 | 1.54094 | 2.5938 | 1.53716 | |
| 3 | −4.6451 | 1.9744 | 1.0 | 1.6032 | 1.0 | |
| 4 | ∞ | 0.6 | 1.57752 | 1.2 | 1.57063 | |
| 5 | ∞ | | | | | |

Aspherical data
2nd surface
(0 < h < 1.66681 mm: Optical surface area including optical axis)
Aspherical coefficient κ −1.9916 × E-0
A1 +1.2271 × E-2    P1 4.0
A2 +2.6623 × E-4    P2 6.0
A3 −4.8051 × E-4    P3 8.0
A4 +9.4489 × E-5    P4 10.0
A5 −2.6250 × E-6    P5 12.0
A6 −1.0534 × E-6    P6 14.0

Optical path difference function
(Coefficient of optical path difference function: Standard wavelength 720 nm)

B4 −2.3605 × E-3
B6 +8.0849 × E-4
B8 −2.1222 × E-4
B10 +1.7503 × E-5

2'nd surface (1.66681 mm < h: Outside optical surface area)
Aspherical coefficient κ −5.5582 × E-1
A1 +6.7989 × E-3    P1 4.0
A2 −5.4908 × E-3    P2 6.0
A3 +1.6536 × E-3    P3 8.0
A4 −2.9300 × E-4    P4 10.0
A5 +3.0799 × E-5    P5 12.0
A6 −1.7778 × E-6    P6 14.0

Optical path difference function
(Coefficient of optical path difference function: Standard wavelength 655 nm)

B2 +2.8609 × E-3
B4 −4.3411 × E-3
B6 +1.1344 × E-3
B8 −1.6710 × E-4
B10 +9.1424 × E-6

3rd surface Aspherical coefficient

κ −6.70263 × E-1
A1 +2.98350 × E-2    P1 4.0
A2 −1.51427 × E-2    P2 6.0
A3 +6.64091 × E-3    P3 8.0
A4 −1.74128 × E-3    P4 10.0
A5 +2.32281 × E-4    P5 12.0
A6 −1.25448 × E-5    P6 14.0

EXAMPLE 5

Figure 20:
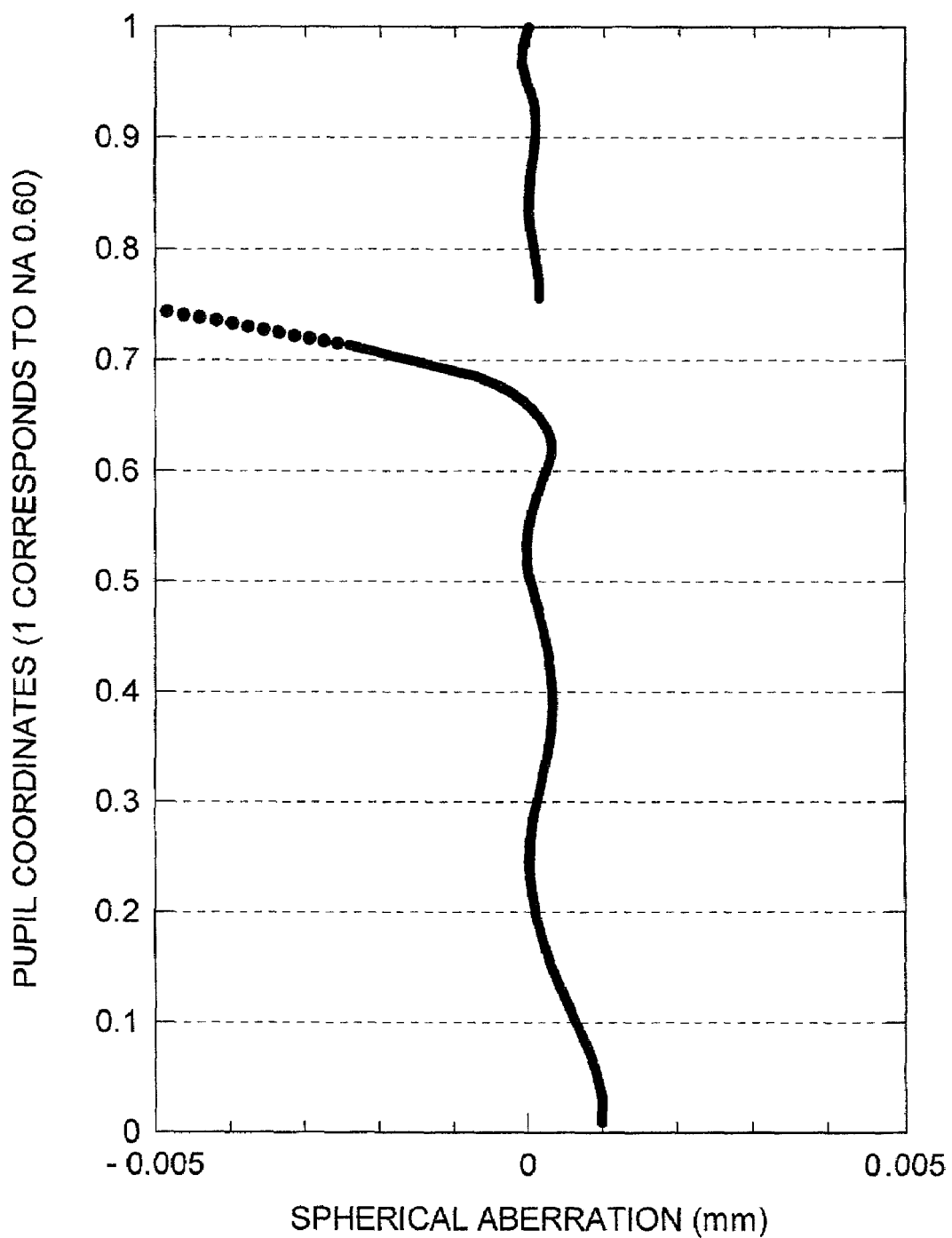
FIG. 20 is a spherical aberration diagram for an objective lens in Example 5 where DVD is used.
Figure 21:
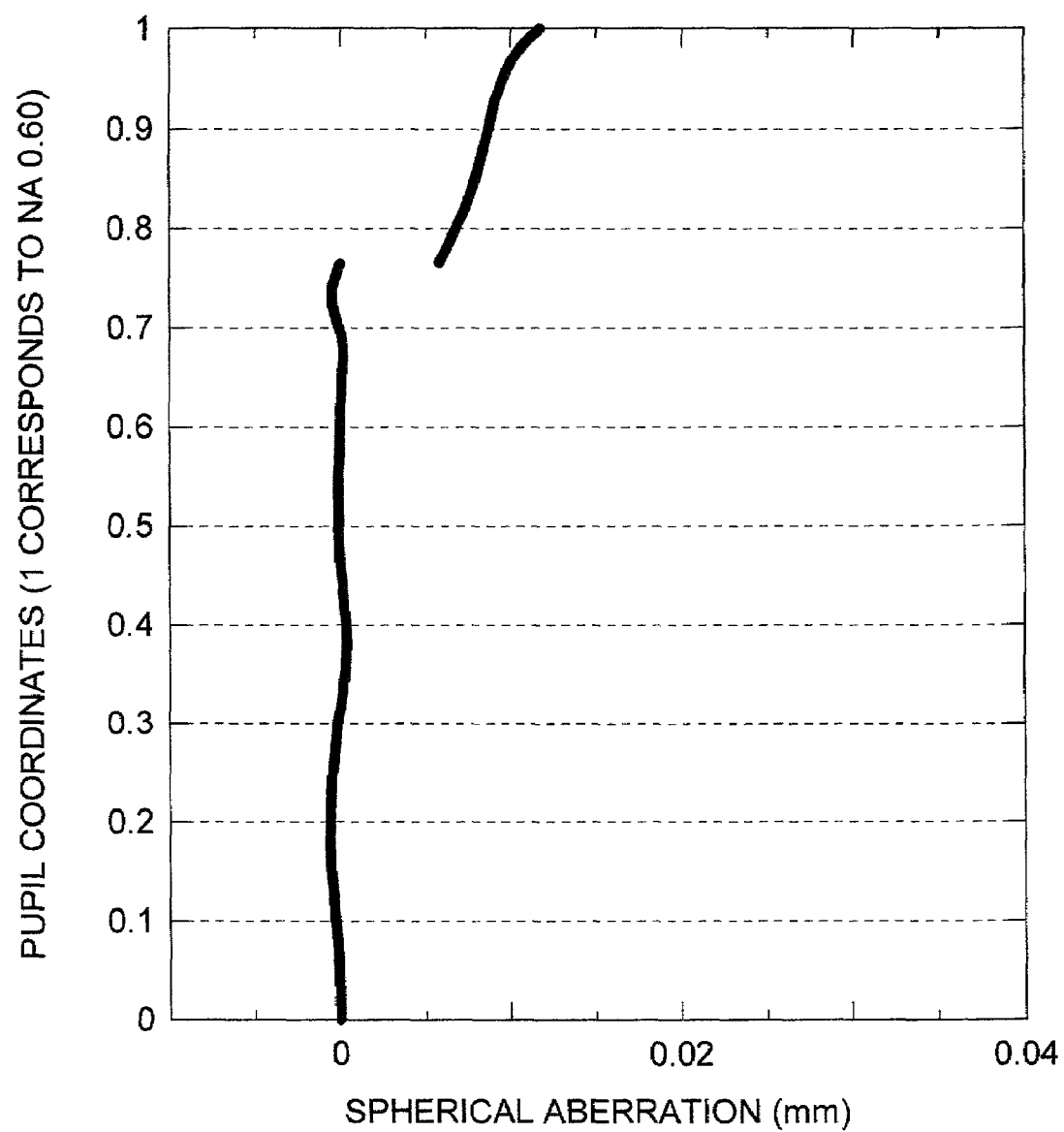
FIG. 21 is a spherical aberration diagram for an objective lens in Example 5 where CD is used.

With regard to another example of the objective lens which can be used for the Embodiment 6 mentioned above, data of the objective lens are shown in Table 2. FIG. 20 is a spherical aberration diagram for DVD and FIG. 21 is that for CD. Necessary numerical aperture NA of DVD is 0.60 and that of CD is 0.45.

TABLE 5

$f_1 = 3.20$ mm, $f_2 = 3.21$ mm, $m_1 = -1/6.8$, $m_2 = -1/6.8$
NAH = 1.66681 mm
Pout= 0.0144 mm, Pin = 0.0556 mm
n= 1 $\delta SA2/\delta T = 0.00102 \lambda rms/°$ C.
$\delta SA1/\delta U = 0.057 \lambda rms/mm$

| ith surface | ri | di (655 nm) | ni (655 nm) | di (785 nm) | ni (785 nm) | |
|---|---|---|---|---|---|---|
| 0 | | 24.3403 | | 24.7307 | | |
| 1 | ∞ | 0.0 | 1.0 | 0.0 | 1.0 | Aperture 4.3108 mm |
| 2 | 2.28859 | 2.6 | 1.54094 | 2.6 | 1.53716 | |
| 2' | 2.43366 | 2.5928 | 1.54094 | 2.5928 | 1.53716 | |
| 3 | −4.7132 | 1.9653 | 1.0 | 1.5749 | 1.0 | |
| 4 | ∞ | 0.6 | 1.57752 | 1.2 | 1.57063 | |
| 5 | ∞ | | | | | |

Aspherical data
2nd surface
(0 < h < 1.66681 mm: Optical surface area including optical axis)
Aspherical coefficient κ −1.0061 × E-0
A1 +4.2439 × E-3    P1 4.0
A2 −1.4759 × E-3    P2 6.0
A3 +9.3408 × E-4    P3 8.0
A4 −5.1099 × E-4    P4 10.0
A5 +1.5021 × E-4    P5 12.0
A6 −1.5815 × E-5    P6 14.0

Optical path difference function
(Coefficient of optical path difference function: Standard wavelength 720 nm)

B2 −4.8645 × E-3
B4 −7.2782 × E-4
B6 −1.8032 × E-4
B8 −4.9114 × E-6
B10 +1.3132 × E-5

2'nd surface (1.66681 mm < h: Outside optical surface area)
Aspherical coefficient κ −7.9917 × E-1
A1 +1.2236 × E-2    P1 4.0
A2 −5.6577 × E-3    P2 6.0
A3 +1.6609 × E-3    P3 8.0
A4 −2.9009 × E-4    P4 10.0
A5 +2.9096 × E-5    P5 12.0
A6 −1.5424 × E-6    P6 14.0

Optical path difference function
(Coefficient of optical path difference function: Standard wavelength 655 nm)

B2 −2.8166 × E-3
B4 −3.1771 × E-3
B6 +1.0641 × E-3
B8 −1.9508 × E-4
B10 +1.2278 × E-5

3rd surface Aspherical coefficient

κ −5.47493 × E-1
A1 +2.95069 × E-2    P1 4.0
A2 −1.46461 × E-2    P2 6.0
A3 +6.39635 × E-3    P3 8.0
A4 −1.71136 × E-3    P4 10.0
A5 +2.35330 × E-4    P5 12.0
A6 −1.31514 × E-5    P6 14.0

EXAMPLE 6

Figure 22:
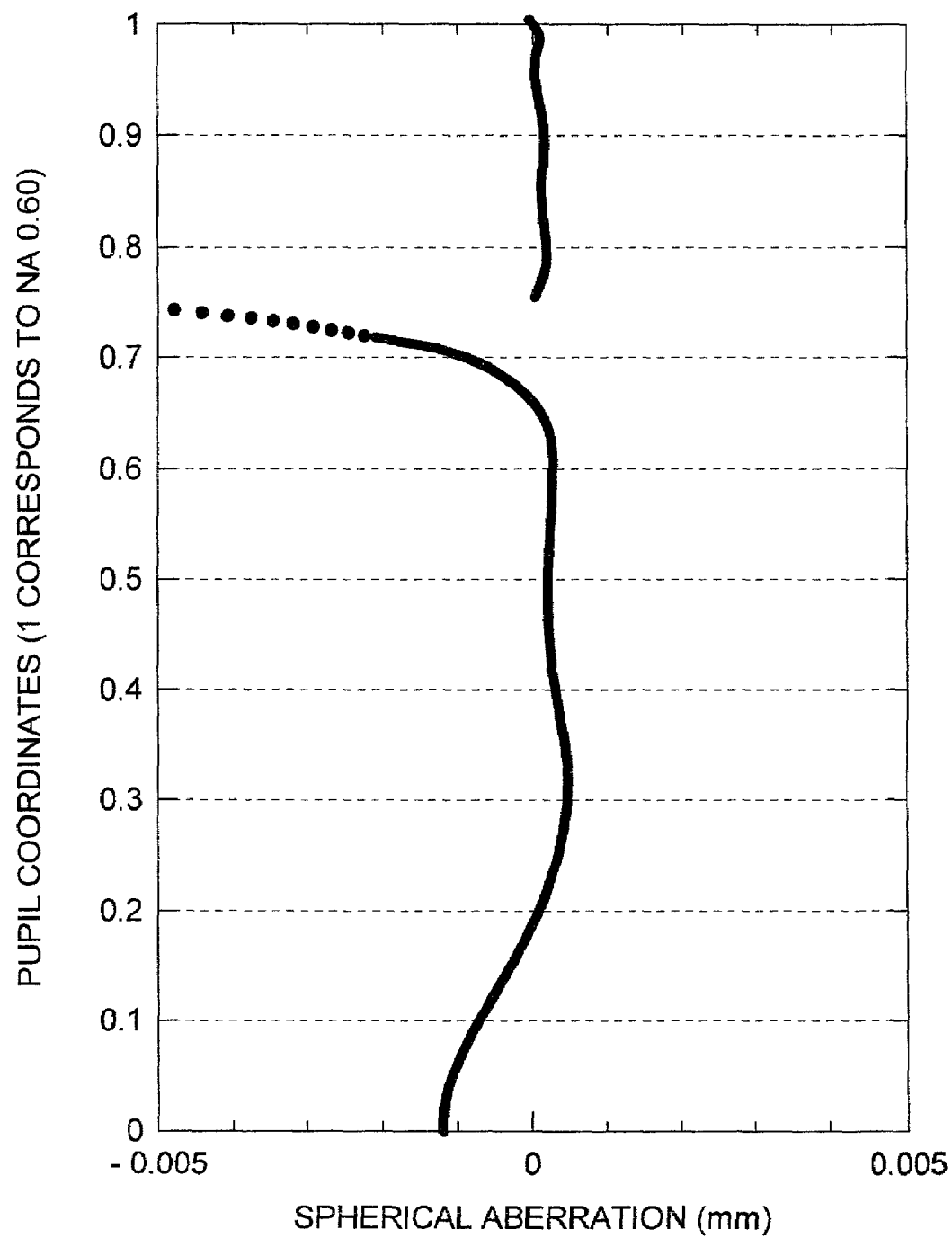
FIG. 22 is a spherical aberration diagram for an objective lens in Example 6 where DVD is used.
Figure 23:
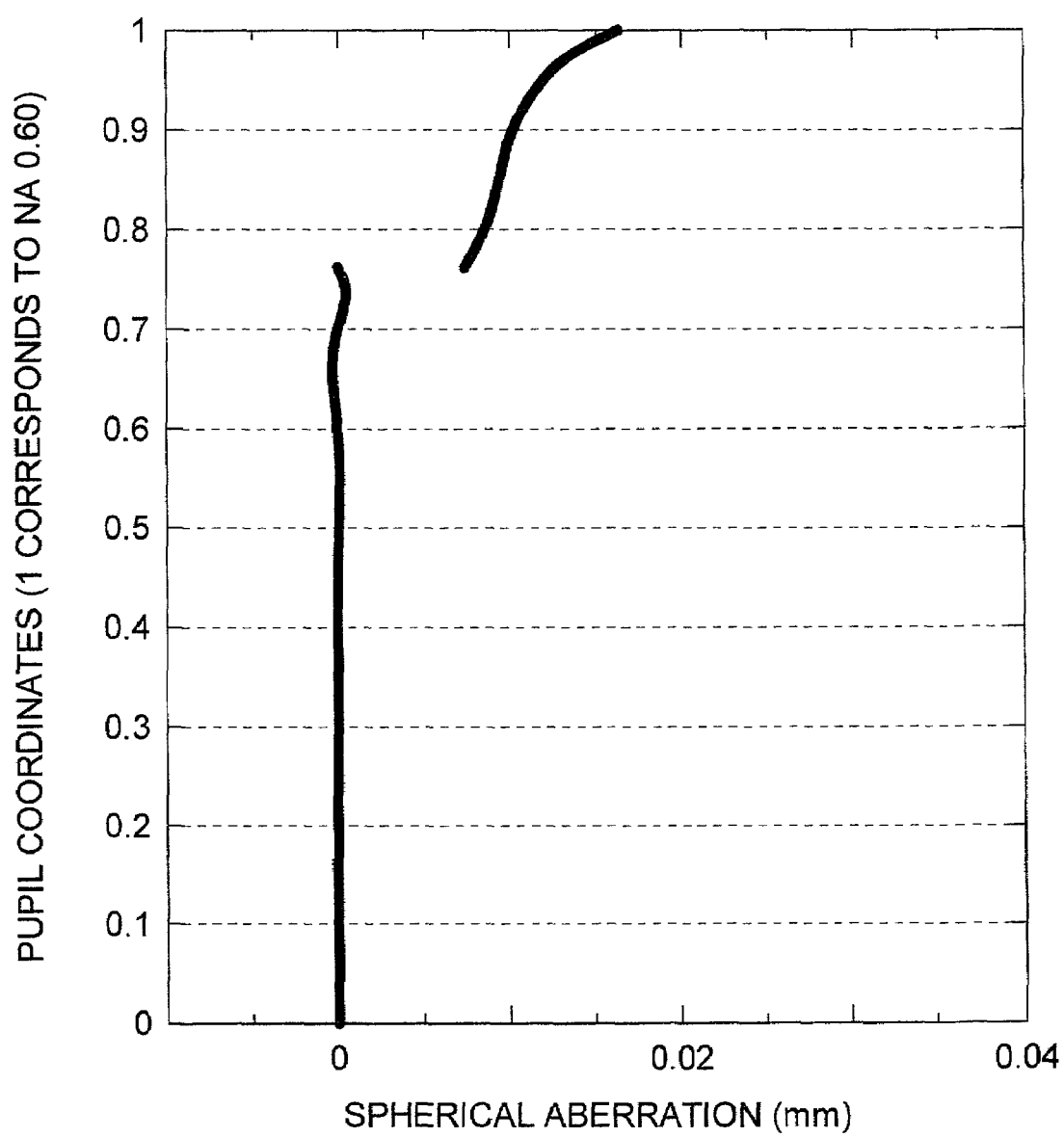
FIG. 23 is a spherical aberration diagram for an objective lens in Example 6 where CD is used.

With regard to still another example of the objective lens which can be used for the Embodiment 6 mentioned above, data of the objective lens are shown in Table 2. FIG. 22 is a spherical aberration diagram for DVD and FIG. 23 is that for CD. Necessary numerical aperture NA of DVD is 0.60 and that of CD is 0.45.

TABLE 6

$f_1 = 3.20$ mm, $f2 = 3.21$ mm, $m1 = -1/6.8$, $m2 = -1/6.8$
NAH = 1.66681 mm
Pout = 0.0135 mm, Pin = 0.0450 mm
$n = 1$  $\delta SA2/\delta T = 0.00097 \lambda rms/°$ C.
$\delta SA1/\delta U = 0.057 \lambda rms/mm$

| ith surface | ri | di (655 nm) | ni (655 nm) | di (785 nm) | ni (785 nm) | |
|---|---|---|---|---|---|---|
| 0 | | 24.3320 | | 24.7315 | | |
| 1 | ∞ | 0.0 | 1.0 | 0.0 | 1.0 | Aperture 4.3108 mm |
| 2 | 2.32575 | 2.6 | 1.54094 | 2.6 | 1.53716 | |
| 2' | 2.45552 | 2.5963 | 1.54094 | 2.5963 | 1.53716 | |
| 3 | −4.6504 | 1.9653 | 1.0 | 1.5749 | 1.0 | |
| 4 | ∞ | 0.6 | 1.57752 | 1.2 | 1.57063 | |
| 5 | ∞ | | | | | |

Aspherical data
2nd surface
(0 < h < 1.66681 mm: Optical surface area including optical axis)
Aspherical coefficient κ  −1.1171 × E−0
A1 +3.1061 × E−3      P1  4.0
A2 +1.6363 × E−3      P2  6.0
A3 −1.1145 × E−3      P3  8.0
A4 +3.1702 × E−4      P4 10.0
A5 −4.9061 × E−5      P5 12.0
A6 +5.3895 × E−6      P6 14.0

Optical path difference function
(Coefficient of optical path difference function: Standard wavelength 720 nm)

B2 −6.3187 × E−3
B4 −1.7269 × E−3
B6 +8.2815 × E−4
B8 −4.0856 × E−4
B10 +6.8845 × E−5

2'nd surface (1.66681 mm < h: Outside optical surface area)
Aspherical coefficient κ  −8.2400 × E−1
A1 +1.1865 × E−2      P1  4.0
A2 −5.4663 × E−3      P2  6.0
A3 +1.6917 × E−3      P3  8.0
A4 −2.9856 × E−4      P4 10.0
A5 −2.6842 × E−5      P5 12.0
A6 −1.1008 × E−6      P6 14.0

Optical path difference function
(Coefficient of optical path difference function: Standard wavelength 655 nm)

B2 −5.3662 × E−3
B4 −2.7368 × E−3
B6 +1.0893 × E−3
B8 −2.3018 × E−4
B10 +1.6566 × E−5

3rd surface Aspherical coefficient

κ  −1.22207 × E−0
A1 +3.03718 × E−2      P1  4.0
A2 −1.45690 × E−2      P2  6.0
A3 +6.19508 × E−3      P3  8.0
A4 −1.71672 × E−3      P4 10.0
A5 +2.51638 × E−4      P5 12.0
A6 −1.50897 × E−5      P6 14.0

Table 7 shows refractive indexes of the objective lens and of the transparent base board of the optical information recording medium for each wavelength, and temperature characteristics data of the semiconductor laser (light source).

TABLE 7

| | Refractive index of objective lens | Refractive index of transparent base board |
|---|---|---|
| 644 nm | 1.5412 | 1.5783 |
| 650 nm | 1.5409 | 1.5779 |
| 656 nm | 1.5407 | 1.5775 |
| 780 nm | 1.5373 | 1.5708 |
| $\delta n/\delta T/(/°$ C.) | $-1.2 \times 10^{-5}$ | $-1.4 \times 10^5$ |
| Temperature characteristics of wavelength emitted from light source | | $\delta \lambda/\delta T/ = +0.2$ nm/° C.) |

Figure 24:
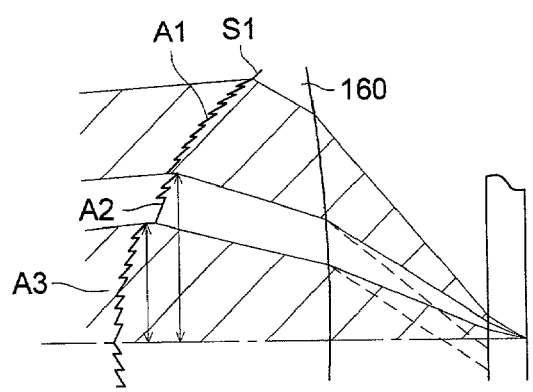
FIGS. 24(a) and 24(b) are sectional views showing a schematic structure of an objective lens related to another variation example.
Figure 24:
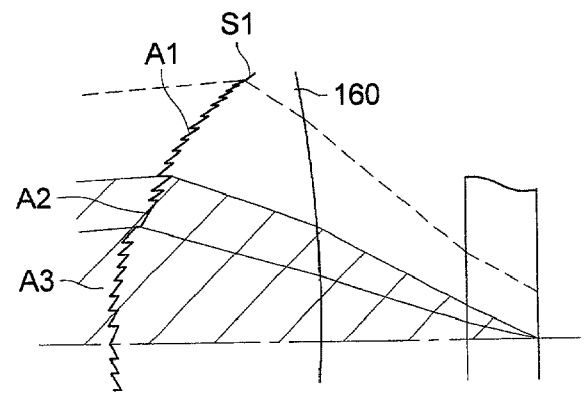
Figure 25:
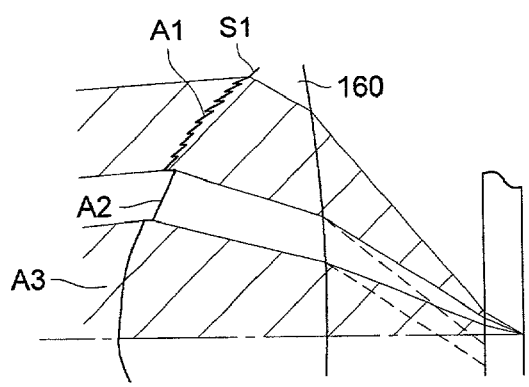
FIGS. 25(a) and 25(b) are sectional views showing a schematic structure of an objective lens related to still another variation example.
Figure 25:
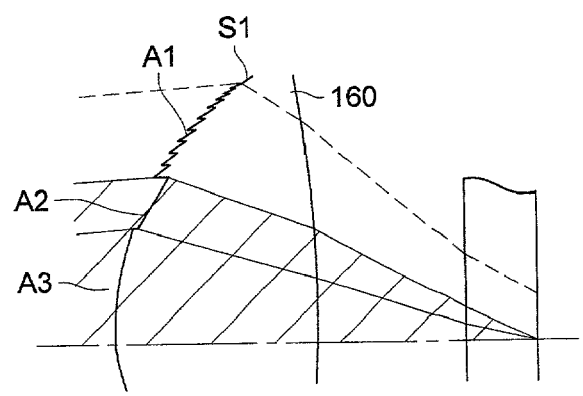
Figure 26:
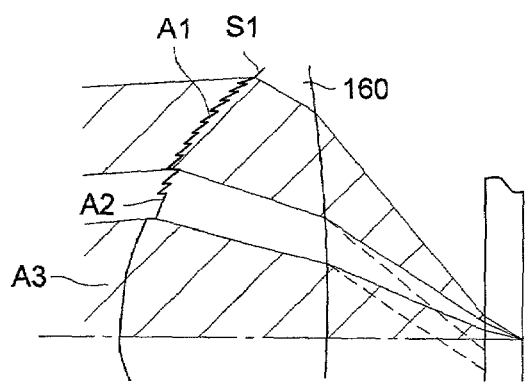
FIGS. 26(a) and 26(b) are sectional views showing a schematic structure of an objective lens related to still another variation example.
Figure 26:
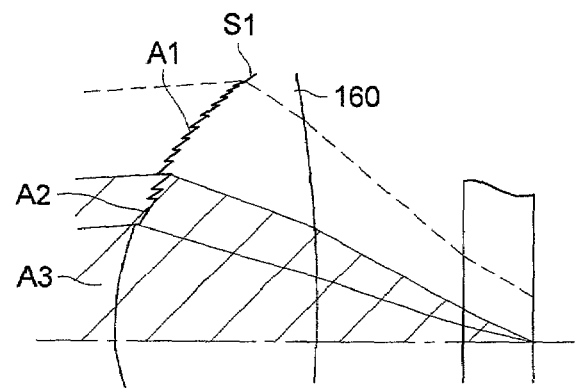

In the examples stated above, Example 1 exemplifies the objective lens wherein outermost optical surface area A1 is composed of a diffractive section, intermediate optical surface area A2 is composed of a refraction section and near-optical-axis optical surface area A3 is composed of a diffractive section, as shown in FIG. 6, and Example 2 exemplifies the objective lens wherein outermost optical surface area A1 is composed of a diffractive section as shown in FIG. 8. However, it is also possible to employ the constitution wherein outermost optical surface area A1 is composed of a diffractive section, intermediate optical surface area A2 is composed of a mixture of a diffractive section and a refraction section and near-optical-axis optical surface area A3 is composed of a diffractive section, as shown in FIG. 24. It is further possible to employ the constitution wherein outermost optical surface area A1 is composed of a diffractive section, intermediate optical surface area A2 is composed of a diffractive section and near-optical-axis optical surface area A3 is composed of a refraction section, as shown in FIG. 9, the constitution wherein outermost optical surface area A1 is composed of a diffractive section, intermediate optical surface area A2 is composed of a refraction section and near-optical-axis optical surface area A3 is composed of a refraction section, as shown in FIG. 25, or the constitution wherein outermost optical surface area A1 is composed of a diffractive section, intermediate optical surface area A2 is composed of a mixture of a diffractive section and a refraction section and near-optical-axis optical surface area A3 is composed of a refraction section, as shown in FIG. 26.

Though there is exemplified an objective lens wherein outside optical surface area A1 is composed of a diffractive section and inside optical surface area A2 is composed of a diffractive section as shown in FIG. 15, in Examples 3–6, it is also possible to make the outside optical surface area A1 to be composed of a diffractive section and to make the inside optical surface area A2 to be composed of a refraction section as shown in FIG. 10. It is further possible to make the inside optical surface area A2 to be composed of a mixed existence of the diffractive section and the refraction section.

Though an explanation of examples of these concrete structures will be omitted, they may easily be worked if the spirit of the invention is observed. It is further possible to modify variously without departing from the spirit of the invention. For example, four or more optical surface areas may be used for composition as stated above, without being limited to the structure wherein functions can be divided by two optical surface areas or three optical surface areas.

Incidentally, the diffractive section may naturally be provided on the surface of the corresponding area closer to a light source, or on the surface of the corresponding area closer to an image, or even on both surfaces.

In the foregoing, "mixed existence" is not limited to the occasion where a diffractive section and a refraction section are formed almost half-and-half as illustrated, and it can take various embodiments of mixed existence.

Further, an embodiment of the optical pickup device is not limited to the aforesaid embodiment, and for example, it can also be applied to a type of 2-light source and 2-optical detector.

The invention can naturally be applied not only to an optical pickup device capable of recording and/or reproducing of information for DVD and CD, but also to at least two optical information recording media each having a different transparent base board thickness. In particular, it is especially beneficial to apply to optical information recording media each having a different transparent base board thickness and having a different necessary numerical aperture. Further, for example, the invention can also be applied to an optical pickup device capable of recording and/or reproducing of information for only DVD, or it can be applied as an objective lens to which a divergent light flux enters, or as an optical information recording medium employing that objective lens.

Further, in the invention, with regard to a divergent light flux entering an objective lens, it is not limited to the occasion wherein a divergent light flux emitted from a light source enters directly an objective lens, and a coupling lens which changes an angle of divergence of a divergent light flux emitted from a light source may be interposed between the light source and the objective lens, and what is essential is that the divergent light flux can enter the objective lens.

The invention makes it possible to provide a practical objective lens and an optical pickup apparatus wherein a divergent light emitted from a light source enters the objective lens for a plurality of optical information recording media each having a different transparent base board thickness, and sufficient capacity for changes of ambient temperature used is satisfied while recording or reproducing of each information is being made possible.

(Embodiment of the Invention)

The invention will further be explained in detail, referring to the drawings as follows.

(Seventh Embodiment)

Figure 27:
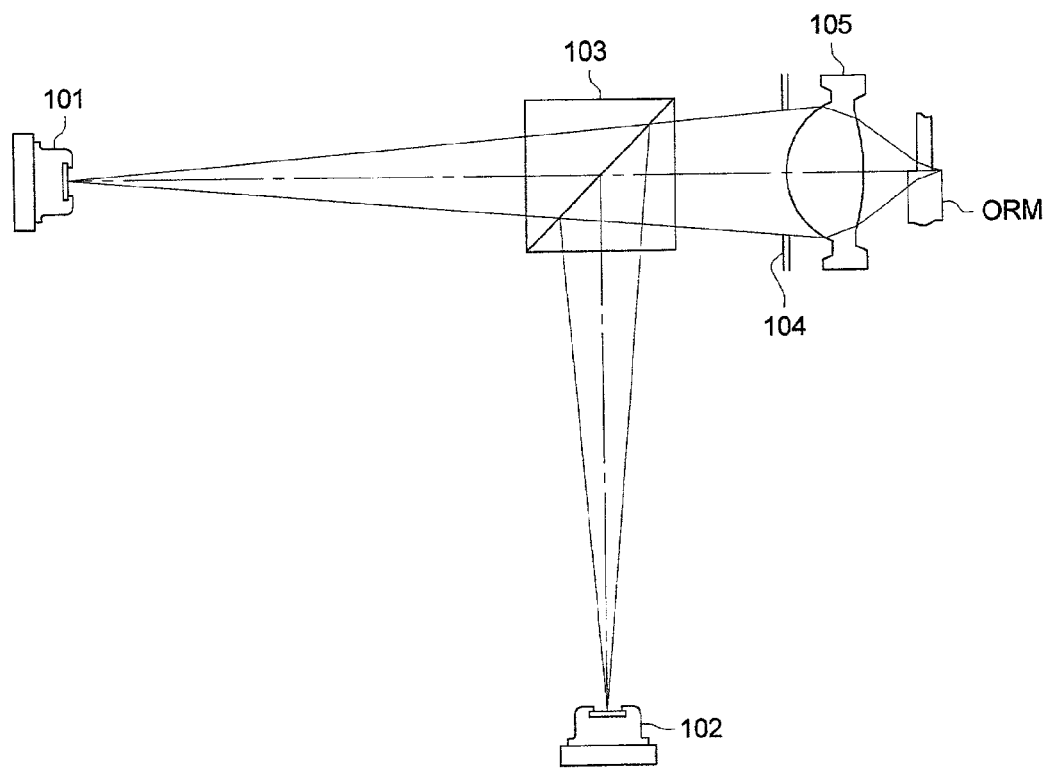
FIG. 27 is a schematic structure diagram of an optical pickup device.

The seventh embodiment will be explained. FIG. 27 is a schematic structure diagram of an optical pickup device including an objective lens of the present embodiment. The optical pickup device is composed of first light source 101 with wavelength $\lambda_1$ for DVD (first optical information recording medium), second light source 102 with wavelength $\lambda_2$ for CD (second optical information recording medium), beam splitter 103 that makes a path for a light flux emitted from the light source 101 to agree with that for a light flux emitted from the light source 102, objective lens 105 that converges each light flux, diaphragm 104 that determines a diameter of a light flux incident on the objective lens 105, an actuator (not shown) that drives the objective lens 105, and a sensor (not shown) that detects a reflected light from optical information recording medium ORM.

When recording or reproducing either one of DVD and CD, light-emitting light source 101 or 102 is selected appropriately. Since a divergent light flux enters the objective lens 105 and lateral magnification is finite, aberration deterioration caused by temperature changes is worsened compared with an occasion wherein infinite light flux enters as stated above.

Figure 28:
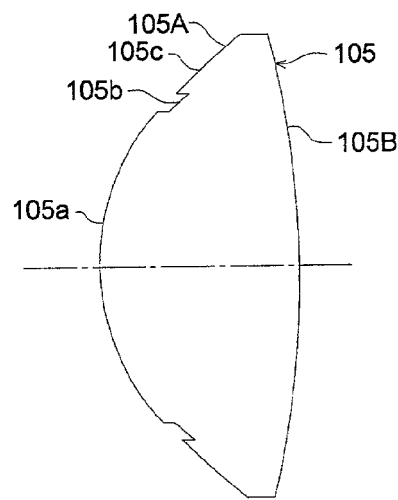
FIGS. 28(a) and 28(b) are sectional views of primary portions of an objective lens in the Seventh Embodiment.
Figure 28:
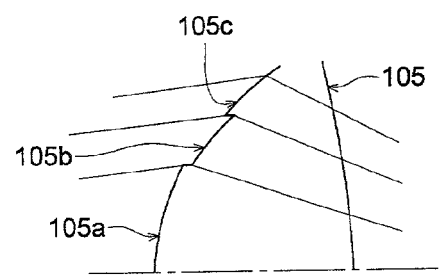

FIG. 28 is a sectional view of primary portions of objective lens 105. The objective lens 105 is composed of two-sided aspheric surfaces 105A and 105B, and three optically functional surfaces 105a, 105b and 105c are formed on the surface 105A closer to the light source. The innermost optically functional surface 105a and outermost optically functional surface 105c are represented by a refracting interface expressed by the same aspherical coefficient. Intermediate optically functional surface 105b is a refracting interface expressed by aspherical coefficient which is different from that for adjoining optically functional surfaces 105a and 105c on both sides, and aspherical aberration correction for the intermediate optically functional surface is different from that for adjoining surfaces on both sides. Further, it is preferable that refractive index temperature dependency of a material (for example, glass) for the objective lens is lower, and the following expression is satisfactory.

$$|dn/dT| \leq 10.0 \times 10^{-6} (/° C.) \qquad (2)$$

In that case, temperature characteristics are satisfactory even when a diffractive structure for improving temperature characteristics is not used. In this case, it is preferable that each of optically functional surfaces 105a, 105b and 105c is formed to have a step at a boundary section, and it is preferable that the step at the boundary section that is farther from an optical axis is greater than that at the boundary section that is closer to an optical axis, on the intermediate optically functional surface 105b.

Now, a design for interchangeability for making it possible to record or reproduce for both DVD and CD will be explained. For light fluxes passing respectively through the inside and outside optically functional areas 105a and 105c, it is possible to carry out spherical aberration correction, assuming the use of DVD. However, with regard to light fluxes passing respectively these optically functional surfaces 105a and 105c, over spherical aberration is generated because of a difference of a base board thickness when CD is used, which usually makes them to be unsuitable for recording or reproducing of CD. Therefore, intermediate optically functional surface 105b is constituted as follows.

Figure 29:
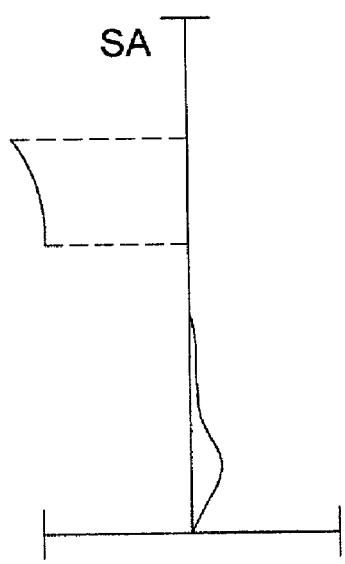
FIGS. 29(a) and 29(b) are diagrams showing an example of a design (target characteristics) of spherical aberration related to the Seventh Embodiment.
Figure 29:
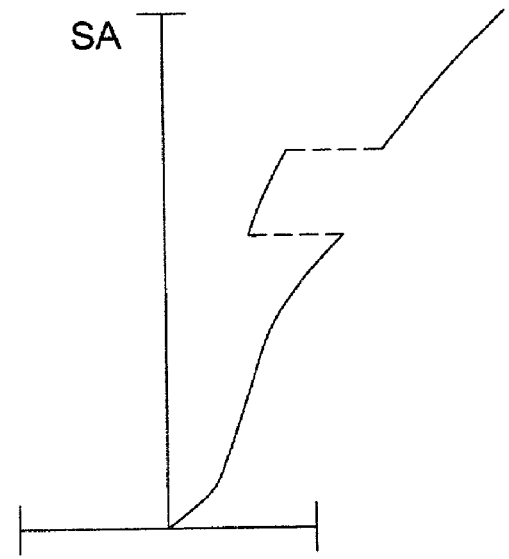

FIG. 29 is a diagram showing an example of design (target characteristics) for spherical aberration related to the present embodiment. According to FIG. 29, a light flux passing through innermost optically functional area 105a is not aplanatic. However, when a light flux diameter is stopped down at the position defocused from the paraxial image point by +10 μm, it is possible to secure the state where the residual aberration is smaller than Marechal criterion. However, since it is insufficient as a spot diameter formed on a recording surface of an optical information recording medium, there is formed intermediate optically functional area 105b representing CD-exclusive area where a spot diameter for CD is stopped down. To be concrete, it is preferable to form intermediate optically functional area 105b so that light-converging is made on the vicinity of the light spot formed on the optical information recording medium at the aforesaid defocused position, and spherical aberration may be designed with assumed transparent base board thickness $t_c$ ($t_c \div (t_1+t_2)/2$) which is between DVD transparent base board thickness t1 and CD transparent base board thickness t2.

When CD is used, a light flux passing through outside optically functional surface 105c becomes a flare light to exist at the position which is away by a distance that is about 10 times a size of a main spot diameter. When DVD is used, a light flux passing through an intermediate optically functional surface becomes a flare light to exist on an outside zone which is away by a distance that is several times a size of a main spot diameter. Therefore, if this flare light does not enter an unillustrated sensor element, or if the flare light is on the level that is not problematic electrically for practical use, an aperture diameter can also be the same for both DVD and CD.

Further, for wavelength variation of light sources 101 and 102, objective lens 105 composed of a refracting interface is more stable, compared with an objective lens that is provided with a diffractive structure which changes power depending on a wavelength. However, wavelength dependency of the refractive index is lowered as a dispersion value of glass material grows greater, which is preferable.

In this way, the objective lens 105 in the present embodiment can conduct recording or reproducing of information properly for both DVD and CD each having a different base board thickness, while correcting temperature characteristics and wavelength characteristics appropriately, even under the specifications which turn out to be more strict for temperature characteristics.

Figure 30:
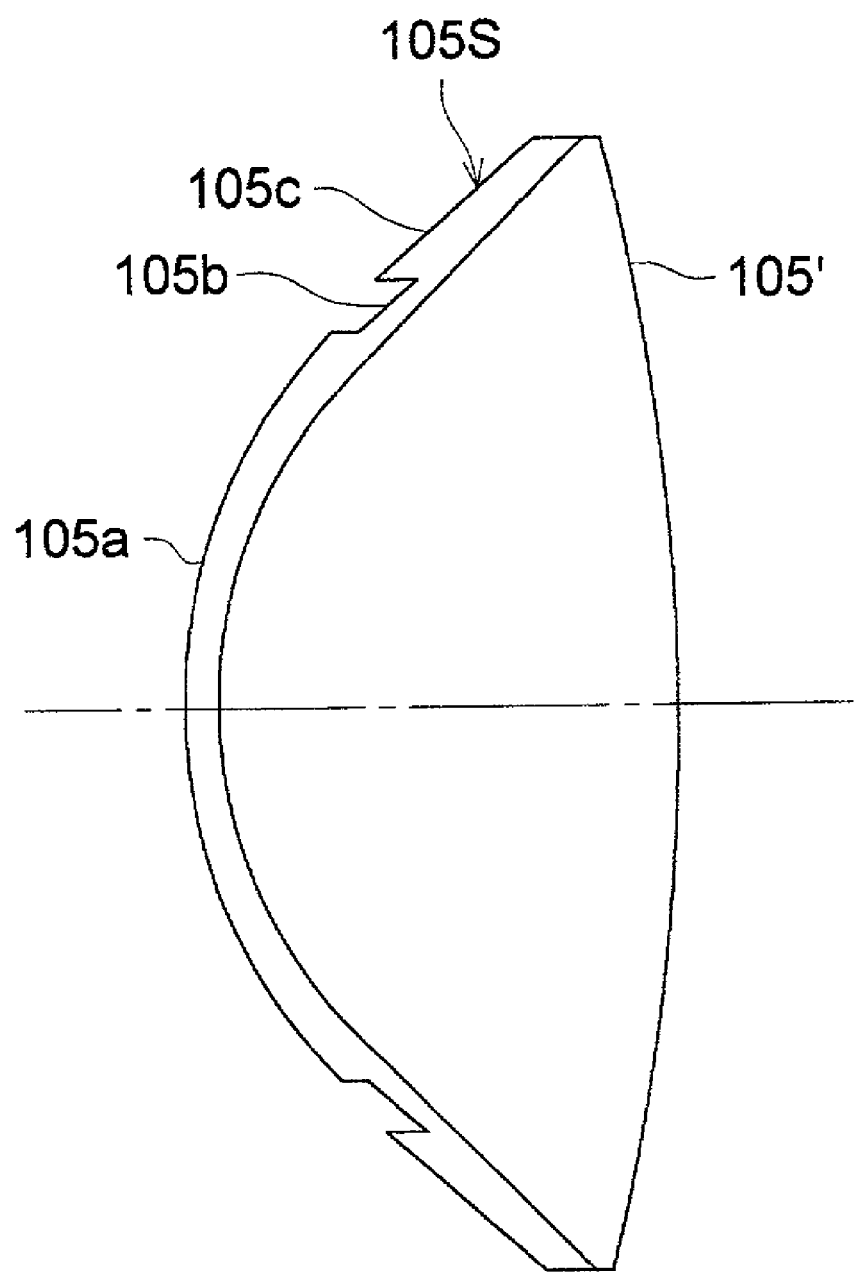
FIG. 30 is a sectional view of primary portions of an objective lens related to the variation of the Seventh Embodiment.

Incidentally, the invention is not limited to the present embodiment. Namely, it is possible either to make the objective lens to be composed of cemented lenses or to make the surface of glass lens 105' to be composed of aspheric surface 105S made of UV-setting resin, as shown in FIG. 30. When the objective lens is made of different glass materials as stated above, at least the following expression needs to be satisfied for the glass material having stronger power (105' in this case).

$$|dn/dT| \leq 10.0 \times 10^{-6} (/° C.) \qquad (2)$$

Figure 31:
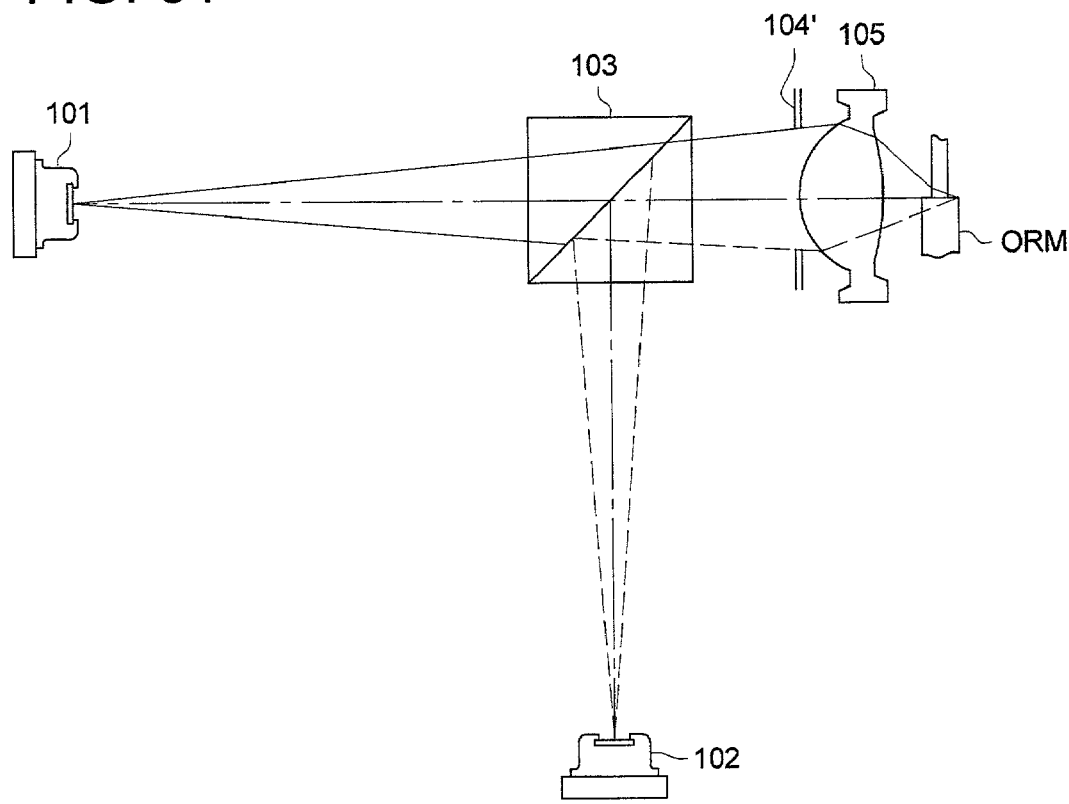
FIG. 31 is a diagram showing an example wherein a wavelength selecting diaphragm is provided on an optical pickup device.

When processing is taken into consideration, it is preferable to provide the aforesaid three optically functional surfaces 105a, 105b and 105c on the side of the surface 105 made of UV-setting resin. In this case, the objective lens can be applied also to the occasion where the same light source wavelength is used for conducting recording and reproducing for both DVD and CD. Even when three or more optically functional surfaces are used, the same effect can be attained sufficiently. It can further be applied to those wherein lateral magnification makes temperature characteristics to be mild, namely, the lateral magnification is infinite. In some cases, there may be provided wavelength selecting diaphragm (restricting member) 104' that restricts a light flux passing through outside optically functional surface 105c in the case of using CD, as shown in FIG. 31.

(Eighth Embodiment)

Figure 32:
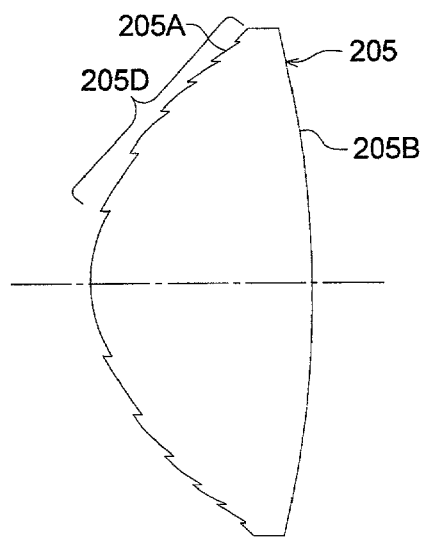
FIGS. 32(a) and 32(b) are sectional views of primary portions of an objective lens related to the Eighth Embodiment.
Figure 32:
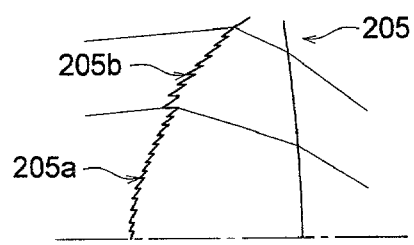

Next, the eighth embodiment will be explained. FIG. 32 is a sectional view of primary portions related to the eighth embodiment. The present embodiment is different from the first embodiment on the point that the diffractive structure is given to the objective lens so that it may attain interchangeability, and explanation for the portions in the present embodiment overlapping with those in the first embodiment will be omitted.

With regard to objective lens 205, diffractive structure 205D is formed on aspheric surface 205A closer to a light source to be solid with it as shown in FIG. 32(a), among aspheric surfaces 205A and 205B on both sides. This diffractive structure 205D is composed of two optically functional surfaces 205a and 205c which are different in terms of design concept with a certain height that is close to the ray of light stipulating numerical aperture NA in the case of using CD and serves as a boundary, as shown in FIG. 32(b).

Figure 33:
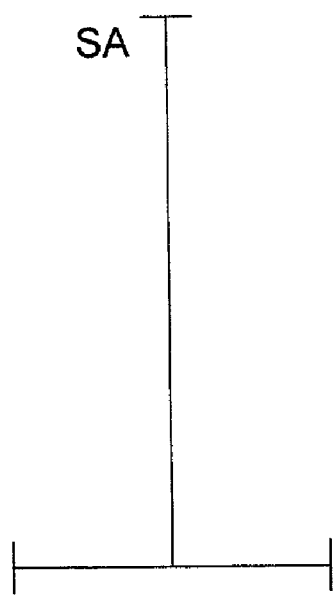
FIGS. 33(a) and 33(b) are diagrams showing an example of a design (target characteristics) of spherical aberration related to the Eighth Embodiment.
Figure 33:
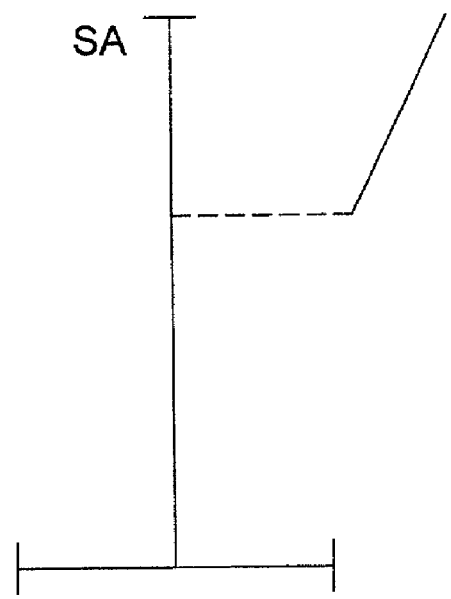

Namely, the inside optically functional surface 205a has a diffractive structure for correcting aberration for each transparent base board thickness of DVD and CD, while the outside optically functional surface 205b has a diffractive structure that corrects aberration for a transparent base board thickness and creates a flare light for CD. FIG. 33 is a diagram showing a design example (target characteristics) of spherical aberration related to the present embodiment.

Even in the present embodiment, it is preferable that refractive index temperature dependency of the glass material of the objective lens 205 is low, and the following expression is preferable.

$$|dn/dT| \leq 10.0 \times 10^{-6} (/° C.) \qquad (2)$$

If the range mentioned above is exceeded, it is necessary to enhance effectiveness of diffraction for temperature correction in the diffractive structure 205D, resulting in narrowed diffraction pitch and a decline of diffraction efficiency.

Figure 34:
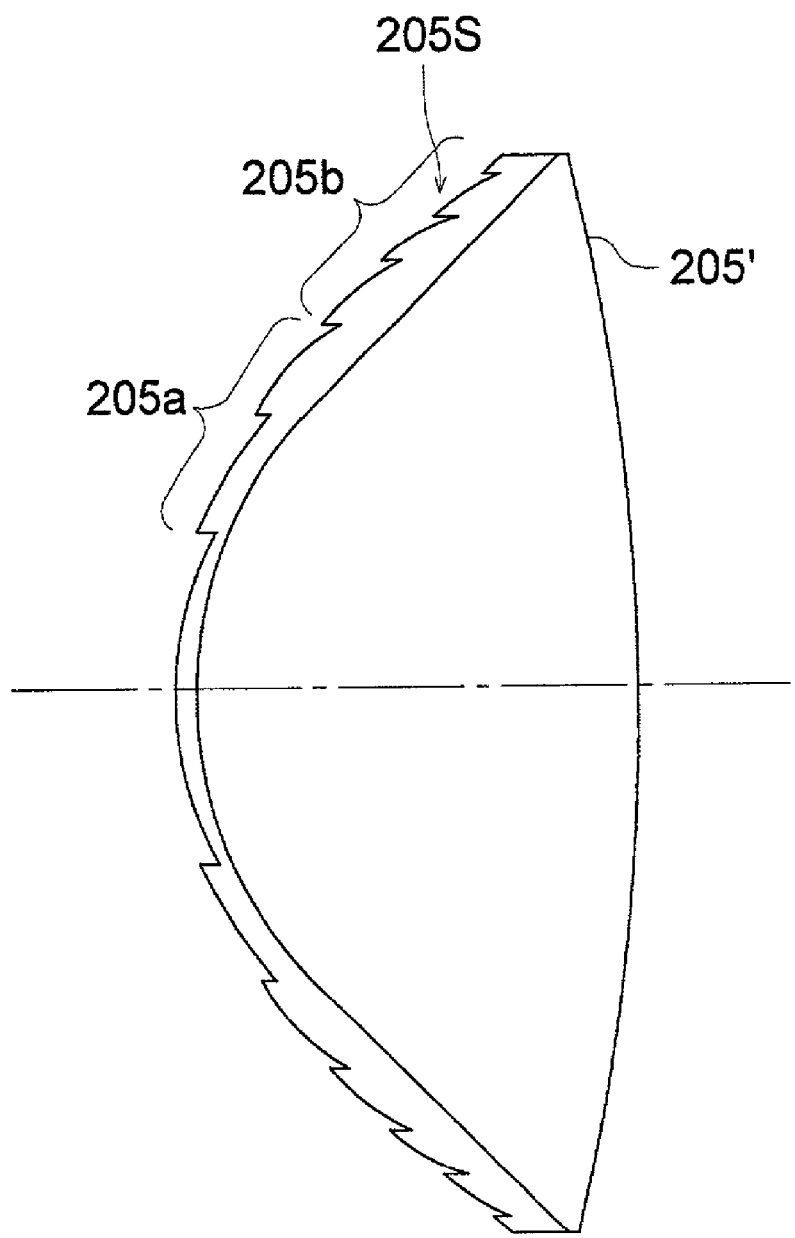
FIG. 34 is a sectional view of primary portions of an objective lens related to the variation of the Eighth Embodiment.
Figure 35:
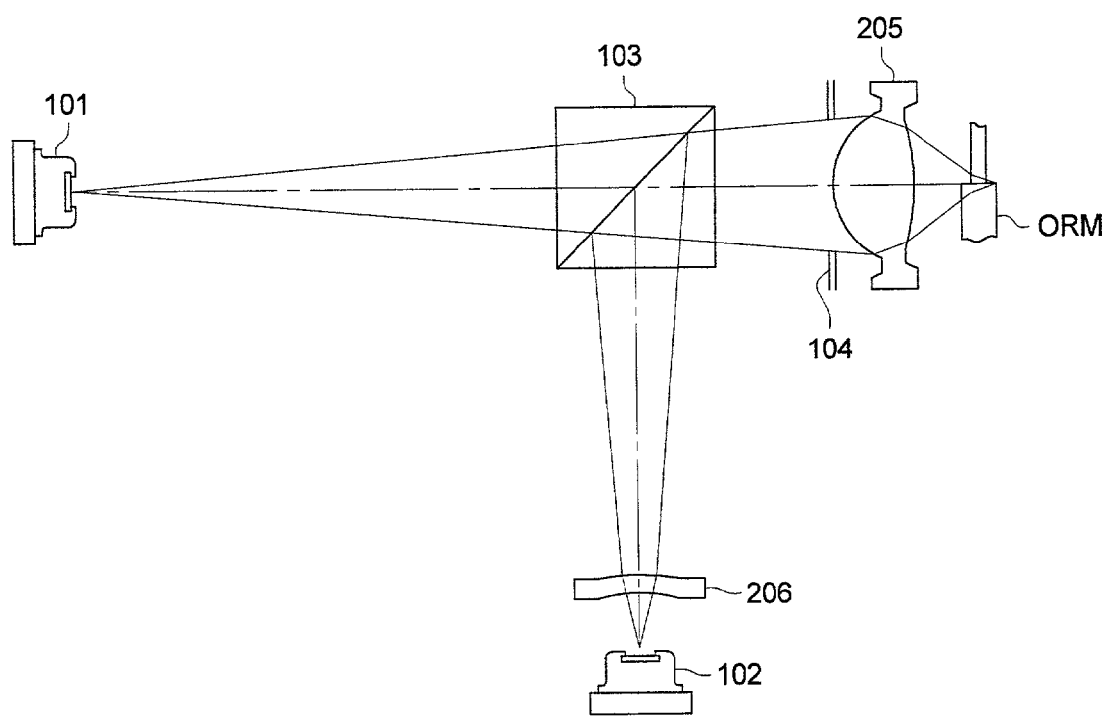
FIG. 35 is a diagram showing an example wherein a coupling lens is provided on an optical pickup device.

The invention is not limited to the present embodiment. Namely, it is possible either to make the objective lens to be composed of cemented lenses or to make the surface of the objective lens to be composed of aspheric surface 205S made of UV-setting resin, as shown in FIG. 34. In this case, it is preferable to provide the aforesaid two optically functional surfaces 205a and 205b on the surface of the UW-setting resin. The reason for the foregoing is as follows. It is necessary to increase a depth of each diffraction for obtaining the same diffraction effect, because a relative refractive index of materials becomes smaller when the diffractive structure is tried to be provided on the cemented portion. It is possible either to provide diffractive structures on both sides of the objective lens 205, or to provide diffraction surfaces on the plane where the diffractive section on the outside is different from that on the inside. Even when three or more optically functional surfaces are used for the structure, it is possible to form one having the same function. As shown in the example of the optical pickup device in FIG. 35, it is also possible to provide coupling lens 206 between the second light source 102 and objective lens 205 to use it for the optical information recording medium on the other side (CD in this case), taking divergence angle characteristics of the second light source 102 into consideration. The objective lens can be applied also to an optical system wherein lateral magnification of individual objective lens 205 for DVD is not the same as that of individual objective lens 205 for CD.

(Ninth Embodiment)

Next, the ninth embodiment will be explained. In the present embodiment, a diffractive structure is formed on an objective lens, and design of each functional surface is different from that in the eighth embodiment, and explanation for the portions in the present embodiment overlapping with those in the eighth embodiment will be omitted.

Figure 36:
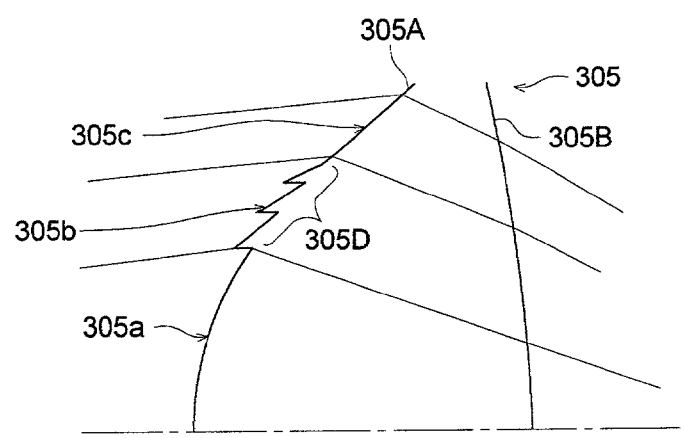
FIG. 36 is a sectional view of primary portions of an objective lens related to the Ninth Embodiment.

FIG. 36 is a sectional view of primary portions of the objective lens in the present embodiment, and a value of refractive index temperature characteristics dn/dT of the material for objective lens 305 is expressed as follows.

$$|dn/dT| \leq 10.0 \times 10^{-6} (/° C.) \qquad (2)$$

Figure 37:
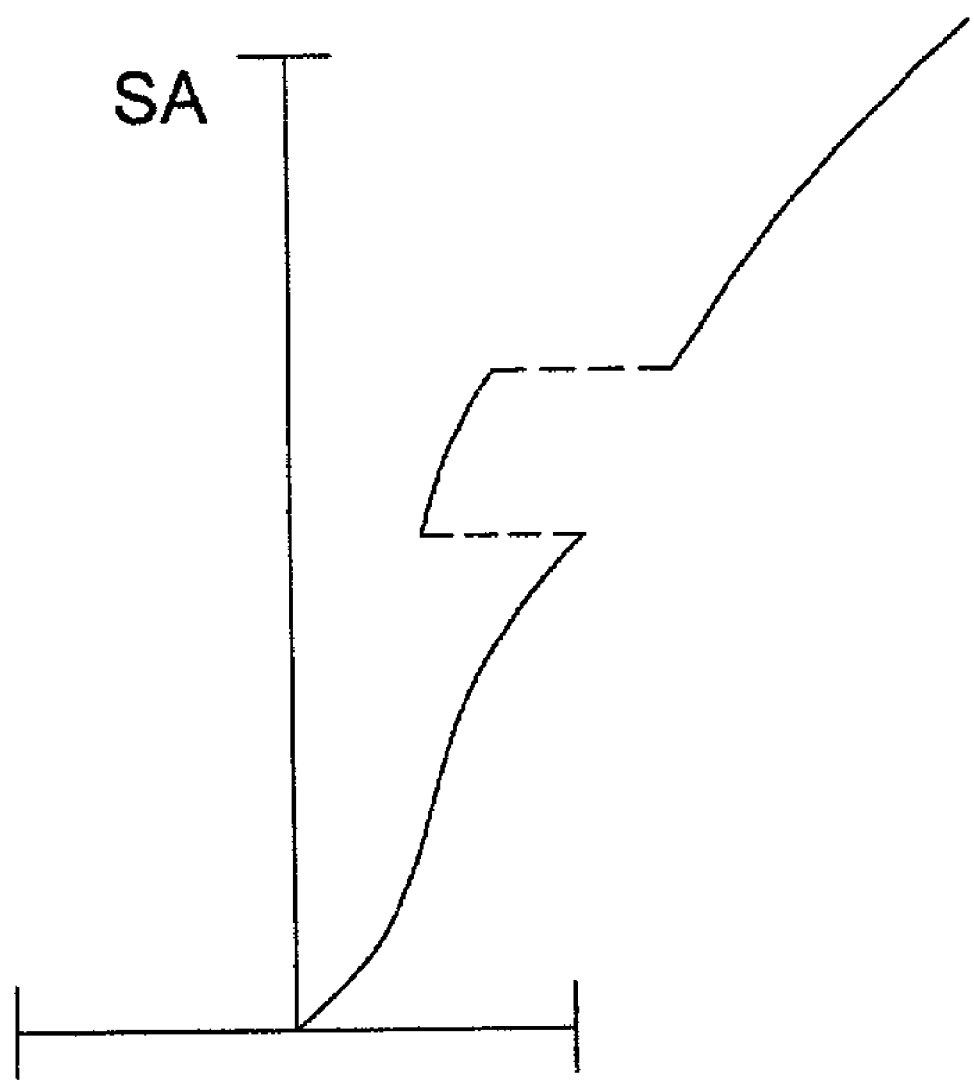
FIGS. 37(a) and 37(b) are diagrams showing an example of a design (target characteristics) of spherical aberration related to the Ninth Embodiment.

Both sides of the objective lens 305 are composed respectively of refracting interfaces 305A and 305B both representing an aspheric surface, and diffractive structure 305D is formed partially on an area of surface 305A of the objective lens 305 closer to a light source. In this case, the objective lens 305 is composed of three optically functional surfaces 305a, 305b and 305c, and further, a part of the area in the vicinity of ray of light stipulating numerical aperture NA in the case of using CD is made to be of a diffractive structure, thus the objective lens 305 is of the diffractive structure that makes the objective lens 305 to be used for both of DVD and CD. Each of the optically functional surfaces 305a and 305c on both sides is composed of a refracting interface to be an aspheric surface which is corrected in terms of spherical aberration mainly for DVD. Though the inside optically functional surface 305a is not designed for CD, it is possible to stop down a spot diameter on the surface of an optical disc even for CD, when the inside optically functional surface 305a is connected together to spherical aberration on intermediate optically functional surface 305b. FIG. 37 is a diagram showing an example of design (target characteristics) for spherical aberration related to the present embodiment.

Incidentally, the invention is not limited to the present embodiment. Namely, it is possible either to make the objective lens 305 to be composed of cemented lenses or to make the surface of a glass lens to be composed of an aspheric surface made of UV-setting resin. In this case, it is preferable that the aforesaid three optically functional surfaces are provided on the surface side of the UV-setting resin.

(Tenth Embodiment)

Next, the fourth embodiment will be explained. In the present embodiment, a diffractive structure is formed on an objective lens, and design of each functional surface is different from those in the eighth embodiment and the ninth embodiment, and explanation for the portions in the present embodiment overlapping with those in each embodiment will be omitted.

Figure 38:
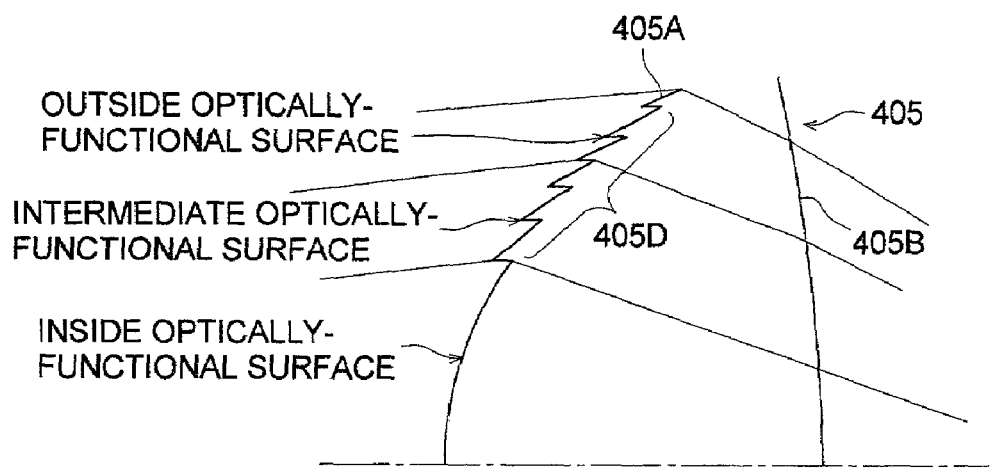
FIG. 38 is a sectional view of primary portions of an objective lens related to the Tenth Embodiment.

FIG. 38 is a sectional view of primary portions of the objective lens in the present embodiment, and a value of refractive index temperature characteristics dn/dT of the material for the objective lens is expressed as follows.

$$|dn/dT| \leq 10.0 \times 10^{-6} (/° C.) \quad (2)$$

Figure 39:
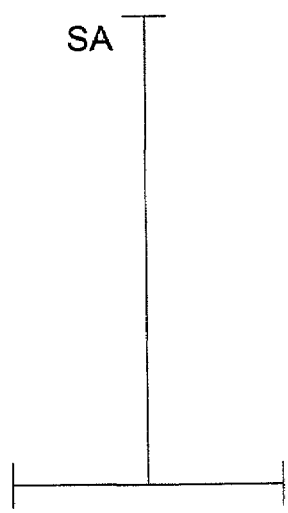
FIGS. 39(a) and 39(b) are diagrams showing an example of a design (target characteristics) of spherical aberration related to the Tenth Embodiment.
Figure 39:
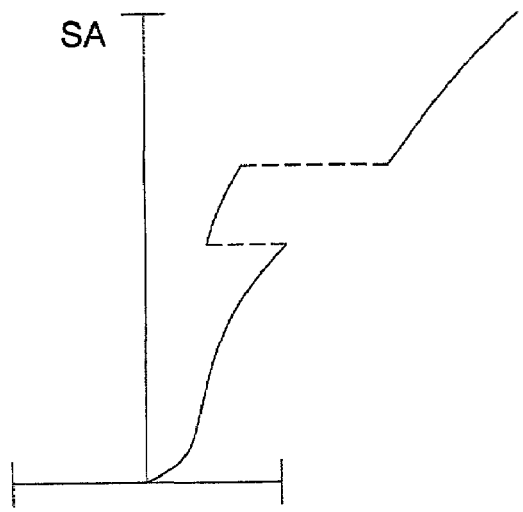

Both sides of the objective lens 405 are composed respectively of refracting interfaces 405A and 405B both representing an aspheric surface, and diffractive structure 405D is formed partially on an area of surface 405A of the objective lens 405 closer to a light source. In this case, the objective lens 405 is composed of three optically functional surfaces 405a, 405b and 405c, and further, a part of the area in the vicinity of ray of light stipulating numerical aperture NA in the case of using CD is made to be of diffractive structure 405D that makes the objective lens 405 to be used for both of DVD and CD. A diffraction surface is formed on outside optically functional surface 405c, spherical aberration is corrected on DVD, and a diffractive structure which creates a flare is formed in CD. FIG. 39 is a diagram showing a design example (target characteristics) of spherical aberration related to the present embodiment.

Incidentally, the invention is not limited to the present embodiment. Namely, it is possible either to make the objective lens to be composed of cemented lenses or to make the surface of a glass lens to be composed of an aspheric surface made of UV-setting resin. In this case, it is preferable that the aforesaid three optically functional surfaces are provided on the surface side of the UV-setting resin.

Examples of the invention will be explained as follows.

EXAMPLE 7

The present example is one for the objective lens related to the Seventh Embodiment stated above. Table 8 shows lens data.

TABLE 8

Example 7
$f_1 = 3.00$ mm, m1 = −1/7.0
NA1 = 0.60, NA2 = 0.45
dn2/dT = +3.8 × E−6 (/° C.) at 632.8 nm, vd = 61.2

| ith surface | ri | DVD di (650 nm) | ni (650 nm) | CD di (780 nm) | ni (780 nm) | |
|---|---|---|---|---|---|---|
| 0 | | 23.576 | 1.0 | 23.576 | 1.0 | Emission point |
| 1 | ∞ | 0.0 | 1.0 | 0.0 | 1.0 | Aperture φ4.06 mm |
| 2 | 2.1759 | 2.2 | 1.58642 | 2.2 | 1.58252 | |
| 2' | 2.1759 | 2.1962 | 1.58642 | 2.1962 | 1.58252 | |
| 2" | 2.1759 | 2.2 | 1.58642 | 2.2 | 1.58252 | |
| 3 | −5.7537 | 1.928 | 1.0 | 1.566 | 1.0 | |
| 4 | ∞ | 0.6 | 1.58 | 1.2 | 1.55 | |
| 5 | ∞ | | | | | |

Aspherical data
2nd surface
(0 < h < 1.32 mm: Inside optically functional surface)
Aspherical coefficient κ −0.92846 × E−0
A1 −0.11050 × E−2      P1 3.0
A2 +0.51090 × E−2      P2 4.0
A3 −0.16336 × E−2      P3 5.0
A4 +0.57112 × E−3      P4 6.0
A5 +0.17007 × E−4      P5 8.0
A6 −0.73062 × E−5      P6 10.0

2'nd surface (1.32 mm < h < 1.54 mm: Intermediate optically functional surface)
Aspherical coefficient κ −0.92421 × E−0
A1 −0.99146 × E−3      P1 3.0
A2 +0.51636 × E−2      P2 4.0
A3 −0.16069 × E−2      P3 5.0
A4 +0.58391 × E−3      P4 6.0
A5 +0.19303 × E−4      P5 8.0
A6 −0.73840 × E−5      P6 10.0

2"nd surface (1.54 mm < h: Outside optical surface area)
Aspherical coefficient

κ −0.92846 × E−0
A1 −0.11050 × E−2      P1 3.0
A2 +0.51090 × E−2      P2 4.0
A3 −0.16336 × E−2      P3 5.0
A4 +0.57112 × E−3      P4 6.0
A5 +0.17007 × E−4      P5 8.0
A6 −0.73062 × E−5      P6 10.0

3rd surface Aspherical coefficient

A1 +0.16009 × E−1      P1 4.0
A2 −0.26764 × E−2      P2 6.0
A3 +0.30016 × E−3      P3 8.0
A4 −0.17687 × E−4      P4 10.0

Each surface is composed of an aspheric surface, and each aspheric surface has an aspherical form expressed by "Numeral 4".

Where, Z represents an axis along the optical axis direction, h represents a height perpendicular to the optical axis, r represents axial curvature of radius, k represents the constant of the cone, A represents the aspherical coefficient and P represents the number of power of the aspheric surface. Further, three optically functional surfaces exist on the aspheric surface of the objective lens closer to a light source, and each of them is an aspheric surface expressed by "Numeral 4".

Those to which the present example can be applied are simple optical systems wherein a divergent light flux emitted from each light source of DVD and CD enters an objective lens directly. Glass materials for the objective lens whose refractive index temperature dependency $dn/dT$ is $-5.8 \times 10^{-6}$ (/° C.) were used. NA, temperature characteristics in the case of using wavelength DVD and others are shown in Table 14. It is possible to confirm that both temperature characteristics and wavelength characteristics are improved, compared with a conventional example.

Figure 40:
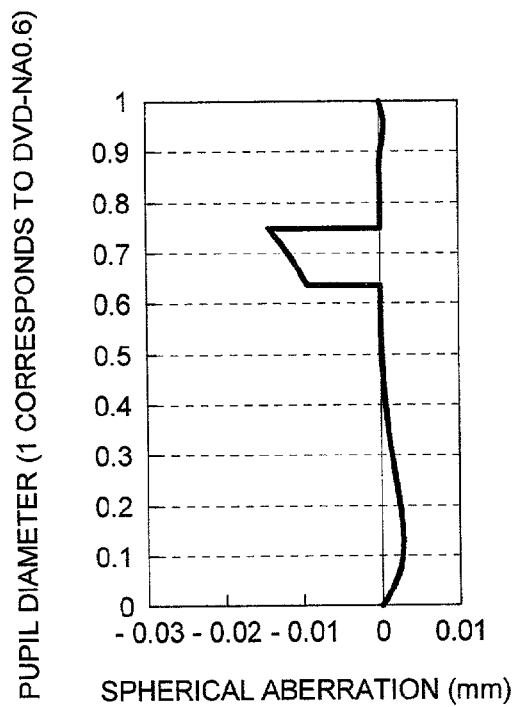
FIGS. 40(a) and 40(b) are spherical aberration diagrams of an objective lens in Example 7.
Figure 40:
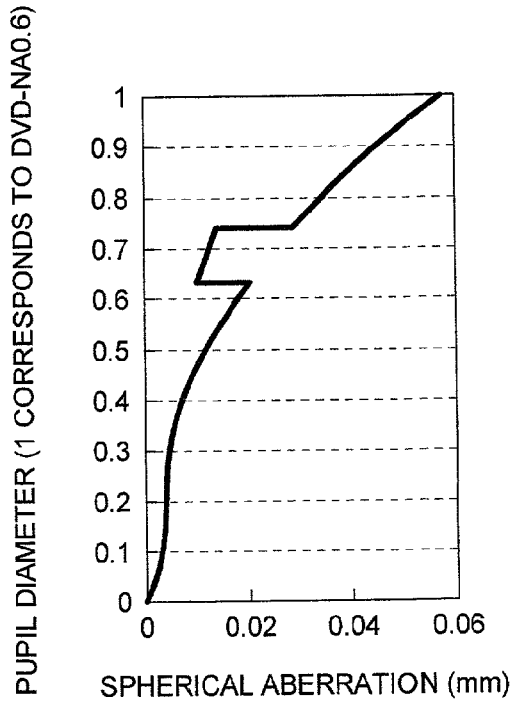
Figure 41:
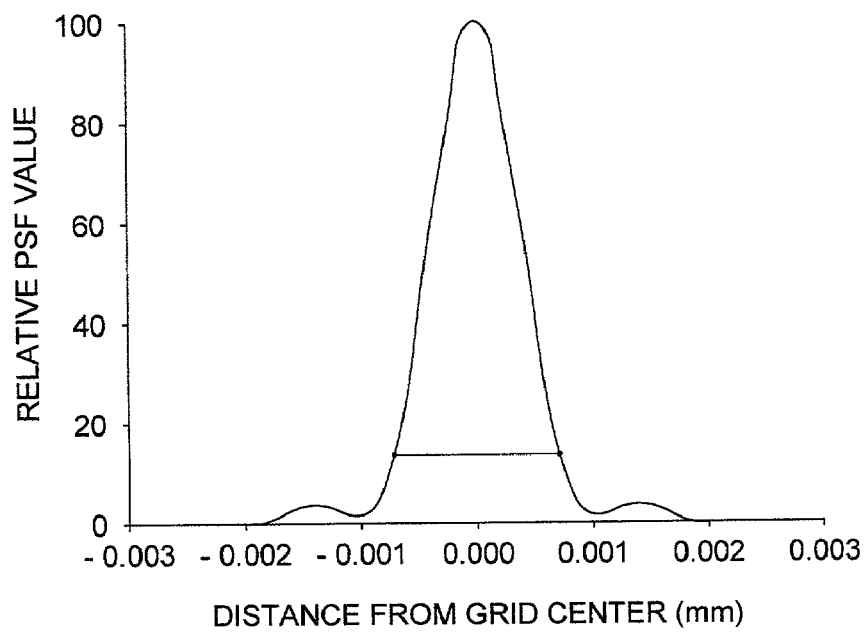
FIGS. 41(a) and 41(b) each shows a form of a spot on an information recording surface of an optical information recording medium for an objective lens in the Example 7.
Figure 41:
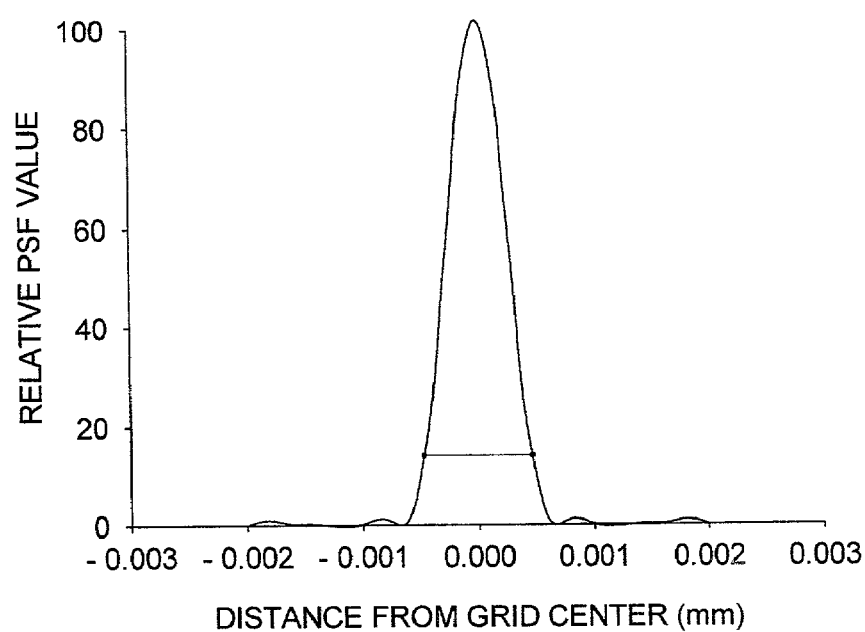

FIG. 40 represents a spherical aberration diagram of the present example wherein three optically functional surfaces are formed. FIG. 41 shows simulation of PSF in the case of an occasion where a light flux with Gaussian distribution enters the aforesaid objective lens by using a fixed diaphragm that regulates a light flux corresponding to NA 0.60 on the DVD side, and it shows a form of a spot on the information recording surface of the optical information recording medium. The aperture diameter in the case of CD is a result of simulation for the occasion where a light flux with the same aperture diameter as in DVD is made to enter. As is understood from this, a spot diameter ($0.831 \times \lambda / NA$ (μm)) requested on the recording surface is satisfied.

On the inside optically functional surface, residual spherical aberration of about $0.02\ \lambda_1$ rms is generated on purpose for DVD. The design of this kind makes it possible to reduce residual spherical aberration in CD. In the present example, a light flux passing through the intermediate optically functional surface is corrected in terms of spherical aberration for the optical information recording medium with assumed transparent base board thickness of $t_c=1.0$ mm, to be used for forming a spot in CD at a defocus position that is located on the over side by about 10 μm from a paraxial image point for CD.

As shown in Table 14, it is possible to realize an objective lens having lateral magnification of $m=-\frac{1}{7}$, NA of 0.60 and severe temperature characteristics, wherein error characteristics are improved so that the objective lens may by used for both DVD and CD.

EXAMPLE 8

The present example is one related to the objective lens concerning the seventh embodiment stated above. Table 9 shows lens data.

TABLE 9

Example 8
$f_1 = 3.00$ mm, m1 $= -1/7.0$
NA1 = 0.60, NA2 = 0.45
$dn2/dT = -1.2 \times E{-4}$ (/° C.) at 632.8 nm, vd = 57.0
$dn3/dT = +0.8 \times E{-6}$ (/° C.) at 632.8 nm, vd = 55.3

| | | DVD | | | |
|---|---|---|---|---|---|
| ith | | di | | CD | |
| sur- face | ri | (650 nm) | ni (650 nm) | di (780 nm) | ni (780 nm) |
| 0 | | 23.205 | 1.0 | 23.205 | 1.0 | Emission point |
| 1 | ∞ | 0.0 | 1.0 | 0.0 | 1.0 | Aperture φ4.01 mm |

TABLE 9-continued

Example 8
$f_1 = 3.00$ mm, m1 $= -1/7.0$
NA1 = 0.60, NA2 = 0.45
$dn2/dT = -1.2 \times E{-4}$ (/° C.) at 632.8 nm, vd = 57.0
$dn3/dT = +0.8 \times E{-6}$ (/° C.) at 632.8 nm, vd = 55.3

| | | | | | |
|---|---|---|---|---|---|
| 2 | 2.600 | 0.1 | 1.48953 | 0.1 | 1.48616 |
| 2' | 2.600 | 0.0958 | 1.48953 | 0.0958 | 1.48616 |
| 2" | 2.600 | 0.1 | 1.48953 | 0.1 | 1.48616 |
| 3 | 2.1270 | 2.8 | 1.67447 | 2.8 | 1.66959 |
| 4 | −6.0270 | 1.638 | 1.0 | 1.276 | 1.0 |
| 5 | ∞ | 0.6 | 1.58 | 1.2 | 1.55 |
| 6 | ∞ | | | | |

Aspherical data
2nd surface
($0 < h < 1.32$ mm: Inside optically functional surface)
Aspherical coefficient κ $-0.43271 \times E{+01}$
A1 $-0.26060 \times E{-2}$    P1  3.0
A2 $+0.34891 \times E{-1}$    P2  4.0
A3 $-0.65070 \times E{-2}$    P3  5.0
A4 $-0.25906 \times E{-2}$    P4  6.0
A5 $+0.57180 \times E{-3}$    P5  8.0
A6 $-0.54866 \times E{-4}$    P6  10.0

2'nd surface
($1.32$ mm $< h < 1.51$ mm: Intermediate optically functional surface)
Aspherical coefficient κ $-0.41771 \times E{+01}$
A1 $-0.34857 \times E{-2}$    P1  3.0
A2 $+0.35107 \times E{-1}$    P2  4.0
A3 $-0.64174 \times E{-2}$    P3  5.0
A4 $-0.25655 \times E{-2}$    P4  6.0
A5 $+0.58143 \times E{-3}$    P5  8.0
A6 $-0.57791 \times E{-4}$    P6  10.0

2"nd surface
($1.51$ mm $< h$: Outside optical surface area)
Aspherical coefficient κ $-0.43271 \times E{+01}$
A1 $-0.26060 \times E{-2}$    P1  3.0
A2 $+0.34891 \times E{-1}$    P2  4.0
A3 $-0.65070 \times E{-2}$    P3  5.0
A4 $-0.25906 \times E{-2}$    P4  6.0
A5 $+0.57180 \times E{-3}$    P5  8.0
A6 $-0.54866 \times E{-4}$    P6  10.0

3rd surface Aspherical coefficient

κ $-0.16931 \times E{+01}$
A1 $+0.47202 \times E{-2}$    P1  4.0

The objective lens in the present example is one wherein three optically functional surfaces (see FIG. 32) are formed with UV-setting resin on the surface of one side of a glass lens. Refractive index temperature dependency of the resin itself is $-1.2 \times 10^{-4}$ (/° C.) which is the same as that in conventional example 2. However, it is possible to correct temperature characteristics for the total objective lens, by reducing power of the resin portion and by using one whose refractive index temperature dependency of a glass lens on the other side is as small as $+0.8 \times 10^{-6}$ (/° C.). Since the design of interchangeability for DVD and CD is the same as in Example 1, the explanation therefore will be omitted.

Figure 42:
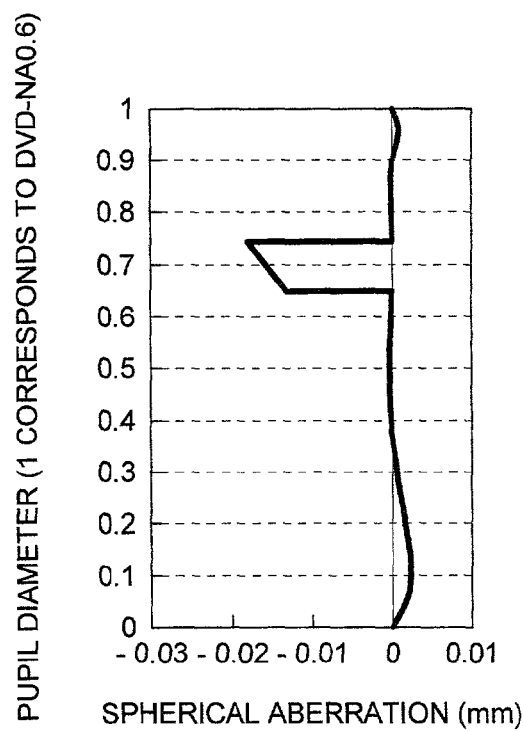
FIGS. 42(a) and 42(b) are spherical aberration diagrams of an objective lens in Example 8.
Figure 42:
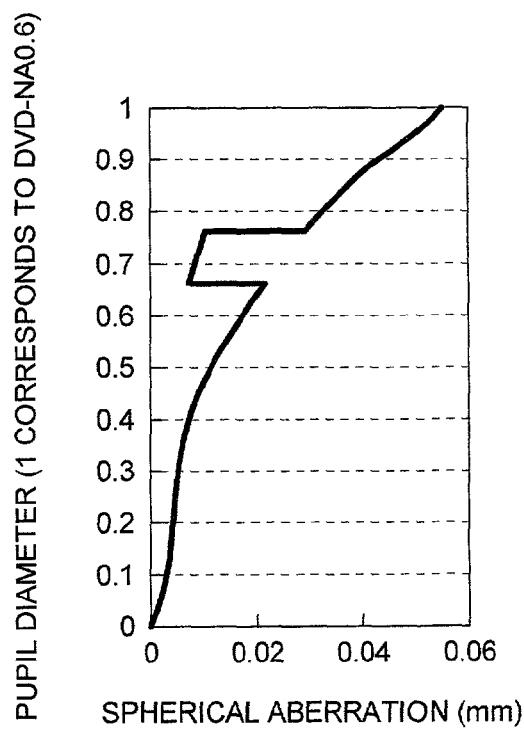
Figure 43:
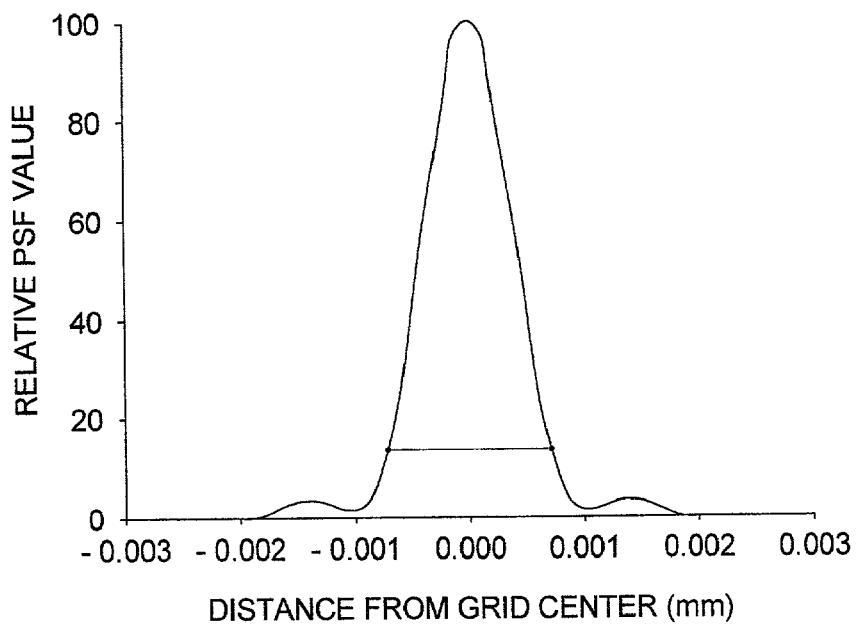
FIGS. 43(a) and 43(b) each shows a form of a spot on an information recording surface of an optical information recording medium for an objective lens in the Example 8.
Figure 43:
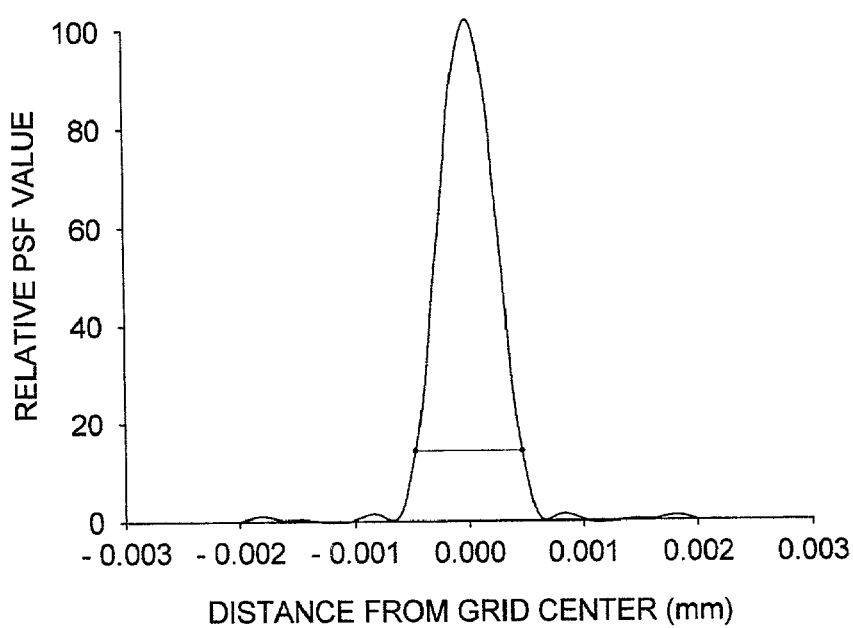

FIG. 42 shows a spherical aberration diagram of the present example. The spot form on the recording surface of each optical information recording medium is shown in FIG. 43.

As shown in Table 14, it is possible to realize an objective lens having lateral magnification of $m=-\frac{1}{7}$, NA of 0.60 and severe temperature characteristics, wherein error characteristics are improved so that the objective lens may by used for both DVD and CD.

EXAMPLE 9

The present example is one related to the eighth embodiment stated above. Table 10 shows lens data.

TABLE 10

Example 9
$f_1$ = 3.00 mm, m1 = 0
NA1 = 0.65, NA2 = 0.45
dn2/dT = −5.7 × E-6 (bc) at 632.8 nm, vd = 81.6

| ith surface | ri | DVD di (660 nm) | ni (660 nm) | CD di (790 nm) | ni (790 nm) | |
|---|---|---|---|---|---|---|
| 0 | ∞ | | 1.0 | ∞ | 1.0 | Emission point |
| 1 | ∞ | 0.0 | 1.0 | 0.0 | 1.0 | Aperture φ3.90 mm |
| 2 | 1.770 | 1.6 | 1.58642 | 1.6 | 1.58252 | |
| 2' | 1.798 | 1.5999 | 1.58642 | 1.5999 | 1.58252 | |
| 3 | −6.422 | 1.725 | 1.0 | 1.353 | 1.0 | |
| 4 | ∞ | 0.6 | 1.577 | 1.2 | 1.570 | |
| 5 | ∞ | | | | | |

Aspherical data
2nd surface
(0 < h < 1.37 mm: Inside optically functional surface)
Aspherical coefficient

| | | |
|---|---|---|
| κ | −9.9350 × E−1 | |
| A1 | +6.4273 × E−3 | P1 4.0 |
| A2 | +6.2694 × E−4 | P2 6.0 |
| A3 | −4.4974 × E−5 | P3 8.0 |
| A4 | +2.8692 × E−5 | P4 10.0 |
| A5 | 2.5654 × E−5 | P5 12.0 |

Optical path difference function
(Coefficient of optical path difference function: Design basis wavelength 720 nm)

| | |
|---|---|
| B2 | +2.4918 × E−4 |
| B4 | −2.0024 × E−3 |
| B6 | −3.7862 × E−4 |
| B8 | +2.0983 × E−4 |
| B10 | −5.8311 × E−5 |

2'nd surface
(1.37 mm < h: Outside optical surface area)
Aspherical coefficient

| | | |
|---|---|---|
| κ | −8.7077 × E−1 | |
| A1 | −6.2127 × E−3 | P1 4.0 |
| A2 | −6.3107 × E−4 | P2 6.0 |
| A3 | +1.3601 × E−4 | P3 8.0 |
| A4 | −2.5299 × E−5 | P4 10.0 |
| A5 | −8.0092 × E−6 | P5 12.0 |

Optical path difference function
(Coefficient of optical path difference function: Design basis wavelength 660 nm)

| | |
|---|---|
| B2 | −2.2736 × E−3 |
| B4 | −3.2476 × E−4 |
| B6 | −8.8656 × E−5 |
| B8 | −1.5GSl × E−5 |
| B10 | +5.2484 × E−6 |

3rd surface Aspherical coefficient

| | | |
|---|---|---|
| A1 | +0.20368 × E−1 | P1 4.0 |
| A2 | −0.48550 × E−2 | P2 6.0 |
| A3 | +0.72231 × E−3 | P3 8.0 |
| A4 | −0.97114 × E−4 | P4 10.0 |
| A5 | +0.78427 × E−5 | P5 12.0 |
| A6 | −0.94305 × E−8 | P6 14.0 |

Each of both sides of the objective lens of the present example is an aspheric surface, and a diffractive structure is provided solidly on the surface of the aspheric surface on one side. As shown in FIG. 32, this diffractive structure is designed to be two different connected portions on both sides of the boundary represented by distance h from an optical axis. Namely, two optically functional surfaces are formed on the diffractive structure. The objective lens is made of glass material whose refractive index temperature dependency is −5.7×10$^{-6}$ (/° C.).

For the light flux passing through the inside optically functional surface, there is provided a diffractive structure that corrects spherical aberration for a wavelength and a transparent base board thickness used for DVD and for those used for CD. Further, on the outside optically functional surface, there is provided a diffractive structure that corrects spherical aberration for DVD, and generates over flare on purpose for CD.

In general, with respect to the diffractive structure, phase difference function ΦB is expressed by Numeral 1 with a unit of radian. By making the secondary coefficient to be a nonzero value, it is possible to give paraxial power to the diffraction portion. In addition, by making the coefficient of a phase difference function other than the secondary coefficient such as, for example, fourth order coefficient or sixth order coefficient to be a nonzero value, it is possible to control spherical aberration. "Control" in this case means that the spherical aberration of the refraction portion is corrected as a whole by giving spherical aberration that is opposite in terms of characteristic to the aforesaid spherical aberration to the diffraction portion, or total spherical aberration is made to be a desired flare amount by manipulating the spherical aberration of the diffraction portion. It is therefore possible to consider spherical aberration in temperature changes to be total of changes of spherical aberration of the refraction portion caused by temperature changes and spherical aberration changes of the diffraction portion.

With respect to changes caused by temperature in the refraction portion, an amount of changes is small because temperature dependency for refractive index change of glass material is small. Therefore, it can be said that temperature characteristics of the total objective lens turn out to be better, though spherical aberration caused by change of spherical aberration of the diffraction portion. Small change of spherical aberration of the diffraction portion in this case means is to weaken wavelength dependency, which results in that effectiveness of diffraction is weakened and a pitch of ring-shaped diffractive zone (diffraction pitch of the diffractive structure) is broadened.

With respect to the diffractive structure formed on the inside optically functional surface, a homogeneous diffracted light is used for DVD and CD, which is preferable compared with an occasion where a non-homogeneous diffracted light is used. In the present example, first order diffracted light is used for both DVD and CD. For the outside optically functional surface, a number of the order may either be the one which is the same as that for the inside optically functional surface, or be the one whose absolute value increases. Since the outside optically functional surface is not used usually for CD, it is preferable that the standard wavelength (blazed wavelength) which makes the diffraction efficiency to be highest on this functional surface is made to be the wavelength that is close to DVD. If an absolute value of the number of the order for diffraction is made to be greater in this case, it is possible to lower the diffraction efficiency on the CD side and thereby to lower CD flare, when the blazed wavelength is set in the vicinity of DVD. Incidentally, in the present example, the first order was used as a number of the order for also the outside optically functional surface, and with respect to the blazed wavelength, 720 nm was used for the inside optically functional surface and 660 nm was used for the outside optically functional surface.

Figure 45:
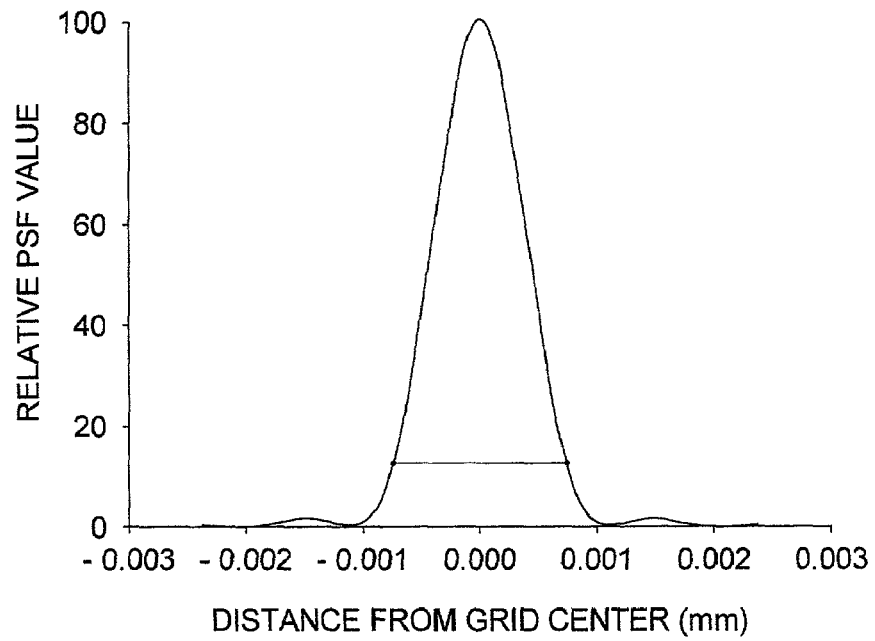
FIGS. 45(a) and 45(b) each shows a form of a spot on an information recording surface of an optical information recording medium for an objective lens in the Example 9.
Figure 45:
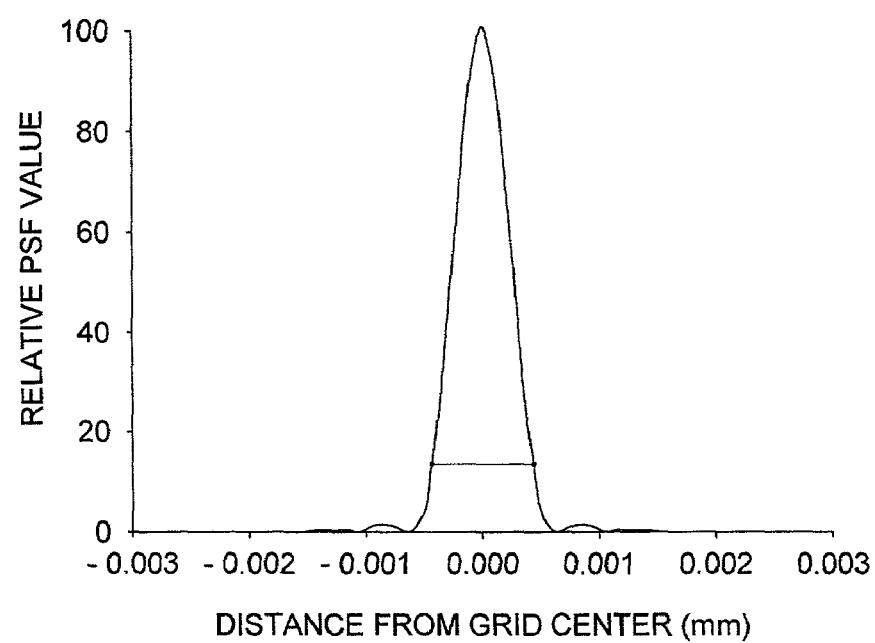

FIG. 44 is an aspheric surface diagram in the present example, and its spot profile is shown in FIG. 45. Error characteristics are shown in Table 14. As shown in this table, it is understood that an objective lens capable of being used for both DVD and CD which are improved in terms of error characteristics can be realized. It is also understood that the minimum value of a pitch of the ring-shaped diffractive zone is greater that that in Conventional example 3.

EXAMPLE 10

The present example is also an example related to the eighth embodiment stated above. Table 11 shows lens data.

TABLE 11

Example 10

$f_1 = 3.00$ mm, $m_1 = 0$
$NA_1 = 0.65$, $NA_2 = 0.50$
$dn_2/dT = -1.2 \times E-4$ (/° C.) at 632.8 nm, $\nu_d = 56.0$
$dn_3/dT = +7.4 \times E-6$ (/° C.) at 632.8 nm, $\nu_d = 37.2$

| ith surface | ri | DVD di (660 nm) | ni (660 nm) | CD di (790 nm) | ni (790 nm) | |
|---|---|---|---|---|---|---|
| 0 | ∞ | | 1.0 | | 1.0 | Emission point |
| 1 | ∞ | 0.0 | 1.0 | 0.0 | 1.0 | Aperture φ3.90 mm |
| 2 | 2.480 | 0.1 | 1.54076 | 0.1 | 1.53704 | |
| 2' | 2.492 | 0.101 | 1.54076 | 0.101 | 1.53704 | |
| 3 | 2.505 | 2.0 | 1.82708 | 2.0 | 1.81900 | |
| 4 | −302.939 | 1.491 | 1.0 | 1.136 | 1.0 | |
| 5 | ∞ | 0.6 | 1.577 | 1.2 | 1.570 | |
| 6 | ∞ | | | | | |

Aspherical data
2nd surface
(0 < h < 1.53 mm: Inside optically functional surface)
Aspherical coefficient κ  −9.4998 × E−1
A1 −2.1815 × E−4    P1  4.0
A2 −3.7775 × E−4    P2  6.0
A3 −2.4169 × E−4    P3  8.0
A4 −7.3177 × E−6    P4  10.0

Optical path difference function (Coefficient of optical path difference function: Design basis wavelength 720 nm)

B2  −4.2048 × E−4
B4  −3.8051 × E−4
B6  −4.0549 × E−4
B8  −3.1443 × E−5
B10 −1.1611 × E−5

2'nd surface (1.53 mm < h: Outside optical surface area)
Aspherical coefficient

κ  −8.4719 × E−1
A1 +6.6073 × E−4    P1  4.0
A2 −2.2175 × E−4    P2  6.0
A3 −3.0955 × E−5    P3  8.0
A4 −4.4414 × E−7    P4  10.0

Optical path difference function (Coefficient of optical path difference function: Design basis wavelength 660 nm)

B2  −5.0466 × E−4
B4  −1.3513 × E−5
B6  −2.3685 × E−5

TABLE 11-continued

Example 10

B8  −4.8511 × E−6
B10 +2.0574 × E−6

3rd surface Aspherical coefficient

κ  −0.90540 × E−2
A1 +0.16292 × E−4    P1  4.0
A2 −0.10622 × E−3    P2  6.0
A3 −0.48106 × E−4    P3  8.0
A4 −0.90706 × E−5    P4  10.0
A5 −0.10113 × E−4    P5  12.0
A6 −0.41941 × E−5    P6  14.0

4th surface Aspherical coefficient

κ  +0.17083 × E+5
A1 +0.25872 × E−3    P1  4.0
A2 −0.44991 × E−4    P2  6.0
A3 −0.69101 × E−4    P3  8.0
A4 −0.22469 × E−3    P4  10.0
A5 −0.58317 × E−4    P5  12.0
A6 +0.29543 × E−4    P6  14.0

The objective lens is one wherein two optically functional surfaces each having a diffractive structure made of UV-setting resin are formed on the surface on one side of a glass lens. Refractive index temperature dependency of the resin itself is $-1.2 \times 10^{-4}$(/° C.) which is the same as that in conventional example 2. However, it is possible to correct temperature characteristics of the total objective lens by weakening power of the resin portion and by using one wherein refractive index temperature dependency of a glass lens on the other side is as small as $+7.4 \times 10^{-6}$ (/° C.).

Figure 46:
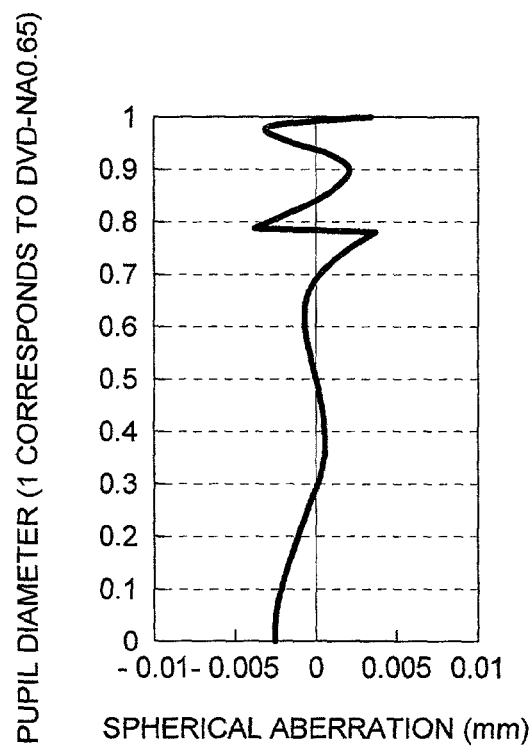
FIGS. 46(a) and 46(b) each is a spherical aberration diagram of an objective lens in Example 10.
Figure 46:
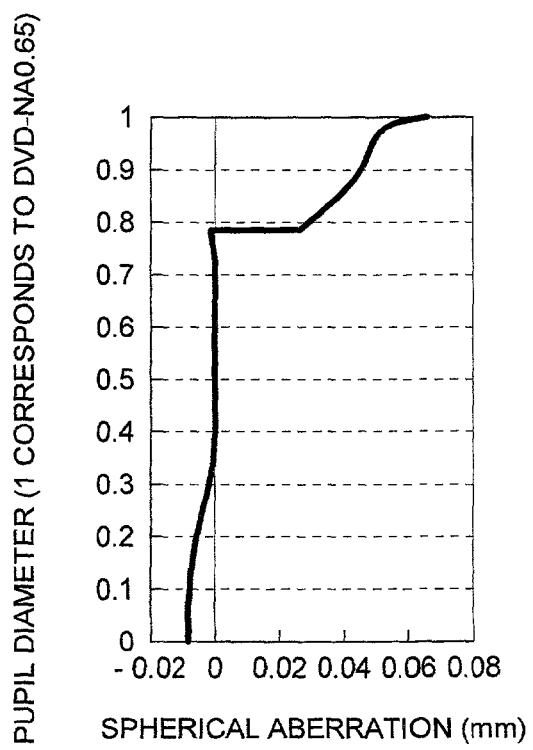
Figure 47:
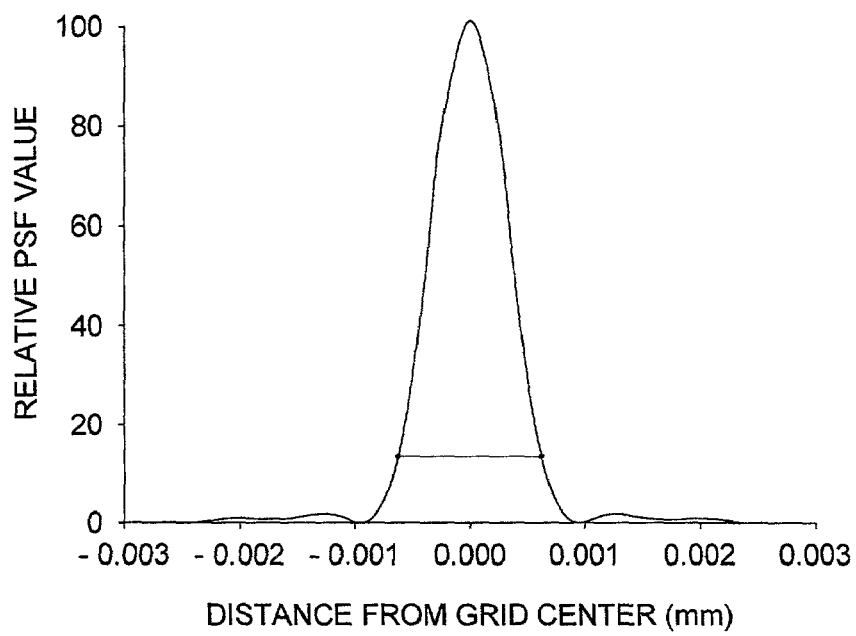
FIGS. 47(a) and 47(b) each shows a form of a spot on an information recording surface of an optical information recording medium for an objective lens in the Example 10.
Figure 47:
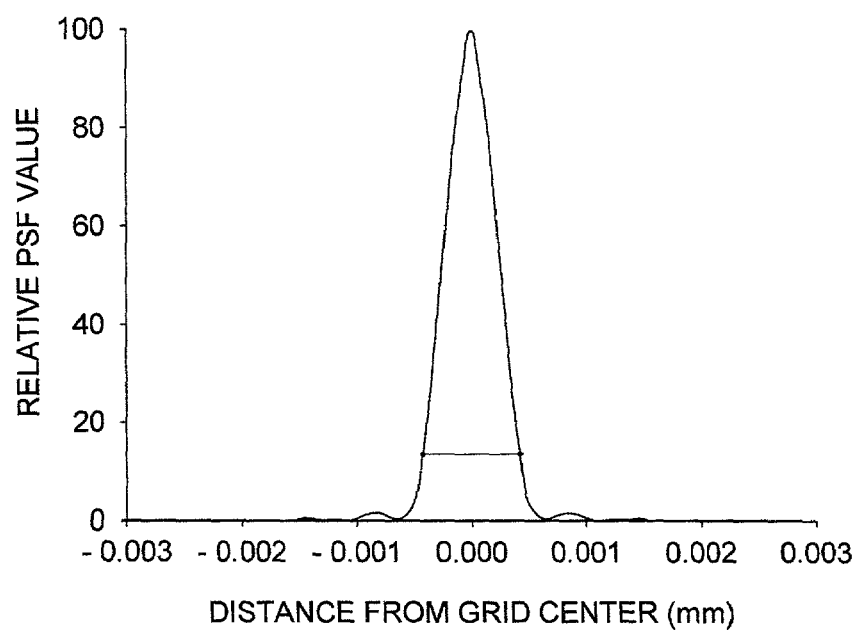

Since the design for interchangeability of DVD and CD is the same as that in Example 9, the explanation thereof will be omitted. FIG. 46 shows a spherical aberration diagram of the present example. A form of a spot on a recording surface of each optical information recording medium is shown in FIG. 47.

As shown in Table 14, it is understood that an objective lens capable of being used for both DVD and CD improved in terms of error characteristics can be realized in an objective lens wherein NA is 0.65 and temperature characteristics are severe. It is also understood that the minimum value of a pitch of the ring-shaped diffractive zone is greater than that in Conventional example 3.

EXAMPLE 11

The present example is an example related to the eighth embodiment stated above. Table 12 shows lens data.

TABLE 12

Example 11

$f_1 = 3.00$ mm, $m_1 = -1/7.0$
$NA_1 = 0.60$, $NA_2 = 0.45$
$dn_2/dT = -1.2 \times E-4$ (/° C.) at 632.8 nm, $\nu_d = 56.0$
$dn_3/dT = +0.8 \times E-6$ (/° C.) at 632.8 nm, $\nu_d = 55.3$

| ith surface | ri | DVD di (650 nm) | ni (650 nm) | CD di (780 nm) | ni (780 nm) | |
|---|---|---|---|---|---|---|
| 0 | | 26.225 | 1.0 | 26.225 | 1.0 | Emission point |

TABLE 12-continued

Example 11

| | | | | | | |
|---|---|---|---|---|---|---|
| 1 | ∞ | 0.0 | 1.0 | 0.0 | 1.0 | Aperture φ4.0 mm |
| 2 | 2.619 | 0.1 | 1.54112 | 0.1 | 1.53727 | |
| 2' | 2.654 | 0.101 | 1.54112 | 0.101 | 1.53727 | |
| 3 | 2.824 | 2.6 | 1.67424 | 2.0 | 1.66959 | |
| 4 | −4.928 | 1.788 | 1.0 | 1.429 | 1.0 | |
| 5 | ∞ | 0.6 | 1.577 | 1.2 | 1.570 | |
| 6 | ∞ | | | | | |

Aspherical data
2nd surface
(0 < h < 1.584 mm: Inside optically functional surface)
Aspherical coefficient

| κ | −4.6299 × E−0 | | |
|---|---|---|---|
| A1 | +2.0834 × E−2 | P1 | 4.0 |
| A2 | −5.7851 × E−3 | P2 | 6.0 |
| A3 | +9.6195 × E−4 | P3 | 8.0 |
| A4 | −1.2123 × E−4 | P4 | 10.0 |

Optical path difference function
(Coefficient of optical path difference function: Design basis wavelength 720 nm)

B2 +7.9637 × E−4
B4 −1.4993 × E−3
B6 −9.9900 × E−5
B8 +5.0721 × E−5
B10 −9.3677 × E−6

2'nd surface (1.584 mm < h: Outside optical surface area)
Aspherical coefficient

| κ | −4.8750 × E−0 | | |
|---|---|---|---|
| A1 | +2.2234 × E−2 | P1 | 4.0 |
| A2 | −5.7025 × E−3 | P2 | 6.0 |
| A3 | +9.4382 × E−4 | P3 | 8.0 |
| A4 | −1.2143 × E−4 | P4 | 10.0 |

Optical path difference function
(Coefficient of optical path difference function: Design basis wavelength 650 nm)

B2 −9.4134 × E−4
B4 −2.4877 × E−4
B6 −8.0210 × E−5
B8 −1.3836 × E−5
B10 +2.0287 × E−6

3rd surface Aspherical coefficient

| κ | −0.25997 × E−0 | | |
|---|---|---|---|
| A1 | −0.31934 × E−2 | P1 | 4.0 |
| A2 | −0.60892 × E−3 | P2 | 6.0 |
| A3 | −0.10705 × E−3 | P3 | 8.0 |
| A4 | −0.55001 × E−4 | P4 | 10.0 |

4th surface Aspherical coefficient

| κ | +0.15272 × E+0 | | |
|---|---|---|---|
| A1 | +0.84547 × E−2 | P1 | 4.0 |
| A2 | −0.32078 × E−2 | P2 | 6.0 |
| A3 | +0.16251 × E−3 | P3 | 8.0 |
| A4 | +0.10235 × E−4 | P4 | 10.0 |
| A5 | +0.30261 × E−5 | P5 | 12.0 |
| A6 | −0.64029 × E−6 | P6 | 14.0 |

Figure 48:
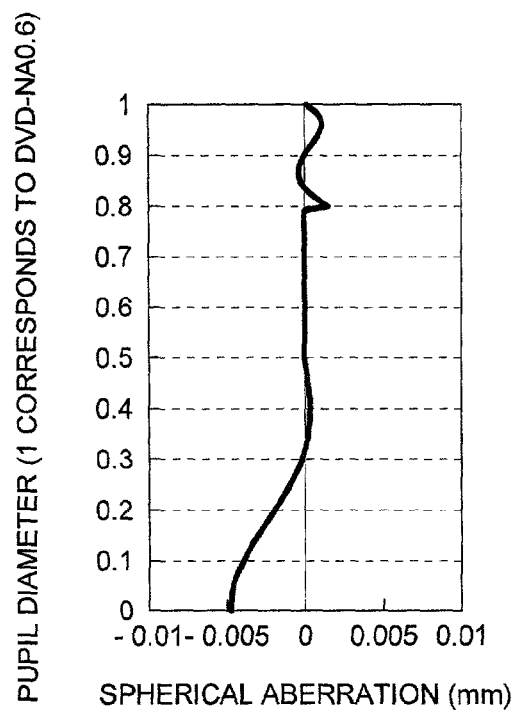
FIGS. 48(a) and 48(b) each is a spherical aberration diagram of an objective lens in Example 11.
Figure 48:
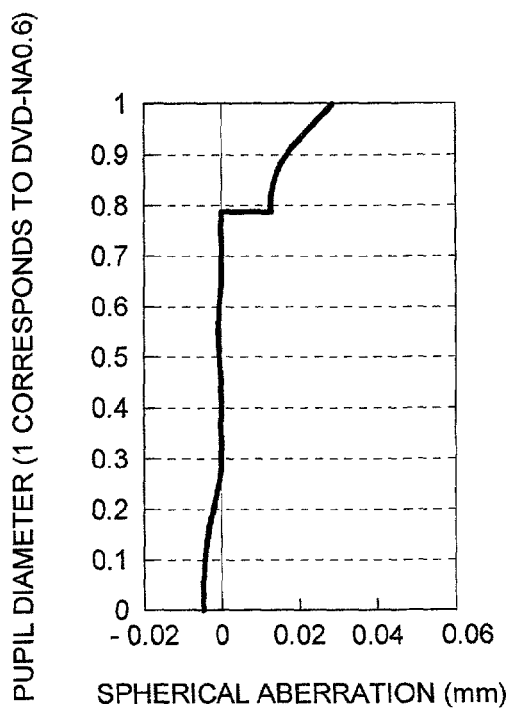
Figure 49:
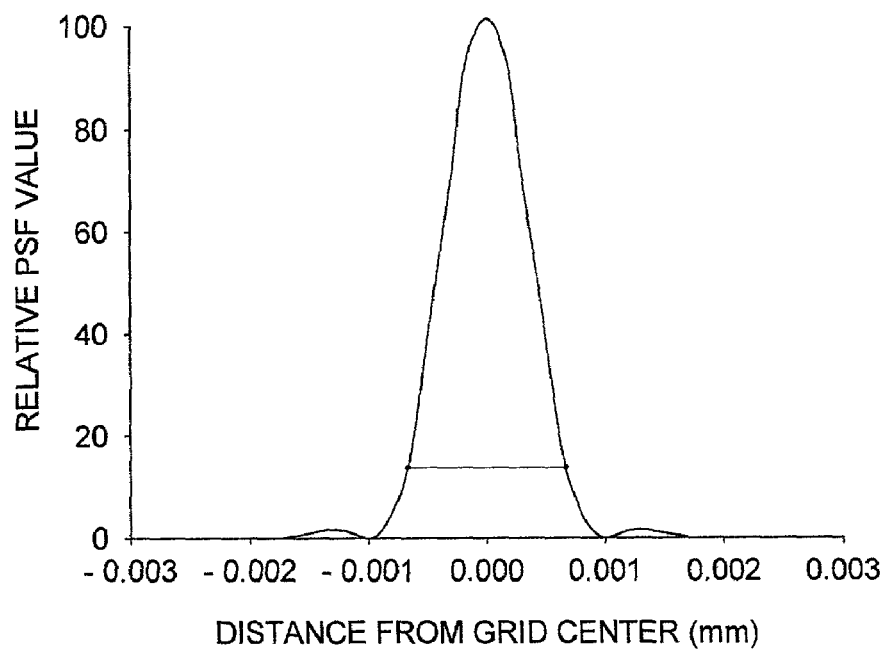
FIGS. 49(a) and 49(b) each shows a form of a spot on an information recording surface of an optical information recording medium for an objective lens in the Example 11.
Figure 49:
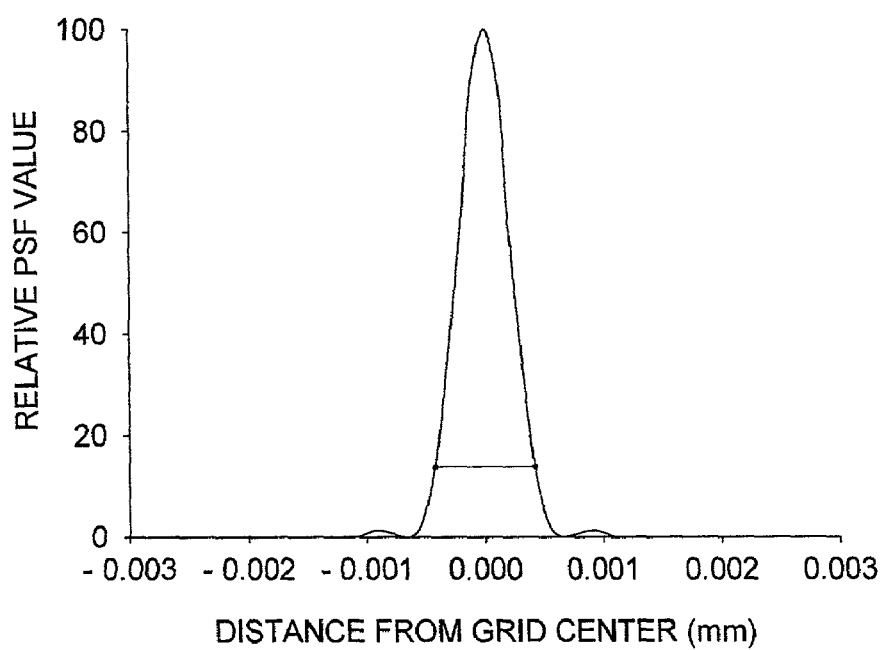

This is an example wherein a divergent light flux enters an objective lens. The objective lens is one wherein two optically functional surfaces each having a diffractive structure made of UV-setting resin are formed on the surface on one side of a glass lens. Refractive index temperature dependency of the resin itself is $-1.2 \times 10^{-4}$ (/° C.) which is the same as that in conventional example 2. However, it is possible to correct temperature characteristics of the total objective lens by weakening power of the resin portion and by using one wherein refractive index temperature dependency of a glass lens on the other side is as small as $+0.8 \times 10^{-6}$. Since an idea for forming two optically functional surfaces by providing a diffractive structure and a concept of design for aberration are the same as those in Example 9, explanation therefore will be omitted. FIG. 48 is a spherical aberration diagram of the present example, and a form of a spot on a recording surface of each optical information recording medium is shown in FIG. 49.

Table 14 shows error characteristics. As shown in this table, it is understood that an objective lens capable of being used for both DVD and CD improved in terms of error characteristics can be realized in an objective lens with specifications wherein lateral magnification m1 is $-\frac{1}{7}$ and NA is 0.65 and temperature characteristics are severe. It is also understood that the minimum value of a pitch of the ring-shaped diffractive zone is greater than that in Conventional example 3.

EXAMPLE 12

The present example is an example related to the eighth embodiment stated above. Table 13 shows lens data.

TABLE 13

Example 12 f1 = 3.00 mm, m1 = −1/10.0
NA1 = 0.60, NA2 = 0.45
dn2/dT = −5.8 × E−6 (/° C.) at 632.8 nm, νd = 81.6

| | | DVD | | CD | | |
|---|---|---|---|---|---|---|
| | | di | | di | | |
| ith surface | ri | (650 nm) | ni (650 nm) | di (780 nm) | ni (780 nm) | |
| 0 | | 32.5 | 1.0 | 32.5 | 1.0 | Emission point |
| 1 | ∞ | 0.0 | 1.0 | 0.0 | 1.0 | Aperture φ3.91 mm |
| 2 | 2.001 | 2.2 | 1.49529 | 2.2 | 1.49282 | |
| 2' | 1.959 | 2.205 | 1.49529 | 2.205 | 1.49282 | |
| 3 | −4.141 | 1.776 | 1.0 | 1.381 | 1.0 | |
| 4 | ∞ | 0.6 | 1.577 | 1.2 | 1.570 | |
| 5 | ∞ | | | | | |

Aspherical data
2nd surface
(0 < h < 1.37 mm: Inside optically functional surface)
Aspherical coefficient

| κ | −1.1326 × E−0 | | |
|---|---|---|---|
| A1 | +3.273 × E−3 | P1 | 4.0 |
| A2 | +6.2694 × E−4 | P2 | 6.0 |
| A3 | −4.4974 × E−5 | P3 | 8.0 |
| A4 | +2.8692 × E−5 | P4 | 10.0 |
| A5 | −2.5654 × E−5 | P5 | 12.0 |

Optical path difference function
(Coefficient of optical path difference function: Design basis wavelength 720 nm)

B2 +2.4918 × E−4
B4 −2.0024 × E−3
B6 −3.7862 × E−4
B8 +2.0983 × E−4
B10 −5.8311 × E−5

2'nd surface
(1.37 mm < h: Outside optical surface area)
Aspherical coefficient

| κ | −8.7077 × E−1 | | |
|---|---|---|---|
| A1 | +6.2127 × E−3 | P1 | 4.0 |
| A2 | +6.3107 × E−4 | P2 | 6.0 |
| A3 | +1.3601 × E−4 | P3 | 8.0 |

TABLE 13-continued

Example 12

| A4 | −2.5299 × E−5 | P4 | 10.0 |
| A5 | −8.0092 × E−6 | P5 | 12.0 |

Optical path difference function
(Coefficient of optical path difference function: Design basis wavelength 660 nm)

| | | | |
|---|---|---|---|
| B2 | −2.2736 × E−3 | | |
| B4 | −3.2476 × E−4 | | |
| B6 | −8.8656 × E−5 | | |
| B8 | −1.5681 × E−5 | | |
| B10 | +5.2484 × E−6 | | |

3rd surface Aspherical coefficient

| A1 | +0.20368 × E−1 | P1 | 4.0 |
| A2 | −0.48550 × E−2 | P2 | 6.0 |
| A3 | +0.72231 × E−3 | P3 | 8.0 |
| A4 | −0.97114 × E−4 | P4 | 10.0 |
| A5 | +0.78427 × E−5 | P5 | 12.0 |
| A6 | −0.94305 × E−8 | P6 | 14.0 |

Figure 51:
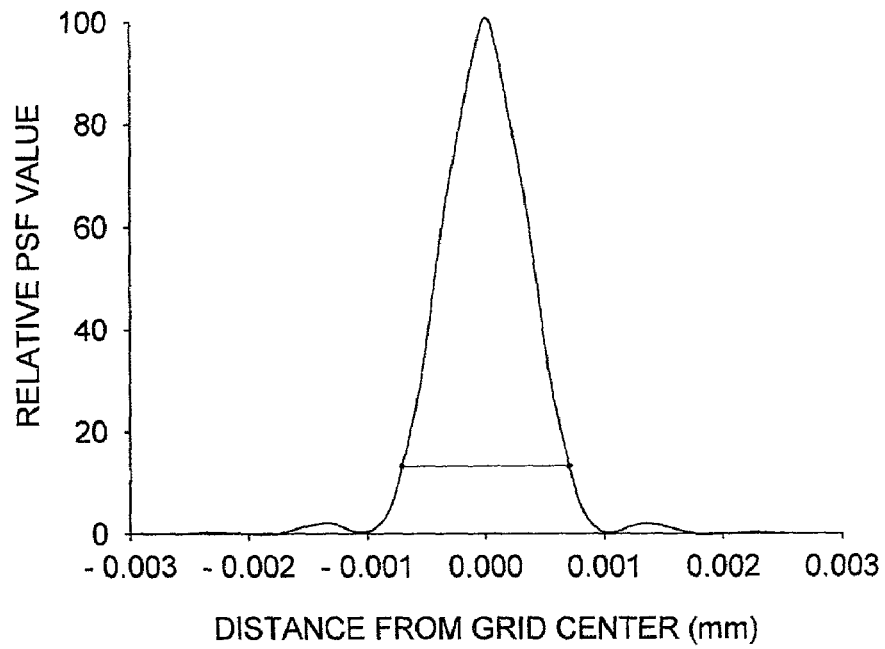
FIGS. 51(a) and 51(b) each shows a form of a spot on an information recording surface of an optical information recording medium for an objective lens in the Example 12.
Figure 51:
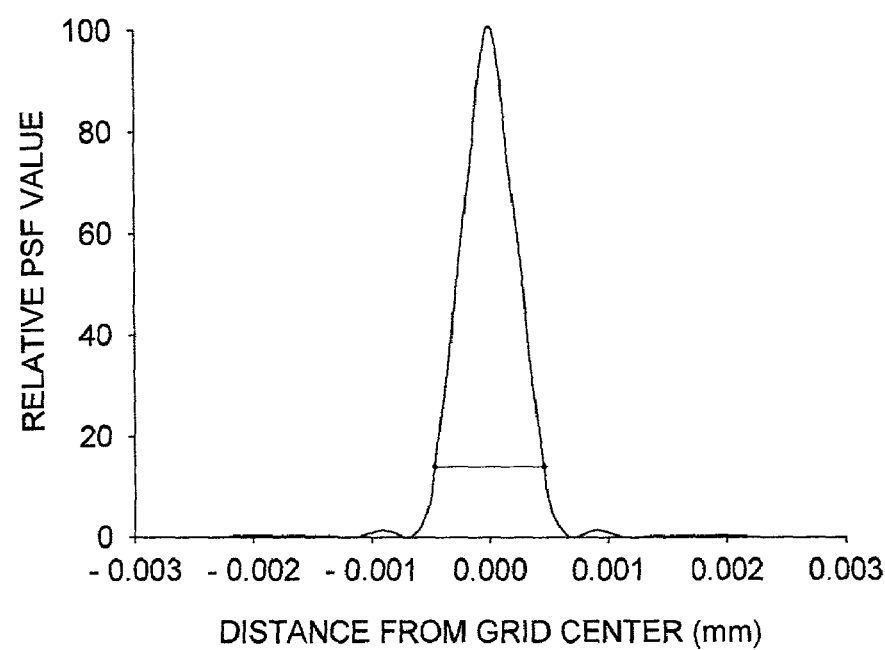
Figure 52:
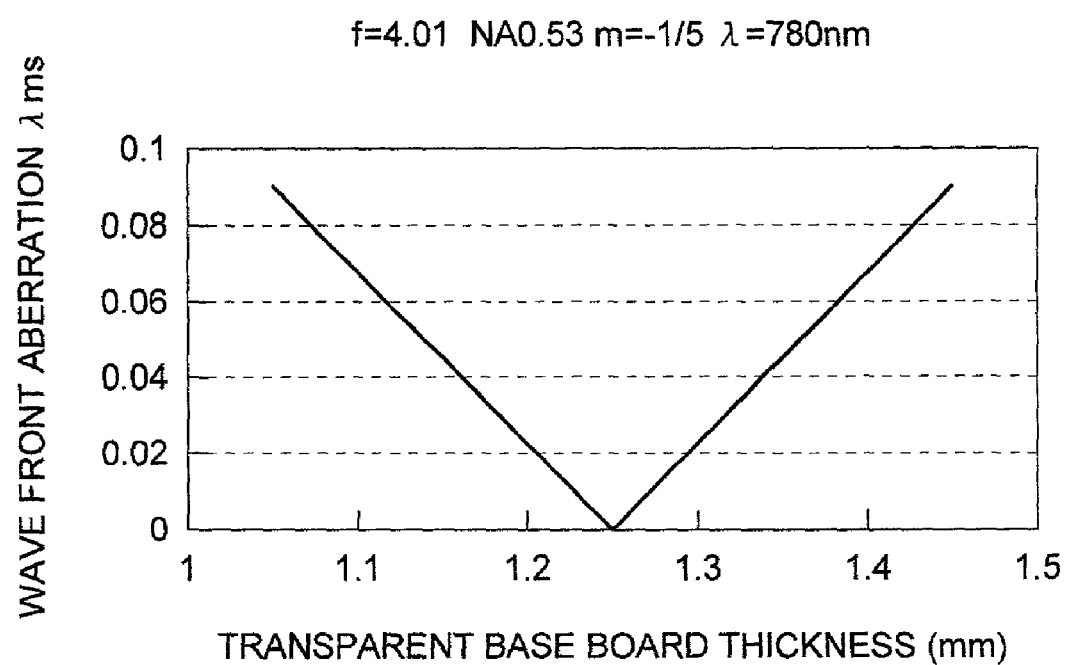
FIG. 52 is a diagram showing how residual aberration (spherical aberration) is generated when a thickness of a transparent base board is changed.

This is an example wherein a divergent light flux enters an objective lens. The objective lens wherein refractive index temperature dependency is $-5.8 \times 10^{-6}$ (/° C.) was used. Each of both sides of the objective lens is an aspheric surface, and a diffractive structure is provided solidly on the surface of the aspheric surface on one side as shown in FIG. 32, and two optically functional surfaces are arranged thereon. Since the design of aberration is the same as that in Example 3, it will be omitted. FIG. 50 is a spherical aberration diagram of the present example, and a form of a spot on a recording surface of each optical information recording medium is shown in FIG. 51.

Table 14 shows error characteristics. As shown in this table, it is understood that an objective lens capable of being used for both DVD and CD improved in terms of error characteristics can be realized in an objective lens wherein lateral magnification m1 is −1/7 and NA is 0.60. It is also understood that the minimum value of a pitch of the ring-shaped diffractive zone is greater than that in Conventional example 3.

In addition to the examples described above, it is also possible to constitute as follows. For example, an intermediate optically functional surface is made to be of a diffractive structure as illustrated in the ninth embodiment, and both sides of the intermediate optically functional surface are constituted with a refracting interface as shown in the seventh embodiment. In this case, the diffractive structure corrects spherical aberration of DVD, and it may be one which gives the same spherical aberration as in CD of the First embodiment, for CD. FIG. 36 shows a schematic sectional view of a lens, and FIG. 37 shows an example of spherical aberration.

It is further possible to provide a diffractive structure on the outside optically functional surface as mentioned in the tenth embodiment. In this case, correction of spherical aberration in DVD and control of flare amount in CD are possible. FIG. 38 shows a schematic sectional view of a lens, and FIG. 39 shows an example of spherical aberration.

Furthermore, it is naturally possible to improve focus characteristics on the CD side by providing a diaphragm with a structure that lowers a transmission factor or blocks for a light flux passing through the outside optically functional surface in the case of CD, or an antireflection coating.

The invention makes it possible to provide an objective lens and an optical pickup device wherein recording and reproducing for optical information recording media each having a different transparent base board thickness are made possible, by forming different optically functional surfaces on the objective lens while keeping temperature characteristics in the objective lens having specifications which make temperature characteristics to be strict.

What is claimed is:

1. An optical pickup apparatus, comprising:
    a light source; and
    a light converging optical system including an objective lens and for converging a light flux emitted from the light source onto an information recording surface of an optical information recording medium;
    wherein the optical pickup apparatus records and/or reproduces information for a first recording medium including a first transparent base board having a thickness t1 and a second recording medium including a second transparent base board having a thickness t2 (t1<t2);
    wherein the objective lens is a plastic lens,
    wherein when the information is recorded for or reproduced from the first or second optical information recording medium, the objective lens converges a divergent light flux emitted from the light source onto an information recording surface of the first or second optical information recording medium; and
    wherein at least one surface of the objective lens is provided with a diffractive structure on at least a peripheral region within an effective diameter; and
    wherein the diffractive structure on the peripheral region of the objective lens is ring-shaped diffractive zones, and when $n^{th}$ order light ray represents a diffractive ray with a maximum amount of light generated by the diffractive structure from a light flux passing through the diffractive structure on the peripheral region among light fluxes emitted from the light source, an average pitch Pout of the ring-shaped diffractive zones and a focal length of the objective lens f satisfy the following conditional formula:

$$2.00 \times 10^{-4} < Pout/(|n| \cdot f) < 3.00 \times 10^{-2}.$$

2. The optical pickup apparatus of claim 1, wherein the following conditional formula is satisfied:

$$|\delta SA_1/\delta U| \cdot |\delta U| + |\delta SA_2/\delta T| \cdot |T| < 0.07 \, \lambda rms$$

where λ represents a wavelength of the light source, $\delta SA_1/\delta U$ represents a change of spherical aberration for an object-to-image distance change δU ($|\delta U| < 0.5$ mm) and $\delta SA_2/\delta T$ represents a change of spherical aberration for a temperature change δT ($|\delta T| < 30°$ C.).

3. The optical pickup apparatus of claim 1, wherein the following conditional formula is satisfied when $\delta SA_1/\delta T$ represents a change of spherical aberration for temperature change δT in a light flux which has passed the diffractive structure on the peripheral region among light fluxes emitted from the light source:

$$|\delta SA_1/\delta T| < 0.002 \, \lambda rms/° C.$$

4. The optical pickup apparatus of claim 3, wherein the following conditional formula is satisfied:

$$|\delta SA_1/\delta T| < 0.002 \, \lambda rms/° C.$$

5. The optical pickup apparatus of claim 1, wherein the average pitch Pout of the ring-shaped diffractive zones satisfies the following conditional formula:

$$1.00 \times 10^{-3} = Pout/(|n| \cdot f) < 3.00 \times 10^{-3}.$$

6. The optical pickup apparatus of claim 1, wherein the average pitch Pout of the ring-shaped diffractive zone satisfies the following conditional formula:

$$3.00\times10^{-3}<Pout/(|n|\cdot f)<8.00\times10^{-3}.$$

7. The optical pickup apparatus of claim 1, wherein the optical surface of the objective lens comprises two or more kinds of optical surface regions arranged in the direction perpendicular to an optical axis, and when the two kinds of optical surface regions are represented by an optical surface region and the peripheral region.

8. The optical pickup apparatus of claim 7, wherein the optical surface region closer to the outside has a function to correct spherical aberration when recording or reproducing information for the first optical information recording medium.

9. The optical pickup apparatus of claim 7, wherein the optical surface region closer to the optical axis has a function to correct spherical aberration for thickness t ($t_1<t<t_2$) of a transparent base board.

10. The optical pickup apparatus of claim 9, wherein when recording or reproducing information for the second optical information recording medium, the following conditional formula is satisfied under the assumption that the optical surface region closer to the optical axis is formed within a range of the shortest distance NAH mm from the optical axis, when a necessary numerical aperture is represented by $NA_2$ and a focal length of the objective lens is represented by $f_2$:

$$(NA_2-0.03)f_2<NAH<(NA_2+0.03)f_2.$$

11. The optical pickup apparatus of claim 7, wherein the optical surface region closer to the light source has a function to make a spherical aberration to be under for the light flux passing through the optical surface region closer to the optical axis when recording or reproducing information for the first optical information recording medium and a function to make a spherical aberration to be over for the light flux passing through the optical surface region closer to the optical axis when recording or reproducing information for the second optical information recording medium.

12. The optical pickup apparatus of claim 1, wherein the following conditional formula is satisfied by image forming magnification m1 of the objective lens in conducting recording or reproduction of information for the first optical information recording medium:

$$-\frac{1}{2}<m1<-\frac{1}{7.5}.$$

13. The optical pickup apparatus of claim 12, wherein image forming magnification m2 of the objective lens in conducting recording or reproduction of information for the second optical information recording medium is nearly the same as m1.

14. The optical pickup apparatus of claim 1, wherein the light source includes a first light source to emit a light flux having a wavelength λ1 and a second light source to emit a light flux having a wavelength λ2;

wherein the light converging optical system converges a light flux emitted from the first and second light sources onto an information recording surface of an optical information recording medium;

wherein the optical pickup apparatus records and/or reproduces information for the first recording medium by using the first light source and the light converging optical system, and the optical pickup apparatus records and/or reproduces information for the second recording medium by using the second light source and the light converging optical system;

wherein when the information is recorded for or reproduced from the first optical information recording medium, the objective lens converges a divergent light flux emitted from the first light source onto the first optical information recording medium and the following conditional formula is satisfied:

$$|\delta SA_3/\delta U|\cdot|\delta U|+|\delta SA_4/\delta T|\cdot|\delta T|<0.07\ \lambda 1\ \text{rms}$$

where $\delta SA_3/\delta U$ represents a change of spherical aberration for object-to-image distance change $\delta U$ ($|\delta U|<0.5$ mm) and $\delta SA_4/\delta T$ represents a change of spherical aberration for temperature change $\delta T$ ($|\delta T|<30°$ C.) when the information is recorded for or reproduced from the first optical information recording medium; and wherein when the information is recorded for or reproduced from the second optical information recording medium, the objective lens converges a divergent light flux emitted from the second light source onto the second optical information recording medium and the following conditional formula is satisfied:

$$|\delta SA_5/\delta U|\cdot|U|+|\delta SA_6/\delta T|\cdot|\delta T|<0.07\ \lambda 2\ \text{rms}$$

where $\delta SA_5/\delta U$ represents a change of spherical aberration for object-to-image distance change $6U$ ($|\delta U|<0.5$ mm) and $\delta SA_6/\delta T$ represents a change of spherical aberration for temperature change $\delta T$ ($|\delta T|<30+$ C.) when the information is recorded for or reproduced from the second optical information recording medium.

15. The optical pickup apparatus of claim 14, wherein the following conditional formula is satisfied when $\delta SA_1/\delta T$ represents a change of spherical aberration for temperature change $\delta T$ in a light flux which has passed the diffractive structure on the peripheral region among light fluxes emitted from the first light source:

$$|\delta SA_1/\delta T|<0.002\ \lambda\text{rms}/°\ \text{C}.$$

16. The optical pickup apparatus of claim 15, wherein the following conditional formula is satisfied:

$$|\delta SA_1/\delta T|<0.0005\ \lambda\text{rms}/°\ \text{C}.$$

17. The optical pickup apparatus of claim 14, wherein the average pitch Pout of the ring-shaped diffractive zone satisfies the following conditional formula:

$$1.00\times10^{-3}<Pout/(|n|\cdot f)<3.00\times10^{-3}.$$

18. The optical pickup apparatus of claim 14, wherein the average pitch Pout of the ring-shaped diffractive zone satisfies the following conditional formula:

$$3.00\times10^{-3}<Pout/(|n|\cdot f)<8.00\times10^{-3}.$$

19. The optical pickup apparatus of claim 14, wherein the optical surface of the objective lens comprises three or more kinds of optical surface regions arranged in the direction perpendicular to an optical axis, and when the three or more kinds of optical surface regions are represented by an optical surface region closer to the optical axis, an intermediate optical surface region and an optical surface region closer to the outside, all arranged in this order from the optical axis side, the optical surface region closer to the outside is the region on the peripheral side.

20. The optical pickup apparatus of claim 19, wherein spherical aberration is discontinuous in at least one of a boundary between the optical surface region closer to the optical axis and the intermediate optical surface and a boundary between the intermediate optical surface region and the optical surface region closer to the outside.

21. The optical pickup apparatus of claim 19, wherein a diffractive section where ring-shaped diffractive zones are formed on the optical surface region closer to the optical axis, and average pitch Pin of the ring-shaped diffractive zones satisfies the following conditional formula, when $n^{th}$ order light ray represents a diffracted light ray with a maximum amount of light generated by the diffractive structure from a light flux passing through the diffractive structure on the optical surface region closer to the second light source among light fluxes emitted from the second light source, and f represents a focal length of the objective lens:

$$3.00\times10^{-3}<Pin/(|n|\cdot f)<8.0\times10^{-2}.$$

22. The optical pickup apparatus of claim 19, wherein the optical surface region closer to the outside has a function to correct spherical aberration when recording or reproducing information for the first optical information recording medium.

23. The optical pickup apparatus of claim 19, wherein when recording or reproducing information for the first optical information recording medium, spherical aberration of the light flux passing through the intermediate optical surface region is made to be discontinuous and to be flare component, for spherical aberration of the light flux passing through the optical surface region closer to the outside, while when recording or reproducing information for the second optical information recording medium, the light flux passing through the intermediate optical surface region is used.

24. The optical pickup apparatus of claim 19, wherein the intermediate optical surface region has a function to correct spherical aberration for thickness t ($t_1<t<t_2$) of a transparent base board.

25. The optical pickup apparatus of claim 19, wherein when recording or reproducing information for the first optical information recording medium, a light flux passing mainly through the optical surface region closer to the optical axis and the optical surface region closer to the outside is used, while when recording or reproducing information for the second optical information recording medium, a light flux passing mainly through the optical surface region closer to the optical axis and the intermediate optical surface region is used.

26. The optical pickup apparatus of claim 19, wherein when recording or reproducing information for the second optical information recording medium, the following conditional formulas are satisfied under the assumption that the intermediate optical surface region is formed within a range from the shortest distance from an optical axis NAH mm to NAL mm when a necessary numerical aperture is represented by $NA_2$ and a focal length of the objective lens is represented by $f_2$:

$$(NA_2-0.03)f_2<NAH<(NA_2+0.03)f_2$$

$$(NA_2-0.20)f_2<NAL<(NA_2-0.04)f_2.$$

27. The optical pickup apparatus of claim 19, wherein when recording or reproducing information for the first optical information recording medium, the optical pickup apparatus has a function to make the spherical aberration to be under for the light flux passing through the intermediate optical surface region.

28. The optical pickup apparatus of claim 19, wherein the optical surface region closer to the optical axis has a function to correct spherical aberration when recording or reproducing information for the first optical information recording medium.

29. The optical pickup apparatus of claim 19, wherein the optical surface region closer to the optical axis has a function to correct temperature characteristics when recording or reproducing information for the first optical information recording medium.

30. The optical pickup apparatus of claim 14, wherein the optical surface of the objective lens comprises two or more kinds of optical surface regions arranged in the direction perpendicular to an optical axis, and when the two kinds of optical surface regions are represented by an optical surface region closer to the optical axis and an optical surface region closer to the outside, the optical surface region closer to the outside is the region on the peripheral side.

31. The optical pickup apparatus of claim 30, wherein a diffractive section where ring-shaped diffractive zones are formed on the optical surface region closer to the optical axis, average pitch Pin of the ring-shaped diffractive zones satisfies the following conditional formula, when $n_o$, order light ray represents a diffracted light ray with a maximum amount of light generated by the diffractive structure from a light flux passing through the diffractive structure on the optical surface region closer to the second light source among light fluxes emitted from the second light source, and f represents a focal length of the objective lens:

$$3.00\times10^{-3}<Pin/(|n|\cdot f)<8.0\times10^{-2}.$$

32. The optical pickup apparatus of claim 30, wherein the optical surface region closer to the outside has a function to correct spherical aberration when recording or reproducing information for the first optical information recording medium.

33. The optical pickup apparatus of claim 30, wherein the optical surface region closer to the optical axis has a function to correct spherical aberration for thickness t ($t_1<t<t_2$) of a transparent base board.

34. The optical pickup apparatus of claim 33, wherein when recording or reproducing information for the second optical information recording medium, the following conditional formula is satisfied under the assumption that the optical surface region closer to the optical axis is formed within a range of the shortest distance NAH mm from the optical axis, when a necessary numerical aperture is represented by $NA_2$ and a focal length of the objective lens is represented by $f_2$:

$$(NA_2-0.03)f_2<NAH<(NA_2+0.03)f_2.$$

35. The optical pickup apparatus of claim 30, wherein the optical surface region closer to the optical axis has a function to correct spherical aberration for a light flux passing through that optical surface region when recording or reproducing information for the second optical information recording medium, while the optical surface region closer to the outside has a function to make the light flux passing through that optical surface region to be a flare component when recording or reproducing information for the second optical information recording medium.

36. The optical pickup apparatus of claim 14, wherein the following conditional formula is satisfied by image forming magnification m1 of the objective lens in conducting recording or reproduction of information for the first optical information recording medium:

$$-\tfrac{1}{2}<m1<-\tfrac{1}{7.5}.$$

37. The optical pickup apparatus of claim 36, wherein image forming magnification m2 of the objective lens in conducting recording or reproduction of information for the second optical information recording medium is nearly the same as m1.

38. An optical pickup apparatus, comprising:
a light source; and
a light converging optical system including an objective lens and for converging a light flux emitted from the light source onto an information recording surface of an optical information recording medium;
wherein the optical pickup apparatus records and/or reproduces information for a first recording medium including a first transparent base board having a thickness t1 and a second recording medium including a second transparent base board having a thickness t2 (t1<t2);
wherein the objective lens is a plastic lens
wherein when the information is recorded for or reproduced from the first or second optical information recording medium, the objective lens converges a divergent light flux emitted from the light source onto an information recording surface of the first or second optical information recording medium;
wherein a diffractive section where ring-shaped diffractive zones are formed on an optical surface region closer to the optical axis, and average pitch Pin of the ring-shaped diffractive zones satisfies the following conditional formula, wherein n-th order light ray represents a diffracted light ray with a maximum amount of light generated by the diffractive structure from a light flux passing through the diffractive structure on the optical surface region closer to the light source among light fluxes emitted from the light source, and f represents a focal length of the objective lens:

$3.00 \times 10^{-3} < Pin/(|n| \cdot f) < 8.0 \times 10^{-2}$.

39. The optical pickup apparatus of claim 38, wherein the optical surface of the objective lens comprises three or more kinds of optical surface regions arranged in the direction perpendicular to an optical axis, and when the three or more kinds of optical surface regions are represented by the optical surface region closer to the optical axis, an intermediate optical surface region and an optical surface region closer to the outside, all arranged in this order from the optical axis side, the optical surface region closer to the outside is the peripheral region.

40. The optical pickup apparatus of claim 39, wherein spherical aberration is discontinuous in at least one of a boundary between the optical surface region closer to the optical axis and the intermediate optical surface and a boundary between the intermediate optical surface region and the optical surface region closer to the outside.

41. The optical pickup apparatus of claim 39, wherein the optical surface region closer to the outside has a function to correct spherical aberration when recording or reproducing information for the first optical information recording medium.

42. The optical pickup apparatus of claim 39, wherein when recording or reproducing information for the first optical information recording medium, spherical aberration of the light flux passing through the intermediate optical surface region is made to be discontinuous and to be flare component, for spherical aberration of the light flux passing through the optical surface region closer to the outside, while when recording or reproducing information for the second optical information recording medium, the light flux passing through the intermediate optical surface region is used.

43. The optical pickup apparatus of claim 39, wherein the intermediate optical surface region has a function to correct spherical aberration for thickness t ($t_1 < t < t_2$) of a transparent base board.

44. The optical pickup apparatus of claim 39, wherein when recording or reproducing information for the first optical information recording medium, a light flux passing mainly through the optical surface region closer to the optical axis and the optical surface region closer to the outside is used, while when recording or reproducing information for the second optical information recording medium, a light flux passing mainly through the optical surface region closer to the optical axis and the intermediate optical surface region is used.

45. The optical pickup apparatus of claim 39, wherein when recording or reproducing information for the second optical information recording medium, the following conditional formulas are satisfied under the assumption that the intermediate optical surface region is formed within a range from the shortest distance from an optical axis NAH mm to NAL mm when a necessary numerical aperture is represented by $NA_2$ and a focal length of the objective lens is represented by $f_2$:

$(NA_2 - 0.03)f_2 < NAH < (NA_2 + 0.03)f_2$ $(NA_2 - 0.20)f_2 < NAL < (NA_2 - 0.04)f_2$.

46. The optical pickup apparatus of claim 39, wherein when recording or reproducing information for the first optical information recording medium, the optical pickup apparatus has a function to make the spherical aberration to be under for the light flux passing through the intermediate optical surface region.

47. The optical pickup apparatus of claim 39, wherein the optical surface region closer to the optical axis has a function to correct spherical aberration when recording or reproducing information for the first optical information recording medium.

48. The optical pickup apparatus of claim 39, wherein the optical surface region closer to the optical axis has a function to correct temperature characteristics when recording or reproducing information for the first optical information recording medium.

49. The optical pickup apparatus of claim 38, wherein the optical surface of the objective lens comprises two or more kinds of optical surface regions arranged in the direction perpendicular to an optical axis, and when the two kinds of optical surface regions are represented by an optical surface region closer to the optical axis and an optical surface region closer to the outside, the optical surface region closer to the outside is the region on the peripheral side.

50. An objective lens for use in an optical pickup apparatus having a light source and a light converging optical system including the objective lens, wherein the optical pickup apparatus can record and/or reproduce information for a first recording medium including a first transparent base board having a thickness t1 and a second recording medium including a second transparent base board having a thickness t2 (t1<t2); comprising:
a diffractive structure on at least a peripheral region within an effective diameter of at least one surface;
wherein the objective lens is a plastic lens,
wherein the objective lens converges a divergent light flux emitted from the light source onto an information recording surface of the first or second optical information recording medium; and wherein the diffractive structure on the peripheral region of the objective lens is a ring-shaped diffractive zone, and an average pitch Pout of the ring-shaped diffractive zones satisfy the following conditional formula, when $n^{th}$ order light ray represents a diffractive ray with the greatest amount of light generated by the diffractive structure and by a light flux passing through the diffractive structure on the peripheral region of the objective lens among light fluxes emitted from the light source, and f represents a focal length of the objective lens:

$2.00 \times 10^{-4} < Pout/(|n| \cdot f) < 3.00 \times 10^{-2}$.

51. The objective lens of claim 50, wherein the following conditional formula is satisfied when $\delta SA_1/\delta T$ represents a change in spherical aberration for temperature change $\delta T$ in a light flux which has passed the diffractive structure on the peripheral region among light fluxes emitted from the light source:

$|\delta SA_1/\delta T| < 0.002$ λrms/° C.

52. The objective lens of claim 51, wherein the following conditional formula is satisfied:

$|\delta SA_1/T| < 0.0005$ λrms/° C.

53. The objective lens of claim 52, wherein average pitch Pout of the ring-shaped diffractive zone satisfies the following conditional formula:

$1.00 \times 10^{-3} < Pout/(|n| \cdot f) < 3.00 \times 10^{-3}$.

54. The objective lens of claim 52, wherein average pitch Pout of the ring-shaped diffractive zone satisfies the following conditional formula:

$3.00 \times 10^{-3} < Pout/(|n| \cdot f) < 8.00 \times 10^{-3}$.

55. The objective lens of claim 50, wherein the optical surface of the objective lens comprises two or more kinds of optical surface regions arranged in the direction perpendicular to an optical axis, and when the two kinds of optical surface regions are represented by an optical surface region closer to the optical axis and the peripheral region.

56. The objective lens of claim 55, wherein the optical surface region closer to the outside has a function to correct spherical aberration when recording or reproducing information for the first optical information recording medium.

57. The objective lens of claim 55, wherein the optical surface region closer to the optical axis has a function to correct spherical aberration for thickness t ($t_1 < t < t_2$) of a transparent base board.

58. The objective lens of claim 57, wherein when recording or reproducing information for the second optical information recording medium, the following conditional formula is satisfied under the assumption that the optical surface region closer to the optical axis is formed within a range of the shortest distance NAH mm from the optical axis, when a necessary numerical aperture is represented by $NA_2$ and a focal length of the objective lens is represented by $f_2$:

$(NA_2 - 0.03) f_2 < NAH < (NA_2 + 0.03) f_2$.

59. The objective lens of claim 55, wherein when recording or reproducing information for the first optical information recording medium, the optical surface region closer to the optical axis makes a light flux passing through the optical surface region closer to the optical axis to have under spherical aberration, and when recording or reproducing information for the second optical information recording medium, the optical surface region closer to the optical axis makes a light flux passing through the optical surface region closer to the optical axis to have over spherical aberration.

60. The objective lens of claim 50, wherein a diffractive section where ring-shaped diffractive zones are formed on an optical surface region closer to the optical axis, average pitch Pin of the ring-shaped diffractive zones satisfies the following conditional formula, when $n^{th}$ order light ray represents a diffracted light ray with a maximum amount of light generated by the diffractive structure from a light flux passing through the diffractive structure on the optical surface region closer to the light source among light fluxes emitted from the light source, and f represents a focal length of the objective lens:

$3.00 \times 10^{-3} < Pin/(|n| \cdot f) < 8.0 \times 10^{-2}$.

61. The objective lens of claim 50, wherein the following conditional formula is satisfied by image forming magnification m1 of the objective lens in conducting recording or reproduction of information for the first optical information recording medium:

$-1/2 < m1 < 1/7.5$.

62. The objective lens of claim 61, wherein image forming magnification m2 of the objective lens in conducting recording or reproduction of information for the second optical information recording medium is nearly the same as m1.

63. The objective lens of claim 50, wherein the optical pickup apparatus having first and second light sources to emit a light flux having a different wavelength from each other and a light converging optical system including the objective lens;

wherein the optical pickup apparatus records and/or reproduces information for a first recording medium by using the first light source and the light converging optical system; and the optical pickup apparatus records and/or reproduces information for a second recording medium by using the second light source and the light converging optical system;

wherein the following conditional formula is satisfied when $\delta SA_1/\delta T$ represents a change in spherical aberration for temperature change $\delta T$ in a light flux which has passed the diffractive structure on the peripheral region among light fluxes emitted from the light source, and λ1 represents a wavelength of the first light source:

$|\delta SA_1/\delta T| < 0.002$ λrms/° C.

64. The objective lens of claim 63, wherein the following conditional formula is satisfied:

$|\delta SA_1/\delta T| < 0.0005$ λrms/° C.

65. The objective lens of claim 63, wherein average pitch Pout of the ring-shaped diffractive zone satisfies the following conditional formula:

$1.00 \times 10^{-3} < Pout/(|n| \cdot f) < 3.00 \times 10^{-3}$.

66. The objective lens of claim 63, wherein average pitch Pout of the ring-shaped diffractive zone satisfies the following conditional formula:

$3.00 \times 10^{-3} < Pout/(|n| \cdot f) < 8.00 \times 10^{-3}$.

67. The objective lens of claim 63, wherein the optical surface of the objective lens comprises two or more kinds of optical surface regions arranged in the direction perpendicular to an optical axis, and when the two kinds of optical surface regions are represented by an optical surface region closer to the optical axis and an optical surface region closer to the outside, the optical surface region closer to the outside is the region on the peripheral side.

68. The objective lens of claim 67, wherein a diffractive section where ring-shaped diffractive zones are formed on the optical surface region closer to the optical axis, average pitch Pin of the ring-shaped diffractive zones satisfies the following conditional formula, when n-th order light ray represents a diffracted light ray with a maximum amount of light generated by the diffractive structure from a light flux passing through the diffractive structure on the optical surface region closer to the second light source among light fluxes emitted from the second light source, and f represents a focal length of the objective lens:

$$3.00 \times 10^{-3} < Pin/(|n| \cdot f) < b8.0 \times 10^{-2}.$$

69. The objective lens of claim 67, wherein the optical surface region closer to the outside has a function to correct spherical aberration when recording or reproducing information for the first optical information recording medium.

70. The objective lens of claim 67, wherein the optical surface region closer to the optical axis has a function to correct spherical aberration for thickness $t_1$ of a transparent base board.

71. The objective lens of claim 70, wherein when recording or reproducing information for the second optical information recording medium, the following conditional formula is satisfied under the assumption that the optical surface region closer to the optical axis is formed within a range of the shortest distance NAH mm from the optical axis, when a necessary numerical aperture is represented by $NA_2$ and a focal length of the objective lens is represented by $f_2$:

$$(NA_2-0.03)f_2 < NAH < (NA_2+0.03)f_2.$$

72. The objective lens of claim 67, wherein when recording or reproducing information for the second optical information recording medium, the optical surface region closer to the optical axis has a function to correct spherical aberration for the light flux passing through that optical surface region, while when recording or reproducing information for the second optical information recording medium, the optical surface region closer to the outside has a function to make the light flux passing through that optical surface to be flare components.

73. The objective lens of claim 63, wherein the following conditional formula is satisfied by image forming magnification m1 of the objective lens in conducting recording or reproduction of information for the first optical information recording medium:

$$-\tfrac{1}{2} < m1 < -\tfrac{1}{7.5}.$$

74. The objective lens of claim 73, wherein image forming magnification m2 of the objective lens in conducting recording or reproduction of information for the second optical information recording medium is nearly the same as m1.

75. An optical pickup apparatus, comprising: an objective lens described in claim 63.

76. The objective lens of claim 50, comprising:
two kinds of regions toward a peripheral region from an optical axis within an effective diameter of at least one surface;
wherein an inner side region for the peripheral region has a function to correct a spherical aberration when recording or reproducing information for the second optical information recording medium.

77. The objective lens of claim 76, wherein the following conditional formula is satisfied when $\delta SA_1/\delta T$ represents a change in spherical aberration for temperature change $\delta T$ in a light flux which has passed the diffractive structure on the peripheral region among light fluxes emitted from the light source:

$$|\delta SA_1/\delta T| < 0.002 \text{ } \lambda\text{rms}/^\circ\text{ C.}$$

78. The objective lens of claim 77, wherein the following conditional formula is satisfied:

$$|\delta SA_1/\delta T| < 0.0005 \text{ } \lambda\text{rms}/^\circ\text{ C.}$$

79. The objective lens of claim 76, wherein average pitch Pout of the ring-shaped diffractive zone satisfies the following conditional formula:

$$1.00 \times 10^{-3} < Pout/(|n| \cdot f) < 3.00 \times 10^{-3}.$$

80. The objective lens of claim 76, wherein average pitch Pout of the ring-shaped diffractive zone satisfies the following conditional formula:

$$3.00 \times 10^{-3} < Pout/(|n| \cdot f) < 8.00 \times 10^{-3}.$$

81. The objective lens of claim 76, wherein the optical surface of the objective lens comprises two or more kinds of optical surface regions arranged in the direction perpendicular to an optical axis, and when the two kinds of optical surface regions are represented by an optical surface region closer to the optical axis and the peripheral region.

82. The objective lens of claim 81, wherein the optical surface region closer to the outside has a function to correct spherical aberration when recording or reproducing information for the first optical information recording medium.

83. The objective lens of claim 81, wherein the optical surface region closer to the optical axis has a function to correct spherical aberration for thickness t ($t_1 < t < t_2$) of a transparent base board.

84. The objective lens of claim 83, wherein when recording or reproducing information for the first optical information recording medium, the optical surface region closer to the optical axis makes a light flux passing through the optical surface region closer to the optical axis to have under spherical aberration, and when recording or reproducing information for the second optical information recording medium, the optical surface region closer to the optical axis makes a light flux passing through the optical surface region closer to the optical axis to have over spherical aberration.

85. The objective lens of claim 81, wherein when recording or reproducing information for the first optical information recording medium, the optical surface region closer to the optical axis makes a light flux passing through the optical surface region closer to the optical axis to have under spherical aberration, and when recording or reproducing information for the second optical information recording medium, the optical surface region closer to the optical axis makes a light flux passing through the optical surface region closer to the optical axis to have over spherical aberration.

86. The objective lens of claim 76, wherein a diffractive section where ring-shaped diffractive zones are formed on an optical surface region closer to the optical axis, and average pitch Pin of the ring-shaped diffractive zones satisfies the following conditional formula, when $n^{th}$ order light ray represents a diffracted light ray with the greatest amount of light generated by the diffractive structure from a light flux passing through the diffractive structure on the optical surface region closer to the light source among light fluxes emitted from the light source, and f represents a focal length of the objective lens:

$$3.00\times10^{-3}<Pin/(|n|\cdot f)<8.00\times10^{-2}.$$

87. The objective lens of claim 86, wherein the optical pickup apparatus having first and second light sources to emit a light flux having a different wavelength from each other and a light converging optical system including the objective lens,
   wherein the optical pickup apparatus records and/or reproduces information for a first recording medium by using the first light source and the light converging optical system; and the optical pickup apparatus records and/or reproduces information for a second recording medium by using the second light source and the light converging optical system;
   wherein the following conditional formula is satisfied when $\delta SA_1/\delta T$ represents a change in spherical aberration for temperature change $\delta T$ in a light flux passing through the diffractive structure on the peripheral region among light fluxes emitted from the light source, and $\lambda 1$ represents a wavelength of the first light source:

$$|\delta SA_1/\delta T|<0.002\ \lambda 1\ \text{rms}/^\circ\ C.$$

88. The objective lens of claim 76, wherein the following conditional formula is satisfied by image forming magnification m1 of the objective lens in conducting recording or reproduction of information for the first optical information recording medium:

$$-\tfrac{1}{2}<m1<-\tfrac{1}{7.5}.$$

89. The objective lens of claim 88, wherein image forming magnification m2 of the objective lens in conducting recording or reproduction of information for the second optical information recording medium is nearly the same as m1.

90. The objective lens of claim 76, wherein the optical pickup apparatus having first and second light sources to emit a light flux having a different wavelength from each other and a light converging optical system including the objective lens,
   wherein the optical pickup apparatus records and/or reproduces information for a first recording medium by using the first light source and the light converging optical system; and the optical pickup apparatus records and/or reproduces information for a second recording medium by using the second light source and the light converging optical system;
   wherein the following conditional formula is satisfied when $\delta SA_1/\delta T$ represents a change in spherical aberration for temperature change $\delta T$ in a light flux passing through the diffractive structure on the peripheral region among light fluxes emitted from the light source, and $\lambda 1$ represents a wavelength of the first light source:

$$|\delta SA_1/\delta T|<0.002\ \lambda 1\ \text{rms}/^\circ\ C.$$

91. The objective lens of claim 90, the following conditional formula is satisfied:

$$|\delta SA_1/\delta T|<0.0005\ \lambda \text{rms}/^\circ\ C.$$

92. The objective lens of claim 90, wherein average pitch Pout of the ring-shaped diffractive zone mentioned above satisfies the following conditional formula:

$$1.00\times10^{-3}<Pout/(|n|\cdot f)<3.00\times10^{-3}.$$

93. The objective lens of claim 90, wherein average pitch Pout of the ring-shaped diffractive zone satisfies the following conditional formula:

$$3.00\times10^{-3}<Pout/(|n|\cdot f)<8.00\times10^{-3}.$$

94. The objective lens of claim 87, wherein the optical surface of the objective lens comprises three or more kinds of optical surface regions arranged in the direction perpendicular to an optical axis, and when the three or more kinds of optical surface regions are represented by the optical surface region closer to the optical axis, an intermediate optical surface region and an optical surface region closer to the outside, all arranged in this order from the optical axis side, the optical surface region closer to the outside is a peripheral region.

95. The objective lens of claim 94, wherein spherical aberration is discontinuous in at least one of a boundary between the optical surface region closer to the optical axis and the intermediate optical surface and a boundary between the intermediate optical surface region and the optical surface region closer to the outside.

96. The objective lens of claim 94, wherein the optical surface region closer to the outside has a function to correct spherical aberration when recording or reproducing information for the first optical information recording medium.

97. The objective lens of claim 94, wherein when recording or reproducing information for the first optical information recording medium, spherical aberration of the light flux passing through the intermediate optical surface region is made to be discontinuous and to be flare component, for spherical aberration of the light flux passing through the optical surface region closer to the outside, while when recording or reproducing information for the second optical information recording medium, the light flux passing through the intermediate optical surface region is used.

98. The objective lens of claim 94, wherein the intermediate optical surface region has a function to correct spherical aberration for thickness t ($t_1<t<t_2$) of a transparent base board.

99. The objective lens of claim 94, wherein when recording or reproducing information for the first optical information recording medium, a light flux passing mainly through the optical surface region closer to the optical axis and the optical surface region closer to the outside is used, while when recording or reproducing information for the second optical information recording medium, a light flux passing mainly through the optical surface region closer to the optical axis and the intermediate optical surface region is used.

100. The objective lens of claim 94, wherein when recording or reproducing information for the second optical information recording medium, the following conditional formulas are satisfied under the assumption that the intermediate optical surface region is formed within a range from the shortest distance from an optical axis NAH mm to NAL mm when a necessary numerical aperture is represented by $NA_2$ and a focal length of the objective lens is represented by $f_2$:

$$(NA_2-0.03)f_2<NAH<(NA_2+0.03)f_2$$

$$(NA_2-0.20)f_2<NAL<(NA_2-0.04)f_2.$$

101. The objective lens of claim 94, wherein when recording or reproducing information for the first optical information recording medium, the objective lens has a function to make the spherical aberration to be over for the light flux passing through the intermediate optical surface region.

102. The objective lens of claim 94, wherein the optical surface region closer to the optical axis has a function to correct spherical aberration when recording or reproducing information for the first optical information recording medium.

103. The objective lens of claim 94, wherein the optical surface region closer to the optical axis has a function to correct temperature characteristics when recording or reproducing information for the first optical information recording medium.

104. The objective lens of claim 90, wherein the optical surface of the objective lens comprises two or more kinds of optical surface regions arranged in the direction perpendicular to an optical axis, and when the two kinds of optical surface regions are represented by an optical surface region closer to the optical axis and the peripheral region.

105. The objective lens of claim 104, wherein the optical surface region closer to the outside has a function to correct spherical aberration when recording or reproducing information for the first optical information recording medium.

106. The objective lens of claim 104, wherein the optical surface region closer to the optical axis has a function to correct spherical aberration for thickness $t_1$ of a transparent base board.

107. The objective lens of claim 106, wherein when recording or reproducing information for the second optical information recording medium, the optical surface region closer to the optical axis has a function to correct spherical aberration for the light flux passing through that optical surface region, while when recording or reproducing information for the second optical information recording medium, the optical surface region closer to the outside has a function to make the light flux passing through that optical surface region to be a flare component.

108. The objective lens of claim 104, wherein when recording or reproducing information for the second optical information recording medium, the following conditional formula is satisfied under the assumption that the optical surface region closer to the optical axis is formed within a range of the shortest distance NAH mm from the optical axis, when a necessary numerical aperture is represented by $NA_2$ and a focal length of the objective lens is represented by $f_2$:

$$(NA_2-0.03)f_2 < NAH < (NA_2+0.03)f_2.$$

109. The objective lens of claim 90, wherein a diffractive section where ring-shaped diffractive zones are formed on an optical surface region closer to the optical axis, and average pitch Pin of the ring-shaped diffractive zones satisfies the following conditional formula, when $n^{th}$ order light ray represents a diffracted light ray with the greatest amount of light generated by the diffractive structure and by a light flux passing through the diffractive structure on the optical surface region closer to the light source among light fluxes emitted from the light source, and f represents a focal length of the objective lens:

$$3.00 \times 10^{-3} < Pin/(|n| \cdot f) < 8.0 \times 10^{-2}.$$

110. The objective lens of claim 90, wherein the following conditional formula is satisfied by image forming magnification m1 of the objective lens in conducting recording or reproduction of information for the first optical information recording medium:

$$-\frac{1}{2} < m1 < -\frac{1}{7.5}.$$

111. The objective lens of claim 110, wherein image forming magnification m2 of the objective lens in conducting recording or reproduction of information for the second optical information recording medium is nearly the same as m1.

112. An optical pickup apparatus, comprising:
an objective lens described in claim 90.

113. An optical pickup apparatus, comprising: an objective lens described in claim 76.

114. An optical pickup apparatus, comprising:
an objective lens described in claim 50.

115. An objective lens for use in an optical pickup apparatus having a light source and a light converging optical system including the objective lens, wherein the optical pickup apparatus can record and/or reproduce information for a first recording medium including a first transparent base board having a thickness t1 and a second recording medium including a second transparent base board having a thickness t2 (t1<t2); comprising:

a diffractive structure on at least a peripheral region within an effective diameter of at least one surface;

wherein the objective lens is a plastic lens, wherein a diffractive section having thereon a ring-shaped diffractive zone is formed on an optical surface region closer to the optical axis, and average pitch Pin of the ring-shaped diffractive zone satisfies the following conditional formula, when $n^{th}$ order light ray represents a diffracted light ray with the greatest amount of light generated by the diffractive structure and by a light flux passing through the diffractive structure on the optical surface region closer to the light source among light fluxes emitted from the light source, and f represents a focal length of the objective lens:

$$3.00 \times 10^{-3} < Pin/(|n| \cdot f) < 8.00 \times 10^{-2}.$$

116. The objective lens of claim 115, wherein the optical surface of the objective lens comprises three or more types of optical surface regions arranged in the direction perpendicular to the optical axis, and when the three types of optical surface regions are represented by the optical surface region closer to the optical axis, an intermediate optical surface region and an optical surface region closer to the outside, in this order from the optical axis side, the optical surface region closer to the outside is the aforesaid peripheral region.

117. The objective lens of claim 116, wherein spherical aberration is discontinuous in at least one of a boundary between the optical surface region closer to the optical axis and the intermediate optical surface and a boundary between the intermediate optical surface region and the optical surface region closer to the outside.

118. The objective lens of claim 116, wherein the optical surface region closer to the outside has a function to correct spherical aberration when recording or reproducing information for the first optical information recording medium.

119. The objective lens of claim 116, wherein when recording or reproducing information for the first optical information recording medium, spherical aberration of the light flux passing through the intermediate optical surface region is made to be discontinuous and to be flare component, for spherical aberration of the light flux passing through the optical surface region closer to the outside, while when recording or reproducing information for the second optical information recording medium, the light flux passing through the intermediate optical surface region is used.

120. The objective lens of claim 116, wherein the intermediate optical surface region has a function to correct spherical aberration for thickness t ($t_1 < t < t_2$) of a transparent base board.

121. The objective lens of claim 116, wherein when recording or reproducing information for the first optical information recording medium, a light flux passing mainly through the optical surface region closer to the optical axis and the optical surface region closer to the outside is used, while when recording or reproducing information for the second optical information recording medium, a light flux passing mainly through the optical surface region closer to the optical axis and the intermediate optical surface region is used.

122. The objective lens of claim 116, wherein when recording or reproducing information for the second optical information recording medium, the following conditional formulas are satisfied under the assumption that the intermediate optical surface region is formed within a range from the shortest distance from an optical axis NAH mm to NAL mm when a necessary numerical aperture is represented by $NA_2$ and a focal length of the objective lens is represented by $f_2$:

$$(NA_2-0.03)f_2 < NAH < (NA_2+0.03)f_2$$

$$(NA_2-0.20)f_2 < NAL < (NA_2-0.04)f_2.$$

123. The objective lens of claim 116, wherein when recording or reproducing information for the first optical information recording medium, the objective lens has a function to make the spherical aberration to be under for the light flux passing through the intermediate optical surface region.

124. The objective lens of claim 116, wherein the optical surface region closer to the optical axis has a function to correct spherical aberration when recording or reproducing information for the first optical information recording medium.

125. The objective lens of claim 116, wherein the optical surface region closer to the optical axis has a function to correct temperature characteristics when recording or reproducing information for the first optical information recording medium.

126. The objective lens of claim 115, wherein the optical pickup apparatus having first and second light sources to emit a light flux having a different wavelength from each other and a light converging optical system including the objective lens;
wherein the optical pickup apparatus records and/or reproduces information for a first recording medium by using the first light source and the light converging optical system; and the optical pickup apparatus records and/or reproduces information for a second recording medium by using the second light source and the light converging optical system;
wherein the following conditional formula is satisfied when $\delta SA_1/\delta T$ represents a change in spherical aberration for temperature change $\delta T$ in a light flux which has passed the diffractive structure on the peripheral region among light fluxes emitted from the light source, and $\lambda 1$ represents a wavelength of the first light source:

$$|\delta SA_1/\delta T| < 0.002\ \lambda rms/°\ C.$$

127. The objective lens of claim 126, wherein the optical surface of the objective lens comprises three or more types of optical surface regions arranged in the direction perpendicular to the optical axis, and when the three types of optical surface regions are represented by the optical surface region closer to the optical axis, an intermediate optical surface region and an optical surface region closer to the outside, in this order from the optical axis side, the optical surface region closer to the outside is a peripheral region.

128. The objective lens of claim 127, wherein spherical aberration is discontinuous in at least one of a boundary between the optical surface region closer to the optical axis and the intermediate optical surface and a boundary between the intermediate optical surface region and the optical surface region closer to the outside.

129. The objective lens of claim 127, wherein the optical surface region closer to the outside has a function to correct spherical aberration when recording or reproducing information for the first optical information recording medium.

130. The objective lens of claim 127, wherein when recording or reproducing information for the first optical information recording medium, spherical aberration of the light flux passing through the intermediate optical surface region is made to be discontinuous and to be flare component, for spherical aberration of the light flux passing through the optical surface region closer to the outside, while when recording or reproducing information for the second optical information recording medium, the light flux passing through the intermediate optical surface region is used.

131. The objective lens of claim 127, wherein the intermediate optical surface region has a function to correct spherical aberration for thickness t ($t_1 < t < t_2$) of a transparent base board.

132. The objective lens of claim 127, wherein when recording or reproducing information for the first optical information recording medium, a light flux passing mainly through the optical surface region closer to the optical axis and the optical surface region closer to the outside is used, while when recording or reproducing information for the second optical information recording medium, a light flux passing mainly through the optical surface region closer to the optical axis and the intermediate optical surface region is used.

133. The objective lens of claim 127, wherein when recording or reproducing information for the second optical information recording medium, the following conditional formulas are satisfied under the assumption that the intermediate optical surface region is formed within a range from the shortest distance from an optical axis NAH mm to NAL mm when a necessary numerical aperture is represented by $NA_2$ and a focal length of the objective lens is represented by $f_2$:

$$(NA_2-0.03)f_2 < NAH < (NA_2+0.03)f_2$$

$$(NA_2-0.20)f_2 < NAL < (NA_2-0.04)f_2.$$

134. The objective lens of claim 127, wherein when recording or reproducing information for the first optical information recording medium, the objective lens has a function to make the spherical aberration to be under for the light flux passing through the intermediate optical surface region.

135. The objective lens of claim 127, wherein the optical surface region closer to the optical axis has a function to correct spherical aberration when recording or reproducing information for the first optical information recording medium.

136. The objective lens of claim 127, wherein the optical surface region closer to the optical axis has a function to correct temperature characteristics when recording or reproducing information for the first optical information recording medium.

137. The objective lens of claim 115, wherein the optical surface of the objective lens comprises three or more kinds of optical surface regions arranged in the direction perpendicular to an optical axis, and when the three or more kinds of optical surface regions are represented by the optical surface region closer to the optical axis, an intermediate optical surface region and an optical surface region closer to the outside, all arranged in this order from the optical axis side, the optical surface region closer to the outside is a peripheral side.

138. The objective lens of claim 137, wherein spherical aberration is discontinuous in at least one of a boundary between the optical surface region closer to the optical axis and the intermediate optical surface and a boundary between the intermediate optical surface region and the optical surface region closer to the outside.

139. The objective lens of claim 137, wherein the optical surface region closer to the outside has a function to correct spherical aberration when recording or reproducing information for the first optical information recording medium.

140. The objective lens of claim 137, wherein when recording or reproducing information for the first optical information recording medium, spherical aberration of the light flux passing through the intermediate optical surface region is made to be discontinuous and to be flare component, for spherical aberration of the light flux passing through the optical surface region closer to the outside, while when recording or reproducing information for the second optical information recording medium, the light flux passing through the intermediate optical surface region is used.

141. The objective lens of claim 137, wherein the intermediate optical surface region has a function to correct spherical aberration for thickness t ($t_1 < t < t_2$) of a transparent base board.

142. The objective lens of claim 137, wherein when recording or reproducing information for the first optical information recording medium, a light flux passing mainly through the optical surface region closer to the optical axis and the optical surface region closer to the outside is used, while when recording or reproducing information for the second optical information recording medium, a light flux passing mainly through the optical surface region closer to the optical axis and the intermediate optical surface region is used.

143. The objective lens of claim 137, wherein when recording or reproducing information for the second optical information recording medium, the following conditional formulas are satisfied under the assumption that the intermediate optical surface region is formed within a range from the shortest distance from an optical axis NAH mm to NAL mm when a necessary numerical aperture is represented by $NA_2$ and a focal length of the objective lens is represented by $f_2$:

$$(NA_2-0.03)f_2 < NAH < (NA_2+0.03)f_2$$

$$(NA_2-0.20)f_2 < NAL < (NA_2-0.04)f_2.$$

144. The objective lens of claim 137, wherein when recording or reproducing information for the first optical information recording medium, the objective lens has a function to make the spherical aberration to be under for the light flux passing through the intermediate optical surface region.

145. The objective lens of claim 137, wherein the optical surface region closer to the optical axis has a function to correct spherical aberration when recording or reproducing information for the first optical information recording medium.

146. The objective lens of claim 137, wherein the optical surface region closer to the optical axis has a function to correct temperature characteristics when recording or reproducing information for the first optical information recording medium.

147. The objective lens of claim 115, comprising:
two kinds of regions toward a peripheral region from an optical axis within an effective diameter of at least one surface,
wherein an inner side region for the peripheral region has a function to correct a spherical aberration when recording or reproducing information for the second optical information recording medium.

148. An objective lens for use in an optical pickup apparatus having a light source and a light converging optical system, wherein the optical pickup apparatus can record and/or reproduce information for a recording medium including a transparent base board having a thickness t1; comprising:
a diffractive structure on at least a peripheral region within an effective diameter of at least one surface;
wherein the objective lens is a plastic lens,
wherein the objective lens converges a divergent light flux emitted from the light source onto an information recording surface of the optical information recording medium; and
wherein the diffractive structure on the peripheral region of the objective lens is a ring-shaped diffractive zone, and average pitch Pout of the ring-shaped diffractive zone satisfies the following conditional formula, when $n^{th}$ order light ray represents a diffracted light ray with the greatest amount of light generated by the diffractive structure and by a light flux passing through the diffractive structure on the peripheral region of the object lens among light fluxes emitted from the light source, and f represents a focal length of the objective lens:

$$2.00 \times 10^{-4} < Pout/(|n|f) < 3.00 \times 10^{-2}.$$

149. The objective lens of claim 148, wherein the following conditional formula is satisfied when $\delta SA_1/\delta T$ represents a change in spherical aberration for temperature change $\delta T$ in a light flux passing through the diffractive structure on the peripheral region among light fluxes emitted from the light source, and $\lambda$ represents a wavelength of the light source:

$$|\delta SA_1/\delta T| < 0.002 \ \lambda rms/^\circ C.$$

150. The objective lens of claim 149, wherein the following conditional formula is satisfied:

$$|\delta SA_1/\delta T| < 0.0005 \ \lambda rms/^\circ C.$$

151. The objective lens of claim 148, wherein average pitch Pout of the ring-shaped diffractive zone satisfies the following conditional formula:

$$1.00 \times 10^{-3} < Pout/(|n|f) < 3.00 \times 10^{-3}.$$

152. The objective lens of claim 148, wherein average pitch Pout of the ring-shaped diffractive zone satisfies the following conditional formula:

$$3.00 \times 10^{-3} < Pout/(|n|f) < 8.00 \times 10^{-3}.$$

153. The objective lens of claim 148, wherein the optical surface of the objective lens comprises two or more kinds of optical surface regions arranged in the direction perpendicular to an optical axis, and when the two kinds of optical surface regions are represented by an optical surface region closer to the optical axis and the peripheral region.

154. The objective lens of claim 153, wherein the optical surface region closer to the outside has a function to correct spherical aberration.

155. The objective lens of claim 153, wherein when recording or reproducing information for the optical information recording medium, the following conditional formula is satisfied under the assumption that the optical surface region closer to the optical axis is formed within a range of the shortest distance from an optical axis NAH mm from the optical axis when a necessary numerical aperture is represented by $NA_2$ and a focal length of the objective lens is represented by $f_2$ and a focal length of the objective lens is represented by $f_2$:

$$(NA_2-0.03)f_2<NAH<(NA_2+0.03)f_2.$$

156. The objective lens of claim 148, wherein a diffractive section where ring-shaped diffractive zones are formed on an optical surface region closer to the optical axis, and average pitch Pin of the ring-shaped diffractive zones satisfies the following conditional formula, when $n^{th}$ order light ray represents a diffracted light ray with the greatest amount of light generated by the diffractive structure and by a light flux passing through the diffractive structure on the optical surface region closer to the light source among light fluxes emitted from the light source, and f represents a focal length of the objective lens:

$$3.00\times10^{-3}<Pin/(|n|\cdot f)<8.00\times10^{-2}.$$

157. The objective lens of claim 148, wherein the following conditional formula is satisfied by image forming magnification m of the objective lens in conducting recording or reproduction of information for the recording medium:

$$-1/2<m1<-1/7.5.$$

158. An optical pickup apparatus, comprising:
an objective lens described in claim 148.

159. An objective lens for use in an optical pickup apparatus having a light source and a light converging optical system, wherein the optical pickup apparatus records and/or reproduces information for a recording medium including a transparent base board having a thickness t1; comprising:
a diffractive structure on at least a peripheral region within an effective diameter of at least one surface;
wherein the objective lens is a plastic lens,
wherein the objective lens converges a divergent light flux emitted from the light source onto an information recording surface of the optical information recording medium; and
wherein a diffractive section having thereon a ring-shaped diffractive zone is formed on an optical surface region closer to the optical axis, and average pitch Pin of the ring-shaped diffractive zone satisfies the following conditional formula, when nth order light ray represents a diffracted light ray with the greatest amount of light generated by the diffractive structure and by a light flux passing through the diffractive structure on the optical surface region closer to the light source among light fluxes emitted from the light source, and f represents a focal length of the objective lens:

$$3.00\times10^{-3}<Pin/(|n|\cdot f)<8.00\times10^{-2}.$$

160. The objective lens of claim 159, wherein the optical surface of the objective lens comprises three or more types of optical surface regions arranged in the direction perpendicular to the optical axis, and when the three or more kinds of optical surface regions are represented by the optical surface region closer to the optical axis, an intermediate optical surface region and an optical surface region closer to the outside, all arranged in this order from the optical axis side, the optical surface region closer to the outside is a peripheral region.

161. The objective lens of claim 160, wherein spherical aberration is discontinuous in at least one of a boundary between the optical surface region closer to the optical axis and the intermediate optical surface and a boundary between the intermediate optical surface region and the optical surface region closer to the outside.

162. The objective lens of claim 160, wherein the optical surface region closer to the outside has a function to correct spherical aberration.

163. The objective lens of claim 160, wherein when recording or reproducing information for the optical information recording medium, the following conditional formulas are satisfied under the assumption that the intermediate optical surface region is formed within a range from the shortest distance from an optical axis NAH mm to NAL mm when a necessary numerical aperture is represented by $NA_2$ and a focal length of the objective lens is represented by $f_2$:

$$(NA_2-0.03)f_2<NAH<(NA_2+0.03)f_2$$

$$(NA_2-0.20)f_2<NAL<(NA_2-0.04)f_2.$$

164. The objective lens of claim 160, wherein the optical surface region closer to the optical axis has a function to correct spherical aberration.

165. The objective lens of claim 160, wherein the optical surface region closer to the optical axis has a function to correct temperature characteristics.

166. An objective lens for conducting recording and/or reproducing of information for an optical information recording medium by converging light emitted from a light source on an information recording surface of the optical information recording medium through a transparent base board, comprising:
at least two or more kinds of optical surface regions provided in an effective diameter on at least one side surface;
a diffractive section formed on an outermost optical surface on the one side surface or on an outermost optical surface on the other side surface at which a light flux having passed through the outermost optical surface on the one side surface further passes, wherein ring-shaped diffractive zones to utilize $n^{th}$ order light ray are formed on the diffractive section;
wherein average pitch Pout of the ring-shaped diffractive zones satisfies the following conditional formula when a focal length of the objective lens is represented by f:

$$2.00\times10^{-4}<Pout/(|n|\cdot f)<3.50\times10^{-3}.$$

167. The objective lens of claim 166, wherein average pitch Pout of the ring-shaped diffractive zone satisfies the following conditional formula:

$$1.00\times10^{-3}<Pout/(|n|\cdot f)<3.00\times10^{-3}.$$

168. The objective lens of claim 166, wherein the optical surface on at least one side of the objective lens is constituted with three or more types of optical surface regions arranged in the direction perpendicular to the optical axis, and an intermediate optical surface region among the aforesaid optical surface regions is provided with a discontinuous section in terms of spherical aberration for at least one optical surface region among the outside and inside optical surface regions.

169. The objective lens of claim 168, wherein at least one of the refraction section and the diffractive section is formed on the intermediate optical surface region.

170. The objective lens of claim 168, wherein there is formed a diffractive section on which a ring-shaped diffractive zone is formed, on the optical surface region including an optical axis excluding the aforesaid intermediate optical surface region, and average pitch Pin of that ring-shaped diffractive zone satisfies the following conditional formula:

$$3.00\times10^{-3}<Pin/(|n|\cdot f)<6.00\times10^{-2}.$$

171. The objective lens of claim 168, wherein the surface on at least one side of the objective lens is constituted with two types of optical surfaces and a diffractive section on which a ring-shaped diffractive zone is formed on the optical surface region including an optical axis, and average pitch Pin of that ring-shaped diffractive zone satisfies the following conditional formula:

$$3.00\times10^{-3}<Pin/(|n|\cdot f)<6.00\times10^{-2}.$$

172. The objective lens of claim 168, wherein the objective lens is made of plastic materials.

173. The objective lens of claim 168, wherein the expression of |n|=1 holds for the diffraction number of order represented by n.

174. An objective lens for use in an optical pickup apparatus having a light source and a light converging optical system including the objective lens, wherein the optical pickup apparatus record and/or reproduce information for a first recording medium including a first transparent base board having a thickness t1 and a second recording medium including a second transparent base board having a thickness t2 (t1<t2) by using the light source and the light converging optical system, comprising:

at least two kinds of optical surface regions comprising, in a direction perpendicular to the optical axis in the order from an optical axis, an optical surface region including the optical axis and an outermost optical surface region within an effective diameter of at least one surface; and a diffractive section formed on the outermost optical surface on the one side surface or on an outermost optical surface on the other side surface at which a light flux having passed through the outermost optical surface on the one side surface further passes, wherein ring-shaped diffractive zones to utilize nth order light ray are formed on the diffractive section;

wherein average pitch Pout of the ring-shaped diffractive zones satisfies the following conditional formula when a focal length of the objective lens is represented by f:

$$2.00\times10^{-4}<Pout/(|n|\cdot f)<3.50\times10^{-3}.$$

175. The objective lens of claim 174, wherein average pitch Pout of the ring-shaped diffractive zone satisfies the following conditional formula:

$$1.00\times10^{-3}<Pout/(|n|\cdot f)<3.00\times10^{-3}.$$

176. The objective lens of claim 174, wherein the light source emits a divergent light flux and the emitted divergent light flux enters to be incident on the objective lens.

177. The objective lens of claim 174, wherein the following conditional formula is satisfied by image forming magnification m1 of the objective lens in the course of conducting recording or reproduction of information for the first optical information recording medium:

$$-\tfrac{1}{2}<m1<-\tfrac{1}{7.5}.$$

178. The objective lens of claim 177, wherein image forming magnification m2 of the objective lens in conducting recording or reproduction of information for the second optical information recording medium is nearly the same as m1.

179. The objective lens of claim 174, wherein the outermost optical surface region has a function to correct spherical aberration when recording or reproducing information for the first optical information recording medium.

180. The objective lens of claim 174, wherein the objective lens comprises three optical surface regions comprising, in a direction perpendicular to the optical axis in the order from an optical axis, an optical surface region including the optical axis, an intermediate optical surface region an outermost optical surface region within an effective diameter of at least one surface, wherein the intermediate optical surface region has a function to make a spherical aberration of a light flux passing the intermediate optical surface region to be an discontinuous flare component for a spherical aberration of a light flux passing through the outermost optical surface region when recording or reproducing information for the first optical information recording medium, and wherein the intermediate optical surface region is used when recording or reproducing information for the second optical information recording medium.

181. The objective lens of claim 180, wherein the intermediate optical surface region has a function to correct spherical aberration for thickness t ($t_1<t<t_2$) of a transparent base board.

182. The objective lens of claim 180, wherein light fluxes passing respectively through the optical surface region mainly including an optical axis and the outermost optical surface region are used when recording or reproducing information for the first optical information recording medium, and light fluxes passing respectively through the optical surface region mainly including an optical axis and the intermediate optical surface region are used when recording or reproducing information for the second optical information recording medium.

183. The objective lens of claim 180, wherein when recording or reproducing information for the second optical information recording medium, the following conditional formulas are satisfied under the assumption that the intermediate optical surface region is formed within a range from NAH mm to NAL mm in terms of the distance from an optical axis, when a necessary numerical aperture is represented by $NA_2$ and a focal length of the objective lens is represented by $f_2$:

$$(NA_2-0.03)f_2<NAH<(NA_2+0.03)f_2$$

$$(NA_2-0.20)f_2<NAL<(NA_2-0.04)f_2.$$

184. The objective lens of claim 180, wherein when recording or reproducing information for the first optical information recording medium and the second optical information recording medium, a light flux having the same wavelength is used, and wherein the objective lens has a function to make an under spherical aberration for a light flux passing through the intermediate optical surface region when recording or reproducing information for the first optical information recording medium.

185. The objective lens of claim 180, wherein when recording or reproducing information for the first optical information recording medium and the second optical information recording medium, a light flux having a different wavelength is used respectively, and
wherein the objective lens has a function to make an over spherical aberration for a light flux passing through the intermediate optical surface region when recording or reproducing information for the first optical information recording medium.

186. The objective lens of claim 180, wherein the optical surface region including the optical axis has a function to correct spherical aberration when conducting recording or reproducing of information for the first optical information recording medium.

187. The objective lens of claim 180, wherein the optical surface region including the optical axis has a function to correct temperature characteristics when conducting recording or reproducing of information for the first optical information recording medium.

188. The objective lens of claim 174, wherein when recording or reproducing information for the first optical information recording medium and the second optical information recording medium, a light flux having the same wavelength is used, and wherein the optical surface region including the optical axis corrects a spherical aberration for a thickness t ($t_1$<t<$t_2$) of the transparent base board.

189. The objective lens of claim 188, wherein the optical surface region including the optical axis has a function to make an under spherical aberration for a light flux passing through the optical surface region including the optical axis when recording or reproducing information for the first optical information recording medium, and the optical surface region including the optical axis has a function to make an over spherical aberration for a light flux passing through the optical surface region including the optical axis when recording or reproducing information for the second optical information recording medium.

190. The objective lens of claim 188, wherein when recording or reproducing information for the second optical information recording medium, the following conditional formula is satisfied under the assumption that the region where spherical aberration is corrected for thickness t of the transparent base board is formed within a range of distance NAH mm from the optical axis, when a necessary numerical aperture is represented by $NA_2$ and a focal length of the objective lens is represented by $f_2$:

$(NA_2-0.03)f_2<NAH<(NA_2+0.03)f_2$.

191. The objective lens of claim 174, wherein the expression of |n|=1 holds for the diffraction number of order represented by n.

192. An optical pickup apparatus, comprising:
a light source; and
a light converging optical system including the objective lens,
wherein the optical pickup apparatus records and/or reproduces information for a first recording medium including a first transparent base board having a thickness t1 and a second recording medium including a second transparent base board having a thickness t2 (t1<t2) by using the light source and the light converging optical system;
the objective comprising
at least two kinds of optical surface regions comprising, in a direction perpendicular to the optical axis in the order from an optical axis, an optical surface region including the optical axis and an outermost optical surface region within an effective diameter of at least one surface; and
a diffractive section formed on the outermost optical surface on the one side surface or on an outermost optical surface on the other side surface at which a light flux having passed through the outermost optical surface on the one side surface further passes, wherein ring-shaped diffractive zones to utilize $n^{th}$ order light ray are formed on the diffractive section;
wherein average pitch Pout of the ring-shaped diffractive zones satisfies the following conditional formula when a focal length of the objective lens is represented by f:

$2.00\times10^{-4}<Pout/(|n|\cdot f)<3.50\times10^{-3}$.

193. The optical pickup apparatus of claim 192, wherein average pitch Pout of the ring-shaped diffractive zone satisfies the following conditional formula:

$1.00\times10^{-3}<Pout/(|n|\cdot f)<3.00\times10^{-3}$.

194. The optical pickup apparatus of claim 192, wherein the light source emits a divergent light flux and the emitted divergent light flux enters to be incident on the objective lens.

195. The optical pickup apparatus of claim 192, wherein the following conditional formula is satisfied by image forming magnification m1 of the objective lens in the course of conducting recording or reproduction of information for the first optical information recording medium:

$-\frac{1}{2}<m1<-\frac{1}{7.5}$.

196. The optical pickup apparatus of claim 195, wherein the objective lens is driven in terms of focusing under the state in which the image forming magnification is constant substantially.

197. The optical pickup apparatus of claim 195, wherein image forming magnification m2 of the objective lens in conducting recording or reproduction of information for the second optical information recording medium is nearly the same as m1.

198. The optical pickup apparatus of claim 192, wherein there is provided a distance adjustment means that adjusts a distance between the light source and the objective lens or between the light source and an information recording surface of the optical information recording medium.

199. The optical pickup apparatus of claim 198, wherein the distance adjustment means adjusts the distance in accordance with a wavelength of the light source in room temperature.

200. The optical pickup apparatus of claim 198, wherein there is provided a temperature adjustment means that adjusts an ambient temperature.

201. The optical pickup apparatus of claim 200, wherein the light source is a semiconductor laser, and the temperature adjustment means adjusts a temperature of the semiconductor laser.

202. The optical pickup apparatus of claim 192, wherein the outermost optical surface region has a function to correct spherical aberration when recording or reproducing information for the first optical information recording medium.

203. The optical pickup apparatus of claim 192, wherein the objective lens comprises three optical surface regions comprising, in a direction perpendicular to the optical axis in the order from an optical axis, an optical surface region including the optical axis, an intermediate optical surface region an outermost optical surface region within an effective diameter of at least one surface, wherein the objective lens has a function to make a spherical aberration of a light flux passing the intermediate optical surface region to be an discontinuous flare component for a spherical aberration of a light flux passing through the outermost optical surface region when recording or reproducing information for the first optical information recording medium, and wherein a light flux having passed through the intermediate optical surface region is used when recording or reproducing information for the second optical information recording medium.

204. The optical pickup apparatus of claim 203, wherein the intermediate optical surface region has a function to correct spherical aberration for thickness t ($t_1 < t < t_2$) of a transparent base board.

205. The optical pickup apparatus of claim 203, wherein when recording or reproducing information for the first optical information recording medium, a light flux passing through the optical surface region including mainly the optical axis and the outermost optical surface region is used, and when recording or reproducing information for the second optical information recording medium, a light flux passing through the optical surface region including mainly the optical axis and the intermediate optical surface region is used.

206. The optical pickup apparatus of claim 203, wherein when recording or reproducing information for the second optical information recording medium, the following conditional formulas are satisfied under the assumption that the intermediate optical surface region is formed within a range from NAH mm to NAL mm in terms of the distance from an optical axis, when a necessary numerical aperture is represented by $NA_2$ and a focal length of the objective lens is represented by $f_2$:

$$(NA_2-0.03)f_2 < NAH < (NA_2+0.03)f_2$$

$$(NA_2-0.20)f_2 < NAL < (NA_2-0.04)f_2.$$

207. The optical pickup apparatus of claim 203, wherein when recording or reproducing information for the first optical information recording medium and the second optical information recording medium, a light flux having the same wavelength is used, and wherein the objective lens has a function to make an under spherical aberration for a light flux passing through the intermediate optical surface region when recording or reproducing information for the first optical information recording medium.

208. The optical pickup apparatus of claim 203, wherein when recording or reproducing information for the first optical information recording medium and the second optical information recording medium, a light flux having a different wavelength is used respectively, and wherein the objective lens has a function to make an over spherical aberration for a light flux passing through the intermediate optical surface region when recording or reproducing information for the first optical information recording medium.

209. The optical pickup apparatus of claim 203, wherein the optical surface region including the optical axis has a function to correct spherical aberration when conducting recording or reproducing of information for the first optical information recording medium.

210. The optical pickup apparatus of claim 203, wherein the optical surface region including the optical axis has a function to correct temperature characteristics when conducting recording or reproducing of information for the first optical information recording medium.

211. The optical pickup apparatus of claim 192, wherein when recording or reproducing information for the first and second optical information recording media, light fluxes relating to the same light source wavelength are used, and the surface on at least one side comprises optical surfaces of two or more kinds, and the optical surface region including the optical axis has a function to correct spherical aberration for thickness t ($t_1 < t < t_2$) of a transparent base board.

212. The optical pickup apparatus of claim 211, wherein the optical surface region including the optical axis has a function to make an under spherical aberration for a light flux passing through the optical surface region including the optical axis when recording or reproducing information for the first optical information recording medium, and the optical surface region including the optical axis has a function to make an over spherical aberration for a light flux passing through the optical surface region including the optical axis when recording or reproducing information for the second optical information recording medium.

213. The optical pickup apparatus of claim 211, wherein when recording or reproducing information for the second optical information recording medium, the following conditional formula is satisfied under the assumption that the intermediate optical surface region is formed within a range of distance NAH mm from an optical axis when a necessary numerical aperture is represented by $NA_2$ and a focal length of the objective lens is represented by $f_2$:

$$(NA_2-0.03)f_2 < NAH < (NA_2+0.03)f_2.$$

214. The optical pickup apparatus of claim 192, wherein a change of spherical aberration for temperature change in a light flux which has passed the outermost optical surface region is in the following range, when $\lambda 1$ represents a wavelength of the light source:

$$|\delta SA1/\delta T| < 0.0005 \ \lambda 1 \ \mathrm{rms}/°\mathrm{C}.$$

215. The optical pickup apparatus of claim 192, wherein the expression of $|n|=1$ holds for the diffraction number of order represented by n.

216. An objective lens for use in an optical pickup apparatus having a light source and a light converging optical system including the objective lens, wherein the optical pickup apparatus can record and/or reproduce information for a first recording medium including a first transparent base board having a thickness t1 and a second recording medium including a second transparent base board having a thickness t2 (t1<t2) by using the light source and the light converging optical system, comprising:

at least two kinds of optical surface regions comprising in a direction perpendicular to the optical axis in the order from an optical axis within an effective diameter of at least one surface, wherein the light source emits a divergent light flux and the emitted divergent light flux enters to be incident on the objective lens; and a ring-shaped diffractive zone formed on an outermost optical surface on the one side surface or on an outermost optical surface on the other side surface at which a light flux having passed through the outermost optical surface on the one side surface further passes so that a temperature characteristic of the light flux having passed through the outermost optical surface is corrected;

wherein the objective lens comprises an optical surface region at an inside of the outermost optical surface region and the optical surface is applied with a spherical aberration design proper for recording or reproducing information for the second optical information recording medium; and wherein average pitch Pout of the ring-shaped diffractive zone utilizing n-th order light ray satisfies the following conditional formula, when a focal length of the objective lens is represented by f:

$$2.00 \times 10^{-4} < Pout/(|n| \cdot f) < 3.50 \times 10^{-3}.$$

217. The objective lens of claim 216, wherein the following conditional formula is satisfied by image forming magnification m1 of the objective lens in the course of conducting recording or reproduction of information for the first optical information recording medium:

$$-1/2 < m1 < -1/7.5.$$

218. The objective lens of claim 217, wherein image forming magnification m2 of the objective lens in conducting recording or reproduction of information for the second optical information recording medium is nearly the same as m1.

219. The objective lens of claim 216, wherein the optical surface region on at least one side of the objective lens comprises three or more kinds of optical surface regions arranged in the direction perpendicular to an optical axis and the optical surface region to correct spherical aberration for a light flux for recording or reproducing information for the first optical information recording medium is arranged inside the optical surface region for recording or reproducing information for the second optical information recording medium.

220. The objective lens of claim 216, wherein the optical surface region on at least one side of the objective lens comprises three or more kinds of optical surface regions arranged in the direction perpendicular to an optical axis, and the optical surface region to correct temperature characteristics for a light flux for recording or reproducing information for the first optical information recording medium is arranged inside the optical surface region for recording or reproducing information for the second optical information recording medium.

221. The objective lens of claim 216, wherein the optical pickup apparatus having a first and second light sources to emit a light flux having different wavelengths from each other and a light converging optical system including the objective lens, wherein the optical pickup apparatus records and/or reproduces information for the first recording medium by using the first light source and the light converging optical system, and the optical pickup apparatus records and/or reproduces information of the second recording medium by using the second light source and the light converging optical system.

222. The objective lens of claim 221, wherein the following conditional formula is satisfied by image forming magnification m1 of the objective lens in the course of conducting recording or reproduction of information for the first optical information recording medium:

$$-1/2 < m1 < -1/7.5.$$

223. The objective lens of claim 222, wherein image forming magnification m2 of the objective lens in conducting recording or reproduction of information for the second optical information recording medium is nearly the same as m1.

224. The objective lens of claim 221, wherein the objective lens comprises at least three optical surface regions arranged in a direction perpendicular to an optical axis in a effective diameter of at least one surface, an intermediate optical surface region among the three optical surface regions is used only when the second light source is used, the objective lens comprises an optical surface region to correct a spherical aberration for a light flux emitted from the first light source at an inside of the intermediate optical surface region.

225. The objective lens of claim 224, wherein an optical surface region for the exclusive use of the light flux from the second light source and the outermost optical surface region adjacent to each other.

226. The objective lens of claim 224, wherein spherical aberration in light fluxes passing respectively through the outermost optical surface region and the intermediate optical surface region adjacent to the outermost optical surface region is discontinuous.

227. The objective lens of claim 224, wherein at least one of a diffractive section and a refraction section is arranged on the intermediate optical surface region.

228. The objective lens of claim 224, wherein the objective lens is made of a plastic material.

229. The objective lens of claim 221, wherein the objective lens comprises at least three optical surface regions arranged in a direction perpendicular to an optical axis on at least one surface, an intermediate optical surface region among the three optical surface regions is used only when the second light source is used, the objective lens comprises an optical surface region to correct a temperature characteristic for a light flux emitted from the first light source at an inside of the intermediate optical surface region.

230. The objective lens of claim 229, wherein an optical surface region for the exclusive use of the light flux from the second light source and the outermost optical surface region regiondjacent to each other.

231. The objective lens of claim 229, wherein spherical aberration in light fluxes passing respectively through the outermost optical surface region and the intermediate optical surface region adjacent to the outermost optical surface region is discontinuous.

232. The objective lens of claim 229, wherein at least one of a diffractive section and a refraction section is arranged on the intermediate optical surface region.

233. The objective lens of claim 229, wherein the objective lens is made of a plastic material.

234. An optical pickup apparatus, comprising:
a light source; and
a light converging optical system including an objective lens,
wherein the optical pickup apparatus records and/or reproduces information for a first recording medium including a first transparent base board having a thickness t1 and a second recording medium including a second transparent base board having a thickness t2 (t1<t2) by using the light source and the light converging optical system,
wherein the objective lens comprises:
at least two kinds of optical surface regions comprising in a direction perpendicular to the optical axis in the order from an optical axis within an effective diameter of at least one surface,
wherein the light source emits a divergent light flux and the emitted divergent light flux enters to be incident on the objective lens;

wherein a ring-shaped diffractive zone is formed on an outermost optical surface on the one side surface or on an outermost optical surface on the other side surface at which a light flux having passed through the outermost optical surface on the one side surface further passes so that a temperature characteristic of the light flux having passed through the outermost optical surface is corrected;

wherein the objective lens comprises an optical surface region at an inside of the outermost optical surface region and the optical surface is applied with a spherical aberration design proper for recording or reproducing information for the second optical information recording medium; and wherein average pitch Pout of the ring-shaped diffractive zone utilizing $n^{th}$ order light ray satisfies the following conditional formula, when a focal length of the objective lens is represented by f:

$$2.00 \times 10^{-4} < Pout/(|n| \cdot f) < 3.50 \times 10^{-3}.$$

235. The optical pickup apparatus of claim 234, wherein the following conditional formula is satisfied by image forming magnification m1 of the objective lens in the course of conducting recording or reproduction of information for the first optical information recording medium:

$$-1/2 < m1 < -1/7.5.$$

236. The optical pickup apparatus of claim 235, wherein image forming magnification m2 of the objective lens in conducting recording or reproduction of information for the second optical information recording medium is nearly the same as m1.

237. The optical pickup apparatus of claim 234, wherein the objective lens comprises at least three optical surface regions arranged in a direction perpendicular to an optical axis in a effective diameter of at least one surface, and the objective lens comprises an optical surface applied with a spherical aberration design proper for recording or reproducing information for the second optical information recording medium and another optical surface region to correct a spherical aberration for a light flux for recording or reproducing information for the first optical information recording medium at an inside of the optical surface region.

238. The optical pickup apparatus of claim 234, wherein the objective lens comprises at least three optical surface regions arranged in a direction perpendicular to an optical axis in a effective diameter of at least one surface, and the objective lens comprises an optical surface region applied with a spherical aberration design proper for recording or reproducing information for the second optical information recording medium and another optical surface region to correct a temperature characteristic for a light flux for recording or reproducing information for the first optical information recording medium at an inside of the optical surface region.

239. The optical pickup apparatus of claim 234, wherein the objective lens comprises an optical surface region applied with a spherical aberration design proper for recording or reproducing information for the second optical information recording medium and a spherical aberration at an outermost optical surface region is made to be discontinuous.

240. The optical pickup apparatus of claim 234, wherein the objective lens comprises an optical surface region applied with a spherical aberration design proper for recording or reproducing information for the second optical information recording medium and at least one of a refractive section and a diffractive section is provided on the optical surface region.

241. The optical pickup apparatus of claim 234, wherein a change of spherical aberration for temperature change in a light flux which has passed the outermost optical surface region is in the following range, when λ1 represents a wavelength of the light source at the room temperature:

$$|\delta SA1/T| < 0.0005 \; \lambda1 \; \mathrm{rms}/^\circ \mathrm{C}.$$

242. The optical pickup apparatus of claim 234, wherein the objective lens is made of a plastic material.

243. The objection lens of claim 234, wherein the optical pickup apparatus having a first and second light sources to emit a light flux having different wavelengths from each other and a light converging optical system including the objective lens;

wherein the optical pickup apparatus records and/or reproduces information for a first recording medium by using the first light source and the light converging optical system, and the optical pickup apparatus records and/or reproduces information of the second recording medium by using the second light source and the light converging optical system.

244. The optical pickup apparatus of claim 243, wherein the following conditional formula is satisfied by image forming magnification m1 of the objective lens in the course of conducting recording or reproduction of information for the first optical information recording medium:

$$-1/2 < m1 < -1/7.5.$$

245. The optical pickup apparatus of claim 243, wherein image forming magnification m2 of the objective lens in conducting recording or reproduction of information for the second optical information recording medium is nearly the same as m1.

246. The optical pickup apparatus of claim 243, wherein the objective lens comprises at least three optical surface regions arranged in a direction perpendicular to an optical axis in a effective diameter of at least one surface, and the objective lens comprises an optical surface applied with a spherical aberration design proper for recording or reproducing information for the second optical information recording medium and another optical surface region to correct a spherical aberration for a light flux emitted from the first light source at an inside of the optical surface region.

247. The optical pickup apparatus of claim 246, wherein in the objective lens, the optical surface applied with a spherical aberration design proper for recording or reproducing information for the second optical information recording medium adjoins to an outermost optical surface region.

248. The optical pickup apparatus of claim 243, wherein the objective lens comprises at least three optical surface regions arranged in a direction perpendicular to an optical axis in a effective diameter of at least one surface, and the objective lens comprises an optical surface applied with a spherical aberration design proper for recording or reproducing information for the second optical information recording medium and another optical surface region to correct a temperature characteristic for a light flux emitted from the first light source at an inside of the optical surface region.

249. The optical pickup apparatus of claim 248, wherein in the objective lens, the optical surface applied with a spherical aberration design proper for recording or reproducing information for the second optical information recording medium adjoins to an outermost optical surface region.

250. The optical pickup apparatus of claim 243, wherein in the objective lens, a spherical aberration of an outermost optical surface region is discontinuous to a spherical aberration of the optical surface applied with a spherical aberration design proper for recording or reproducing information for the second optical information recording medium.

251. The optical pickup apparatus of claim 243, wherein in the objective lens, at least one of a refractive section and a diffractive section is provided on the optical surface applied with a spherical aberration design proper for recording or reproducing information for the second optical information recording medium.

252. The optical pickup apparatus of claim 243, wherein a change of spherical aberration for temperature change in a light flux which has passed the outermost optical surface region is in the following range, when $\lambda 1$ represents a wavelength of the light source at the room temperature:

$$|\delta SA1/\delta T| < 0.0005 \; \lambda 1 \; \text{rms}/° \text{C}.$$

253. The optical pickup apparatus of claim 243, wherein the objective lens is made of a plastic material.

* * * * *

UNITED STATES PATENT AND TRADEMARK OFFICE
CERTIFICATE OF CORRECTION

PATENT NO.      : 7,102,980 B2
APPLICATION NO. : 09/983682
DATED           : September 5, 2006
INVENTOR(S)     : Shinichiro Saito and Katsuya Sakamoto It is certified that error appears in the above-identified patent and that said Letters Patent is hereby corrected as shown below:

In claim 1, column 96, line 17, "t1" should read --$t_1$--.

In claim 1, column 96, line 18, "t2" should read --$t_2$--.

In claim 1, column 96, line 19, "(t1<t2);" should read --$(t_1<t_2)$;--.

In claim 1, column 96, line 37, "Pout" should read --P out--.

In claim 1, column 96, line 41, "$2.00\times10^{-4}<Pout/(|n|\cdot f)<3.00\times10^{-2}$." should read --$2.00\times10^{-4}\leq P\ out/(|n|\cdot f)\leq 3.00\times10^{-2}$.--.

In claim 5, column 96, line 64, "Pout" should read --P out--.

In claim 5, column 96, line 67, "$1.00\times10^{-3}=Pout/(|n|\cdot f)<3.00\times10^{-3}$." should read --$1.00\times10^{-3}\leq P\ out/(|n|\cdot f)\leq 3.00\times10^{-3}$.--.

In claim 6, column 97, line 2, "Pout" should read --P out--.

In claim 6, column 97, line 4, "$3.00\times10^{-3}<Pout/(|n|\cdot f)<8.00\times10^{-3}$." should read --$3.00\times10^{-3}\leq P\ out/(|n|\cdot f)\leq 8.00\times10^{-3}$.--.

In claim 10, column 97, line 31, "$(NA_2-0.03)f_2<NAH<(NA_2+0.03)f_2$." should read --$(NA_2-0.03)f_2\leq NAH\leq(NA_2+0.03)f_2$.--.

In claim 17, column 98, line 45, "Pout" should read --P out--.

In claim 17, column 98, line 47, "$1.00\times10^{-3}<Pout/(|n|\cdot f)<3.00\times10^{-3}$." should read --$1.00\times10^{-3}\leq P\ out/(|n|\cdot f)\leq 3.00\times10^{-3}$.--.

In claim 18, column 98, line 50, "Pout" should read --P out--.

In claim 18, column 98, line 53, "$3.00\times10^{-3}<Pout/(|n|\cdot f)<8.00\times10^{-3}$." should read --$3.00\times10^{-3}\leq P\ out/(|n|\cdot f)\leq 8.00\times10^{-3}$.--.

In claim 21, column 99, line 6, "Pin" should read --P in--.

In claim 21, column 99, line 15, "$3.00\times10^{-3}<Pin/(|n|\cdot f)<8.0\times10^{-2}$." should read --$3.00\times10^{-3}\leq P\ in/(|n|\cdot f)\leq 8.0\times10^{-2}$.--.

UNITED STATES PATENT AND TRADEMARK OFFICE
CERTIFICATE OF CORRECTION

PATENT NO.       : 7,102,980 B2
APPLICATION NO.  : 09/983682
DATED            : September 5, 2006
INVENTOR(S)      : Shinichiro Saito and Katsuya Sakamoto It is certified that error appears in the above-identified patent and that said Letters Patent is hereby corrected as shown below:

In claim 26, column 99, line 56, "$(NA_2-0.03)f_2<NAH<(NA_2+0.03)f_2$" should read --$(NA_2-0.03)f_2 \leq NAH \leq (NA_2+0.03)f_2$--.

In claim 26, column 99, line 58, "$(NA_2-0.20)f_2<NAL<(NA_2-0.04)f_2$." should read --$(NA_2-0.20)f_2 \leq NAL \leq (NA_2-0.04)f_2$.--.

In claim 31, column 100, line 20, "Pin" should read --P in--.

In claim 31, column 100, line 29, "$3.00 \times 10^{-3} < Pin/(|n| \cdot f) < 8.0 \times 10^{-2}$." should read --$3.00 \times 10^{-3} \leq P\ in/(|n| \cdot f) \leq 8.0 \times 10^{-2}$.--.

In claim 34, column 100, line 49, "$(NA_2-0.03)f_2<NAH<(NA_2+0.03)f_2$." should read --$(NA_2-0.03)f_2 \leq NAH \leq (NA_2+0.03)f_2$.--.

In claim 38, column 101, line 15, "t1" should read --$t_1$--.

In claim 38, column 101, line 16, "t2" should read --$t_2$--.

In claim 38, column 101, line 17, "(t1<t2);" should read --$(t_1<t_2)$;--.

In claim 38, column 101, line 28, "Pin" should read --P in--.

In claim 38, column 101, line 38, "$3.00 \times 10^{-3} < Pin/(|n| \cdot f) < 8.0 \times 10^{-2}$." should read --$3.00 \times 10^{-3} \leq P\ in/(|n| \cdot f) \leq 8.0 \times 10^{-2}$.--.

In claim 45, column 102, line 28, "$(NA_2-0.03)f_2<NAH<(NA_2+0.03)f_2$" should read --$(NA_2-0.03)f_2 \leq NAH \leq (NA_2+0.03)f_2$--.

In claim 45, column 102, line 29, "$(NA_2-0.20)f_2<NAL<(NA_2-0.04)f_2$." should read --$(NA_2-0.20)f_2 \leq NAL \leq (NA_2-0.04)f_2$.--.

In claim 50, column 102, line 60, "t1" should read --$t_1$--.

In claim 50, column 102, line 62, "t2 (t1<t2);" should read --$t_2$ $(t_1<t_2)$;--.

In claim 50, column 103, line 5, "Pout" should read --P out--.

In claim 50, column 103, line 14, "$2.00 \times 10^{-4} < Pout/(|n| \cdot f) < 3.00 \times 10^{-2}$." should read --$2.00 \times 10^{-4} \leq P\ out/(|n| \cdot f) \leq 3.00 \times 10^{-2}$.--.

UNITED STATES PATENT AND TRADEMARK OFFICE
CERTIFICATE OF CORRECTION

| | |
|---|---|
| PATENT NO. | : 7,102,980 B2 |
| APPLICATION NO. | : 09/983682 |
| DATED | : September 5, 2006 |
| INVENTOR(S) | : Shinichiro Saito and Katsuya Sakamoto |

It is certified that error appears in the above-identified patent and that said Letters Patent is hereby corrected as shown below:

In claim 53, column 103, line 28, "Pout" should read --P out--.

In claim 53, column 103, line 31, "$1.00\times10^{-3}<Pout/(|n|\cdot f)<3.00\times10^{-3}$." should read --$1.00\times10^{-3}\leq P\ out/(|n|\cdot f)\leq3.00\times10^{-3}$.--.

In claim 54, column 103, line 33, "Pout" should read --P out--.

In claim 54, column 103, line 36, "$3.00\times10^{-3}<Pout/(|n|\cdot f)<8.00\times10^{-3}$." should read --$3.00\times10^{-3}\leq P\ out/(|n|\cdot f)\leq8.00\times10^{-3}$.--.

In claim 58, column 103, line 61, "$(NA_2-0.03)f_2<NAH<(NA_2+0.03)f_2$." should read --$(NA_2-0.03)f_2\leq NAH\leq(NA_2+0.03)f_2$.--.

In claim 60, column 104, line 8, "Pin" should read --P in--.

In claim 60, column 104, line 17, "$3.00\times10^{-3}<Pin/(|n|\cdot f)<8.0\times10^{-2}$." should read --$3.00\times10^{-3}\leq P\ in/(|n|\cdot f)\leq8.0\times10^{-2}$.--.

In claim 61, column 104, line 23, "$-\frac{1}{2}<m1<\frac{1}{7.5}$." should read -- $-\frac{1}{2}<m1<-\frac{1}{7.5}$. --.

In claim 65, column 104, line 54, "Pout" should read --P out--.

In claim 65, column 104, line 57, "$1.00\times10^{-3}<Pout/(|n|\cdot f)<3.00\times10^{-3}$." should read --$1.00\times10^{-3}\leq P\ out/(|n|\cdot f)\leq3.00\times10^{-3}$.--.

In claim 66, column 104, line 59, "Pout" should read --P out--.

In claim 66, column 104, line 62, "$3.00\times10^{-3}<Pout/(|n|\cdot f)<8.00\times10^{-3}$." should read --$3.00\times10^{-3}\leq P\ out/(|n|\cdot f)\leq8.00\times10^{-3}$.--.

In claim 68, column 105, line 7, "Pin" should read --P in--.

In claim 68, column 105, line 15, "$3.00\times10^{-3}<Pin/(|n|\cdot f)<b8.0\times10^{-2}$." should read --$3.00\times10^{-3}\leq P\ in/(|n|\cdot f)\leq8.0\times10^{-2}$.--.

In claim 71, column 105, line 34, "$(NA_2-0.03)f_2<NAH<(NA_2+0.03)f_2$." should read --$(NA_2-0.03)f_2\leq NAH\leq(NA_2+0.03)f_2$.--.

In claim 79, column 106, line 15, "Pout" should read --P out--.

UNITED STATES PATENT AND TRADEMARK OFFICE
CERTIFICATE OF CORRECTION

PATENT NO. : 7,102,980 B2
APPLICATION NO. : 09/983682
DATED : September 5, 2006
INVENTOR(S) : Shinichiro Saito and Katsuya Sakamoto It is certified that error appears in the above-identified patent and that said Letters Patent is hereby corrected as shown below:

In claim 79, column 106, line 17, "$1.00\times10^{-3}<\text{Pout}/(|n|\cdot f)<3.00\times10^{-3}$." should read --$1.00\times10^{-3}\leq \text{P out}/(|n|\cdot f)\leq3.00\times10^{-3}$.--.

In claim 80, column 106, line 20, "Pout" should read --P out--.

In claim 80, column 106, line 23, "$3.00\times10^{-3}<\text{Pout}/(|n|\cdot f)<8.00\times10^{-3}$." should read --$3.00\times10^{-3}\leq \text{P out}/(|n|\cdot f)\leq8.00\times10^{-3}$.--.

In claim 86, column 106, line 62, "Pin" should read --P in--.

In claim 86, column 107, line 4, "$3.00\times10^{-3}<\text{Pin}/(|n|\cdot f)<8.00\times10^{-2}$." should read --$3.00\times10^{-3}\leq \text{P in}/(|n|\cdot f)\leq8.00\times10^{-2}$.--.

In claim 92, column 107, line 64, "Pout" should read --P out--.

In claim 92, column 107, line 67, "$1.00\times10^{-3}<\text{Pout}/(|n|\cdot f)<3.00\times10^{-3}$." should read --$1.00\times10^{-3}\leq \text{P out}/(|n|\cdot f)\leq3.00\times10^{-3}$.--.

In claim 93, column 108, line 2, "Pout" should read --P out--.

In claim 93, column 108, line 4, "$3.00\times10^{-3}<\text{Pout}/(|n|\cdot f)<8.00\times10^{-3}$." should read --$3.00\times10^{-3}\leq \text{P out}/(|n|\cdot f)\leq8.00\times10^{-3}$.--.

In claim 100, column 108, line 59, "$(NA_2-0.03)f_2<NAH<(NA_2+0.03)f_2$" should read --$(NA_2-0.03)f_2\leq NAH\leq(NA_2+0.03)f_2$--.

In claim 100, column 108, line 61, "$(NA_2-0.20)f_2<NAL<(NA_2-0.04)f_2$." should read --$(NA_2-0.20)f_2\leq NAL\leq(NA_2-0.04)f_2$.--.

In claim 108, column 109, line 45, "$(NA_2-0.03)f_2<NAH<(NA_2+0.03)f_2$." should read --$(NA_2-0.03)f_2\leq NAH\leq(NA_2+0.03)f_2$.--.

In claim 109, column 109, line 49, "Pin" should read --P in--.

In claim 109, column 109, line 57, "$3.00\times10^{-3}<\text{Pin}/(|n|\cdot f)<8.0\times10^{-2}$." should read --$3.00\times10^{-3}\leq \text{P in}/(|n|\cdot f)\leq8.0\times10^{-2}$.--.

In claim 115, column 110, line 17, "t1" should read --$t_1$--.

UNITED STATES PATENT AND TRADEMARK OFFICE
CERTIFICATE OF CORRECTION

| | |
|---|---|
| PATENT NO. | : 7,102,980 B2 |
| APPLICATION NO. | : 09/983682 |
| DATED | : September 5, 2006 |
| INVENTOR(S) | : Shinichiro Saito and Katsuya Sakamoto |

It is certified that error appears in the above-identified patent and that said Letters Patent is hereby corrected as shown below:

In claim 115, column 110, line 19, "t2 (t1<t2);" should read --$t_2$ ($t_1<t_2$);--.

In claim 115, column 110, line 25, "Pin" should read --P in--.

In claim 115, column 110, line 35, "$3.00\times10^{-3}<Pin/(|n|\cdot f)<8.00\times10^{-2}$." should read --$3.00\times10^{-3}\leq P\ in/(|n|\cdot f)\leq 8.00\times10^{-2}$.--.

In claim 122, column 111, line 24, "$(NA_2-0.03)f_2<NAH<(NA_2+0.03)f_2$" should read --$(NA_2-0.03)f_2\leq NAH\leq(NA_2+0.03)f_2$--.

In claim 122, column 111, line 26, "$(NA_2-0.20)f_2<NAL<(NA_2-0.04)f_2$." should read --$(NA_2-0.20)f_2\leq NAL\leq(NA_2-0.04)f_2$.--.

In claim 133, column 112, line 51, "$(NA_2-0.03)f_2<NAH<(NA_2+0.03)f_2$" should read --$(NA_2-0.03)f_2\leq NAH\leq(NA_2+0.03)f_2$--.

In claim 133, column 112, line 53, "$(NA_2-0.20)f_2<NAL<(NA_2-0.04)f_2$." should read --$(NA_2-0.20)f_2\leq NAL\leq(NA_2-0.04)f_2$.--.

In claim 143, column 113, line 58, "$(NA_2-0.03)f_2<NAH<(NA_2+0.03)f_2$" should read --$(NA_2-0.03)f_2\leq NAH\leq(NA_2+0.03)f_2$--.

In claim 143, column 113, line 60, "$(NA_2-0.20)f_2<NAL<(NA_2-0.04)f_2$." should read --$(NA_2-0.20)f_2\leq NAL\leq(NA_2-0.04)f_2$.--.

In claim 148, column 114, line 23, "t1;" should read --$t_1$;--.

In claim 148, column 114, line 34, "Pout" should read --P out--.

In claim 148, column 114, line 43, "$2.00\times10^{-4}<Pout/(|n|\cdot f)<3.00\times10^{-2}$." should read --$2.00\times10^{-4}\leq P\ out/(|n|\cdot f)\leq 3.00\times10^{-2}$.--.

In claim 151, column 114, line 57, "Pout" should read --P out--.

In claim 151, column 114, line 60, "$1.00\times10^{-3}<Pout/(|n|\cdot f)<3.00\times10^{-3}$." should read --$1.00\times10^{-3}\leq P\ out/(|n|\cdot f)\leq 3.00\times10^{-3}$.--.

In claim 152, column 114, line 62, "Pout" should read --P out--.

UNITED STATES PATENT AND TRADEMARK OFFICE
CERTIFICATE OF CORRECTION

PATENT NO. : 7,102,980 B2
APPLICATION NO. : 09/983682
DATED : September 5, 2006
INVENTOR(S) : Shinichiro Saito and Katsuya Sakamoto It is certified that error appears in the above-identified patent and that said Letters Patent is hereby corrected as shown below:

In claim 152, column 114, line 65, "$3.00 \times 10^{-3} < P_{out}/(|n| \cdot f) < 8.00 \times 10^{-3}$." should read --$3.00 \times 10^{-3} \leq P\ out/(|n| \cdot f) \leq 8.00 \times 10^{-3}$.--.

In claim 155, column 115, line 18, "$(NA_2 - 0.03)f_2 < NAH < (NA_2 + 0.03)f_2$." should read --$(NA_2 - 0.03)f_2 \leq NAH \leq (NA_2 + 0.03)f_2$.--.

In claim 156, column 115, line 23, "Pin" should read --P in--.

In claim 156, column 115, line 32, "$3.00 \times 10^{-3} < P_{in}/(|n| \cdot f) < 8.00 \times 10^{-2}$." should read --$3.00 \times 10^{-3} \leq P\ in/(|n| \cdot f) \leq 8.00 \times 10^{-2}$.--.

In claim 159, column 115, line 46, "t1;" should read --$t_1$;--.

In claim 159, column 115, line 57, "Pin" should read --P in--.

In claim 159, column 115, line 67, "$3.00 \times 10^{-3} < P_{in}/(|n| \cdot f) < 8.00 \times 10^{-2}$." should read --$3.00 \times 10^{-3} \leq P\ in/(|n| \cdot f) \leq 8.00 \times 10^{-2}$.--.

In claim 163, column 116, line 29, "$(NA_2 - 0.03)f_2 < NAH < (NA_2 + 0.03)f_2$" should read --$(NA_2 - 0.03)f_2 \leq NAH \leq (NA_2 + 0.03)f_2$--.

In claim 163, column 116, line 31, "$(NA_2 - 0.20)f_2 < NAL < (NA_2 - 0.04)f_2$." should read --$(NA_2 - 0.20)f_2 \leq NAL \leq (NA_2 - 0.04)f_2$.--.

In claim 166, column 116, line 54, "Pout" should read --P out--.

In claim 166, column 116, line 58, "$2.00 \times 10^{-4} < P_{out}/(|n| \cdot f) < 3.50 \times 10^{-3}$." should read --$2.00 \times 10^{-4} \leq P\ out/(|n| \cdot f) \leq 3.50 \times 10^{-3}$.--.

In claim 167, column 116, line 60, "Pout" should read --P out--.

In claim 167, column 116, line 63, "$1.00 \times 10^{-3} < P_{out}/(|n| \cdot f) < 3.00 \times 10^{-3}$." should read --$1.00 \times 10^{-3} \leq P\ out/(|n| \cdot f) \leq 3.00 \times 10^{-3}$.--.

In claim 170, column 117, line 13, "Pin" should read --P in--.

In claim 170, column 117, line 15, "$3.00 \times 10^{-3} < P_{in}/(|n| \cdot f) < 6.00 \times 10^{-2}$." should read --$3.00 \times 10^{-3} \leq P\ in/(|n| \cdot f) \leq 6.00 \times 10^{-2}$.--.

In claim 171, column 117, line 22, "Pin" should read --P in--.

UNITED STATES PATENT AND TRADEMARK OFFICE
CERTIFICATE OF CORRECTION

PATENT NO. : 7,102,980 B2
APPLICATION NO. : 09/983682
DATED : September 5, 2006
INVENTOR(S) : Shinichiro Saito and Katsuya Sakamoto It is certified that error appears in the above-identified patent and that said Letters Patent is hereby corrected as shown below:

In claim 171, column 117, line 24, "$3.00\times10^{-3}<Pin/(|n|\cdot f)<6.00\times10^{-2}$." should read --$3.00\times10^{-3}\leq P\ in/(|n|\cdot f)\leq6.00\times10^{-2}$.--.

In claim 174, column 117, line 36, "t1" should read --$t_1$--.

In claim 174, column 117, line 38, "t2 (t1<t2)" should read --$t_2\ (t_1<t_2)$--.

In claim 174, column 117, line 53, "Pout" should read --P out--.

In claim 174, column 117, line 57, "$2.00\times10^{-4}<Pout/(|n|\cdot f)<3.50\times10^{-3}$." should read --$2.00\times10^{-4}\leq P\ out/(|n|\cdot f)\leq3.50\times10^{-3}$.--.

In claim 175, column 117, line 59, "Pout" should read --P out--.

In claim 175, column 117, line 62, "$1.00\times10^{-3}<Pout/(|n|\cdot f)<3.00\times10^{-3}$." should read --$1.00\times10^{-3}\leq P\ out/(|n|\cdot f)\leq3.00\times10^{-3}$.--.

In claim 183, column 118, line 57, "$(NA_2-0.03)f_2<NAH<(NA_2+0.03)f_2$" should read --$(NA_2-0.03)f_2\leq NAH\leq(NA_2+0.03)f_2$--.

In claim 183, column 118, line 59, "$(NA_2-0.20)f_2<NAL<(NA_2-0.04)f_2$." should read --$(NA_2-0.20)f_2\leq NAL\leq(NA_2-0.04)f_2$.--.

In claim 190, column 119, line 52, "$(NA_2-0.03)f_2<NAH<(NA_2+0.03)f_2$." should read --$(NA_2-0.03)f_2\leq NAH\leq(NA_2+0.03)f_2$.--.

In claim 192, column 119, line 64, "t1" should read --$t_1$--.

In claim 192, column 119, line 65, "t2" should read --$t_2$--.

In claim 192, column 119, line 66, "(t1<t2)" should read --$(t_1<t_2)$--.

In claim 192, column 120, line 15, "Pout" should read --P out--.

In claim 192, column 120, line 18, "$2.00\times10^{-4}<Pout/(|n|\cdot f)<3.50\times10^{-3}$." should read --$2.00\times10^{-4}\leq P\ out/(|n|\cdot f)\leq3.50\times10^{-3}$.--.

In claim 193, column 120, line 21, "Pout" should --P out--.

UNITED STATES PATENT AND TRADEMARK OFFICE
CERTIFICATE OF CORRECTION

PATENT NO.       : 7,102,980 B2
APPLICATION NO.  : 09/983682
DATED            : September 5, 2006
INVENTOR(S)      : Shinichiro Saito and Katsuya Sakamoto It is certified that error appears in the above-identified patent and that said Letters Patent is hereby corrected as shown below:

In claim 193, column 120, line 23, "$1.00\times10^{-3}<Pout/(|n|\cdot f)<3.00\times10^{-3}$." should read --$1.00\times10^{-3}\leq P\ out/(|n|\cdot f)\leq 3.00\times10^{-3}$.--.

In claim 206, column 121, line 39, "$(NA_2-0.03)f_2<NAH<(NA_2+0.03)f_2$" should read --$(NA_2-0.03)f_2\leq NAH\leq(NA_2+0.03)f_2$--.

In claim 206, column 121, line 41, "$(NA_2-0.20)f_2<NAL<(NA_2-0.04)f_2$." should read --$(NA_2-0.20)f_2\leq NAL\leq(NA_2-0.04)f_2$.--.

In claim 213, column 122, line 33, "$(NA_2-0.03)f_2<NAH<(NA_2+0.03)f_2$." should read --$(NA_2-0.03)f_2\leq NAH\leq(NA_2+0.03)f_2$.--.

In claim 216, column 122, line 50, "t1" should read --$t_1$--.

In claim 216, column 122, line 52, "t2 (t1<t2)" should read --$t_2$ $(t_1<t_2)$--.

In claim 216, column 123, line 7, "Pout" should read --P out--.

In claim 216, column 123, line 11, "$2.00\times10^{-4}<Pout/(|n|\cdot f)<3.50\times10^{-3}$." should read --$2.00\times10^{-4}\leq P\ out/(|n|\cdot f)\leq 3.50\times10^{-3}$.--.

In claim 234, column 124, line 56, "t1" should read --$t_1$--.

In claim 234, column 124, line 57, "t2" should read --$t_2$--.

In claim 234, column 124, line 58, "(t1<t2)" should read --$(t_1<t_2)$--.

In claim 234, column 125, line 15, "Pout" should read --P out--.

UNITED STATES PATENT AND TRADEMARK OFFICE
CERTIFICATE OF CORRECTION

PATENT NO.        : 7,102,980 B2
APPLICATION NO. : 09/983682
DATED             : September 5, 2006
INVENTOR(S)       : Shinichiro Saito and Katsuya Sakamoto It is certified that error appears in the above-identified patent and that said Letters Patent is hereby corrected as shown below:

In claim 234, column 125, line 20, "$2.00 \times 10^{-4} < \text{Pout}/(|n| \cdot f) < 3.50 \times 10^{-3}$." should read --$2.00 \times 10^{-4} \leq P\ \text{out}/(|n| \cdot f) \leq 3.50 \times 10^{-3}$.--.

Signed and Sealed this

Twenty-fourth Day of June, 2008

JON W. DUDAS
*Director of the United States Patent and Trademark Office*